US012625226B2

(12) United States Patent
Au et al.

(10) Patent No.: US 12,625,226 B2
(45) Date of Patent: May 12, 2026

(54) METHOD, APPARATUS, AND SYSTEM FOR WIRELESS SENSING MEASUREMENT AND REPORTING

(71) Applicants: Oscar Chi-Lim Au, Rockville, MD (US); Beibei Wang, Clarksville, MD (US); K. J. Ray Liu, Potomac, MD (US); Hung-Quoc Duc Lai, Parkville, MD (US)

(72) Inventors: Oscar Chi-Lim Au, Rockville, MD (US); Beibei Wang, Clarksville, MD (US); K. J. Ray Liu, Potomac, MD (US); Hung-Quoc Duc Lai, Parkville, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 18/395,539

(22) Filed: Dec. 23, 2023

(65) Prior Publication Data

US 2024/0183936 A1 Jun. 6, 2024

Related U.S. Application Data

(63) Continuation-in-part of application No. 18/199,963, filed on May 21, 2023, and a continuation-in-part of
(Continued)

(51) Int. Cl.
*G01S 7/00* (2006.01)
*G01S 13/00* (2006.01)
(Continued)

(52) U.S. Cl.
CPC ............ *G01S 7/006* (2013.01); *G01S 13/003* (2013.01); *H04L 67/12* (2013.01); *H04L 67/147* (2013.01); *H04W 84/12* (2013.01)

(58) Field of Classification Search
CPC .......... G01S 13/56; G01S 13/86; G01S 13/88; G01S 13/003; G01S 7/006; H04L 5/0026;
(Continued)

(56) References Cited

U.S. PATENT DOCUMENTS

| | | | | |
|---|---|---|---|---|
| 2014/0280904 | A1* | 9/2014 | Bugenhagen | ........... H04L 43/12 709/224 |
| 2015/0338500 | A1* | 11/2015 | Levin | .................... G01S 5/0027 455/456.6 |

(Continued)

FOREIGN PATENT DOCUMENTS

| | | | | | |
|---|---|---|---|---|---|
| CN | 116033477 | * | 4/2023 | ............. | Y02D 30/70 |
| WO | WO-2023078203 | A1 * | 5/2023 | | |

(Continued)

*Primary Examiner* — Zhiyu Lu

(57) ABSTRACT

Methods, apparatus and systems for wireless sensing are described. In one example, a described system in a wireless data communication network comprises: a transmitter configured to transmit a time series of at least one wireless sounding signal (WSS) based on a standard wireless network protocol associated with the wireless data communication network, and a receiver. The wireless data communication network comprises a physical (PHY) layer, a medium access control (MAC) layer, and at least one higher layer. The receiver is configured to: receive the time series of at least one WSS (TSWSS) based on the standard wireless network protocol through a wireless channel of a venue, and perform a plurality of wireless sensing measurements based on the received TSWSS to obtain sensing measurement results based on the standard wireless network protocol. The PHY layer or the MAC layer of the receiver provides the sensing measurement results locally to the at least one higher layer of the receiver based on the standard wireless network protocol. The sensing measurement results are
(Continued)

available to the at least one higher layer of the receiver for performing a sensing-based task based on the sensing measurement results.

30 Claims, 32 Drawing Sheets

Related U.S. Application Data application No. PCT/US2022/045708, filed on Oct. 4, 2022, and a continuation-in-part of application No. 17/945,995, filed on Sep. 15, 2022, and a continuation-in-part of application No. 17/891,037, filed on Aug. 18, 2022, and a continuation-in-part of application No. 17/888,429, filed on Aug. 15, 2022, now Pat. No. 11,771,366, and a continuation-in-part of application No. 17/838,228, filed on Jun. 12, 2022, and a continuation-in-part of application No. 17/838,231, filed on Jun. 12, 2022, and a continuation-in-part of application No. 17/838,244, filed on Jun. 12, 2022, and a continuation-in-part of application No. 17/827, 902, filed on May 30, 2022, which is a continuation-in-part of application No. 16/909,940, filed on Jun. 23, 2020, now Pat. No. 11,391,830.

(60) Provisional application No. 63/349,082, filed on Jun. 4, 2022, provisional application No. 63/332,658, filed on Apr. 19, 2022, provisional application No. 63/300,042, filed on Jan. 16, 2022, provisional application No. 63/293,065, filed on Dec. 22, 2021.

(51) Int. Cl.
| | |
|---|---|
| *H04L 67/12* | (2022.01) |
| *H04L 67/147* | (2022.01) |
| *H04W 84/12* | (2009.01) |

(58) Field of Classification Search
CPC ............... H04L 5/0048; H04L 27/2602; H04L 27/2613; H04L 27/2647; H04L 5/0051; H04L 67/12; H04L 67/147; H04W 24/10; H04W 4/38; H04W 84/12
See application file for complete search history.

(56) References Cited

U.S. PATENT DOCUMENTS

| | | | |
|---|---|---|---|
| 2022/0263603 A1* | 8/2022 | Papasakellariou | .... H04L 5/0055 |
| 2024/0049135 A1* | 2/2024 | Lim | ........................ G01S 5/0268 |
| 2024/0306020 A1* | 9/2024 | Gao | ....................... H04W 84/18 |
| 2024/0357653 A1* | 10/2024 | Luo | ....................... H04W 24/10 |

FOREIGN PATENT DOCUMENTS

| | | | | |
|---|---|---|---|---|
| WO | WO2023206861 | * 11/2023 | ............. | H04B 17/00 |
| WO | WO-2023211362 A2 | * 11/2023 | ............. | H04L 67/14 |
| WO | WO-2023244163 A1 | * 12/2023 | ............. | H04W 24/10 |

* cited by examiner

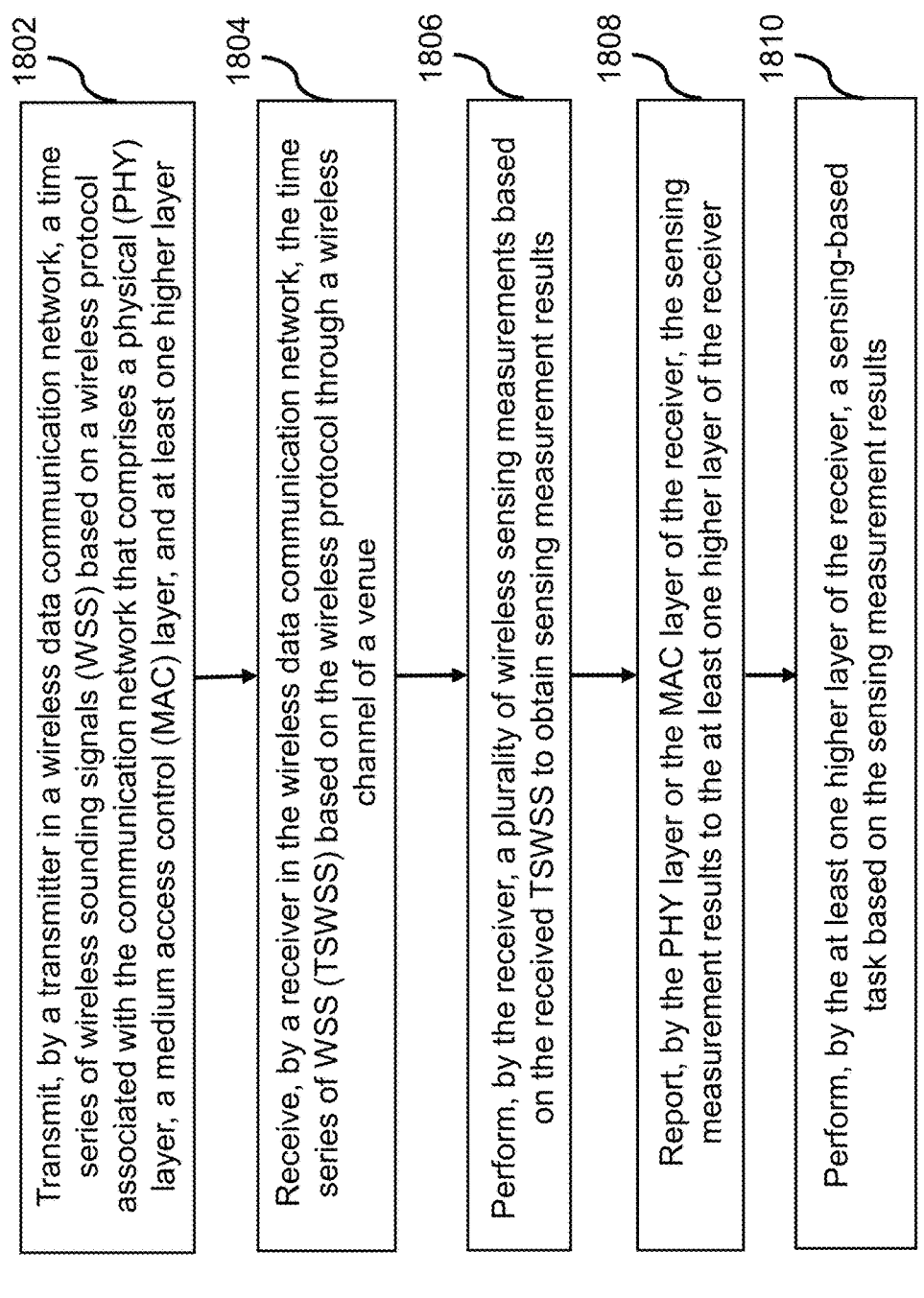

1802 Transmit, by a transmitter in a wireless data communication network, a time series of wireless sounding signals (WSS) based on a wireless protocol associated with the communication network that comprises a physical (PHY) layer, a medium access control (MAC) layer, and at least one higher layer 1804 Receive, by a receiver in the wireless data communication network, the time series of WSS (TSWSS) based on the wireless protocol through a wireless channel of a venue 1806 Perform, by the receiver, a plurality of wireless sensing measurements based on the received TSWSS to obtain sensing measurement results 1808 Report, by the PHY layer or the MAC layer of the receiver, the sensing measurement results to the at least one higher layer of the receiver 1810 Perform, by the at least one higher layer of the receiver, a sensing-based task based on the sensing measurement results

Sensing initiator,
Sensing transmitter

Sensing responder,
Sensing receiver

Sensing PPDU transmission
Optional CSI transmission

Sensing initiator

Sensing responder, Sensing receiver

Sensing responder, Sensing transmitter

Sensing PPDU transmission

Optional CSI transmission

SBP responder,
Sensing initiator,
Sensing transmitter

Sensing responder,
Sensing receiver

SBP initiator

Sensing PPDU transmission
Optional CSI transmission
SBP request

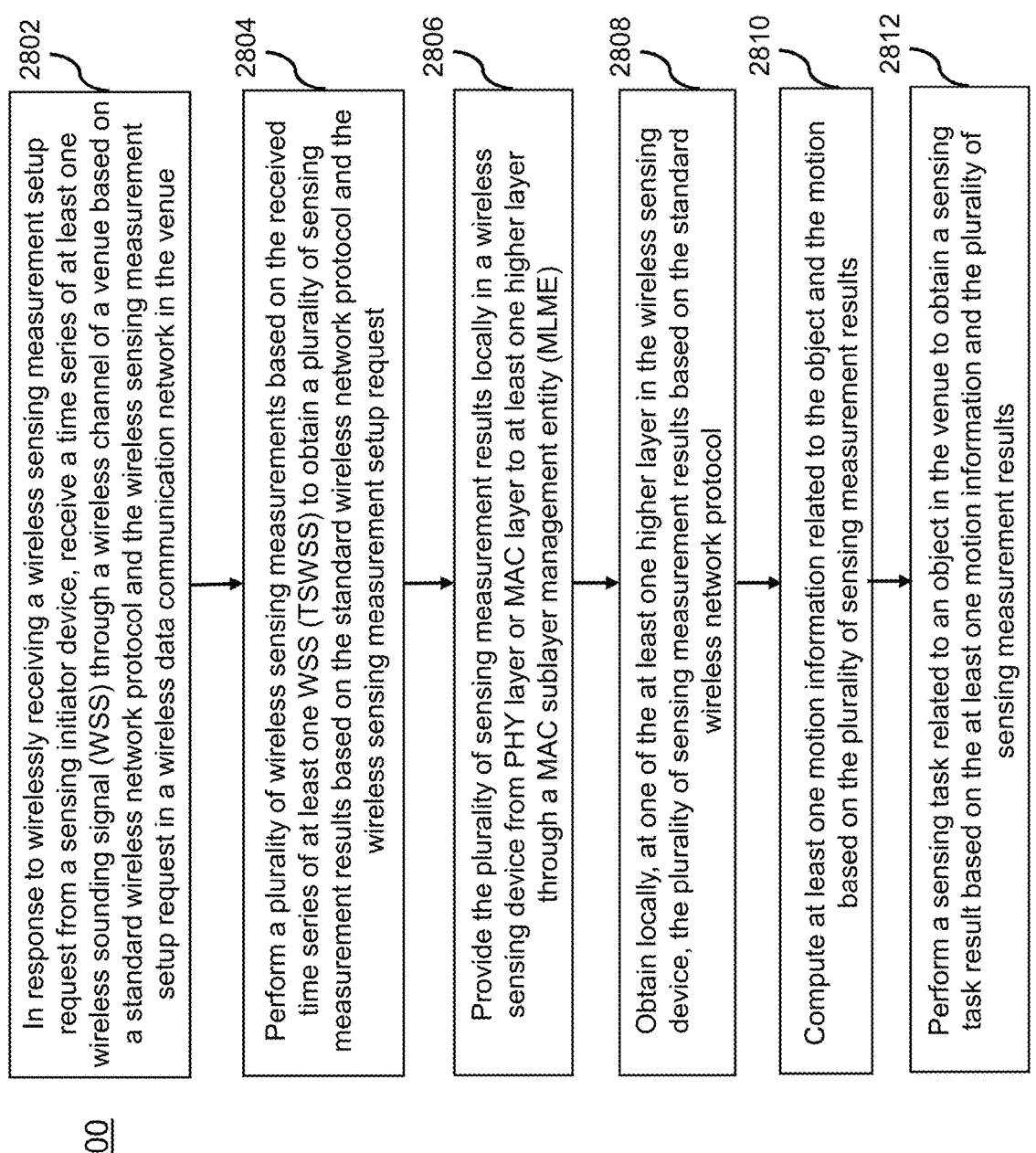

2800

2802 In response to wirelessly receiving a wireless sensing measurement setup request from a sensing initiator device, receive a time series of at least one wireless sounding signal (WSS) through a wireless channel of a venue based on a standard wireless network protocol and the wireless sensing measurement setup request in a wireless data communication network in the venue 2804 Perform a plurality of wireless sensing measurements based on the received time series of at least one WSS (TSWSS) to obtain a plurality of sensing measurement results based on the standard wireless network protocol and the wireless sensing measurement setup request 2806 Provide the plurality of sensing measurement results locally in a wireless sensing device from PHY layer or MAC layer to at least one higher layer through a MAC sublayer management entity (MLME)

2808 Obtain locally, at one of the at least one higher layer in the wireless sensing device, the plurality of sensing measurement results based on the standard wireless network protocol 2810 Compute at least one motion information related to the object and the motion based on the plurality of sensing measurement results 2812 Perform a sensing task related to an object in the venue to obtain a sensing task result based on the at least one motion information and the plurality of sensing measurement results

FIG. 28

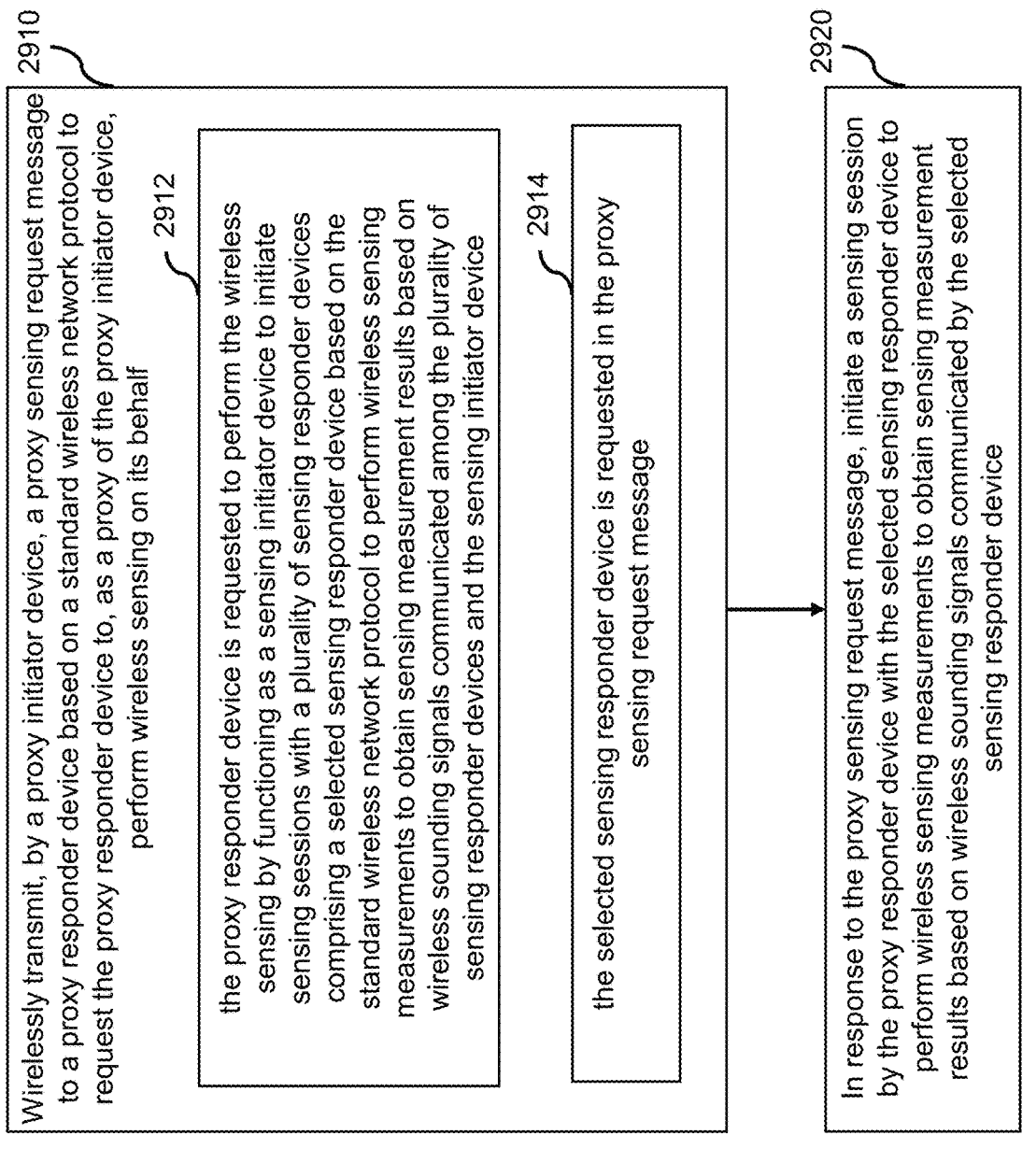

2900

2910

Wirelessly transmit, by a proxy initiator device, a proxy sensing request message to a proxy responder device based on a standard wireless network protocol to request the proxy responder device to, as a proxy of the proxy initiator device, perform wireless sensing on its behalf

2912 the proxy responder device is requested to perform the wireless sensing by functioning as a sensing initiator device to initiate sensing sessions with a plurality of sensing responder devices comprising a selected sensing responder device based on the standard wireless network protocol to perform wireless sensing measurements to obtain sensing measurement results based on wireless sounding signals communicated among the plurality of sensing responder devices and the sensing initiator device

2914 the selected sensing responder device is requested in the proxy sensing request message

2920

In response to the proxy sensing request message, initiate a sensing session by the proxy responder device with the selected sensing responder device to perform wireless sensing measurements to obtain sensing measurement results based on wireless sounding signals communicated by the selected sensing responder device

FIG. 29

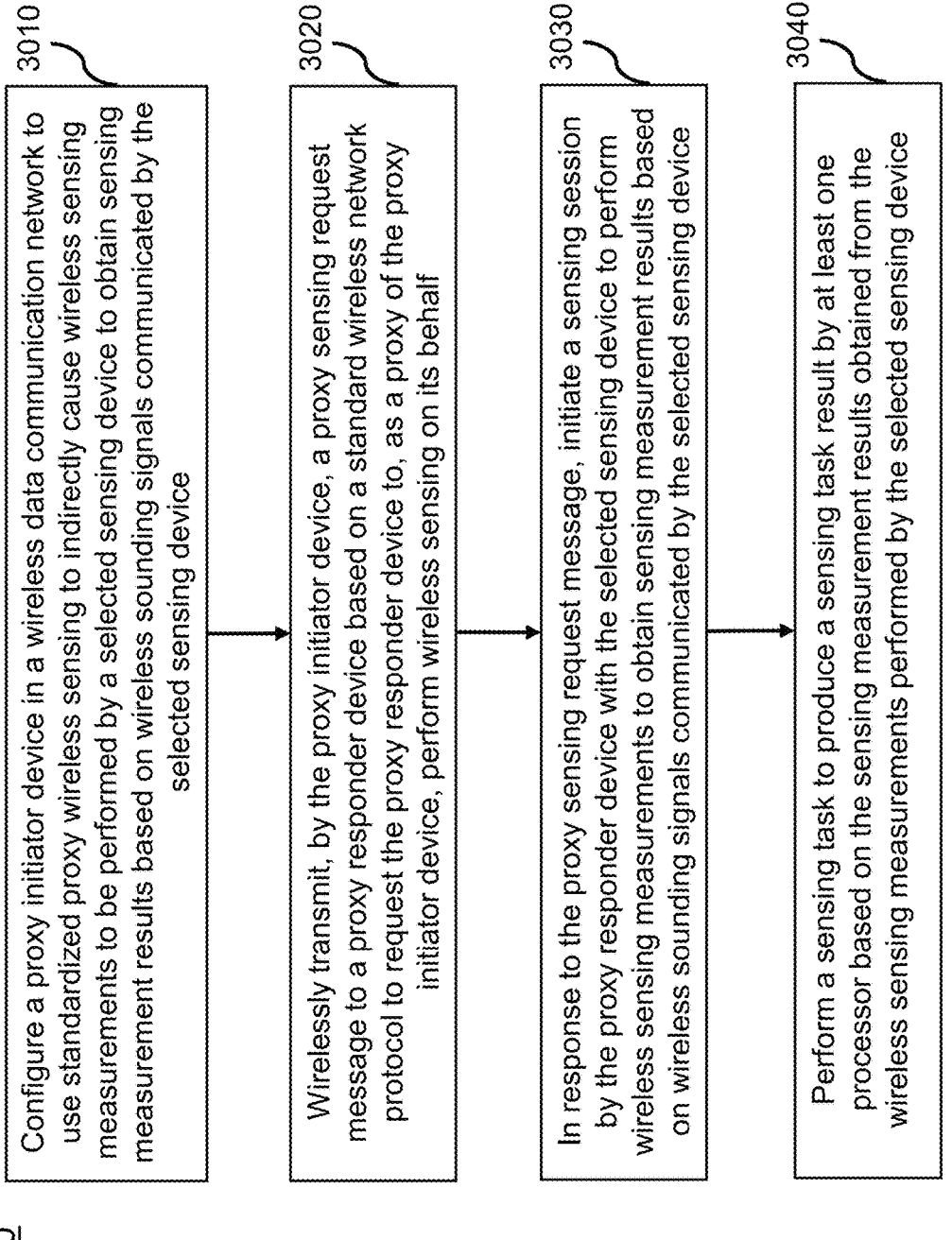

3000

3010

Configure a proxy initiator device in a wireless data communication network to use standardized proxy wireless sensing to indirectly cause wireless sensing measurements to be performed by a selected sensing device to obtain sensing measurement results based on wireless sounding signals communicated by the selected sensing device

3020

Wirelessly transmit, by the proxy initiator device, a proxy sensing request message to a proxy responder device based on a standard wireless network protocol to request the proxy responder device to, as a proxy of the proxy initiator device, perform wireless sensing on its behalf

3030

In response to the proxy sensing request message, initiate a sensing session by the proxy responder device with the selected sensing device to perform wireless sensing measurements to obtain sensing measurement results based on wireless sounding signals communicated by the selected sensing device

3040

Perform a sensing task to produce a sensing task result by at least one processor based on the sensing measurement results obtained from the wireless sensing measurements performed by the selected sensing device

FIG. 30

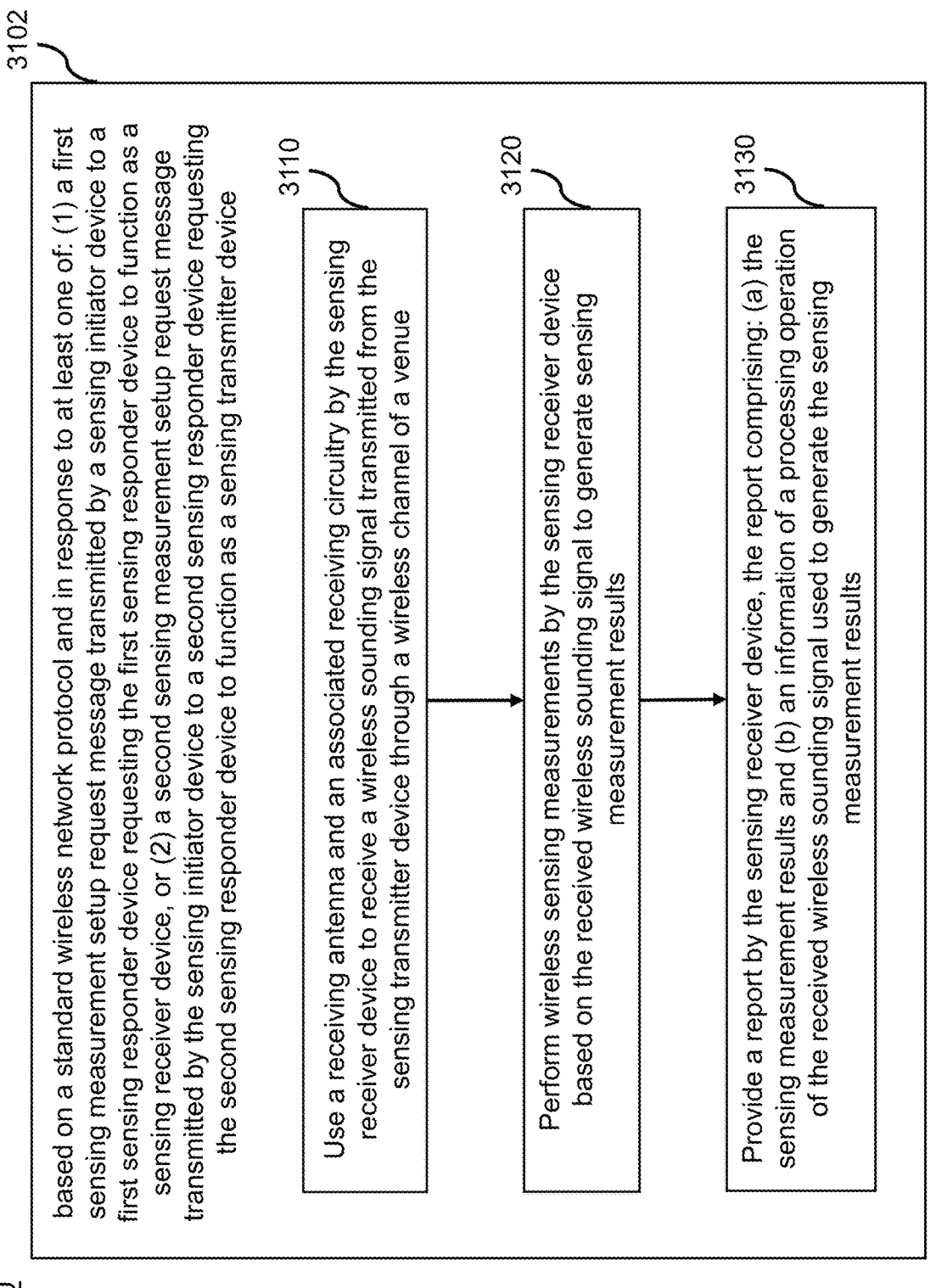

3100

3102 based on a standard wireless network protocol and in response to at least one of: (1) a first sensing measurement setup request message transmitted by a sensing initiator device to a first sensing responder device requesting the first sensing responder device to function as a sensing receiver device, or (2) a second sensing measurement setup request message transmitted by the sensing initiator device to a second sensing responder device requesting the second sensing responder device to function as a sensing transmitter device

3110

Use a receiving antenna and an associated receiving circuitry by the sensing receiver device to receive a wireless sounding signal transmitted from the sensing transmitter device through a wireless channel of a venue

3120

Perform wireless sensing measurements by the sensing receiver device based on the received wireless sounding signal to generate sensing measurement results

3130

Provide a report by the sensing receiver device, the report comprising: (a) the sensing measurement results and (b) an information of a processing operation of the received wireless sounding signal used to generate the sensing measurement results

FIG. 31

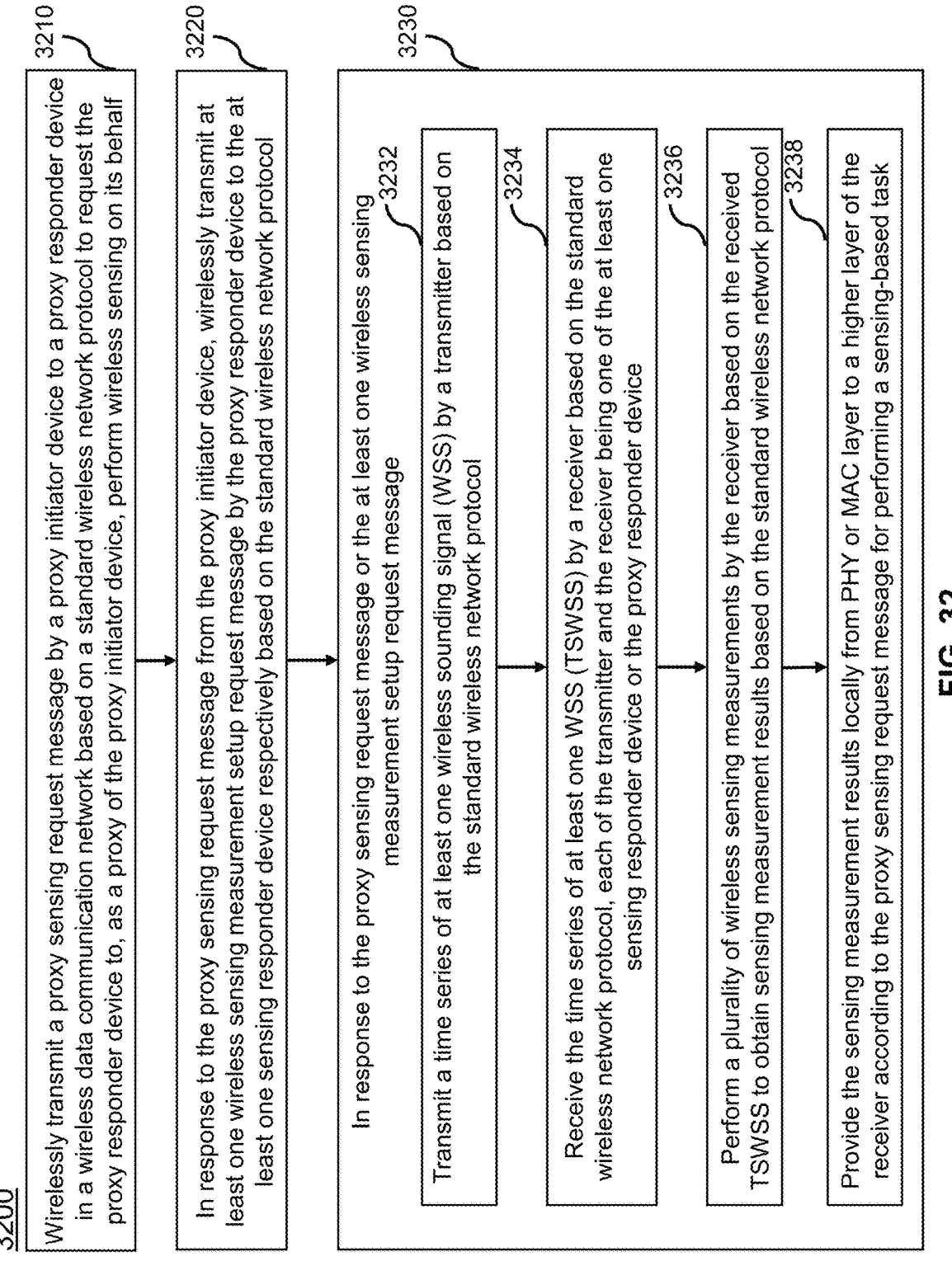

3200

Wirelessly transmit a proxy sensing request message by a proxy initiator device to a proxy responder device in a wireless data communication network based on a standard wireless network protocol to request the proxy responder device to, as a proxy of the proxy initiator device, perform wireless sensing on its behalf — 3210

In response to the proxy sensing request message from the proxy initiator device, wirelessly transmit at least one wireless sensing measurement setup request message by the proxy responder device to the at least one sensing responder device respectively based on the standard wireless network protocol — 3220

In response to the proxy sensing request message or the at least one wireless sensing measurement setup request message — 3230

In response to the proxy sensing request message or the at least one wireless sensing measurement setup request message — 3232

Transmit a time series of at least one wireless sounding signal (WSS) by a transmitter based on the standard wireless network protocol — 3234

Receive the time series of at least one WSS (TSWSS) by a receiver based on the standard wireless network protocol, each of the transmitter and the receiver being one of the at least one sensing responder device or the proxy responder device — 3236

Perform a plurality of wireless sensing measurements by the receiver based on the received TSWSS to obtain sensing measurement results based on the standard wireless network protocol — 3238

Provide the sensing measurement results locally from PHY or MAC layer to a higher layer of the receiver according to the proxy sensing request message for performing a sensing-based task

FIG. 32

METHOD, APPARATUS, AND SYSTEM FOR WIRELESS SENSING MEASUREMENT AND REPORTING

CROSS-REFERENCE TO RELATED APPLICATIONS

The present application hereby incorporates by reference the entirety of the disclosures of, and claims priority to, each of the following cases:

(a) U.S. patent application Ser. No. 18/199,963, entitled "METHOD, APPARATUS, AND SYSTEM FOR WIRELESS SENSING MEASUREMENT AND REPORTING", filed on May 21, 2023, (b) PCT patent application PCT/US22/45708, entitled "METHOD, APPARATUS, AND SYSTEM FOR WIRELESS SENSING MEASUREMENT AND REPORTING", filed on Oct. 4, 2022, (c) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022, which incorporates by reference and claims priority to:

(1) U.S. Provisional Patent application 63/293,065, entitled "METHOD, APPARATUS AND SYSTEM FOR SPEECH ENHANCEMENT AND SEPARATION", filed on Dec. 22, 2021, (2) U.S. Provisional Patent application 63/300,042, entitled "METHOD, APPARATUS, AND SYSTEM FOR WIRELESS SENSING AND SLEEP TRACKING", filed on Jan. 16, 2022, (3) U.S. Provisional Patent application 63/332,658, entitled "METHOD, APPARATUS, AND SYSTEM FOR WIRELESS SENSING", filed Apr. 19, 2022, (4) U.S. Provisional Patent application 63/349,082, entitled "METHOD, APPARATUS, AND SYSTEM FOR WIRELESS SENSING VOICE ACTIVITY DETECTION", filed on Jun. 4, 2022, (5) U.S. patent application Ser. No. 16/909,940, entitled "METHOD, APPARATUS, AND SYSTEM FOR QUALIFIED WIRELESS SENSING", filed on Jun. 23, 2020, issued as U.S. Pat. No. 11,391,830 B2 on Jul. 19, 2022, (d) U.S. patent application Ser. No. 17/827,902, entitled "METHOD, APPARATUS, AND SYSTEM FOR SPEECH ENHANCEMENT AND SEPARATOIN BASED ON AUDIO AND RADIO SIGNALS", filed on May 30, 2022, (e) U.S. patent application Ser. No. 17/838,228, entitled "METHOD, APPARATUS, AND SYSTEM FOR WIRELESS SENSING BASED ON CHANNEL INFORMATION", filed on Jun. 12, 2022, (f) U.S. patent application Ser. No. 17/838,244, entitled "METHOD, APPARATUS, AND SYSTEM FOR WIRELESS SENSING BASED ON LINKWISE MOTION STATISTICS", filed on Jun. 12, 2022, (g) U.S. patent application Ser. No. 17/888,429, entitled "METHOD, APPARATUS, AND SYSTEM FOR RADIO BASED SLEEP TRACKING", filed on Aug. 15, 2022, (h) U.S. patent application Ser. No. 17/891,037, entitled "METHOD, APPARATUS, AND SYSTEM FOR MAP RECONSTRUCTION BASED ON WIRELESS TRACKING", filed on Aug. 18, 2022, (i) U.S. patent application Ser. No. 17/945,995, entitled "METHOD, APPARATUS, AND SYSTEM FOR WIRELESS VITAL MONITORING USING HIGH FREQUENCY SIGNALS", filed on Sep. 15, 2022.

TECHNICAL FIELD

The present teaching generally relates to wireless sensing. More specifically, the present teaching relates to methods, system and devices for performing wireless sensing measurement and reporting.

BACKGROUND

With the proliferation of Internet of Things (IoT) applications, billions of household appliances, phones, smart devices, security systems, environment sensors, vehicles and buildings, and other radio-connected devices will transmit data and communicate with each other or people, and everything will be able to be measured and tracked all the time. Among the various approaches to measure what is happening in the surrounding environment, wireless sensing has received an increasing attention in recent years because of the ubiquitous deployment of wireless radio devices. In addition, human activities affect wireless signal propagations, therefore understanding and analyzing the way how wireless signals react to human activities can reveal rich information about the activities. As more bandwidth becomes available in the new generation of wireless systems, wireless sensing will make many smart IoT applications only imagined today possible in the near future. That is because when the bandwidth increases, one can see many more multipaths, in a rich-scattering environment such as in indoors or metropolitan area, which can be treated as hundreds of virtual antennas/sensors. Some technical standards, including e.g. IEEE 802.11bf, support wireless sensing, but have still not yet finished the standardization regarding many details of the wireless sensing, e.g. how to perform wireless sensing measurement and reporting. As such, an efficient and effective method for wireless sensing measurement and reporting is desirable.

SUMMARY

The present teaching generally relates to wireless sensing. More specifically, the present teaching relates to methods, system and devices for performing wireless sensing measurement and reporting.

In one embodiment, a system in a wireless data communication network for wireless sensing is described. The system comprises: a transmitter configured to transmit a time series of wireless sounding signals (WSS) based on a wireless protocol associated with the wireless data communication network, and a receiver. The wireless data communication network comprises a physical (PHY) layer, a medium access control (MAC) layer, and at least one higher layer. The receiver is configured to: receive the time series of WSS (TSWSS) based on the wireless protocol through a wireless channel of a venue, and perform a plurality of wireless sensing measurements based on the received TSWSS to obtain sensing measurement results. The PHY layer or the MAC layer of the receiver reports the sensing measurement results to the at least one higher layer of the receiver. The at least one higher layer of the receiver performs a sensing-based task based on the sensing measurement results.

In another embodiment, a wireless device in a wireless data communication network for wireless sensing is described. The wireless device comprises: a processor; a memory communicatively coupled to the processor; and a receiver communicatively coupled to the processor. An additional wireless device in the wireless data communication network is configured to transmit a time series of wireless sounding signals (WSS) based on a wireless protocol associated with the wireless data communication network. The wireless data communication network comprises a physical (PHY) layer, a medium access control (MAC) layer, and at least one higher layer. The receiver is configured to: receive the time series of WSS (TSWSS) based on the wireless protocol through a wireless channel of a venue, and perform a plurality of wireless sensing measurements based on the received TSWSS to obtain sensing measurement results. The PHY layer or the MAC layer of the receiver reports the sensing measurement results to the at least one higher layer of the receiver. The at least one higher layer of the receiver performs a sensing-based task based on the sensing measurement results.

In yet another embodiment, a method for wireless sensing is described. The method comprises: transmitting, by a transmitter in a wireless data communication network, a time series of wireless sounding signals (WSS) based on a wireless protocol associated with the wireless data communication network, wherein the wireless data communication network comprises a physical (PHY) layer, a medium access control (MAC) layer, and at least one higher layer; receiving, by a receiver in the wireless data communication network, the time series of WSS (TSWSS) based on the wireless protocol through a wireless channel of a venue; performing, by the receiver, a plurality of wireless sensing measurements based on the received TSWSS to obtain sensing measurement results; reporting, by the PHY layer or the MAC layer of the receiver, the sensing measurement results to the at least one higher layer of the receiver; and performing, by the at least one higher layer of the receiver, a sensing-based task based on the sensing measurement results.

Other concepts relate to software for implementing the present teaching on wireless sensing measurement and reporting. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

FIG. 18 illustrates a flow chart of an exemplary method for identifying devices used for wireless sensing, according to some embodiments of the present disclosure.

FIG. 28 illustrates a flow chart of an exemplary method for wireless sensing, according to some embodiments of the present disclosure.

FIG. 29 illustrates a flow chart of an exemplary method for standardized proxy wireless sensing, according to some embodiments of the present disclosure.

FIG. 30 illustrates a flow chart of another exemplary method for standardized proxy wireless sensing, according to some embodiments of the present disclosure.

FIG. 31 illustrates a flow chart of an exemplary method for standardized wireless sensing, according to some embodiments of the present disclosure.

FIG. 32 illustrates a flow chart of an exemplary method for standardized proxy sensing, according to some embodiments of the present disclosure.

DETAILED DESCRIPTION

Figure 1:
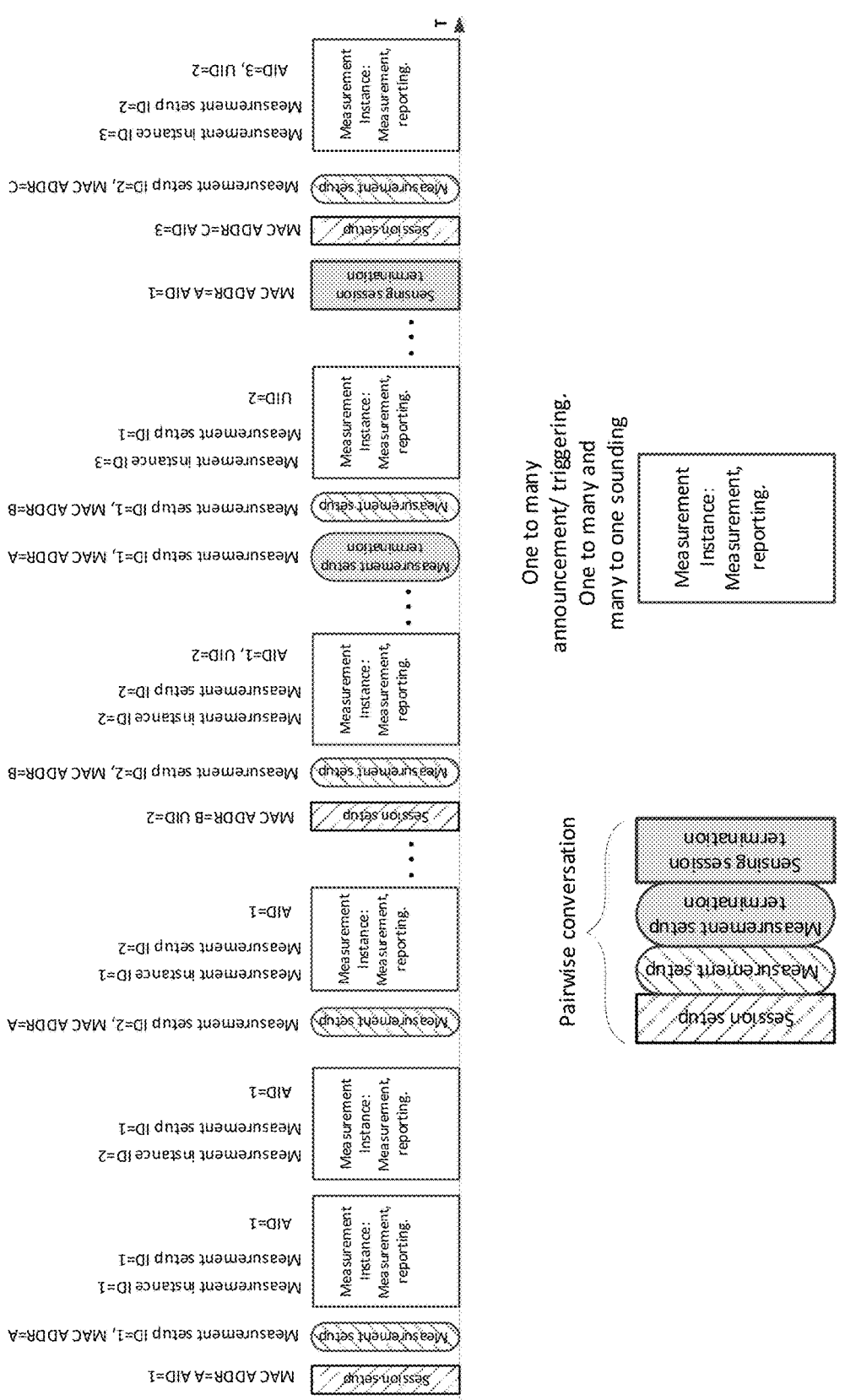
FIG. 1 illustrates an example of wireless sensing procedure, according to some embodiments of the present disclosure.

In one embodiment, the present teaching discloses a method, apparatus, device, system, and/or software (method/apparatus/device/system/software) of a wireless monitoring system. A time series of channel information (CI) of a wireless multipath channel (channel) may be obtained (e.g. dynamically) using a processor, a memory communicatively coupled with the processor and a set of instructions stored in the memory. The time series of CI (TSCI) may be extracted from a wireless signal (signal) transmitted between a Type 1 heterogeneous wireless device (e.g. wireless transmitter, TX) and a Type 2 heterogeneous wireless device (e.g. wireless receiver, RX) in a venue through the channel. The channel may be impacted by an expression (e.g. motion, movement, expression, and/or change in position/pose/shape/expression) of an object in the venue. A characteristics and/or a spatial-temporal information (STI, e.g. motion information) of the object and/or of the motion of the object may be monitored based on the TSCI. A task may be performed based on the characteristics and/or STI. A presentation associated with the task may be generated in a user-interface (UI) on a device of a user. The TSCI may be a wireless signal stream. The TSCI or each CI may be preprocessed. A device may be a station (STA). The symbol "A/B" means "A and/or B" in the present teaching.

The expression may comprise placement, placement of moveable parts, location, position, orientation, identifiable place, region, spatial coordinate, presentation, state, static expression, size, length, width, height, angle, scale, shape, curve, surface, area, volume, pose, posture, manifestation, body language, dynamic expression, motion, motion sequence, gesture, extension, contraction, distortion, deformation, body expression (e.g. head, face, eye, mouth, tongue, hair, voice, neck, limbs, arm, hand, leg, foot, muscle, moveable parts), surface expression (e.g. shape, texture, material, color, electromagnetic (EM) characteristics, visual pattern, wetness, reflectance, translucency, flexibility), material property (e.g. living tissue, hair, fabric, metal, wood, leather, plastic, artificial material, solid, liquid, gas, temperature), movement, activity, behavior, change of expression, and/or some combination.

The wireless signal may comprise: transmitted/received signal, EM radiation, RF signal/transmission, signal in licensed/unlicensed/ISM band, bandlimited signal, baseband signal, wireless/mobile/cellular communication signal, wireless/mobile/cellular network signal, mesh signal, light signal/communication, downlink/uplink signal, unicast/multicast/broadcast signal, standard (e.g. WLAN, WWAN, WPAN, WBAN, international, national, industry, defacto, IEEE, IEEE 802, 802.11/15/16, WiFi, 802.11n/ac/ax/be, 3G/4G/LTE/5G/6G/7G/8G, 3GPP, Bluetooth, BLE, Zigbee, RFID, UWB, WiMax) compliant signal, protocol signal, standard frame, beacon/pilot/probe/enquiry/acknowledgement/handshake/synchronization signal, management/control/data frame, management/control/data signal, standardized wireless/cellular communication protocol, reference signal, source signal, motion probe/detection/sensing signal, and/or series of signals. The wireless signal may comprise a line-of-sight (LOS), and/or a non-LOS component (or path/link). Each CI may be extracted/generated/computed/sensed at a layer (e.g. PHY/MAC layer in OSI model) of Type 2 device and may be obtained by an application (e.g. software, firmware, driver, app, wireless monitoring software/system).

The wireless multipath channel may comprise: a communication channel, analog frequency channel (e.g. with analog carrier frequency near 700/800/900 MHz, 1.8/1.8/2.4/3/5/6/27/60 GHz), coded channel (e.g. in CDMA), and/or channel of a wireless network/system (e.g. WLAN, WiFi, mesh, LTE, 4G/5G, Bluetooth, Zigbee, UWB, RFID, microwave). It may comprise more than one channel. The channels may be consecutive (e.g. with adjacent/overlapping bands) or non-consecutive channels (e.g. non-overlapping WiFi channels, one at 2.4 GHz and one at 5 GHz).

The TSCI may be extracted from the wireless signal at a layer of the Type 2 device (e.g. a layer of OSI reference model, physical layer, data link layer, logical link control layer, media access control (MAC) layer, network layer, transport layer, session layer, presentation layer, application layer, TCP/IP layer, internet layer, link layer). The TSCI may be extracted from a derived signal (e.g. baseband signal, motion detection signal, motion sensing signal) derived from the wireless signal (e.g. RF signal). It may be (wireless) measurements sensed by the communication protocol (e.g. standardized protocol) using existing mechanism (e.g. wireless/cellular communication standard/network, 3G/LTE/4G/5G/6G/7G/8G, WiFi, IEEE 802.11/15/16). The derived signal may comprise a packet with at least one of:

a preamble, a header and a payload (e.g. for data/control/management in wireless links/networks). The TSCI may be extracted from a probe signal (e.g. training sequence, STF, LTF, L-STF, L-LTF, L-SIG, HE-STF, HE-LTF, HE-SIG-A, HE-SIG-B, CEF) in the packet. A motion detection/sensing signal may be recognized/identified base on the probe signal. The packet may be a standard-compliant protocol frame, management frame, control frame, data frame, sounding frame, excitation frame, illumination frame, null data frame, beacon frame, pilot frame, probe frame, request frame, response frame, association frame, reassociation frame, disassociation frame, authentication frame, action frame, report frame, poll frame, announcement frame, extension frame, enquiry frame, acknowledgement frame, RTS frame, CTS frame, QoS frame, CF-Poll frame, CF-Ack frame, block acknowledgement frame, reference frame, training frame, and/or synchronization frame.

The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network) may be used to store the TSCI, characteristics, STI, signatures, patterns, behaviors, trends, parameters, analytics, output responses, identification information, user information, device information, channel information, venue (e.g. map, environmental model, network, proximity devices/networks) information, task information, class/category information, presentation (e.g. UI) information, and/or other information.

The Type 1/Type 2 device may comprise at least one of electronics, circuitry, transmitter (TX)/receiver (RX)/transceiver, RF interface, "Origin Satellite"/"Tracker Bot", unicast/multicast/broadcasting device, wireless source device, source/destination device, wireless node, hub device, target device, motion detection device, sensor device, remote/wireless sensor device, wireless communication device, wireless-enabled device, standard compliant device, and/or receiver. The Type 1 (or Type 2) device may be heterogeneous because, when there are more than one instances of Type 1 (or Type 2) device, they may have different circuitry, enclosure, structure, purpose, auxiliary functionality, chip/IC, processor, memory, software, firmware, network connectivity, antenna, brand, model, appearance, form, shape, color, material, and/or specification. The Type 1/Type 2 device may comprise: access point, router, mesh router, internet-of-things (IoT) device, wireless terminal, one or more radio/RF subsystem/wireless interface (e.g. 2.4 GHz radio, 5 GHz radio, front haul radio, backhaul radio), modem, RF front end, RF/radio chip or integrated circuit (IC).

At least one of Type 1 device, Type 2 device, a link between them, the object, the characteristics, the STI, the monitoring of the motion, and the task may be associated with an identification (ID) such as UUID. The Type 1/Type 2/another device may obtain/store/retrieve/access/preprocess/condition/process/analyze/monitor/apply the TSCI. The Type 1 and Type 2 devices may communicate network traffic in another channel (e.g. Ethernet, HDMI, USB, Bluetooth, BLE, WiFi, LTE, other network, the wireless multipath channel) in parallel to the wireless signal. The Type 2 device may passively observe/monitor/receive the wireless signal from the Type 1 device in the wireless multipath channel without establishing connection (e.g. association/ authentication) with, or requesting service from, the Type 1 device.

The transmitter (i.e. Type 1 device) may function as (play role of) receiver (i.e. Type 2 device) temporarily, sporadically, continuously, repeatedly, interchangeably, alternately, simultaneously, concurrently, and/or contemporaneously; and vice versa. A device may function as Type 1 device (transmitter) and/or Type 2 device (receiver) temporarily, sporadically, continuously, repeatedly, simultaneously, concurrently, and/or contemporaneously. There may be multiple wireless nodes each being Type 1 (TX) and/or Type 2 (RX) device. A TSCI may be obtained between every two nodes when they exchange/communicate wireless signals. The characteristics and/or STI of the object may be monitored individually based on a TSCI, or jointly based on two or more (e.g. all) TSCI.

The motion of the object may be monitored actively (in that Type 1 device, Type 2 device, or both, are wearable of/associated with the object) and/or passively (in that both Type 1 and Type 2 devices are not wearable of/associated with the object). It may be passive because the object may not be associated with the Type 1 device and/or the Type 2 device. The object (e.g. user, an automated guided vehicle or AGV) may not need to carry/install any wearables/fixtures (i.e. the Type 1 device and the Type 2 device are not wearable/attached devices that the object needs to carry in order perform the task). It may be active because the object may be associated with either the Type 1 device and/or the Type 2 device. The object may carry (or installed) a wearable/a fixture (e.g. the Type 1 device, the Type 2 device, a device communicatively coupled with either the Type 1 device or the Type 2 device).

The presentation may be visual, audio, image, video, animation, graphical presentation, text, etc. A computation of the task may be performed by a processor (or logic unit) of the Type 1 device, a processor (or logic unit) of an IC of the Type 1 device, a processor (or logic unit) of the Type 2 device, a processor of an IC of the Type 2 device, a local server, a cloud server, a data analysis subsystem, a signal analysis subsystem, and/or another processor. The task may be performed with/without reference to a wireless fingerprint or a baseline (e.g. collected, processed, computed, transmitted and/or stored in a training phase/survey/current survey/previous survey/recent survey/initial wireless survey, a passive fingerprint), a training, a profile, a trained profile, a static profile, a survey, an initial wireless survey, an initial setup, an installation, a re-training, an updating and a reset.

The Type 1 device (TX device) may comprise at least one heterogeneous wireless transmitter. The Type 2 device (RX device) may comprise at least one heterogeneous wireless receiver. The Type 1 device and the Type 2 device may be collocated. The Type 1 device and the Type 2 device may be the same device. Any device may have a data processing unit/apparatus, a computing unit/system, a network unit/ system, a processor (e.g. logic unit), a memory communicatively coupled with the processor, and a set of instructions stored in the memory to be executed by the processor. Some processors, memories and sets of instructions may be coordinated.

There may be multiple Type 1 devices interacting (e.g. communicating, exchange signal/control/notification/other data) with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/ or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/ Type 2 devices may operate independently and/or collaboratively. A Type 1 and/or Type 2 device may have/ comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/ characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling (e.g. association, authentication) from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, STI and/or another quantity of the object may be monitored based on the second TSCI. The Type 1 device and the Type 2 device may be the same. The characteristics, STI and/or another quantity with different time stamps may form a waveform. The waveform may be displayed in the presentation.

The wireless signal and/or another signal may have data embedded. The wireless signal may be a series of probe signals (e.g. a repeated transmission of probe signals, a re-use of one or more probe signals). The probe signals may change/vary over time. A probe signal may be a standard compliant signal, protocol signal, standardized wireless protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the STI (e.g. motion information), initial STI, initial time, direction, instantaneous location, instantaneous angle, and/or speed, of the object.

The processor, the memory and/or the set of instructions may be associated with the Type 1 device, one of the at least one Type 2 device, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (e.g. association, authentication) with any Type 2 device, and without any Type 2 device requesting services from the Type 1 device. The Type 1 device may transmit to a particular media access control (MAC) address common for more than one Type 2 devices. Each Type 2 device may adjust its MAC address to the particular MAC address. The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) overtime. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) overtime. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection (e.g. association, authentication) between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device. The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection (e.g. association, authentication) with any Type 2 device. The Type 1 device may reply to the third special signal by transmitting a fourth handshake signal to the another device. The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device. The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device. The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection (e.g. association, authentication) established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device. Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/ mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices. A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals. In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or STI (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, environmental model of the venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events. A CI or TSCI associated with an event may be considered/may comprise a wireless sample/characteristics/fingerprint associated with the event (and/or the venue, the environment, the object, the motion of the object, a state/emotional state/mental state/condition/stage/gesture/gait/action/movement/activity/daily activity/history/event of the object, etc.).

For each of the multiple known events happening in the venue in a respective training (e.g. surveying, wireless survey, initial wireless survey) time period associated with the known event, a respective training wireless signal (e.g.

a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed. The training may be a wireless survey (e.g. during installation of Type 1 device and/or Type 2 device).

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may partition TSCI (or the characteristics/STI or other analytics or output responses) into clusters and associate the clusters to specific events/objects/subjects/locations/movements/activities. Labels/tags may be generated for the clusters. The clusters may be stored and retrieved. The classifier may be applied to associate the current TSCI (or characteristics/STI or the other analytics/output response, perhaps associated with a current event) with: a cluster, a known/specific event, a class/category/group/grouping/list/cluster/set of known events/subjects/locations/movements/activities, an unknown event, a class/category/group/grouping/list/cluster/set of unknown events/subjects/locations/movements/activities, and/or another event/subject/location/movement/activity/class/category/group/grouping/list/cluster/set. Each TSCI may comprise at least one CI each associated with a respective timestamp. Two TSCI associated with two Type 2 devices may be different with different: starting time, duration, stopping time, amount of CI, sampling frequency, sampling period. Their CI may have different features. The first and second Type 1 devices may be at same location in the venue. They may be the same device. The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device. The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device. The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed. The first section may comprise a first segment (e.g. subset) of the first TSCI with a first starting/ending time, and/or another segment (e.g. subset) of a processed first TSCI. The processed first TSCI may be the first TSCI processed by a first operation. The second section may comprise a second segment (e.g. subset) of the second TSCI with a second starting time and a second ending time, and another segment (e.g. subset) of a processed second TSCI. The processed second TSCI may be the second TSCI processed by a second operation. The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many. At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration. A section of a time duration of a TSCI may be determined adaptively (and/or dynamically). A tentative section of the TSCI may be computed. A starting time and an ending time of a section (e.g. the tentative section, the section) may be determined.

The section may be determined by removing a beginning portion and an ending portion of the tentative section. A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time T1 may comprise at least one of: (1) a first function of the item at time T1 and an item at time T1-D1, wherein D1 is a pre-determined positive quantity (e.g. a constant time offset), (2) a second function of the item at time T1 and an item at time T1+D1, (3) a third function of the item at time T1 and an item at time T2, wherein T2 is a pre-determined quantity (e.g. a fixed initial reference time; T2 may be changed (e.g. adjusted, varied, modified) over time; T2 may be updated periodically; T2 may be the beginning of a time period and T1 may be a sliding time in the time period), and (4) a fourth function of the item at time T1 and another item.

At least one of: the first function, the second function, the third function, and/or the fourth function may be a function (e.g. F(X, Y, . . . )) with at least two arguments: X and Y. The two arguments may be scalars. The function (e.g. F) may be a function of at least one of: X, Y, (X−Y), (Y−X), abs(X−Y), $X^a$, $Y^B$, abs($X^a$−$Y^B$), $(X-Y)^a$, (X/Y), (X+a)/(Y+b), $((X/Y)^a$-b), wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative. In another example, both arguments X and Y may be n-tuples such that X= (x_1, x_2, . . . , x_n) and Y=(y_1, y_2, . . . , y_n). The function may be a function of at least one of x_i, y_i, (x_i−y_i), (y_i−x_i), abs(x_i−y_i), $x\_i\ \hat{}a$, $y\_i\ \hat{}b$, abs(x_i $\hat{}a$−y_i $\hat{}b$), $(x\_i-y\_i)\hat{}a$, (x_i/y_i), (x_i+a)/(y_i+b), (x_i $\hat{}a$/y_i $\hat{}B$), and $((x\_i/y\_i)\hat{}a$-b), wherein i is a component index of the n-tuple X and Y, and 1<=i<=n, e.g. component index of x_1 is i=1, component index of x_2 is i=2.

The function may comprise a component-by-component summation of another function of at least one of the following: x_i, y_i, (x_i−y_i), (y_i−x_i), abs(x_i−y_i), $x\_i\ \hat{}a$, $y\_i\ \hat{}b$, abs(x_i $\hat{}a$−y_i $\hat{}b$), $(x\_i-y\_i)\hat{}a$, (x_i/y_i), (x_i+a)/ (y_i+b), (x_i $\hat{}a$/y_i $\hat{}B$), and $((x\_i/y\_i)\hat{}a$-b), wherein i is the component index of the n-tuple X and Y. For example, the function may be in a form of $sum\_\{i=1\}\hat{}n$ (abs(x_i/y_i)− 1)/n, or $sum\_\{i=1\}\hat{}n$ w_i*(abs(x_i/y_i)−1), where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i\hat{}\{th\}$ domain item is mapped to the $j\hat{}\{th\}$ range item. The constraint may be on admissible combination of i and j (constraint on relationship between i and j). Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp. A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost. The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieves smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost. The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2. The current event may be associated with at least one of: the known event, the unknown event and/or the another event, based on the mismatch cost and additional mismatch cost associated with at least one additional section of the first TSCI and at least one additional section of the second TSCI. The known events may comprise at least one of a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of the training TSCI associated with the at least one event, and/or the current TSCI, for the classifier.

The classifier of the at least one event may be trained based on the projection and the training TSCI associated with the at least one event. The at least one current TSCI may be classified/categorized based on the projection and the current TSCI. The projection may be re-trained using at least one of the dimension reduction method, and another dimension reduction method, based on at least one of the training TSCI, at least one current TSCI before retraining the projection, and/or additional training TSCI. The another dimension reduction method may comprise at least one of principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method. The classifier of the at least one event may be re-trained based on at least one of the re-trained projection, the training TSCI associated with the at least one events, and/or at least one current TSCI. The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values. Each training TSCI may be weighted in the training of the projection. The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE), dynamic beam-forming information (including feedback or steering matrices generated by wireless communication devices, according to a standardized process, e.g., IEEE 802.11, or another standard), transfer function components, radio state (e.g. used in digital communication systems to decode digital data, baseband processing state, RF processing state, etc.), measurable variables, sensed data, coarse-grained/fine-grained information of a layer (e.g. physical layer, data link layer, MAC layer, etc.), digital setting, gain setting, RF filter setting, RF front end switch setting, DC offset setting, DC correction setting, IQ compensation setting, effect(s) on the wireless signal by the environment (e.g. venue) during propagation, transformation of an input signal (the wireless signal transmitted by the Type 1 device) to an output signal (the wireless signal received by the Type 2 device), a stable behavior of the environment, a state profile, wireless channel measurements, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel. The TSCI may be a stream of wireless signals (e.g. CI).

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem). The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc. The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc. Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/STI of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristic of a component-feature time series of a TSCI may be computed. The component-wise characteristics may be a scalar (e.g. energy) or a function with a domain and a range (e.g. an autocorrelation function, transform, inverse transform). The characteristics/STI of the motion of the object may be monitored based on the component-wise characteristics. A total characteristics (e.g. aggregate characteristics) of the TSCI may be computed based on the component-wise characteristics of each component time series of the TSCI. The total characteristics may be a weighted average of the component-wise characteristics. The characteristics/STI of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock. An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or STI (e.g. motion information) may comprise: location, location coordinate, change in location, position (e.g. initial position, new position), position on map, height, horizontal location, vertical location, distance, displacement, speed, acceleration, rotational speed, rotational acceleration, direction, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, temporal change, change of CI, change in frequency, change in timing, change of gait cycle, timing, starting time, initiating time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, signal statistics, signal dynamics, anomaly, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting/initiating location, ending location, starting/initiating quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, analytics, output responses, and/or another information. The characteristics and/or STI may be computed/monitored based on a feature computed from a CI or a TSCI (e.g. feature computation/extraction). A static segment or profile (and/or a dynamic segment/profile) may be identified/computed/analyzed/monitored/extracted/obtained/marked/presented/indicated/highlighted/stored/communicated based on an analysis of the feature. The analysis may comprise a motion detection/movement assessment/presence detection. Computational workload may be shared among the Type 1 device, the Type 2 device and another processor.

The Type 1 device and/or Type 2 device may be a local device. The local device may be: a smart phone, smart device, TV, sound bar, set-top box, access point, router, repeater, wireless signal repeater/extender, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT)

device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, user, subject, passenger, child, older person, baby, sleeping baby, baby in vehicle, patient, worker, high-value worker, expert, specialist, waiter, customer in mall, traveler in airport/train station/bus terminal/ shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/ supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc. The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device. The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable. The portable device, the nearby device, a local server (e.g. hub device) and/or a cloud server may share the computation and/or storage for a task (e.g. obtain TSCI, determine characteristics/STI of the object associated with the movement (e.g. change in position/ location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory/path/track, process the map, processing trajectory/path/track based on environment models/ constraints/limitations, correction, corrective adjustment, adjustment, map-based (or model-based) correction, detecting error, checking for boundary hitting, thresholding) and information (e.g. TSCI). The nearby device may/may not move with the object. The nearby device may be portable/ not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/ 3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device. The nearby device and/or at least one processor associated with the wireless receiver, the wireless transmitter, the another wireless receiver, the another wireless transmitter and/or a cloud server (in the cloud) may determine the initial STI of the object. Two or more of them may determine the initial spatial-temporal info jointly. Two or more of them may share intermediate information in the determination of the initial STI (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial STI (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known. In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a sensing area, room, house, office, property, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/ other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/ display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/ tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/ audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/ bucket/container, smart plate/cup/bowl/pot/mat/utensils/ kitchen tools/kitchen devices/kitchen accessories/cabinets/ tables/chairs/tiles/lights/water pipes/taps/gas range/oven/ dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identity (ID)/identifier as described above.

An event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball), two-body action (e.g. a person letting go a balloon, catching a fish, molding a clay, writing a paper, person typing on a computer), car moving in a garage, person carrying a smart phone and walking around an airport/mall/government building/office/etc., autonomous moveable object/machine moving around (e.g. vacuum cleaner, utility vehicle, car, drone, self-driving car).

The task or the wireless smart sensing task may comprise: object detection, presence detection, proximity detection, object recognition, activity recognition, object verification, object counting, daily activity monitoring, well-being monitoring, vital sign monitoring, health condition monitoring, baby monitoring, elderly monitoring, sleep monitoring, sleep stage monitoring, walking monitoring, exercise monitoring, tool detection, tool recognition, tool verification, patient detection, patient monitoring, patient verification, machine detection, machine recognition, machine verification, human detection, human recognition, human verification, baby detection, baby recognition, baby verification, human breathing detection, human breathing recognition, human breathing estimation, human breathing verification, human heart beat detection, human heart beat recognition, human heart beat estimation, human heart beat verification, fall-down detection, fall-down recognition, fall-down estimation, fall-down verification, emotion detection, emotion recognition, emotion estimation, emotion verification, motion detection, motion degree estimation, motion recognition, motion estimation, motion verification, periodic motion detection, periodic motion recognition, periodic motion estimation, periodic motion verification, repeated motion detection, repeated motion recognition, repeated motion estimation, repeated motion verification, stationary motion detection, stationary motion recognition, stationary motion estimation, stationary motion verification, cyclo-stationary motion detection, cyclo-stationary motion recognition, cyclo-stationary motion estimation, cyclo-stationary motion verification, transient motion detection, transient motion recognition, transient motion estimation, transient motion verification, trend detection, trend recognition, trend estimation, trend verification, breathing detection, breathing recognition, breathing estimation, breathing estimation, human biometrics detection, human biometric recognition, human biometrics estimation, human biometrics verification, environment informatics detection, environment informatics recognition, environment informatics estimation, environment informatics verification, gait detection, gait recognition, gait estimation, gait verification, gesture detection, gesture recognition, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, model-based processing/correction, irregularity detection, locationing, room sensing, tracking, multiple object tracking, indoor tracking, indoor position, indoor navigation, energy management, power transfer, wireless power transfer, object counting, car tracking in parking garage, activating a device/system (e.g. security system, access system, alarm, siren, speaker, television, entertaining system, camera, heater/air-conditioning (HVAC) system, ventilation system, lighting system, gaming system, coffee machine, cooking device, cleaning device, housekeeping device), geometry estimation, augmented reality, wireless communication, data communication, signal broadcasting, networking, coordination, administration, encryption, protection, cloud computing, other processing and/or other task. The task may be performed by the Type 1 device, the Type 2 device, another Type 1 device, another Type 2 device, a nearby device, a local server (e.g. hub device), edge server, a cloud server, and/or another device. The task may be based on TSCI between any pair of Type 1 device and Type 2 device. A Type 2 device may be a Type 1 device, and vice versa. A Type 2 device may play/perform the role (e.g. functionality) of Type 1 device temporarily, continuously, sporadically, simultaneously, and/or contemporaneously, and vice versa. A first part of the task may comprise at least one of: preprocessing, processing, signal conditioning, signal processing, post-processing, processing sporadically/continuously/simultaneously/contemporaneously/dynamically/adaptive/on-demand/as-needed, calibrating, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder (and/or illegal action) detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc. Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, subsurface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio. The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination. The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802.11ah, 802.1 lax, 802.1 lay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination. The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art. The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text), symbolic way (e.g. emoticon, signs, hand gesture), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a line-of-sight (LOS) quantity, computing a non-LOS (NLOS) quantity, a quantity comprising LOS and NLOS, computing a single link (e.g. path, communication path, link between a transmitting antenna and a receiving antenna) quantity, computing a quantity comprising multiple links, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, measure of variation, spread, dispersion, deviation, divergence, range, interquartile range, total variation, absolute deviation, total deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity/feature from a TSCI may be computed. The quantity may comprise statistic of at least one of motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, signal intensity, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics (e.g. output responses), daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another measurable quantity/variable.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or STI to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics (e.g. characteristic value, or characteristic point) of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a maximum, minimum, extremum, local maximum, local minimum, local extremum, local extremum with positive time offset, first local extremum with positive time offset, $n$^th local extremum with positive time offset, local extremum with negative time offset, first local extremum with negative time offset, $n$^th local extremum with negative time offset, constrained maximum, constrained minimum, constrained extremum, significant maximum, significant minimum, significant extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, $n$^th zero crossing with positive time offset, zero crossing with negative time offset, $n$^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, measure of variation, spread, dispersion, deviation, divergence, range, interquartile range, total variation, absolute deviation, total deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude) of the local maximum over the same quantity of the local minimum. It may also be the function of a difference between the quantity of the local maximum and the same quantity of the local minimum. Significant local peaks may be identified or selected. Each significant local peak may be a local maximum with SNR-like parameter greater than a threshold T1 and/or a local maximum with amplitude greater than a threshold T2. The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/STI of the object may be computed based on the set of selected significant local peaks and frequency values associated with the set of selected significant local peaks. In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be backtraced in time and made "selected" in the earlier time when it was significant but not selected. In such case, the backtraced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or STI may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/ state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/ STI/size/property/trait/habit/behavior, the venue, feature/ fixture/furniture/barrier/material/machine/living thing/ thing/object/boundary/surface/medium that is in/at/of the venue, map, constraint of the map (or environmental model), the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of error, aggregate error, component error, error in projection domain, error in selected axes, error in selected orthogonal axes, absolute error, square error, absolute deviation, square deviation, higher order error (e.g. third order, fourth order), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or STI of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or STI of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map (or environmental model) of the venue. The information may comprise: location, zone, region, area, coverage area, corrected location, approximate location, location with respect to (w.r.t.) a map of the venue, location w.r.t. a segmentation of the venue, direction, path, path w.r.t. the map and/or the segmentation, trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), history of a path, approximate regions/zones along a path, history/summary of past locations, history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, identity (ID) or identifier of the respect object (e.g. pet, person, self-guided machine/device, vehicle, drone, car, boat, bicycle, self-guided vehicle, machine with fan, air-conditioner, TV, machine with movable part), identification of a user (e.g. person), information of the user, location/speed/acceleration/direction/motion/ gesture/gesture control/motion trace of the user, ID or identifier of the user, activity of the user, state of the user, sleeping/resting characteristics of the user, emotional state of the user, vital sign of the user, environment information of the venue, weather information of the venue, earthquake, explosion, storm, rain, fire, temperature, collision, impact, vibration, event, door-open event, door-close event, window-open event, window-close event, fall-down event, burning event, freezing event, water-related event, wind-related event, air-movement event, accident event, pseudo-periodic event (e.g. running on treadmill, jumping up and down, skipping rope, somersault, etc.), repeated event, crowd event, vehicle event, gesture of the user (e.g. hand gesture, arm gesture, foot gesture, leg gesture, body gesture, head gesture, face gesture, mouth gesture, eye gesture, etc.).

The location may be 2-dimensional (e.g. with 2D coordinates), 3-dimensional (e.g. with 3D coordinates). The location may be relative (e.g. w.r.t. a map or environmental model) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/ state/status/action/motion of a user, temperature, network traffic, network connectivity, status of a device/machine, remaining power of a device, status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map (or environmental model) may be 2-dimensional, 3-dimensional and/or higher-dimensional. (e.g. a time varying 2D/3D map/environmental model) Walls, windows, doors, entrances, exits, forbidden areas may be marked on the map or the model. The map may comprise floor plan of a facility. The map or model may have one or more layers (overlays). The map/model may be a maintenance map/model comprising water pipes, gas pipes, wiring, cabling, air ducts, crawl-space, ceiling layout, and/or underground layout. The venue may be segmented/subdivided/ zoned/grouped into multiple zones/regions/geographic regions/sectors/sections/territories/districts/precincts/locali- ties/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map/ model. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Washington. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.). Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that the disclosed wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain the Type 1 transceiver and/or the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise: analytics, output response, selected time window, subsampling, transform, and/or projection. The presenting may comprise presenting at least one of: monthly/weekly/daily view, simplified/detailed view, cross-sectional view, small/large form-factor view, color-coded view, comparative view, summary view, animation, web view, voice announcement, and another presentation related to the periodic/repetition characteristics of the repeating motion.

A Type 1/Type 2 device may be an antenna, a device with antenna, a device with a housing (e.g. for radio, antenna, data/signal processing unit, wireless IC, circuits), device that has interface to attach/connect to/link antenna, device that is interfaced to/attached to/connected to/linked to another device/system/computer/phone/network/data aggregator, device with a user interface (UI)/graphical UI/display, device with wireless transceiver, device with wireless transmitter, device with wireless receiver, internet-of-thing (IoT)

device, device with wireless network, device with both wired networking and wireless networking capability, device with wireless integrated circuit (IC), Wi-Fi device, device with Wi-Fi chip (e.g. 802.11a/b/g/n/ac/ax standard compliant), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc. In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment. All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.). In one embodiment, all the Type A devices are leaf node. Each Type B device may be the root node, non-leaf node, or leaf node.

Type 1 device (transmitter, or Tx) and Type 2 device (receiver, or Rx) may be on same device (e.g. RF chip/IC) or simply the same device. The devices may operate at high frequency band, such as 28 GHz, 60 GHz, 77 GHz, etc. The RF chip may have dedicated Tx antennas (e.g. 32 antennas) and dedicated Rx antennas (e.g. another 32 antennas).

One Tx antenna may transmit a wireless signal (e.g. a series of probe signal, perhaps at 100 Hz). Alternatively, all Tx antennas may be used to transmit the wireless signal with beamforming (in Tx), such that the wireless signal is focused in certain direction (e.g. for energy efficiency or boosting the signal to noise ratio in that direction, or low power operation when "scanning" that direction, or low power operation if object is known to be in that direction).

The wireless signal hits an object (e.g. a living human lying on a bed 4 feet away from the Tx/Rx antennas, with breathing and heart beat) in a venue (e.g. a room). The object motion (e.g. lung movement according to breathing rate, or blood-vessel movement according to heart beat) may impact/modulate the wireless signal. All Rx antennas may be used to receive the wireless signal.

Beamforming (in Rx and/or Tx) may be applied (digitally) to "scan" different directions. Many directions can be scanned or monitored simultaneously. With beamforming, "sectors" (e.g. directions, orientations, bearings, zones, regions, segments) may be defined related to the Type 2 device (e.g. relative to center location of antenna array). For each probe signal (e.g. a pulse, an ACK, a control packet, etc.), a channel information or CI (e.g. channel impulse response/CIR, CSI, CFR) is obtained/computed for each sector (e.g. from the RF chip). In breathing detection, one may collect CIR in a sliding window (e.g. 30 see, and with 100 Hz sounding/probing rate, one may have 3000 CIR over 30 sec).

The CIR may have many taps (e.g. N1 components/taps). Each tap may be associated with a time lag, or a time-of-flight (tof, e.g. time to hit the human 4 feet away and back). When a person is breathing in a certain direction at a certain distance (e.g. 4 ft), one may search for the CIR in the "certain direction". Then one may search for the tap corresponding to the "certain distance". Then one may compute the breathing rate and heart rate from that tap of that CIR.

One may consider each tap in the sliding window (e.g. 30 second window of "component time series") as a time function (e.g. a "tap function", the "component time series"). One may examine each tap function in search of a strong periodic behavior (e.g. corresponds to breathing, perhaps in the range of 10 bpm to 40 bpm).

The Type 1 device and/or the Type 2 device may have external connections/links and/or internal connections/links. The external connections (e.g. connection 1110) may be associated with 2G/2.5G/3G/3.5G/4G/LTE/5G/6G/7G/NBIoT, UWB, WiMax, Zigbee, 802.16 etc. The internal connections (e.g., 1114A and 1114B, 1116, 1118, 1120) may be associated with WiFi, an IEEE 802.11 standard, 802.11a/b/g/n/ac/ad/af/ag/ah/ai/aj/aq/ax/ay, Bluetooth, Bluetooth 1.0/1.1/1.2/2.0/2.1/3.0/4.0/4.1/4.2/5, BLE, mesh network, an IEEE 802.16/1/1a/1b/2/2a/a/b/c/d/e/f/g/h/i/j/k/l/m/n/o/p/ standard.

The Type 1 device and/or Type 2 device may be powered by battery (e.g. AA battery, AAA battery, coin cell battery, button cell battery, miniature battery, bank of batteries, power bank, car battery, hybrid battery, vehicle battery, container battery, non-rechargeable battery, rechargeable battery, NiCd battery, NiMH battery, Lithium ion battery, Zinc carbon battery, Zinc chloride battery, lead acid battery, alkaline battery, battery with wireless charger, smart battery, solar battery, boat battery, plane battery, other battery, temporary energy storage device, capacitor, fly wheel).

Any device may be powered by DC or direct current (e.g. from battery as described above, power generator, power convertor, solar panel, rectifier, DC-DC converter, with various voltages such as 1.2V, 1.5V, 3V, 5V, 6V, 9V, 12V, 24V, 40V, 42V, 48V, 110V, 220V, 380V, etc.) and may thus have a DC connector or a connector with at least one pin for DC power.

Any device may be powered by AC or alternating current (e.g. wall socket in a home, transformer, invertor, shore-power, with various voltages such as 100V, 110V, 120V, 100-127V, 200V, 220V, 230V, 240V, 220-240V, 100-240V, 250V, 380V, 50 Hz, 60 Hz, etc.) and thus may have an AC connector or a connector with at least one pin for AC power. The Type 1 device and/or the Type 2 device may be positioned (e.g. installed, placed, moved to) in the venue or outside the venue.

For example, in a vehicle (e.g. a car, truck, lorry, bus, special vehicle, tractor, digger, excavator, teleporter, bull-dozer, crane, forklift, electric trolley, AGV, emergency vehicle, freight, wagon, trailer, container, boat, ferry, ship, submersible, airplane, air-ship, lift, mono-rail, train, tram, rail-vehicle, railcar, etc.), the Type 1 device and/or Type 2 device may be an embedded device embedded in the vehicle, or an add-on device (e.g. aftermarket device) plugged into a port in the vehicle (e.g. OBD port/socket, USB port/socket, accessory port/socket, 12V auxiliary power outlet, and/or 12V cigarette lighter port/socket).

For example, one device (e.g. Type 2 device) may be plugged into 12V cigarette lighter/accessory port or OBD port or the USB port (e.g. of a car/truck/vehicle) while the other device (e.g. Type 1 device) may be plugged into 12V cigarette lighter/accessory port or the OBD port or the USB port. The OBD port and/or USB port can provide power, signaling and/or network (of the car/truck/vehicle). The two devices may jointly monitor the passengers including chil-dren/babies in the car. They may be used to count the passengers, recognize the driver, detect presence of passen-ger in a particular seat/position in the vehicle.

In another example, one device may be plugged into 12V cigarette lighter/accessory port or OBD port or the USB port of a car/truck/vehicle while the other device may be plugged into 12V cigarette lighter/accessory port or OBD port or the USB port of another car/truck/vehicle.

In another example, there may be many devices of the same type A (e.g. Type 1 or Type 2) in many heterogeneous vehicles/portable devices/smart gadgets (e.g. automated guided vehicle/AGV, shopping/luggage/moving cart, park-ing ticket, golf cart, bicycle, smart phone, tablet, camera, recording device, smart watch, roller skate, shoes, jackets, goggle, hat, eye-wear, wearable, Segway, scooter, luggage tag, cleaning machine, vacuum cleaner, pet tag/collar/wear-able/implant), each device either plugged into 12V acces-sory port/OBD port/USB port of a vehicle or embedded in a vehicle. There may be one or more device of the other type B (e.g. B is Type 1 if A is Type 2, or B is Type 2 if A is Type 1) installed at locations such as gas stations, street lamp post, street corners, tunnels, multi-storey parking facility, scat-tered locations to cover a big area such as factory/stadium/ train station/shopping mall/construction site. The Type A device may be located, tracked or monitored based on the TSCI.

The area/venue may have no local connectivity, e.g., broadband services, WiFi, etc. The Type 1 and/or Type 2 device may be portable. The Type 1 and/or Type 2 device may support plug and play.

Pairwise wireless links may be established between many pairs of devices, forming the tree structure. In each pair (and the associated link), a device (second device) may be a non-leaf (Type B). The other device (first device) may be a leaf (Type A or Type B) or non-leaf (Type B). In the link, the first device functions as a bot (Type 1 device or a Tx device)

to send a wireless signal (e.g. probe signal) through the wireless multipath channel to the second device. The second device may function as an Origin (Type 2 device or Rx device) to receive the wireless signal, obtain the TSCI and compute a "linkwise analytics" based on the TSCI.

In some embodiments, the present teaching discloses systems and methods for wireless sensing. In one embodi-ment, a Type 1 heterogeneous wireless device or a Type2 heterogeneous wireless device may be one of many hetero-geneous wireless devices or stations (STA) in a space.

Roles in wireless sensing: A Type 1 device, or a Type2 device, or another STA may function as a sensing initiator. A sensing initiator may be a STA that initiates a wireless sensing procedure (or sensing procedure in short, e.g. using WiFi, WLAN, 5G, UWB, millimeter wave, WiMax, WiGig, Bluetooth, or other radio system). At least one STA (e.g. Type 1 device, Type2 device, sensing initiator, sensing transmitter, sensing receiver, or another STA) may function as a sensing responder. A sensing responder may be a STA that participates in a sensing procedure initiated by a sensing initiator. At least one STA (e.g. Type1 device, Type2 device, sensing initiator, sensing responder, sensing receiver, or another STA) may function as a sensing transmitter. A sensing transmitter may be a STA that transmits wireless signals (e.g. physical-layer protocol data units (PPDUs) in WiFi, data packet frame (NDP), NDP announcement (NDPA) frame, or some sounding signal) used for sensing measurements in a wireless sensing procedure. At least one STA (e.g. Type 1 device, Type2 device, sensing initiator, sensing responder, sensing transmitter, or another STA) may function as a sensing receiver. A sensing receiver may be a STA that receives wireless signals (e.g. PPDUs in WiFi, NDPA, NDP, or some sounding signal) sent by a sensing transmitter and performs sensing measurements in a WLAN sensing procedure.

A STA may assume one or more possible roles (e.g. sensing initiators, sensing receivers, sensing transmitters, sensing receivers, sensing contributors, SBP requesting STA) in one (or more) sensing procedure. In a sensing procedure, a sensing initiator may be sensing transmitter, sensing receiver, both or neither. In a sensing procedure, a sensing responder might be sensing transmitter, sensing receiver, or both.

Sensing procedure: A sensing procedure may allow a STA to perform sensing and obtain measurement results. A sens-ing procedure may be composed of one or more of the following: sensing session setup, sensing measurement setup, sensing measurement instance, sensing measurement setup termination, and sensing session termination. A sens-ing procedure may comprise one or more sensing measure-ment instances.

Figure 2:
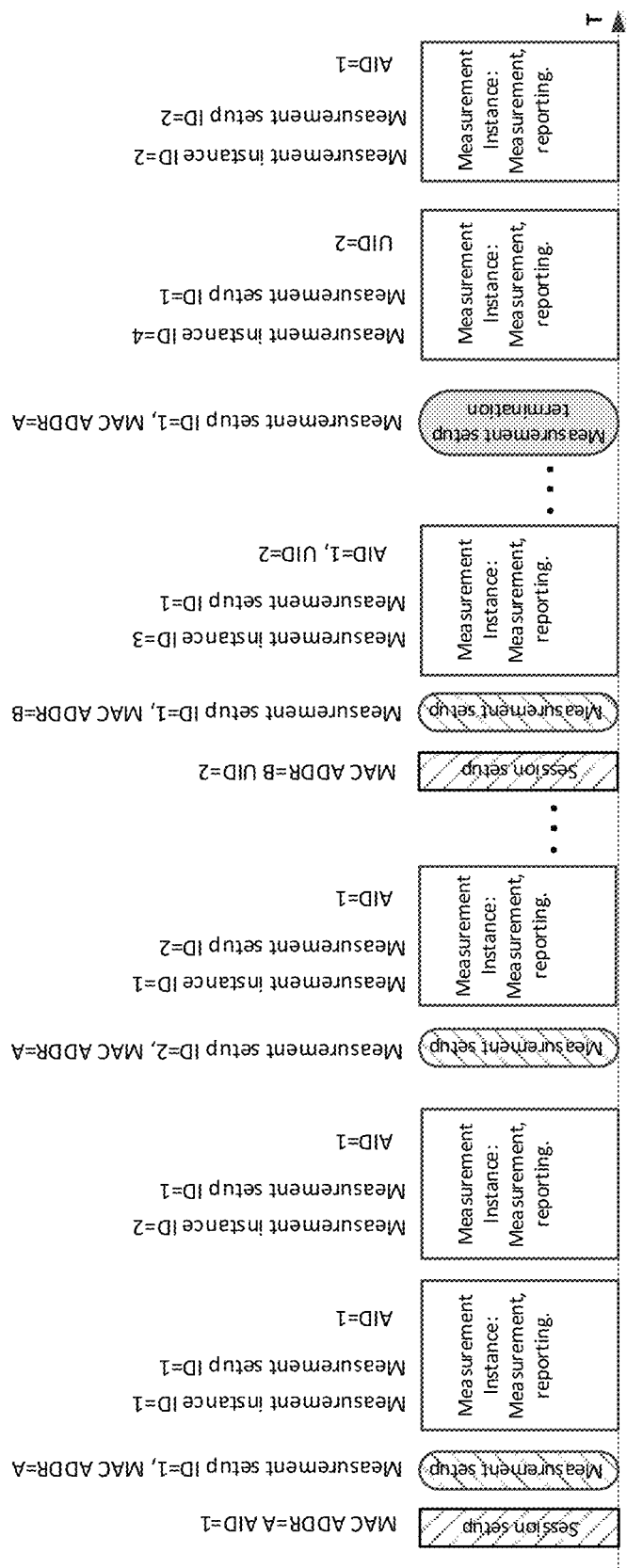
FIG. 2 illustrates another example of wireless sensing procedure, according to some embodiments of the present disclosure.

Sensing session: A sensing session may be an agreement between a sensing initiator and a sensing responder to participate in a sensing procedure. A sensing procedure may comprise zero, or at least one sensing measurement instance. Some examples of a sensing procedure are shown in FIG. 1 and FIG. 2.

The Measurement Setup ID may be used to identify attributes of the sensing measurement instances. The Mea-surement Instance ID may be used to identify the sensing measurement instance that utilizes attributes of the same Measurement Setup ID. The Dialog Token field may be used to contain both the Measurement Setup ID and the Mea-surement Instance ID. At least one type of sensing measure-ment results may be defined. The sensing transmitter and sensing receiver role(s) of a STA corresponding to a Mea-surement Setup ID may be fixed, unchanged, changed, modified or adjusted as determined during the sensing measurement set up until the sensing measurement set up is terminated.

In the sensing session setup of a sensing procedure, a sensing session may be established, and operational parameters associated with the sensing session may be determined and may be exchanged between STAs. A sensing session may be pairwise and may be identified by MAC addresses, associated AID/UID, a session ID, or another ID. A sensing initiator may maintain multiple sensing sessions. A STA may be a sensing initiator in one session and a sensing responder in another session.

An optional negotiation process in the sensing measurement setup may be defined that allows for a sensing initiator and a sensing responder to exchange and agree on operational attributes associated with a sensing measurement instance. The operational attributes may include initiator's and responder's roles, measurement report types (for nonlocal reporting or local reporting or both), and other operational parameters.

In a sensing measurement instance of a sensing procedure, sensing measurements may be performed to obtain sensing measurement result(s). More than one sensing responders may participate in a sensing measurement instance. There may be at least two types of sensing measurement instances: (a) Trigger-based (TB) sensing measurement instance, and (b) Non-TB sensing measurement instance.

TB sensing measurement: A TB sensing measurement instance may comprise a polling phase, an NDPA sounding phase, a trigger frame (TF) sounding phase, a reporting phase and/or a LTF security update phase. As for the ordering between the sounding phases, the NDPA sounding may precede TF sounding, or vice versa. The order may be changed over time.

Figure 3:
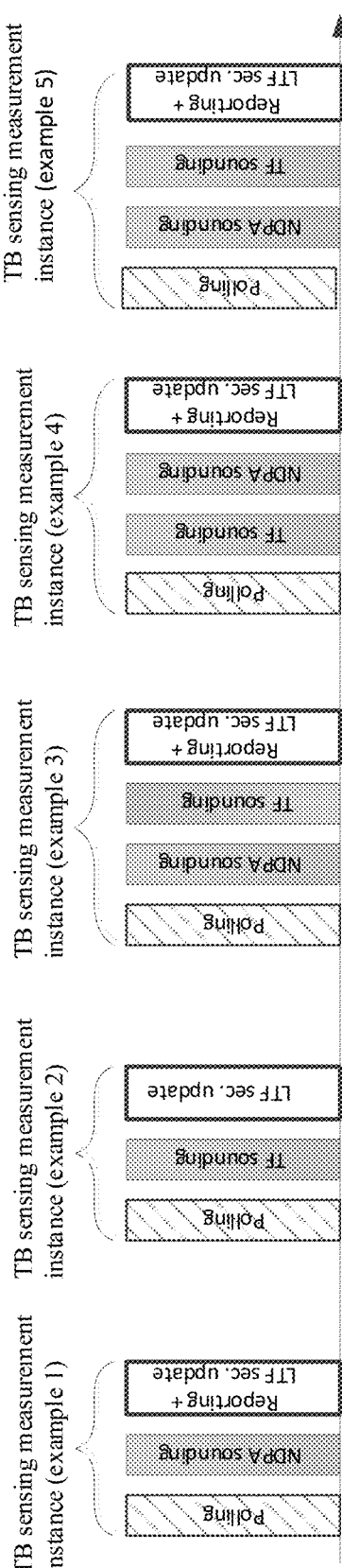
FIG. 3 illustrates examples of trigger-based wireless sensing measurement instances, according to some embodiments of the present disclosure.

Some examples of possible TB sensing measurement instances are shown in FIG. 3. As shown in FIG. 3, two sounding orders are shown in example 3 and example 4. The reporting phase in example 5 may be separated in time from the sounding phases. This may be delayed reporting. The polling in the reporting phase in example 5 may be addressed to responders other than those involved in the sounding.

Polling phase: In the polling phase, an AP (e.g. WiFi Access Point, or 3G/4G/5G/6G base station, or a hub) may send a trigger frame to check the availability of STAs. If a STA is available, it may respond with a CTS-to-self.

NDPA sounding: The NDPA sounding phase may be present in a TB sensing measurement instance if at least one STA that is a sensing receiver responds in the polling phase. The NDPA sounding phase may comprise: (a) transmission of a sensing NDP Announcement (NDPA) frame by an AP, and (b) transmission of an NDP by an AP, after the transmission of the sensing NDPA frame. NDP may be used for the channel measurement (e.g. CI, CSI, CIR, CFR, etc.) between sensing transmitter(s) and sensing receiver(s) (e.g. in sub-7 GHz bands).

TF sounding: The trigger frame (TF) sounding phase may be present in a TB sensing measurement instance if at least one STA that is a sensing transmitter responds in the polling phase. The TF sounding phase may comprise: (a) transmission of a trigger frame (TF) by an AP to solicit NDP transmissions from STAs; and (b) transmission of an NDP by STA(s), after receiving the trigger frame. NDP may be used for the channel measurement (e.g. CI, CSI, CIR, CFR, etc.) between sensing transmitter and sensing receiver(s) (e.g. in sub-7 GHz bands).

Local/nonlocal reporting: In the reporting phase of a sensing measurement instance, sensing measurement results may be reported. Results of measurements performed in a sensing procedure may be reported and/or obtained locally, nonlocally, both (i.e. both locally and nonlocally), or none (i.e. not reported, e.g. when CI variation is less than a threshold suggesting the CI may be essentially the same as the previous CI).

When reported locally, the sensing measurement results may be reported locally in the sensing receiver or where the sensing measurement results may be measured. Such local reporting may be achieved via some software interface, such as medium access control (MAC) sublayer management entity (MLME) primitive, or some firmware application program interface (or API). Some application or high level software may use the software interface (e.g. using software interrupts) to obtain or read the sensing measurement results.

When reported nonlocally, the measurement results may be reported nonlocally to another device or STA (e.g. at least one of: sensing initiator, sensing responder, sensing transmitter, sensing receiver, Type 1 device, Type2 device, a neighboring STA, other STA, or some local or cloud server).

The measurement results may be reported both locally and nonlocally (e.g. simultaneously, contemporaneously, alternately, selectively, adaptively, and/or in an on-demand/scheduled/planned manner). Within a measurement "span" (a period of time), the measurement result reporting may comprise a combination of local and nonlocal reporting (e.g. simultaneous local/nonlocal reporting, alternate local/nonlocal/both/none reporting, local/nonlocal/both/none reporting as selected by certain mechanism, adaptively determined local/nonlocal/both/none reporting, on-demand local/nonlocal/both/none reporting, scheduled local/nonlocal/both/none reporting, local/nonlocal/both/none reporting in response to some situations/states/events as planned (e.g. threshold-based)).

A setting (e.g. of the combination of local and nonlocal reporting, any setup parameter, any session setup parameter, one of the measurement setup parameters) may be applied to a "measurement span". The measurement span may include measurement instances associated with multiple sensing initiators, or identity of sensing initiators, or sensing initiator IDs, or multiple sessions associated with one (or more) sensing initiator, or a session, or an identity of a session, or a session ID, or multiple measurement setup in a session, or a measurement setup, or an identity of measurement setup, or a measurement setup ID, or multiple measurement instance associated with a measurement setup (or measurement setup ID), or a measurement instance number.

In simultaneous reporting, both local reporting and nonlocal reporting may be performed simultaneously or contemporaneously. In alternate reporting, the measurement instances may be segmented into groups of consecutive sensing results and a first group may be reported in a first way, followed by a second group being reported in a second way, followed by a third group being reported in a third way, and so on, wherein each of the first way, second way, third way, fourth way, fifth way . . . may be one of: (a) locally only, (b) nonlocally only, (c) both locally and nonlocally, or (d) none (not reported).

The type/precision/processing/other specification of measurement result(s) reported nonlocally in a sensing procedure/session/measurement instance may be decided (nonlocally) by its sensing initiator. The type/precision/processing/other specification of measurement result reported locally in a sensing procedure may be decided (locally) via a software interface (e.g. MLME primitive) in the sensing receiver or where the results are measured. The local/nonlocally reporting may be enabled/disabled (nonlocally) by sensing initiator, or by the negotiation between sensing initiator and sensing responder. The switching between local and nonlocal reporting may be controlled completely by sensing initiator, or controlled partially by sensing initiator and partially via the software interface in the sensing responder.

Sensing measurement report frame: A Sensing Measurement Report frame, which may allow a sensing receiver to report sensing measurements nonlocally, may be defined. This frame may contain at least the following two fields: (a) measurement report control field which contains information necessary to interpret the measurement report field, and (b) measurement report field which carries sensing measurement results (e.g. channel information, CI, CSI, CIR, CFR, RSSI, or some variant) obtained by a sensing receiver.

Each of the local reporting and nonlocal reporting may be initiated by a respective MLME. Transmission of the Sensing Measurement Report frame may be initiated by an MLME primitive. Both immediate and delayed reporting may be performed.

In the sensing session termination, the STAs stop performing measurements and terminate the sensing session.

Threshold-based reporting: An optional threshold-based measurement and reporting procedure may be performed. The difference between the current measured CI (e.g. CSI) and the previous measured CI (e.g. CSI) may be quantified. The difference may be referred to as CI variation. A threshold value to be used by the sensing receiver in the threshold-based procedure may be defined (e.g. by sensing initiator, sensing responder, sensing transmitter, sensing receiver, another STA, and/or some server). By comparing the CI variation with the threshold, the sensing receiver may report the measurement results (e.g. the measurement results, original or transformed, uncompressed or compressed) when the CI variation may be large (e.g. larger than some threshold or fall in "large" classification).

CI variation choices: The CI variation may comprise more than one quantities/measures/choices (e.g. two CI variation measures may be selected out of 7 choices). As an example, the CI variation choices may comprise any of: difference (subtraction of current CI and previous CI), difference of moving averages (current CI moving average minus previous CI moving average), difference of magnitude (or L1-norm, i.e. current CI magnitude minus previous CI magnitude), difference of power (current CI power minus previous CI power), difference of current value and a moving average value (current CI minus a CI moving average value), a highpass or bandpass filter output, inner-product (of current CI and previous CI, both being vectors), inner product of moving averages, inner product of magnitude, inner product of power, autocorrelation function (of CI), autocorrelation function of CI magnitude, autocorrelation of CI power, autocorrelation of a function of CI, auto-covariance, etc.

Selection: Same, similar or different threshold-based measurement and reporting procedure may be applied to local reporting and nonlocal reporting, in which (a) the amounts of CI variation measures used for local reporting and nonlocal reporting may be the same or different, (b) the choices of CI variation measures used for local reporting and nonlocal reporting may be the same or different, and/or (c) thresholds used for local reporting and for nonlocal report may be the same and/or different.

For nonlocal reporting, the enabling/disable of threshold-based reporting, the amount and choices of CI variations, and the corresponding thresholds may be decided by sensing initiator. They may also be decided by at least one of: sensing responder, sensing transmitter, Type 1 device, another STA, and/or some server. They may also be decided locally by sensing receiver or Type2 device. Before being reported nonlocally, some precision reduction measure (e.g. quantization, approximation) may be applied to the measurement results.

For local reporting, the enabling/disable of threshold-based reporting, the amount and choices of CI variations and the corresponding thresholds may be decided locally by sensing receiver or Type2 device. They may also be decided nonlocally by at least one of: sensing initiator, sensing responder, sensing transmitter, Type 1 device, another STA, and/or some server. For local reporting, any precision reduction measure applied to the measurement results before nonlocal reporting may/may not be applied (i.e. may/may not be skipped). For local reporting, the measurement results may be reported with highest precision supported by the hardware of the sensing receiver.

Buffering time out: During a sensing session, measurement results associated with a measurement instance and corresponding measurement setup ID may be buffered and remain available for local/nonlocal reporting in the sensing receiver (or Type2 device) for a time duration comparable to a sounding period associated with the measurement setup ID (e.g. a percentage of the sounding period). A sounding period associated with a measurement setup ID may be the target time duration between two consecutive measurement instances as negotiated in the sensing measurement setup.

CSI as measurement results: CI (e.g. CSI, CIR, CFR, RSSI, or the channel measured during the training symbols of a received PPDU) may be a type of sensing measurement result (e.g. for sub-7 GHz WiFi/WLAN). To enable sensing, a parameter (e.g. an RXVECTOR parameter CI_ESTIMATE) may be defined that may contain the channel measured during the training symbols of the received wireless signal (e.g. PPDU in WiFi/WLAN). The format of parameter (e.g. CI_ESTIMATE) may be the same used in the measurement report field within the Sensing Measurement Report frame.

Central computing: Some sensing networks comprising the STAs may form a centralized sensing system, in which most of the high level sensing computation tasks based on the sensing measurement results (or "consumption" of the sensing results, e. g. motion detection, breathing detection/monitoring, fall down detection, etc.) are performed centrally by a central device (which may be a STA and sensing initiator, or a device that request a STA to function as sensing initiator) while a majority of the STAs (e.g. sensing responders, sensing transmitters, sensing receivers, Type1 device, Type2 device) do not participate in the high level sensing tasks. If the sensing measurement results are generated at the central device, then local-only reporting may be used in the central device and the central computing of the high level sensing computation tasks may be performed, and the sensing measurement results do not need to be transmitted from the majority of the STAs to the central device (which would take a lot of network resources, air time, bandwidth, hardware/software resources, with considerable time delay). If the sensing measurements are generated at the majority of the STAs, then nonlocal-only reporting may be used in the majority of the STAs to send all the measurement results to the central device which would then perform the central computing of the high level sensing computation tasks. But such nonlocal-only reporting may use a significant amount of network resources, air time, bandwidth, hardware/software resources and may result in considerable time delay.

Distributed computing: Some sensing networks form a distributed sensing system, in which most of the high level sensing computation tasks based on the sensing measurement results are distributed or shared among a majority of the STAs, with their respective high level task results to be sent to a central device (e.g. a STA and sensing initiator, or a device that request a STA to function as sensing initiator) for fusion and/or further processing. If the sensing measurement results are generated at the majority of the STAs, then local-only reporting may be performed and the distributed computing of the high level sensing tasks may be performed. If the sensing measurement results are generated at the central device, the central device may need to transmit the respective results to the respective STA for the distributed computing.

Example: As an example, there may be a base device (e.g. access point/AP for WiFi, or base station in 3G/4G/5G/6G/7G/8G, or a hub) serving as a sensing initiator and there may be many client devices (e.g. IoT devices for WiFi, mobile phones or client devices for 3G/4G/5G/6G/7G/8G).

Case 1: The base device may use trigger-based (TB) sensing measurement by sending trigger frame (TF) to solicit NDP from the client devices such that the measurement results are generated at the base device. In this way, local-only reporting in the base device may be performed and the central computing of the high level task may be performed in the base device.

Case 2: The base device may use non-TB sensing measurement by sending NDPA and NDP to the client devices such that the measurement results are generated at the client devices. In this way, local-only reporting in the client devices may be performed and the distributed computing of the high level task may be performed in the client devices. The clients may send their high level task results to the base device for fusion and further processing.

Example (proxy): In another example, an initiating device (e.g. a STA as real sensing initiator) may request the base device to function as a sensing initiator (proxy sensing initiator) to establish a sensing network with the IoT devices. In Case 1, the base device may transmit all the measurement results to the initiating device which can then perform the central computing of the high level task. In Case 2, the clients device may send their high level task results to the base device which then send to the initiating device for fusion and further processing (in the initiating device).

Measurement instance sharing: In one embodiment, a measurement instance may be associated with one measurement setup. In another embodiment, measurement instance sharing in a session may be disclosed. A measurement instance may be shared by more than one measurement setups in a sensing session (by being associated with more than one measurement setup ID, same initiator-responder pair), with the measurement performed using a "shared" or "combined" measurement setup which may be a superset encompassing the more than one measurement setups (e.g. if one setup is 300 Hz with 2 antennas and another setup is 200 Hz with 3 antennas, then combined setup may be 300 Hz with 3 antennas). The combined sounding frequency may be greater than or equal to the sounding frequencies of the more than measurement setups, and less than or equal to their least common multiple (LCM) (e.g. LCM of 200 and 300 is 600). For example, the combined sounding frequency may be the maximum of the sounding frequencies (e.g. max of 200 and 300 is 300). Or it may be the LCM. Such measurement instance sharing may be useful when a large amount of sampling time of the more than one measurement setups are coinciding or very close to each other. The combined amount of antennas may be the maximum of the antenna numbers of the more than one measurement setups.

As an example, measurement instance sharing may be useful for two measurement setups that differ only in sounding frequency, one sounding frequency being a factor of the other (e.g. 100 Hz vs 200 Hz, all other settings being identical). By sharing the measurement instances, all of the slower (with lower sounding frequency) measurement instances can be completed absorbed by the fast measurement instances. By sharing measurement instances, 100 measurement instances can be saved (now with 200 total instances per second compared with the previous 300 instances per second). This would reduce a large amount of network resources (air time, bandwidth, hardware/software usage).

As another example, measurement instance sharing may be useful for two measurement setups that differs only in sounding frequency, with the two sounding frequencies have a large enough GCF (greatest common factor), e.g. 200 Hz vs 300 Hz, GCF=100, all other settings being identical. By sharing measurement instances, ten measurement instances can be saved (now with 400 total instances per second compared with the previous 500 total measurement instances per second). In general, if GCF=N, then N measurement instances can be saved per second. The two measurement instances may be merged or shared if their GCF is larger than a threshold.

In another embodiment, measurement instance sharing across multiple sessions may be disclosed. There may be multiple sessions each associated with a unique session ID. A measurement instance may be shared by more than one measurement setups in multiple sensing sessions (by being associated with more than one measurement setup ID and more than one session ID, the multiple session corresponding to multiple initiator-responder pairs), with the measurement performed using a "shared" or "combined" measurement setup which may be a superset encompassing the more than one measurement setups. Such measurement instance sharing may be useful for eliminating or avoiding "redundant" measurement instances when different initiator-responder pairs choose similar or same measurement setup parameter sets.

As an example, a smart TV may establish a first sensing session with an AP, with the AP being the sensing initiator. A smart thermostat may establish a second sensing session with the AP, with the AP being the sensing initiator. Both sensing sessions may have identical or very similar measurement setup parameter sets (e.g. both have 100 Hz in the "identical" case, or 100 Hz vs. 200 Hz in the "similar" case, all other settings being identical). For example, some smart professor may have published a paper sharing a very good set of measurement setup parameters set (e.g. 100 Hz). In the "identical" case, both the TV and the thermostat may be designed based on the published results, thus leading to identical settings (e.g. both 100 Hz). In the "similar" case, one device may have adjusted the sounding frequency from 100 Hz to 200 Hz in order to achieve their performance requirement, thus leading to the "similar" settings (100 Hz vs 200 Hz). As explained before, a saving of 100 instances per second can be achieved by allowing the measurement instance sharing across multiple sessions.

In general, two measurement instances associated with two different measurement setups (in the same session or across multiple sessions) may be "merged" or "shared" if the difference between their sampling times may be less than a threshold.

In some embodiments, applications can benefit from "local" reporting/consumption of sensing measurements (e.g. CSI) in the sensing receiver, instead of "nonlocal" reporting (transmit to sensing initiator using sensing measure report frame)/consumption (by sensing initiator). For example, the sensing initiator and the sensing receiver may be designed/operated by the same company to perform a sensing task jointly. The sensing initiator may be designed to set up the WLAN sensing network while the sensing receiver may be designed to perform locally a majority of the sensing computation (e.g. motion/breathing detection) based on locally reported sensing measurements. The locally computed sensing results (much simpler than raw sensing measurements) may be transmitted to the sensing initiator for fusion/further procession.

This would significantly reduce heavy network resources (signaling, bandwidth, airtime, delay) needed in the nonlocal reporting, as sensing measurements (e.g. CSI) are sizable. Local consumption distributes sensing computation to many sensing receivers, which means relatively low computation/memory requirement for each. In contrast, nonlocal consumption centralizes ALL sensing computation in sensing initiator, which means high computation/memory requirement. As such, sensing measurements are reported locally in the sensing receiver via a MLME primitive, according to some embodiments of the present teaching.

In some embodiments, the threshold-based procedure is extended from nonlocal reporting to local reporting of sensing measurement. An optional "threshold-based local reporting" may be defined for local reporting. In some embodiments, the optional "threshold-based local reporting" (and associated threshold) may be selected/deselected by an MLME primitive. When sensing measurements can be reported locally in sensing receiver, "threshold-based local reporting" can be applied to local reporting in the sensing receiver. Threshold-based local reporting means a sensing measurement will be reported locally when "sensing measurement variation" is larger than a threshold.

In various embodiments, the threshold-based local reporting can be applied in the sensing receiver in an optional manner or a mandatory manner. In some embodiments, the threshold used in "threshold-based local reporting" may be set via an MLME in the sensing receiver. In some embodiments, at least one "sensing measurement variation" (SMV) is available to "threshold-based local reporting." In some embodiments, one of the at least one SMV is selected via an MLME in the sensing receiver.

In some embodiments, a wireless device can reduce precision of sensing measurement (e.g. CSI) by performing some quantization on it before sending it in the sensing measurement report frame. This can help to achieve: reduced computation complexity, reduced hardware cost, increased/sustained throughput. But for local consumption by the sensing receiver (or local reporting of sensing measurement), the sensing measurement can/should be reported at highest possible precision.

In some embodiments, any precision reduction measures applied to the sensing measurement can be skipped for the purpose of nonlocal reporting in the sensing receiver. In some embodiments, sensing measurement can be locally reported in the sensing receiver via an MLME with a highest precision supported by the hardware of the sensing receiver.

In some embodiments, a sensing measurement result may take a sizeable memory to store/buffer in the sensing receiver. With limited allocated memory in the hardware of the sensing receiver, it may be expensive, if not impossible, to buffer a new sensing measurement result if an old one is not being "cleared", where "cleared" means being transmitted for nonlocal reporting or being read for local reporting.

In some embodiments, the old sensing measurement result may be overwritten by the new one. Thus a sensing measurement result associated with a measurement instance with a measurement setup ID should be buffered and available for local/nonlocal reporting for a time duration comparable to a sounding period associated with the measurement setup ID (e.g. a percentage of the sounding period such as 50%). This would allow high level applications to know how much time it has to fetch the sensing measurement result using an MLME primitive.

A sounding period associated with a measurement setup ID is the target time duration between two consecutive measurement instances as negotiated in the corresponding sensing measurement setup. In some embodiments, a statement is added in SPF that a sensing measurement associated with a measurement instance with a measurement setup ID should be buffered and available for local/nonlocal reporting for a time duration comparable to a sounding period associated with the measurement setup ID.

In various embodiments, there are different methods for reporting of sensing measurement results. First, the sensing measurement results can be reported non-locally only, without local reporting, which is good for centralized sensing system. Second, the sensing measurement results can be reported locally only, without non-local reporting, which is good for fully distributed sensing system. Third, the sensing measurement results can be reported both locally and non-locally, which is good for hybrid sensing system. Fourth, there is no reporting of the sensing measurement results, or the reporting is paused/stopped. For example, the sensing measurement/session may be paused for privacy protection. The pausing can be achieved by terminating a measurement setup, and then resuming later by starting a new measurement setup.

Following the first method, there is only non-local reporting of the sensing measurement results using sensing measurement report frame, with no local reporting. In this method, all sensing measurement results are transmitted to elsewhere, and consumed non-locally. This is useful in centralized sensing system, in which sensing responder does not participate in the consumption of the sensing measurement. That is, the sensing responder does NOT perform high level WLAN sensing computation (such as detecting/monitoring motion, breathing, fall down, etc.). This would induce significant network traffic, air-time, or resources spent on transmitting raw sensing measurements (e.g. CSI), which causes considerable time delay (for sensing initiator to collect all sensing measurements). In addition, this needs central computing, which induces high computing/storage requirement for sensing initiator. This method can be good for "cooperating" sensing receivers who are only willing to help to generate and send back sensing measurements.

Following the second method, there is only local reporting of the sensing measurement results, with no non-local reporting. In this method, all sensing measurement results are consumed locally at a higher layer of the sensing responder, not sent to the sensing initiator. This is useful in a distributed case, where each sensing receiver performs high level WLAN sensing computation (such as detecting/monitoring motion, breathing, fall down, etc.) associated with the (local) sensing measurement. The sensing initiator serves to set up the sensing responders to form a WLAN sensing network. The sensing initiator may serve as a sensing transmitter or a sensing receiver. In some embodiments, the sensing receivers may share the computed sensing result (which would require little network bandwidth, air-time or resource) with the sensing initiator for fusion/ further processing. This only induces local computing, with lower computing/storage requirement than the first method. There is no network resources used to transmit demanding raw sensing measurements, which is good for "partner" sensing receivers who will help to perform part of high level computing.

Following the third method, both local reporting and non-local reporting are performed, such that the sensing measurement results are consumed both locally and non-locally. This is useful in a hybrid case, in which both the sensing responder and the sensing initiator participate in the consumption of the sensing measurement. That is, the sensing responder shares some high level WLAN sensing computation with the sensing initiator. Similar to the first method, the third method will induce significant network traffic, air-time, or resources spent on transmitting raw sensing measurements (e.g. CSI). Because the third method performs both centralized computing and distributed computing, it has computational/memory requirement for the sensing initiator similar to the first method, while those requirements for the sensing receivers are similar to the second method.

Hybrid cases mean central and distributed computing. In one example, suppose an AP is sensing initiator and there are many IoT devices serving as sensing responders. (Or AP is requested to be a proxy.)

An exemplary "recipe" for central computing is that: AP uses TB sensing measurement by using TF to solicit NDP from the IoT devices such that measurement results are generated at the AP. Then local-only reporting is sufficient for central computing. There is no transmission of measurement results over the air.

An exemplary "recipe" for distributed computing is that: AP can use non-TB sensing measurement by sending NDPA+NDP to the IoT devices such that measurement results are generated at the IoT devices. Then local-only reporting is sufficient for distributed computing at the IoT devices. There is no transmission of measurement results over the air.

In some embodiments, selection of local reporting and nonlocal reporting remain the same for measurement instances with the same measurement setup ID. The local or nonlocal reporting can be selected at different levels or granularities, including: at session setup level (e.g. local/ nonlocal reporting selection applied to ALL measurement setups in a session), at measurement setup level (e.g. local/ nonlocal reporting selection applied to ONE measurement setups), or both (e.g. 1 bit in session level to indicate session level or measurement setup level, then select at the corresponding level).

In some embodiments, one measurement instance is associated with one measurement setup. But it may be useful to associate a measurement instance with more than one measurement setups within a sensing session, with measurement performed using "shared" measurement setup. In a first example, the more than one shared measurement setups may be two measurement setups with large amount of measurement instances coinciding to each other. In a second example, the more than one shared measurement setups may be two measurement setups that differ only in sounding frequency, F1 being a factor of F2 (e.g. 10 Hz vs 20 Hz, all other settings being identical, where 30 instances/s becomes 20 instances/s.) In a third example, the more than one shared measurement setups may be two measurement setups that differ only in sounding frequency, with large greatest common factor (GCF) (e.g. 20 Hz vs 30 Hz, all other settings being identical, GCF=10, where 20+30=50 instance/s becomes 40 instance/s. If GCF=N, instance saving=N.) In a fourth example, the more than one shared measurement setups may be two measurement setups that differ in sounding frequency and number of antennas (e.g. 10 Hz/3 antennas vs 20 Hz/2 antennas, "shared" measurement setup=3 antennas). Sensing measurement sharing can reduce the total amount of measurement instances which implies less air time/bandwidth/network resources for sensing, less buffering memory, lower power, longer battery life, etc.

In some embodiments, it may be useful to share measurement instances of different sensing sessions (e.g. different initiator-responder pairs), with measurement performed using "shared" measurement setup. When the initiator is an AP, and responders are IoT devices, some "common" and "good" settings may likely be used by many IoT, causing their measurement setup parameters to be very similar. In one example, the shared measurement setups in TB-based sensing are two measurement setups that differ only in sounding frequency, one being a factor of the other (e.g. smart TV wants 10 Hz while smart speaker wants 20 Hz, all other settings being identical). In another example, the shared measurement setups in TB-based sensing are two measurement setups that differ in sounding frequency and number of antennas (e.g. smart TV wants 10 Hz for 3 antennas while smart speaker wants 20 Hz for 2 antennas, "shared" measurement setup=3 antennas). Sensing measurement sharing can reduce the total amount of measurement instances which implies less air time/bandwidth/network resources for sensing, less buffering memory, lower power, longer battery life, etc.

In some embodiments, the sensing transmitter is allowed to associate a measurement instance with up to N measurement setup ID. N is an integer. Among the N measurement setup ID, local/nonlocal reporting is performed in predefined order (e.g. increasing) of measurement setup ID.

In some embodiments, "measurement instance sharing" is allowed in a sensing session. In some embodiments, "measurement instance sharing" allows an instantaneous (individual) measurement instance to be associated with N sensing measurement setup ID, and to perform the associated sensing measurement with an instantaneous "common" setup which enables the sensing measurement to satisfy all requirement/specification of the N sensing measurement setup ID. N is an integer larger than 1.

In some embodiments, "measurement instance sharing" is optional in a sensing session, where the "measurement instance sharing" allows an instantaneous (individual) measurement instance to be associated with N sensing measurement setup ID, and to perform the associated sensing measurement with an instantaneous "common" setup which enables the sensing measurement to satisfy all requirement/ specification of the N sensing measurement setup ID. N is an integer larger than 1.

In some embodiments, access of CSI is controlled for privacy protection. In a WLAN sensing, there are different functional roles. A sensing initiator is to initiate a sensing procedure and can access CSI. A sensing responder is to participate in a session procedure and can access CSI if being receiver. A sensing transmitter is to transmit sensing PPDU. A sensing receiver is to perform sensing measurements and report sensing measurement, and can access CSI.

There may be also a SBP-requesting STA that can request SBP procedure and can access CSI.

In some embodiments, the sensing system can maintain a classification of STA for the sake of managing access of CSI. In one example, the system can allow a class of most trusted STA to do all roles (with full access of CSI) including 1, 2, 3, 4, 5 (e.g. user's IoT devices from trusted sources). In another example, the system can allow a class of STA to do some roles (with limited access of CSI) such as {1, 2, 3, 4}, {2, 3, 4}, or {4} (e.g. for user's IoT devices from less trusted sources, neighbors' devices). In another example, the system can allow a class of STA to do some roles (with no access of CSI) such as a responder being not a receiver, or {3} (e.g. for unknown device). In another example, the system can allow a class of STA to do no role (with no access of CSI) (e.g. hostile devices, compromised device).

In some embodiments, an optional sensing by proxy (SBP) procedure can be defined as below. First, an "SBP request" includes a non-AP STA sending an SBP Request frame to an SBP-capable AP STA. An STA that sends an SBP Request frame to invoke SBP (and, as a result, WLAN sensing) is denoted by "SBP requesting STA". The format and contents of the SBP Request frame are to be determined. Second, an AP STA that receives an SBP request can send to the SBP requesting STA an SBP Response frame to accept or reject the request. The format and contents of the SBP Response frame are to be determined. Then, an AP STA that accepts an SBP request can initiate WLAN sensing procedure(s) with one or more non-AP STA(s) using operational parameters derived from those indicated within the SBP Request frame. The measurement results obtained in WLAN sensing procedure(s) resultant from an SBP request may be reported to the SBP requesting STA.

In some embodiments, a sensing by proxy with local reporting (SBP-LR) procedure may be defined as below. An "SBP-LR request" includes a non-AP STA sending an SBP-LR Request frame to an SBP-LR capable AP STA. An STA that sends an SBP Request-LR frame to invoke SBP-LR (and, as a result, WLAN sensing) is denoted by "SBP-LR requesting STA". The format and contents of the SBP Request frame are to be determined. An AP STA that receives an SBP-LR request can send to the SBP-LR requesting STA an SBP-LR Response frame to accept or reject the request. If accepting, the AP may be promising to execute the SBP-LR for a period of time. At the end of the period, the ABP-LR may stop. But the SBP-LR requesting STA (or another STA) may send another "request to continue" together with the SBP-LR setup ID. The format and contents of the SBP-LR Response frame are to be determined. An AP STA that accepts an SBP-LR request can initiate WLAN sensing procedure(s) with one or more non-AP STA(s) using operational parameters derived from those indicated within the SBP-LR Request frame. The measurement results may be reported locally only (i.e. locally to the sensing receivers), remotely (to AP STA which would forward SBP-LR/SBP requesting STA) only or both locally and remotely.

In some embodiments, an SBP-LR setup ID may be associated with the SBP-LR setup and/or the operational parameters. Each measurement instance may be associated with one or more SBP-LR setup ID. The AP STA may store/buffer/process/forward/re-direct/re-route/distribute/utilize/perform/distribute the sensing measurement results received from the sensing receivers.

In some embodiments, the AP STA may perform non-TB sensing measurements with the non-AP STAs, with NDPs sent to non-AP STAs, such that sensing measurement is performed at each of the non-AP STAs and the measurement results are reported locally in the non-AP STAs. The AP STA may perform non-TB sensing measurements with the non-AP STAs, with NDPs sent from the non-AP STAs, such that sensing measurement is performed at the AP STA and the measurement results are reported locally in the AP STAs. The AP STA may perform non-TB sensing measurements with the non-AP STAs, with some NDP sent to and some sent from the non-AP STAs. In this way, the sensing measurement results may not be transmitted over the air from sensing receivers to the AP STA. In some embodiments, the AP STA may perform TB sensing measurement with the non-AP STAs such that sensing measurement is performed at the AP STA, and the measurement results are reported locally in the AP STA.

For the local reporting in the sensing receivers, unclaimed/unconsumed measurement results may be kept for up to a time-out period. Beyond the time-out period, the measurement results may be persist (e.g. persist until being overwritten, persist for a time-out period), discarded, overwritten, or kept. One or more high level application process in the non-AP STAs can use MLME primitive to request the non-AP STAs to take part in a SBP-LR with a corresponding sounding frequency. The sensing measurement results may be read via a MLME primitive within the time-out period. The AP STA may perform a wireless (e.g. WLAN, 4G/5G/6G/7G/8G, Bluetooth, WiMax, Wi-Fi, etc.) sensing procedure for more than one SBP-LR requests/SBP request and/or more than one SBP-LR requesting STA/SBP requesting STA. The AP STA may perform the WLAN sensing procedure as a service to the more than one SBP-LR requesting STA/SBP requesting STA. As long as there is one SBP-LR/SBP request, the AT STA may start to perform the WLAN sensing procedure. The service may pause when all SBP-LR/SBP requests are fulfilled and finished and there are no more requests.

When there are two or more SBP-LR requests/SBP requests with different sensing parameters (e.g. one with 20 Hz sounding and one with 10 Hz, or one with 20 Hz and the other with 30 Hz), the AP STA may perform a wireless sensing procedure with a "superset" of sensing parameters, such that all SBP-LR/SBP requests are satisfied simultaneously. Or the AP STA may perform multiple wireless sensing procedures such that each SBP-LR/SBP request is satisfied by the more than one wireless sensing procedure. For example, the AP STA may perform several wireless sensing procedures, say, A, B and C, each with respective sensing parameters. A first SBP-LR/SBP request may be satisfied by A (or part of A). A second request may be satisfied by combining A and B. A third request may be satisfied by A and C. A fourth may be satisfied by A, B and C, so on and so forth.

In some embodiments, the more than one SBP-LR/SBP requesting STA may be selected or permitted STA to send the SBP-LR/SBP requests. The AP STA may decline/reject SBP-PR/SBP requests from non-selected/non-permitted STA.

In some embodiments, the AP STA may provide privacy protection/access control for the wireless sensing system formed by the AP STA and the non-AP STA. The AP STA may belong to a User and be installed at the user's home/office/facility. The User may specify/designate/select some user devices (e.g. User's devices, some permitted users' devices, User's trusted devices, User's recognized devices, User's permitted devices) as "permitted" or "selected" STA to send the SBP-LR/SBP request to enable sensing, e.g. using some authentication protocol, some pairing procedure, some identification procedure, some password, etc. The User may also specify/designate/select some WiFi devices "visible" to the AP STA (e.g. neighbors' WiFi devices, public devices, commercial devices, unknown devices, devices not trusted by the user, or devices owned by unauthorized users such as tenants or residents or visitors of the User's home/office/facility) as "non-permitted" or "non-selected" or "rejected" devices.

In some embodiments, in a mesh network in which there are more than one AP STAs cooperating together to form the mesh network, some or all of the AP STAs may do the SBP or SBP-LR. Each AP STA may perform wireless sensing independently with a respective set of "client" STAs. A client STA may perform wireless sensing with one or more than one AP STAs. Or some or all of the AP STAs may do wireless sensing jointly or in a coordinated manner. The sounding of two AP STAs may be synchronous, or almost synchronous, or contemporaneous, or phased with certain phase lag, or not. Suppose there are three APs: AP1, AP2 and AP3. Each of the three APs may be doing one or more wireless sensing procedures (e.g. A, B, C for AP1 and D, E, F for AP2) each with respective sensing parameters. D and A may be related. D and A may have identical sensing parameters. Similarly E and B may be related or similar or identical. F and C may be related or similar or identical. AP1 and AP2 may do A and D simultaneously, or contemporaneously, or in a synchronous (with or without a phase lag) manner, or asynchronous manner. AP1 and AP2 may do A and B alternately (e.g. A=D, B=E such that AP1 does A while AP2 does B, and then AP1 does B while AP2 does A), or in a phased manner (e.g. AP1 does A, then AP2 does D while AP1 does B, then AP2 does E while AP1 does C, then AP2 does F while AP1 does A, and so on—i.e. AP2 may be one step behind AP1). AP3 may perform wireless sensing in a manner relative to AP1 only, AP2 only, or both AP1 and AP2.

In some embodiments, a "recipe" for distributed computing is implemented. An AP can use non-TB sensing measurement by sending NDPA+NDP to the IoT devices such that measurement results are generated at the IoT devices. Then local-only reporting is sufficient for distributed computing at the IoT devices. There is no transmission of measurement results over the air.

In some embodiments, a sensing by proxy with local reporting (SBP-LR) procedure for more than one SBP-LR requesting STA (e.g. one request 10 Hz/20 MHz/1 antenna, one request 30 Hz/40 MHz/4 antenna, one request 15 Hz/40 MHz/3 antenna) can be defined as below. When more than one SBP-LR requesting STA send SBP-LR request to the SBP-LR capable AP STA, the AP can assign SBP-LR setup ID to each set of requested parameters. For those with identical requested parameters, the SBP-LR setup ID can be the same, which means SBP-PR setup ID sharing. When AP establishes session with the non-AP STAs, it would obtain the maximum parameter set supported by the non-AP STAs. So AP would know which non-AP STA can take part in each SBP-LR setup. AP would perform measurement setup with each non-AP STA, with measurement setup based on the SBP-LR setup. Some measurement setup ID may be reserved for SBP-LR setup.

Selective SBP may be applied in some embodiments. A proxy-initiator (e.g. SBP-initiator) may send a request to a wireless access point (AP) which is a proxy-responder (e.g. SBP-responder), such that non-selective wireless sensing (e.g. SBP) is performed between the AP (acting as sensing initiator, on behalf of the proxy-initiator) with any available sensing responders (e.g. non-AP STAs/devices, another AP, mesh AP) in the AP's wireless network. Each of the available sensing responders may be assigned/associated with an identity (ID, e.g. MAC address). The proxy-initiator (e.g. SBP-initiator) may send another request to the AP to perform selective wireless sensing (e.g. selective SBP) with a group of selected sensing responders in the AP's wireless network. Each selected sensing responder may be identified by the respective ID. Same or different sensing settings may be used for different sensing responders. For a sensing responder, same or different sensing settings may be used for different target tasks (for the case of more than one target tasks) or different proxy-initiators (for the case of multiple proxy-initiators).

The proxy-initiator may request the AP to provide a list of sensing-capable devices in the AP's network that support/is capable of wireless sensing (e.g. 802.11bf compatible), with associated device information (e.g. device name, host name, vendor class ID, device product name). The proxy-initiator may select the selected sensing responders based on the list and the associated device information.

The proxy-initiator may use a two-stage approach to do selective wireless sensing for a target task. In stage 1, the proxy-initiator may request/perform/use non-selective wireless sensing (i.e. sensing with all available sensing responders) to perform a trial/testing/training task with all the sensing responders and select the selected sensing responders based on the sensing results and some criteria. The trial/testing/training task may be a motion detection task. A location (or a mapping to some target physical device) of each sensing responder in a venue may be estimated in the trial/testing/training task and the selection may be based on the estimated locations (or the mapping) of the sensing responders. The proxy-selector may also select some device from the list of sensing-capable devices that did not participate in stage 1.

Then in stage 2, the proxy-initiator may request/perform selective wireless sensing for the target task with the selected sensing responders. The trial/testing/training task may be related to the target task in a certain way. The trial/testing/training task may have a low sensing requirement such that all sensing-capable wireless responders can satisfy the requirement and are capable of taking part in the non-selective wireless sensing. The trial/testing/training task may have sensing results useful for the selection of the selected sensing responders.

The proxy-initiator may use the two-stage approach to do selective wireless sensing for two target tasks. For each target task, a respective stage 1 followed by a respective stage 2 may be performed. Alternatively, a common stage 1 may be performed in which a first group of selected sensing responders may be selected for the first target task and a second group selected for the second target task. The first group may or may not overlap with the second group. Then separate stage 2 may be performed for the two target tasks (e.g. sequentially, simultaneously or contemporaneously) based on the respective group of selected sensing responders. If the first group and the second group overlap with at least one common sensing responder appearing in both groups, sensing results associated with the common sensing responder may be shared by both target tasks.

Two different proxy-initiators may use the two-stage approach to do selective wireless sensing for their respective target tasks. For each target task of each proxy-initiator, a respective stage 1 followed by a respective stage 2 may be performed. Alternatively, a first common stage 1 may be performed for the first proxy-initiator (to select a group of selected sensing responders for each of its target tasks)

followed by separate stage 2 (to perform selective wireless sensing for each of its target tasks). Similarly, a second common stage 1 may be performed for the second proxy-initiator followed by separate stage 2 for each of its target tasks. Alternatively, a third common stage 1 may be performed for both proxy-initiators followed by separate stage 2 for each target tasks. If a common sensing responder is selected for more than one target tasks, sensing results associated with the common sensing responder may be shared by the more than one target tasks.

The proxy-initiator may be an "authorized" or "trusted" device that the AP allows/authorizes/authenticates to initiate one of the non-selective SBP, or non-selective SBP, or both. A first qualification test/setup/procedure may be performed in order for the SBP-initiator to be authorized by the AP to initiate non-selective SBP (first authorization). A second qualification test/setup/procedure may be performed in order for the SBP-initiator to be authorized by the AP to initiate selective SBP (second authorization). The SBP-initiator may have one of the first authorization and the second authorization, or both. One of the first authorization and the second authorization may imply the other.

The proxy-initiator may be connected to the AP via a wireless connection (e.g. the AP's wireless network, WiFi, WiMax, 4G/5G/6G/7G/8G, Bluetooth, UWB, mmWave, etc.) or via a wired connection (e.g. Ethernet, USB, fiber optics, etc.).

A sensing responder may/may not support non-selective proxy sensing (e.g. SBP), or selective proxy sensing or both. When sending sensing results to the AP for onward transmission to the proxy-initiator, a sensing responder may encrypt/process the sensing results so that the sensing results may not be decrypted/interpreted/consumed/made sense by AP (which does not have decryption key) but may be by the proxy-initiator (which has the decryption key).

In some embodiments, the SBP initiator may request the SBP responder (e.g. during the SBP set up; or in a SBP set-up request frame; or in a SBP set up protocol/exchange/signaling) to, and the SBP responder may, restrict the sensing procedure in an SBP to a list of selected non-AP STAs as sensing responders. Each selected non-AP STA may be specified in terms of its MAC address. When requested, the SBP responder may not include any non-selected non-AP STAs as sensing responders in the sensing procedure in the SBP. The SBP initiator may include itself as one of the sensing responders.

In some embodiments, a bit pattern in an SBP set-up request frame may be used to indicate the presence or absence of such a request. If the bit pattern indicates a presence of the request, there may be a field in the SBP set-up request frame to indicate a number/count/amount of the selected non-AP STAs. The MAC address of the list of selected non-AP STAs may be transmitted in or after the SBP set-up request frame.

Figure 4:
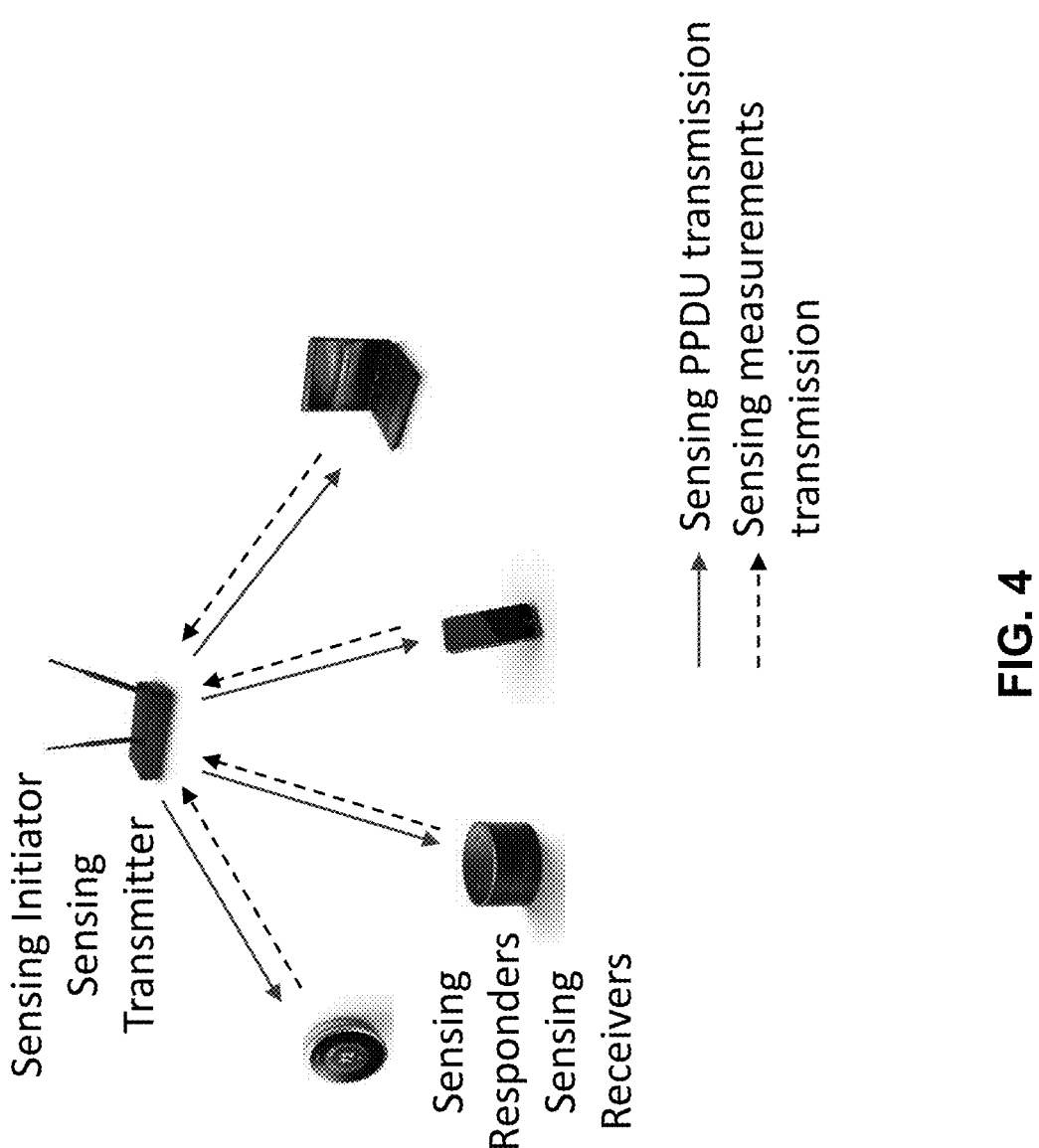
FIGS. 4-13 illustrate various exemplary use cases of wireless sensing and reporting, according to various embodiments of the present disclosure.

In some embodiments, there are different use cases for wireless sensing. A first use case of wireless sensing is illustrated in FIG. 4. In this case, AP is both the sensing initiator and the sensing transmitter for wireless sensing. An 802.11bf compatible STA may be the sensing responder and the sensing receiver for wireless sensing. In this case, the sensing measurement results (e.g. CSI) may be fed back to the sensing initiator. Some sensing-based results (e.g. task and applications like breathing detection, fall-down detection) may be computed by the sensing initiator based on the sensing measurement results.

Figure 5:
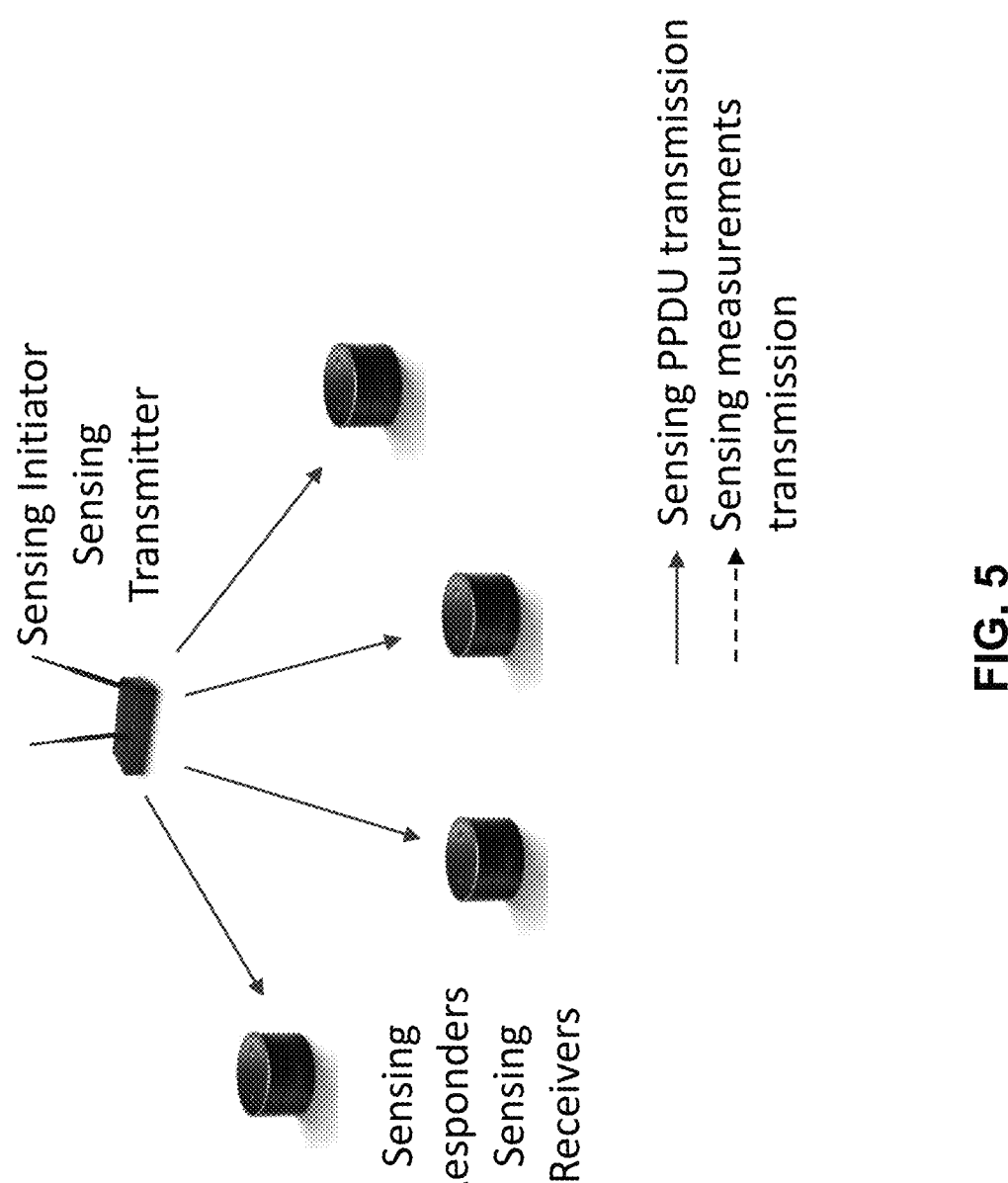

A second use case of wireless sensing is illustrated in FIG. 5. In this case, AP is both the sensing initiator and the sensing transmitter for wireless sensing. An 802.11bf compatible STA may be the sensing responder and the sensing receiver for wireless sensing. In this case, there is no feedback of the sensing measurement results (e.g. CSI) to the sensing initiator. Some sensing-based results may be computed by the sensing responder based on the sensing measurement results. The sensing-based results may be used by the sensing responder or sent elsewhere.

Figure 6:
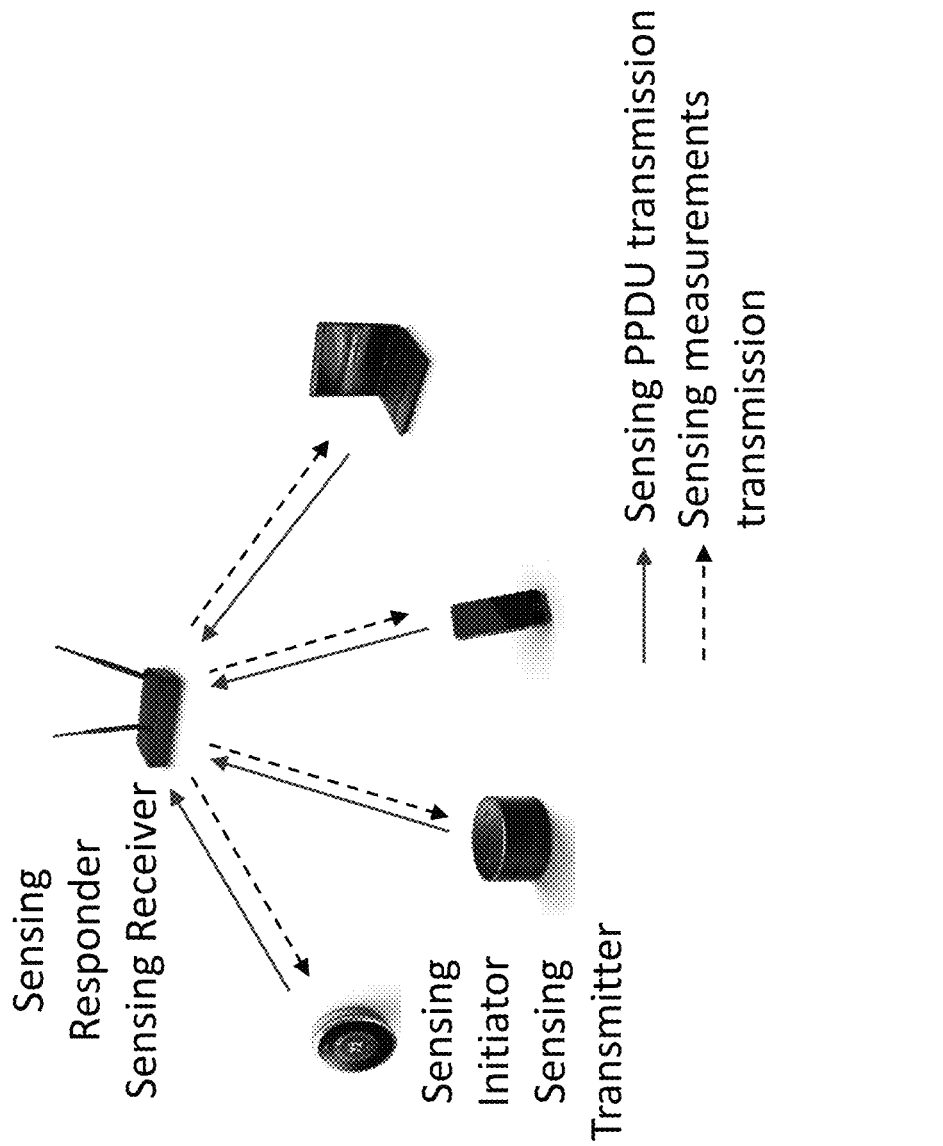

A third use case of wireless sensing is illustrated in FIG. 6. In this case, AP is both the sensing responder and the sensing receiver for wireless sensing. An 802.11bf compatible STA may be the sensing initiator and the sensing transmitter for wireless sensing. In this case, the sensing measurement results (e.g. CSI) may be fed back to the sensing initiator. Some sensing-based results (e.g. task and applications like breathing detection, fall-down detection) may be computed by the sensing initiator based on the sensing measurement results.

Figure 7:
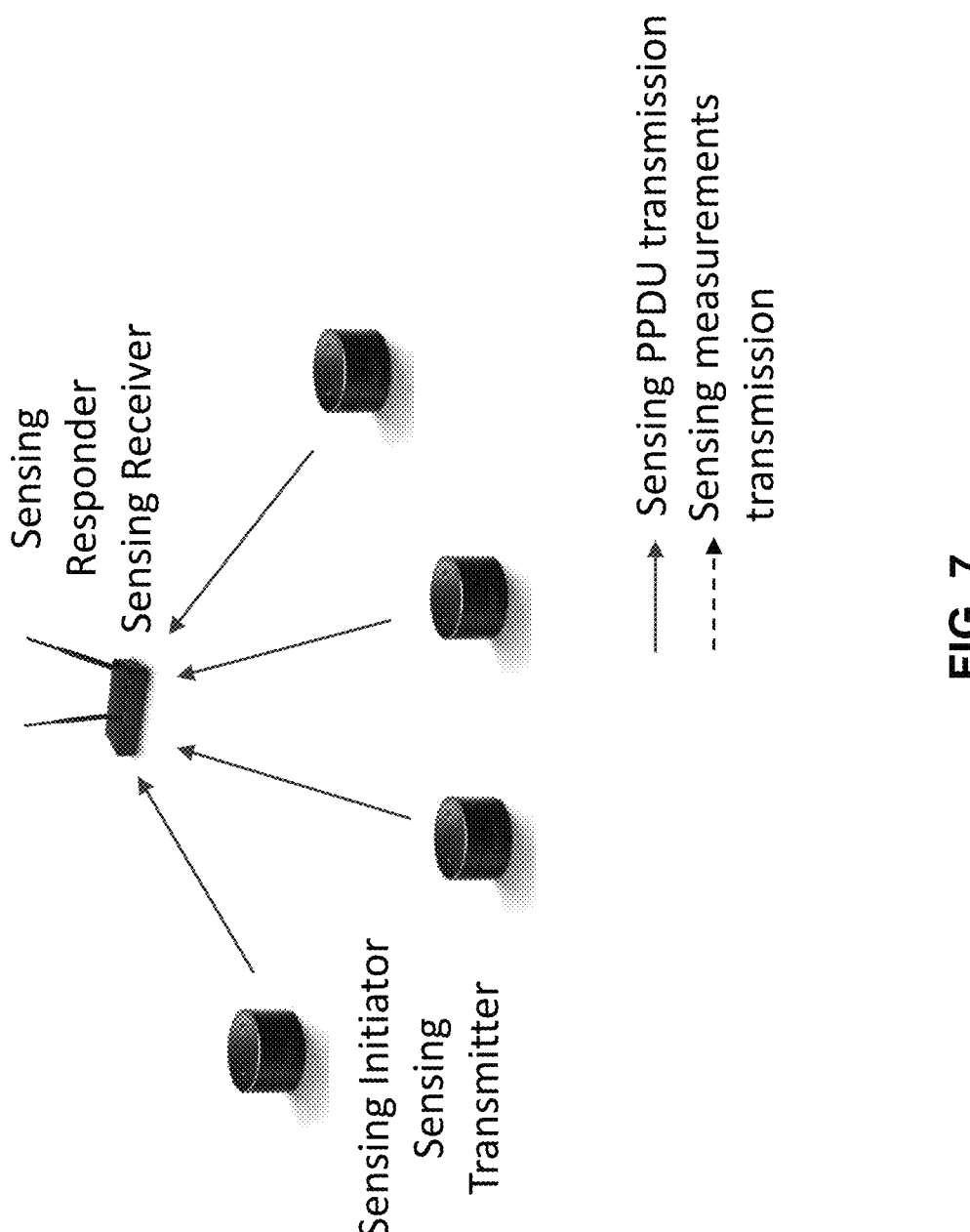

A fourth use case of wireless sensing is illustrated in FIG. 7. In this case, AP is both the sensing responder and the sensing receiver for wireless sensing. An 802.11bf compatible STA may be the sensing initiator and the sensing transmitter for wireless sensing. In this case, there is no feedback of the sensing measurement results (e.g. CSI) to the sensing initiator. Some sensing-based results may be computed by the sensing responder (AP) based on the sensing measurement results. The sensing-based results may be used by the sensing responder or sent elsewhere.

Figure 8:
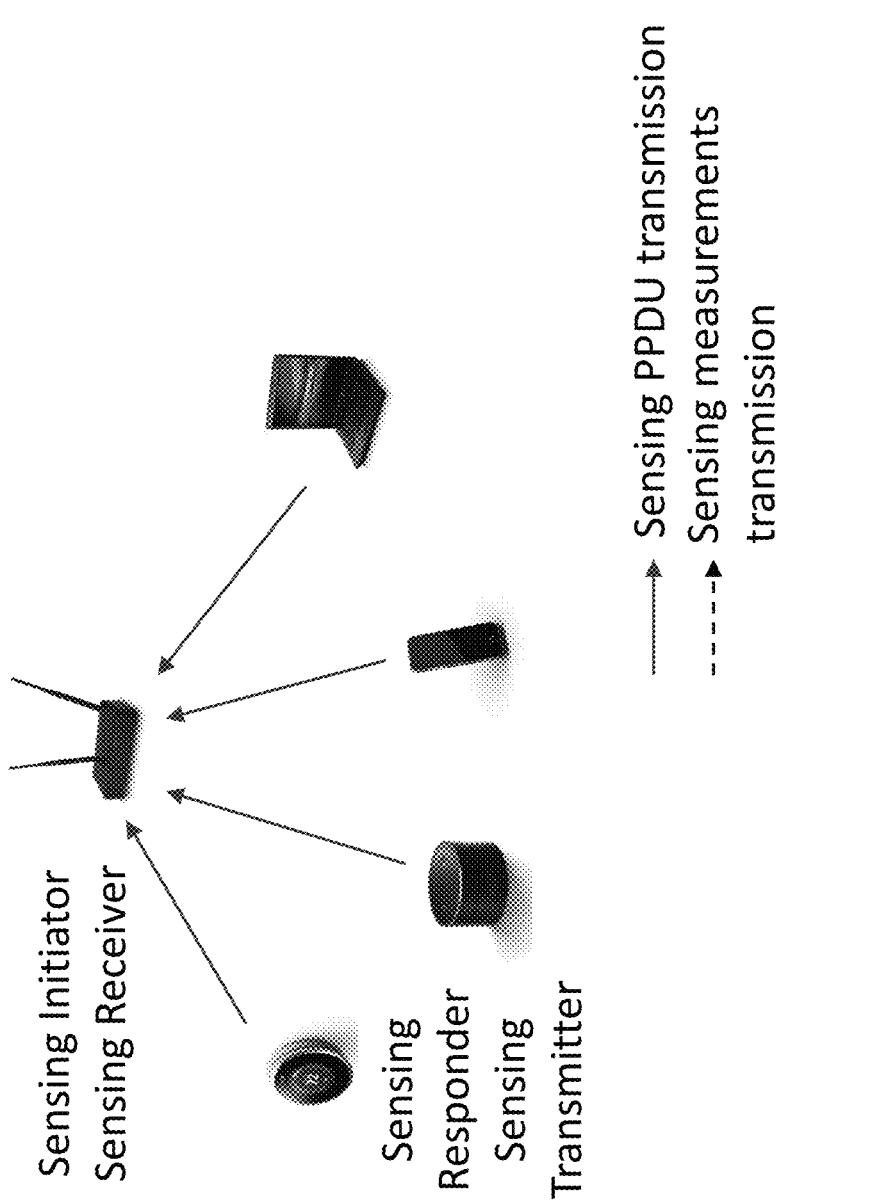

A fifth use case of wireless sensing is illustrated in FIG. 8. In this case, AP is both the sensing initiator and the sensing receiver for wireless sensing. An 802.11bf compatible STA may be the sensing responder and the sensing transmitter for wireless sensing. In this case, the sensing measurement results (e.g. CSI) may be obtained by the sensing initiator. Some sensing-based results (e.g. task and applications like breathing detection, fall-down detection) may be computed by the sensing initiator based on the sensing measurement results.

Figure 9:
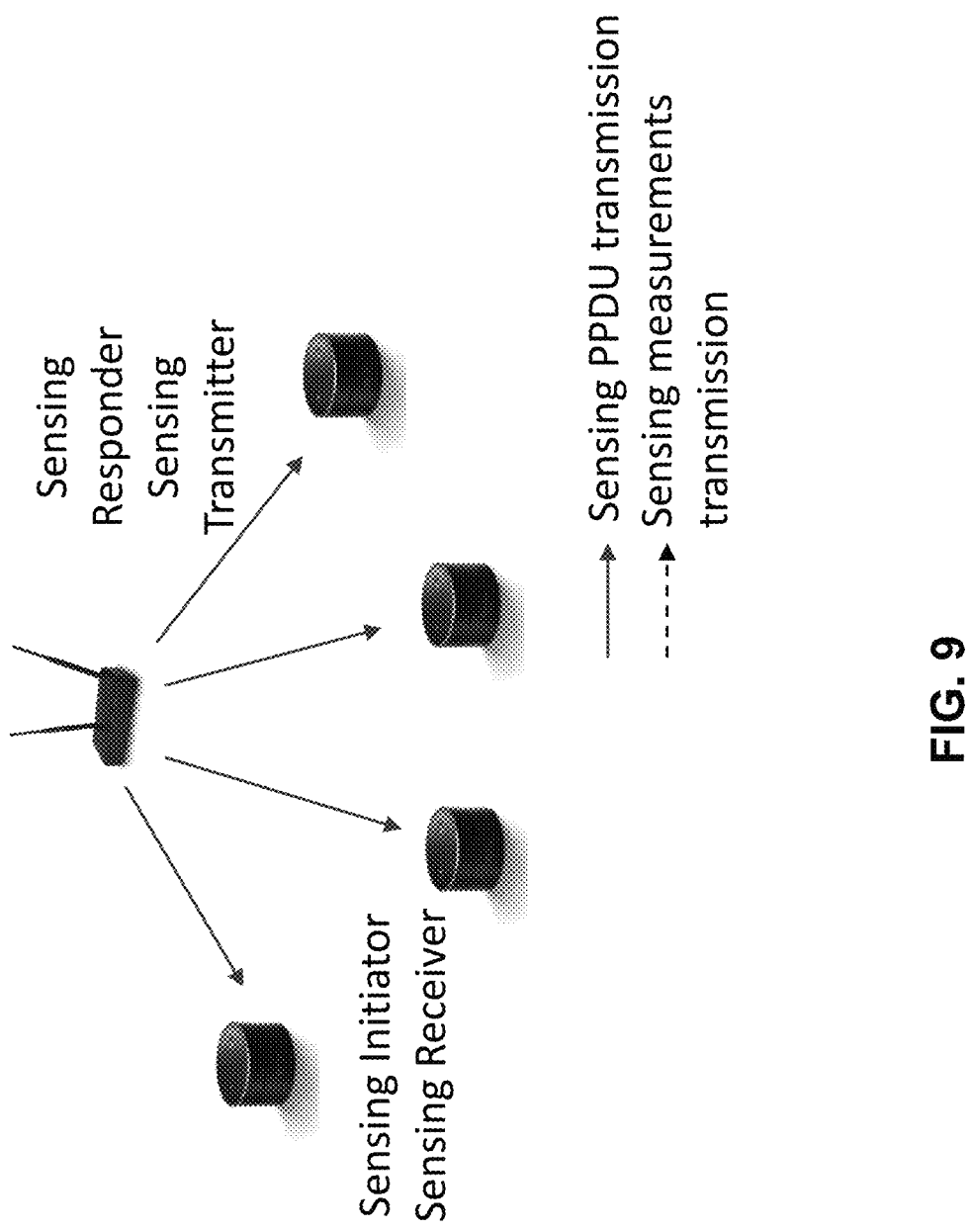

A sixth use case of wireless sensing is illustrated in FIG. 9. In this case, AP is both the sensing responder and the sensing transmitter for wireless sensing. An 802.11bf compatible STA may be the sensing initiator and the sensing receiver for wireless sensing. In this case, the sensing measurement results (e.g. CSI) may be obtained by the sensing initiator. Some sensing-based results (e.g. task and applications like breathing detection, fall-down detection) may be computed by the sensing initiator based on the sensing measurement results.

Figure 10:
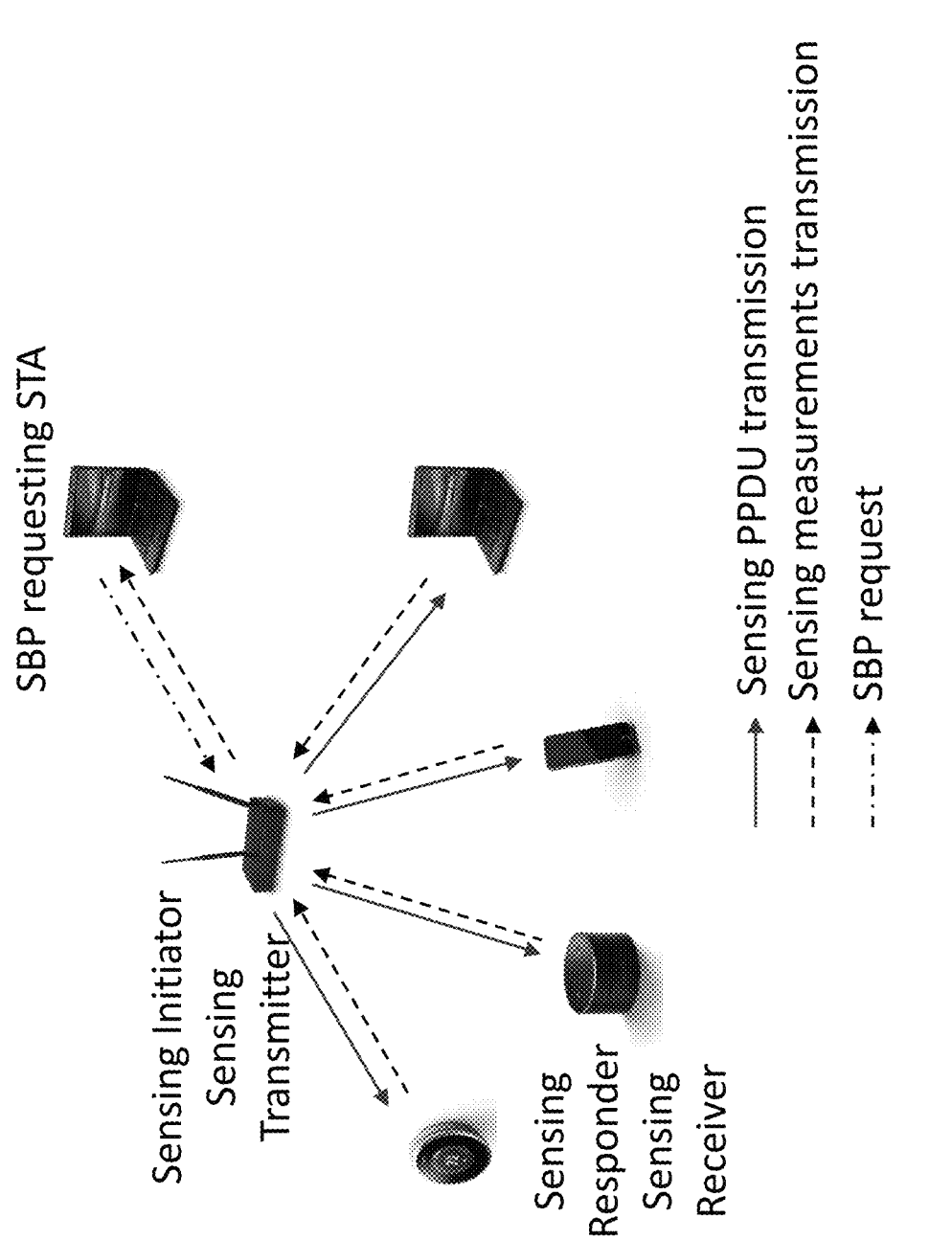

A seventh use case of wireless sensing is a sensing by proxy (SBP) case illustrated in FIG. 10. In this case, AP is both the sensing initiator and the sensing transmitter for wireless sensing. An 802.11bf compatible STA may be the sensing responder and the sensing receiver for wireless sensing. In this case, the sensing measurement results (e.g. CSI) may be fed back to the SBP requesting STA. Some sensing-based results (e.g. task and applications like breathing detection, fall-down detection) may be computed by the SBP requesting STA based on the sensing measurement results.

Figure 11:
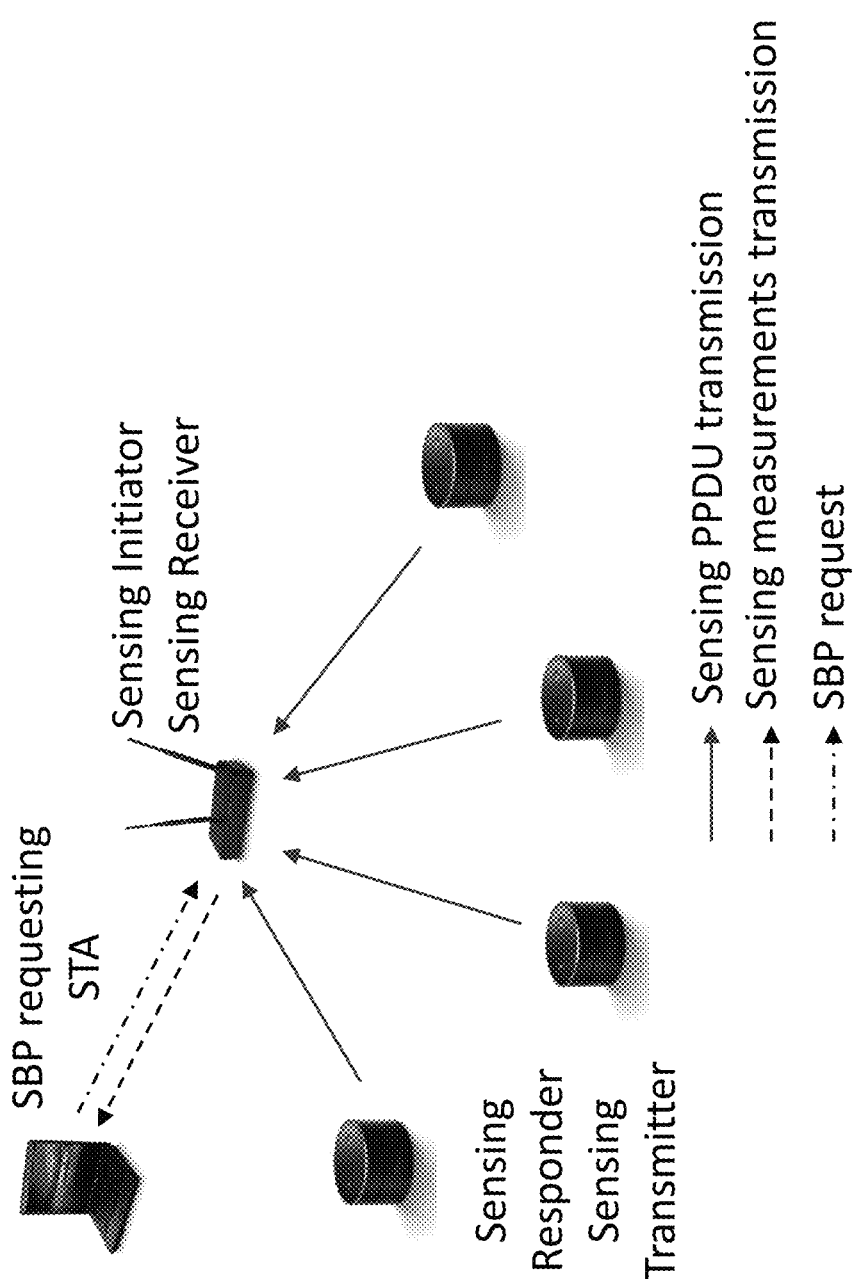

An eighth use case of wireless sensing is a sensing by proxy (SBP) case illustrated in FIG. 11. In this case, AP is both the sensing initiator and the sensing receiver for wireless sensing. An 802.11bf compatible STA may be the sensing responder and the sensing transmitter for wireless sensing. In this case, the sensing measurement results (e.g. CSI) may be fed back to the SBP requesting STA. Some sensing-based results (e.g. task and applications like breathing detection, fall-down detection) may be computed by the SBP requesting STA based on the sensing measurement results.

Figure 12:
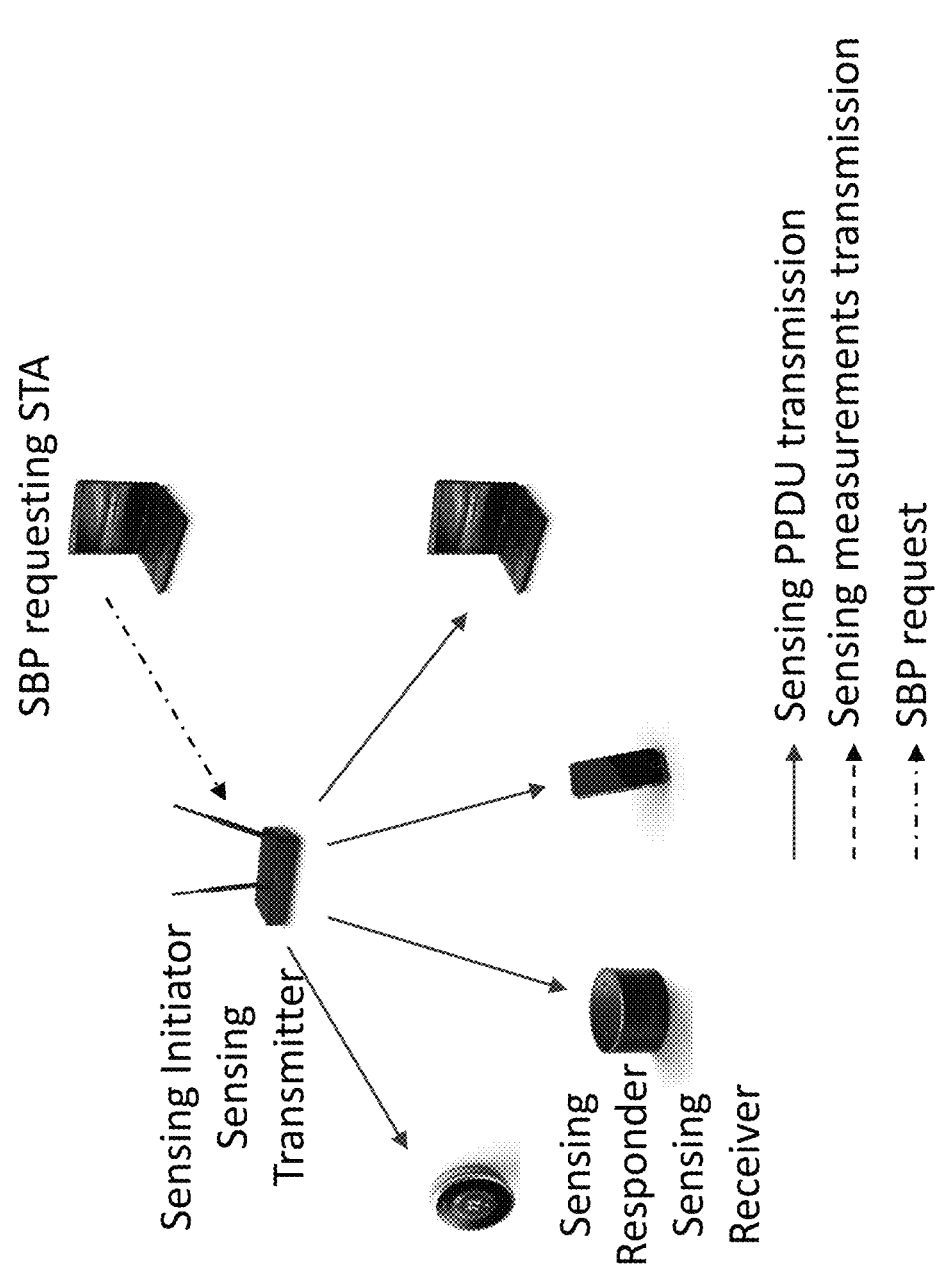

A ninth use case of wireless sensing is a sensing by proxy (SBP) case illustrated in FIG. 12. In this case, AP is both the sensing initiator and the sensing transmitter for wireless sensing. An 802.11bf compatible STA may be the sensing responder and the sensing receiver for wireless sensing. In this case, there is no feedback of the sensing measurement results (e.g. CSI) to the SBP requesting STA. Some sensing-based results (e.g. task and applications like breathing detection, fall-down detection) may be computed by the sensing responders based on the sensing measurement results.

Figure 13:
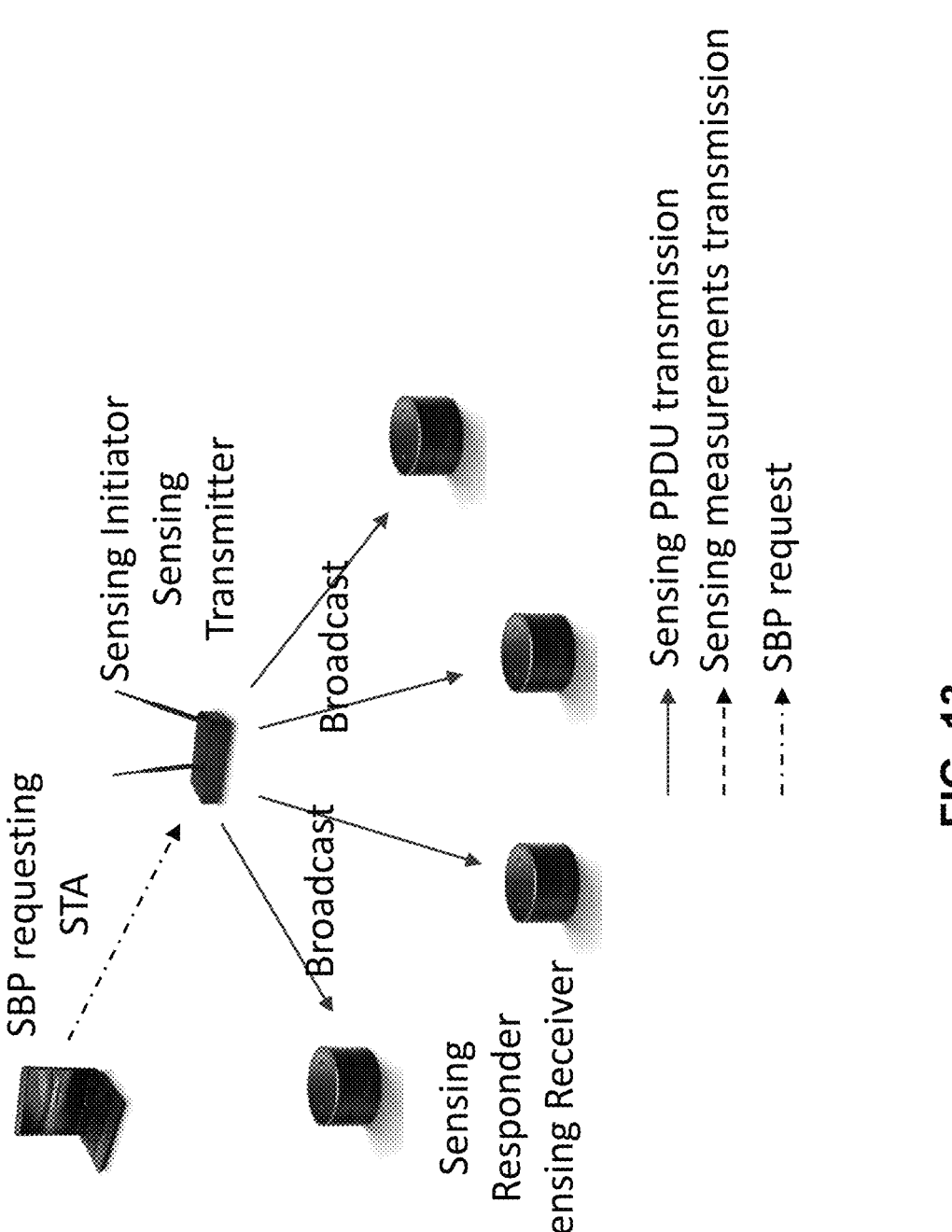

A tenth use case of wireless sensing is a sensing by proxy (SBP) case illustrated in FIG. 13. In this case, AP is both the sensing initiator and the sensing transmitter for wireless sensing. An 802.11bf compatible STA may be the sensing responder and the sensing receiver for wireless sensing. In this case, PPDU is broadcasted with identical sensing measurement setup from the AP to one or more sensing responders; and there is no feedback of the sensing measurement results (e.g. CSI) to the SBP requesting STA. Some sensing-based results (e.g. task and applications like breathing detection, fall-down detection) may be computed by the sensing responders based on the sensing measurement results.

In some embodiments, the present teaching discloses systems and methods for wireless sensing. In some embodiments, when the sensing results (e.g. CSI) are reported locally at the sensing receivers, a time stamp may be included in the report. The time stamp may comprise: the time when the wireless signal (i.e. the sensing physical layer protocol data unit (PPDU) sent from sensing transmitter to sensing receiver) from a Type 1 device (which may be a sensing transmitter) is received by a Type 2 device (sensing receiver). In some embodiments, the time stamp may be used for time base correction (e.g. in breathing detection/monitoring).

In some embodiments, each measurement instance is associated with one and only one measurement setup, though it can be associated with multiple sessions.

Figure 14:
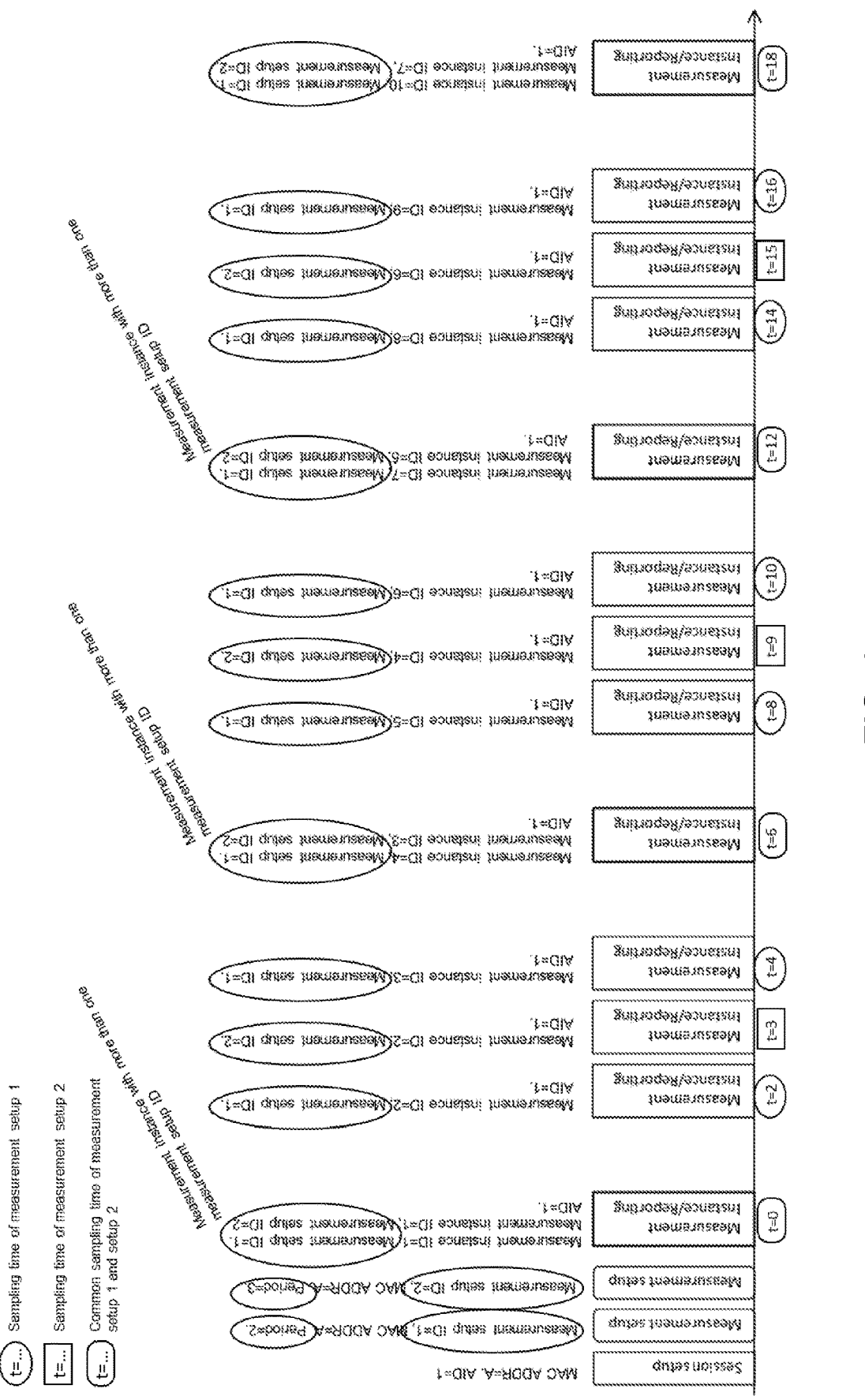
FIG. 14 illustrates an example of measurement instance sharing within a session of wireless sensing, according to some embodiments of the present disclosure.

But it can be useful to associate a measurement instance with more than one measurement setups. This can reduce the total amount of measurement instances which implies less air time/bandwidth/network resources for sensing, less buffering memory, lower power, longer battery life, etc. In some embodiments, there is measurement instance sharing within a session. FIG. 14 illustrates an example of associating a measurement instance with more than one measurement setup ID.

Figure 15:
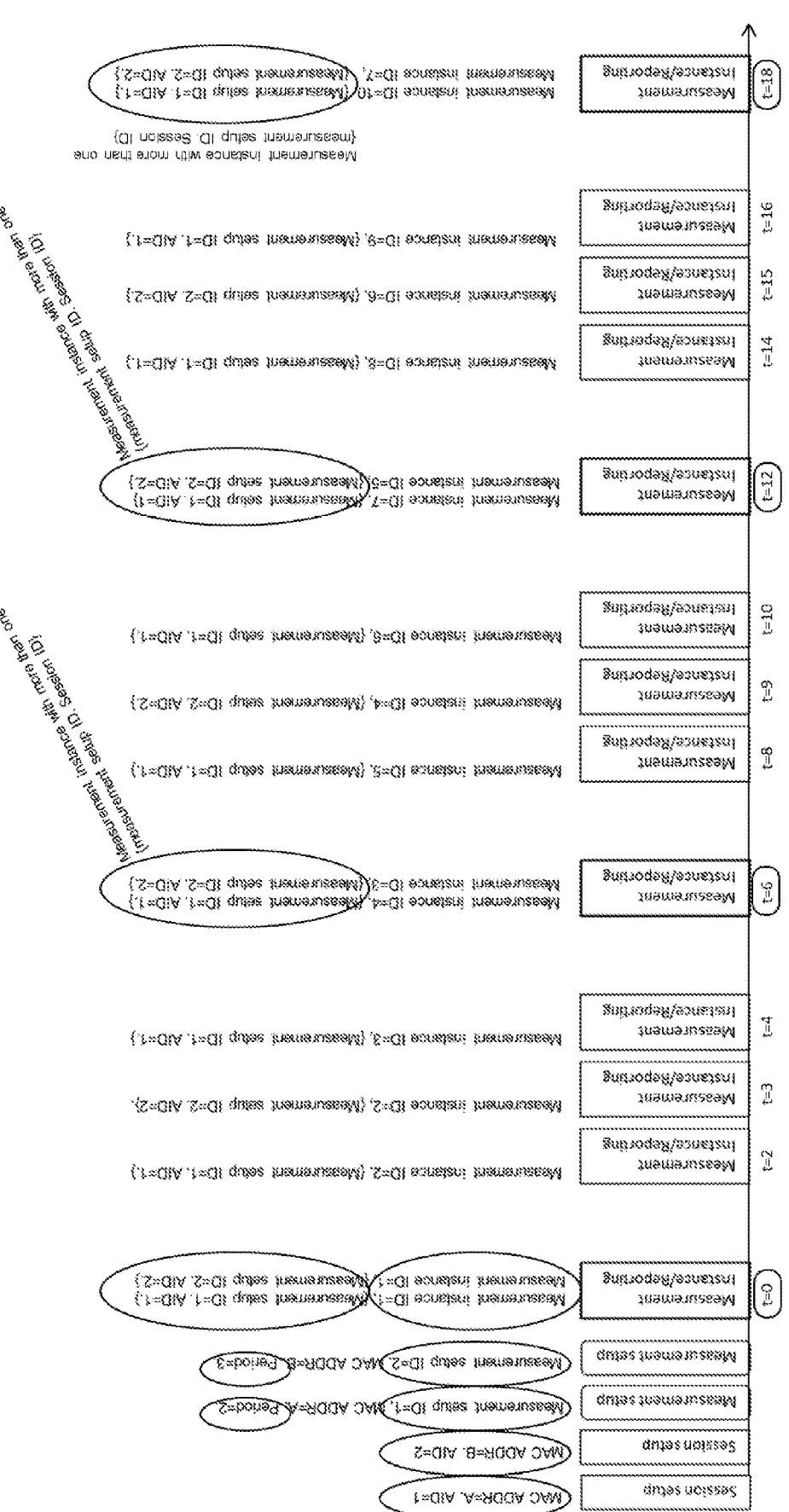
FIG. 15 illustrates an example of measurement instance sharing across sessions of wireless sensing, according to some embodiments of the present disclosure.

In some embodiments, there can be measurement instance sharing across sessions. As one measurement instance can be associated with more than one session in standard, a measurement instance associated with more than one measurement setups can be associated with more than one sets of {measurement setup ID, session ID}. FIG. 15 illustrates an example of measurement instances with more than one {measurement setup ID, session ID}.

As such, according to some embodiments, in 802.11bf, a measurement instance may or may not be allowed to be associated with more than one measurement setup ID. According to some embodiments, in 802.11bf, a measurement instance may or may not be allowed to be associated with more than one {measurement setup ID, session ID}.

Figure 16:
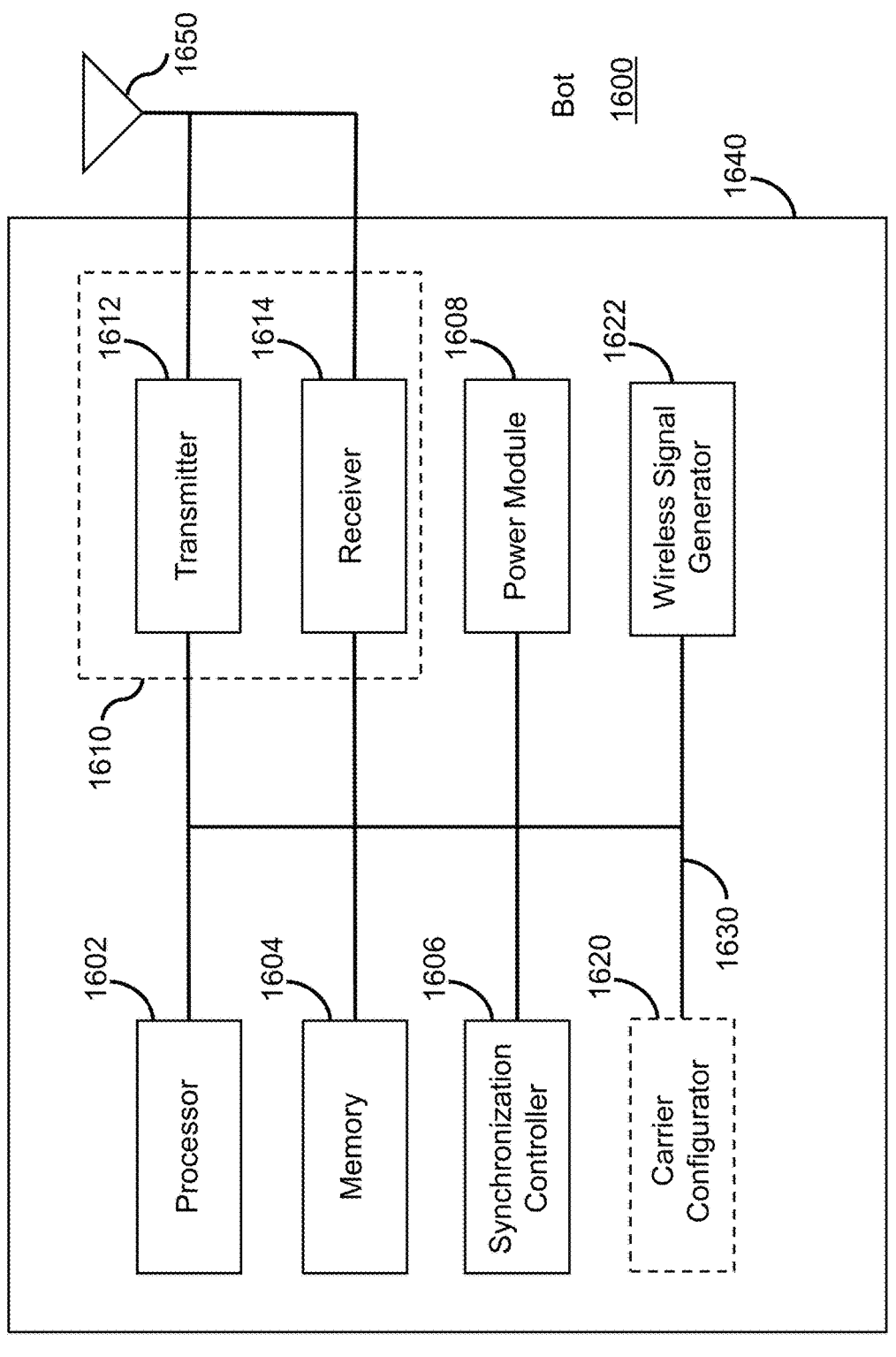
FIG. 16 illustrates an exemplary block diagram of a first wireless device of a system for wireless sensing, according to some embodiments of the present disclosure.

FIG. 16 illustrates an exemplary block diagram of a first wireless device, e.g. a Bot 1600, of a system for wireless sensing, according to some embodiments of the present disclosure. The Bot 1600 is an example of a device that can be configured to implement the various methods described herein. As shown in FIG. 16, the Bot 1600 includes a housing 1640 containing a processor 1602, a memory 1604, a transceiver 1610 comprising a transmitter 1612 and receiver 1614, a synchronization controller 1606, a power module 1608, an optional carrier configurator 1620 and a wireless signal generator 1622.

In this embodiment, the processor 1602 controls the general operation of the Bot 1600 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 1604, which can include both read-only memory (ROM) and random access memory (RAM), can provide instructions and data to the processor 1602. A portion of the memory 1604 can also include non-volatile random access memory (NVRAM). The processor 1602 typically performs logical and arithmetic operations based on program instructions stored within the memory 1604. The instructions (a.k.a., software) stored in the memory 1604 can be executed by the processor 1602 to perform the methods described herein. The processor 1602 and the memory 1604 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 1610, which includes the transmitter 1612 and receiver 1614, allows the Bot 1600 to transmit and receive data to and from a remote device (e.g., an Origin or another Bot). An antenna 1650 is typically attached to the housing 1640 and electrically coupled to the transceiver 1610. In various embodiments, the Bot 1600 includes (not shown) multiple transmitters, multiple receivers, and multiple transceivers. In one embodiment, the antenna 1650 is replaced with a multi-antenna array 1650 that can form a plurality of beams each of which points in a distinct direction. The transmitter 1612 can be configured to wirelessly transmit signals having different types or functions, such signals being generated by the processor 1602. Similarly, the receiver 1614 is configured to receive wireless signals having different types or functions, and the processor 1602 is configured to process signals of a plurality of different types.

The Bot 1600 in this example may serve as a Bot or Type 1 device or sensing transmitter for wireless sensing. The synchronization controller 1606 in this example may be configured to control the operations of the Bot 1600 to be synchronized or un-synchronized with another device, e.g. an Origin or another Bot. In one embodiment, the synchronization controller 1606 may control the Bot 1600 to be synchronized with an Origin that receives the wireless signal transmitted by the Bot 1600. In another embodiment, the synchronization controller 1606 may control the Bot 1600 to transmit the wireless signal asynchronously with other Bots. In another embodiment, each of the Bot 1600 and other Bots may transmit the wireless signals individually and asynchronously.

The carrier configurator 1620 is an optional component in Bot 1600 to configure transmission resources, e.g. time and carrier, for transmitting the wireless signal generated by the wireless signal generator 1622. In one embodiment, each CI of the time series of CI has one or more components each corresponding to a carrier or sub-carrier of the transmission of the wireless signal. The wireless sound sensing may be based on any one or any combination of the components.

The power module 1608 can include a power source such as one or more batteries, and a power regulator, to provide regulated power to each of the above-described modules in FIG. 16. In some embodiments, if the Bot 1600 is coupled to a dedicated external power source (e.g., a wall electrical outlet), the power module 1608 can include a transformer and a power regulator.

The various modules discussed above are coupled together by a bus system 1630. The bus system 1630 can include a data bus and, for example, a power bus, a control signal bus, and/or a status signal bus in addition to the data bus. It is understood that the modules of the Bot 1600 can be operatively coupled to one another using any suitable techniques and mediums.

Although a number of separate modules or components are illustrated in FIG. 16, persons of ordinary skill in the art will understand that one or more of the modules can be combined or commonly implemented. For example, the processor 1602 can implement not only the functionality described above with respect to the processor 1602, but also implement the functionality described above with respect to the wireless signal generator 1622. Conversely, each of the modules illustrated in FIG. 16 can be implemented using a plurality of separate components or elements.

Figure 17:
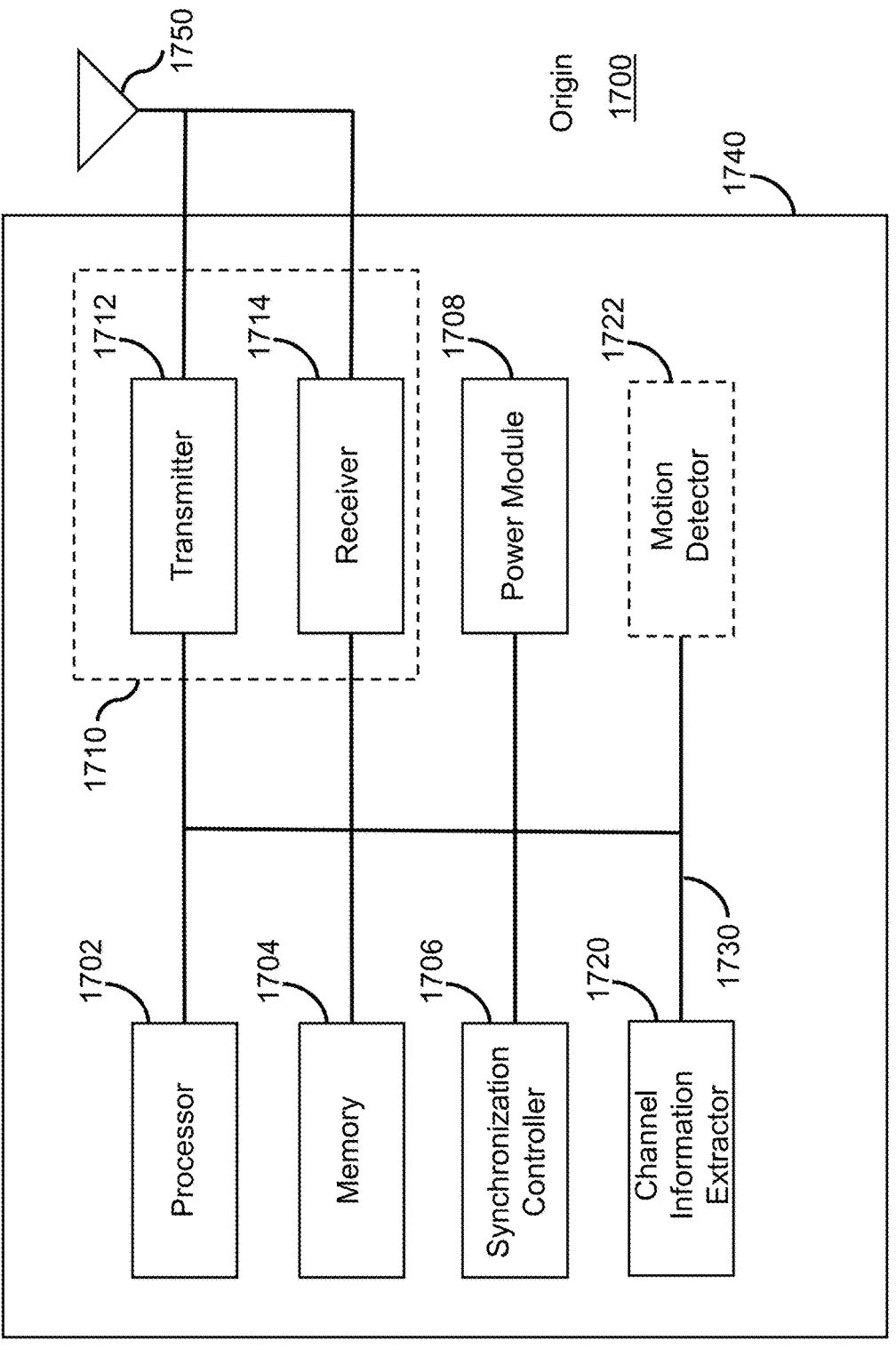
FIG. 17 illustrates an exemplary block diagram of a second wireless device of a system for wireless sensing, according to some embodiments of the present disclosure.

FIG. 17 illustrates an exemplary block diagram of a second wireless device, e.g. an Origin 1700, of a system for wireless sensing, according to one embodiment of the present teaching. The Origin 1700 is an example of a device that can be configured to implement the various methods described herein. The Origin 1700 in this example may serve as Origin or Type 2 device or sensing receiver for wireless sensing. As shown in FIG. 17, the Origin 1700 includes a housing 1740 containing a processor 1702, a memory 1704, a transceiver 1710 comprising a transmitter 1712 and a receiver 1714, a power module 1708, a synchronization controller 1706, a channel information extractor 1720, and an optional motion detector 1722.

In this embodiment, the processor 1702, the memory 1704, the transceiver 1710 and the power module 1708 work similarly to the processor 1602, the memory 1604, the transceiver 1610 and the power module 1608 in the Bot 1600. An antenna 1750 or a multi-antenna array 1750 is typically attached to the housing 1740 and electrically coupled to the transceiver 1710.

The Origin 1700 may be a second wireless device that has a different type from that of the first wireless device (e.g. the Bot 1600). In particular, the channel information extractor 1720 in the Origin 1700 is configured for receiving the wireless signal through the wireless channel, and obtaining a time series of channel information (CI) of the wireless channel based on the wireless signal. The channel information extractor 1720 may send the extracted CI to the optional motion detector 1722 or to a motion detector outside the Origin 1700 for wireless sound sensing in the venue.

The motion detector 1722 is an optional component in the Origin 1700. In one embodiment, it is within the Origin 1700 as shown in FIG. 17. In another embodiment, it is outside the Origin 1700 and in another device, which may be a Bot, another Origin, a cloud server, a fog server, a local server, and an edge server. The optional motion detector 1722 may be configured for detecting sound information from a vibrating object or source in the venue based on motion information. The motion information may be computed based on the time series of CI by the motion detector 1722 or another motion detector outside the Origin 1700.

The synchronization controller 1706 in this example may be configured to control the operations of the Origin 1700 to be synchronized or un-synchronized with another device, e.g. a Bot, another Origin, or an independent motion detector. In one embodiment, the synchronization controller 1706 may control the Origin 1700 to be synchronized with a Bot that transmits a wireless signal. In another embodiment, the synchronization controller 1706 may control the Origin 1700 to receive the wireless signal asynchronously with other Origins. In another embodiment, each of the Origin 1700 and other Origins may receive the wireless signals individually and asynchronously. In one embodiment, the optional motion detector 1722 or a motion detector outside the Origin 1700 is configured for asynchronously computing respective heterogeneous motion information based on the respective time series of CI.

The various modules discussed above are coupled together by a bus system 1730. The bus system 1730 can include a data bus and, for example, a power bus, a control signal bus, and/or a status signal bus in addition to the data bus. It is understood that the modules of the Origin 1700 can be operatively coupled to one another using any suitable techniques and mediums.

Although a number of separate modules or components are illustrated in FIG. 17, persons of ordinary skill in the art will understand that one or more of the modules can be combined or commonly implemented. For example, the processor 1702 can implement not only the functionality described above with respect to the processor 1702, but also implement the functionality described above with respect to the channel information extractor 1720. Conversely, each of the modules illustrated in FIG. 17 can be implemented using a plurality of separate components or elements.

FIG. 18 illustrates a flow chart of an exemplary method 1800 for wireless sensing, according to some embodiments of the present disclosure. In various embodiments, the method 1800 can be performed by the systems disclosed above. At operation 1802, a time series of wireless sounding signals (WSS) is transmitted by a transmitter in a wireless data communication network based on a wireless protocol associated with the communication network. The wireless data communication network may comprise multiple layers: a physical (PHY) layer, a medium access control (MAC) layer, and at least one higher layer. At operation 1804, the time series of WSS (TSWSS) is received by a receiver in the wireless data communication network based on the wireless protocol through a wireless channel of a venue. At operation 1806, a plurality of wireless sensing measurements is performed by the receiver based on the received TSWSS to obtain sensing measurement results. At operation 1808, the sensing measurement results are reported by the PHY layer (or the MAC layer) of the receiver to the at least one higher layer of the receiver. At operation 1810, a sensing-based task is performed by the at least one higher layer of the receiver based on the sensing measurement results. The order of the operations in FIG. 18 may be changed according to various embodiments of the present teaching.

In some embodiments, the present teaching discloses methods for two-way P2P sensing. In one example of two-way P2P sensing, the AP may be the sensing initiator and both the first and second non-AP STA may be sensing responders. In another example, a non-AP STA may be a sensing-by-proxy (SBP) initiator that requests the AP (SBP responder) to perform two-way P2P sensing in which the AP may be the sensing initiator and both the first and second non-AP STAs may be sensing responders.

In both examples, the AP may configure/negotiate/arrange individually with the two non-AP STAs such that the two non-AP STAs can identify each other (each with at least one corresponding ID, e.g. identifiable network address, identifiable wireless network address/ID, AP assigned ID, initiator assigned ID, user defined ID, MAC address) and the two non-AP STAs would send NDP as sounding signal to each other so that sensing measurement results may be obtained/generated in both non-AP STA.

The AP may send a second P2P-sensing-triggering frame to the pair of non-AP STAs. The second P2P-sensing-triggering frame may be a NDPA frame, a Trigger Frame, the special NDPA-Trigger frame (mentioned above), the first P2P-sensing-triggering frame, or another frame. A separate first P2P-sensing-triggering frame may be sent to each pair of non-AP STAs, or a common/shared first P2P-sensing-triggering frame may be sent to multiple (e.g. some or all) available STA(s). Then the first non-AP STA would send NDP to the second non-AP STA to generate sensing measurement results at the second non-AP STA and the second non-AP STA would send NDP to the first non-AP STA to generate sensing measurement results at the first non-AP STA. The sensing measurement results may be used/needed in the second non-AP STA, or the sensing results can optionally be transmitted from the second non-AP STA (sensing responder) to the AP (sensing initiator). In the SBP example, the AP (SBP responder) may further report the sensing results to the SBP initiator.

In another example, the first and second non-AP STA may perform the one-way P2P sensing or the two-way P2P sensing without signaling from AP. The two non-AP STA may be able to identify each other and configure/negotiate/arrange with each other. In one-way P2P sensing, NDP may be transmitted one-way from a first non-AP STA to a second non-AP STA to generate sensing results in the second non-AP STA. The second non-AP STA may optionally transmit its sensing results to the first non-AP STA. In two-way P2P sensing, NDPs may be transmitted both ways between the two non-AP STA, without signaling from AP.

In sensing procedure initiated by AP, responder-to-responder sounding may be optionally allowed, for a two-way responder-to-responder sensing. For example, a two-way sounding between two responders is optionally allowed in a sensing procedure initiated by AP, with an NDP from responder1 (R1) to responder2 (R2) and another NDP from responder2 (R2) to responder1 (R1). This can be useful when there are N responders forming a daisy chain or a scanning order or a configuration.

For an example of N=3, three responders R1, R2 and R3 may form a closed daisy chain or a closed loop. R2 can get CSI between R1-R2 and also between R2-R3. It can perform useful WLAN sensing computation based on the two CSIs. Optionally the CSI may be reported to AP.

Figure 19:
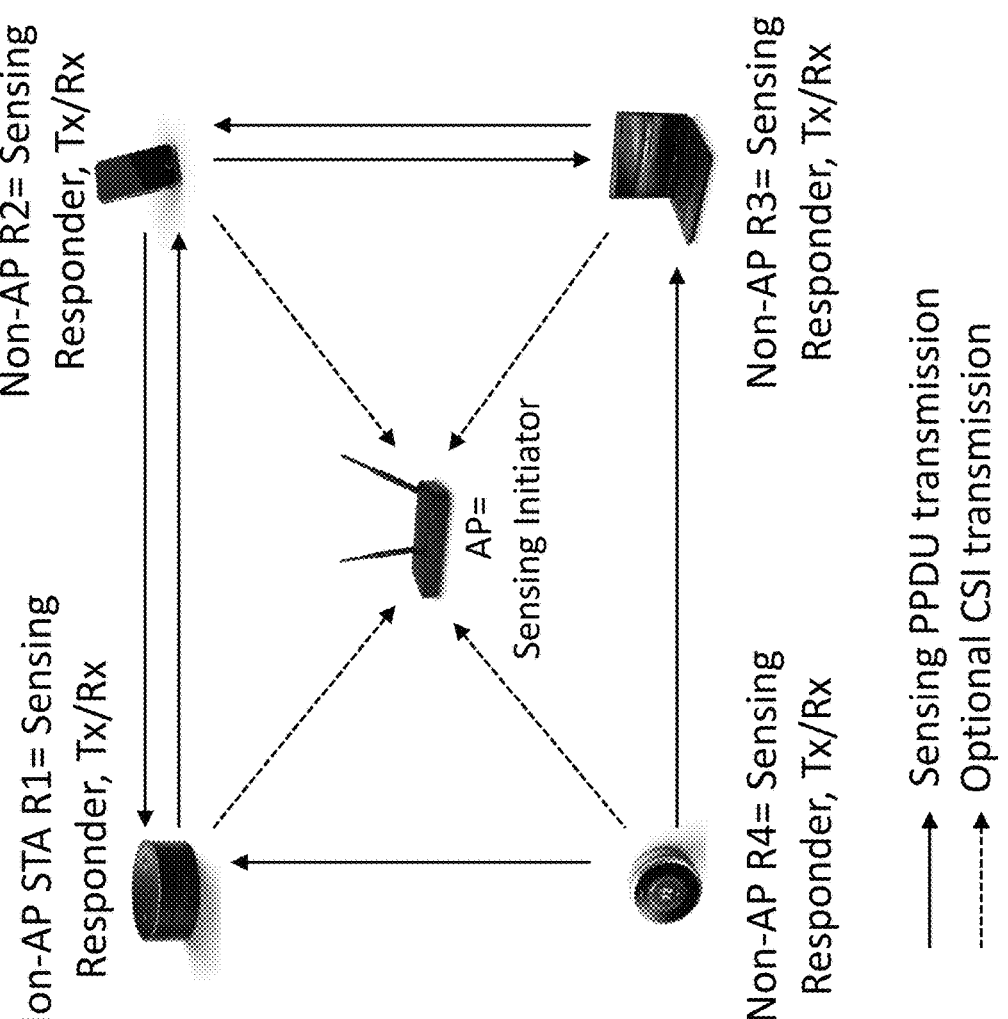
FIG. 19 shows an example of two-way responder-to-responder sensing, according to some embodiments of the present disclosure.

FIG. 19 shows an example of two-way responder-to-responder sensing. In this example, four sensing responders R1, R2, R3 and R4 are configured to form a network (e.g.

daisy chain). Some "links" may do two-way sensing (e.g. R1-R2, or R2-R3) such that each linked pair would send NDP to each other in tandem (e.g. R1-to-R2 NDP and R2-to-R1 NDP).

Some links may do one-way sensing (e.g. R3-R4, R4-R1) such that NDP would be sent in one direction only. R2 has two CSIs: CSI between R1-R2, and CSI between R2-R3 (could have more CSI if R2 is further linked to additional responders such as R4). In some embodiments, reporting's of sensing measurements are optional.

According to some embodiments, in the optional responder-to-responder sensing, a first sensing responder should be allowed to perform one-way sensing or two-way sensing with a second sensing responder. In the one-way sensing, an NDP is sent from the first responder to the second responder. In the two-way sensing, an NDP is sent from the first responder to the second responder followed by another NDP sent from the second responder to the first responder.

In some embodiments, the present teaching also discloses termination or pause of a session setup/measurement setup associated with a sensing responder. An AP may determine, or AP may receive a determination from SBP initiator in the case of sensing-by-proxy (SBP), that the sensing measurement results (e.g. CSI, CIR, CFR, RSSI) associated with a particular sensing responder may be useless, not useful, and/or least useful for a task (e.g. too noisy, too unstable, too chaotic, too much interference, unreliable, faulty, or a user "pause" or "stop" the sensing associated with the particular responder, or a user "pause" or "stop" the sensing associated with all sensing responders, etc.). The determination may be based on (i) a test on the sensing measurement results (e.g. based on a test/measure for noise, stability, variability, randomness/chaos, interference, reliability, fault, error and/or mistakes) and/or (ii) a state/condition/test of system (e.g. the sensing measurement results transmission/storage/associated processing/sensing computation may consume too much bandwidth/memory/processing power/time, or generate too much power, or another task of higher priority needs resources currently allocated to the sensing measurement results). There may be a determination that sensing measurement results associated with another sensing responder may be useful, not useless and/or more useful for the task.

As a result, the AP may, or may receive a request from SBP initiator in the case of SBP to, terminate the sensing session setup associated with the particular sensing responder. The AP may, or may receive a request from SBP initiator in the case of SBP to, wait for a period of time (e.g. wait until some interfering/noisy/9unstable/unreliable/adverse condition is finished, or wait until a user "un-pause" or "un-stop" the sensing) and then start another sensing session (by performing sensing session setup) with the particular sensing responder, using identical or similar or modified sensing session setup settings as the terminated sensing session setup. The determination of the period time may be based on some criteria.

Alternatively, instead of terminating the sensing session setup, the AP may, or may receive a request from SBP initiator in the case of SBP to, terminate a particular sensing measurement setup associated with the particular sensing responder. The AP may, or may receive a request from SBP initiator in the case of SBP to, wait for the period of time and then start another sensing measurement setup with the particular sensing responder, with identical or similar setting as the particular terminated sensing measurement setup.

Alternatively, the AP may, or may receive a request from SBP initiator in the case of SBP to, pause the sensing session (i.e. sensing session setup) with the particular sensing responder for the period of time, and resume the sensing session after the period of time.

Alternatively, the AP may, or may receive a request from SBP initiator in the case of SBP to, pause a particular sensing measurement session with the particular sensing responder for the period of time, and resume the particular sensing measurement session after the period of time.

In some embodiments, sounding signals may be multi-casted or broadcasted from AP to more than one sensing responders in SBP. An AP may be a sensing initiator and also a sensing transmitter (e.g. in sensing session, or in SBP). It may send a sounding signal (e.g. NDP) to each of a number of sensing responders separately (i.e. point-to-point sound-ing). Alternatively, it may send sounding signal (e.g. NDP) to more than one sensing responders using multicast or broadcast such that sensing measurement results may be generated in the more than one sensing responders simul-taneously or contemporaneously. The sensing measurement results may optionally (i.e. may/may not) be reported to the AP. In the case of SBP, the AP may optionally (i.e. may/may not) report the sensing measurement results to the SBP initiator.

In some embodiments, the present teaching discloses systems and methods for adhoc network sensing, peer-to-peer mode sensing, and non-infrastructure mode (NIM) sensing, e.g. a wireless sensing in wireless ad-hoc networks or decentralized wireless network (e.g. with WiFi, Blu-etooth, or other devices in non-infrastructure mode or peer-to-peer mode, WiFi Direct, mobile adhoc network (MANET), vehicular adhoc network (VANET), SPAN, wireless mesh network). In some embodiments, adhoc net-works do not rely on pre-existing infrastructure (e.g. no access point/AP in adhoc network) making them suitable for applications where central nodes cannot be relied on. Adhoc networks tend to need minimal configuration and may be quick to deploy making them suitable for emergency situ-ations, natural disasters, temporary/special events, or for robots.

A wireless sensing procedure can be used in infrastructure mode (non-adhoc network) in which an access point (AP) establishes/organizes/manages a wireless network. An STA (an AP STA or a non-AP STA) may function as a sensing initiator to initiate a sensing procedure (infrastructure mode). One or more other STA(s) may function as sensing responders by joining the sensing procedure. An STA may initiate multiple wireless sensing procedures, each with a respective set of sensing responders and a respective setting of sensing parameters/settings. There may be multiple STAs each initiating respective sensing procedure(s).

The AP may be the sensing initiator, or the sensing responder. Sounding signals may be sent from an STA (sensing transmitter) to another STA (sensing receiver). They may be sent from the AP to a non-AP STA, or from the non-AP STA to the AP, or both, or none. If AP is the sensing initiator, trigger-based (TB) sensing may be used. The triggering of sounding signal (e.g. non-data packet (NDP), variant kinds of NDP) transmission may be achieved by the AP sending an NDP announcement frame (NDPA) or a trigger frame variant (TF). A short time (e.g. inter-frame space (IFS), short IFS (SIFS), reduced IFS (RIFS), PCF IFS (PIFS), DCF IFS (DIFS), Arbitrary IFS (AIFS), Extended IFS (EIFS), etc.) after the triggering, NDP may be sent from the AP (sensing initiator) to the non-AP STA (sensing responders), or from the non-AP STA(s) to the AP, or both, or from a non-AP STA to another non-AP STA, to generate sensing results. If a non-AP STA is sensing initiator, non-TB sensing may be used in which the non-AP STA sends NDPA to AP, followed by a pair of initiator-to-responder (I2R) NDP and responder-to-initiator (R2I) NDP. Any of the NDP may be used for generating sensing results in the sensing receiver. Reporting of sensing results to sensing initiator is optional.

In some embodiments, the present teaching discloses non-infrastructure mode (NIM) wireless sensing based on a protocol (e.g. 802.11, 802.11bf) for a wireless adhoc net-work which comprise more than one peer-to-peer wireless devices or wireless stations (STA) in non-infrastructure mode. The non-infrastructure mode wireless sensing (in-cluding the frames, the exchange, the timing, the specifica-tion, etc.) may be in accordance to/based on a protocol or a standard (e.g. 802.11, 802.11bf). Similar to infrastructure mode, a STA in non-infrastructure mode may function as a sensing initiator by initiating a non-infrastructure mode sensing procedure or sensing session (e.g. by sending a request to neighboring stations in the adhoc network). The non-infrastructure mode sensing procedure may be similar to the infrastructure mode sensing procedure except that the AP is replaced by a STA in non-infrastructure mode. Similar to infrastructure mode, other STA(s) in non-infrastructure mode may function as sensing responder by joining the non-infrastructure mode sensing procedure (e.g. by replying to the request from sensing initiator with the intention to join). A STA in non-infrastructure mode may initiate more than one non-infrastructure mode sensing procedures or sensing sessions, each procedure/session with a respective set of sensing responders (which are STA(s) in non-infra-structure mode). There may be multiple STAs in non-infrastructure mode in the adhoc network functioning as sensing initiator, each with its respective non-infrastructure mode sensing procedure(s) or sensing sessions.

In non-infrastructure mode sensing procedure, the sensing initiator may be a sensing transmitter, or a sensing receiver, or both, or none. A sensing responder may be a transmitter, a receiver, or both. Sounding signals may be transmitted from a sensing transmitter to a sensing receiver. If two way sensing is supported, sounding signals may be transmitted in reverse direction also. Sounding signals may be sent from the sensing initiator to a sensing responder, or from a sensing responder to the sensing initiator, or both, or from a first sensing responder to a second responder.

Non-infrastructure mode trigger-based (TB) sensing may be performed, similar to TB sensing in infrastructure mode except that the AP in infrastructure mode is replaced by the sensing initiator in non-infrastructure mode. The triggering of sounding signal (e.g. NDP, NDP variant) transmission may be achieved by the sensing initiator sending the NDPA, or a frame similar to NDPA, or TF, or a frame similar to TF. A short time (e.g. IFS, SIFS, RIFS, PIFS, DIFS, AIFS, EIFS, etc.) after the triggering, NDP may be sent from the sensing initiator to the sensing responder, or from the sensing responder to the sensing initiator, or both, or from a first sensing responder to a second sensing responder, to generate sensing results (in sensing receiver).

Similar to the non-TB sensing in infrastructure mode, non-infrastructure mode non-TB sensing may be performed, in which the sensing initiator may send NDPA to sensing responder, followed by a pair of initiator-to-responder (I2R) NDP and responder-to-initiator (R2I) NDPs. In non-infra-structure mode non-TB sensing, the sensing responder may send NDPA to sensing initiator, followed by a pair of initiator-to-responder (I2R) NDP and responder-to-initiator (R2I) NDP.

Any of the NDP may be used for generating sensing results in the sensing receiver. Reporting of sensing results to sensing initiator is optional.

In some embodiments, for non-infrastructure mode (e.g. in polling phase in TB sensing), a frame (public or protected) similar to the Trigger frame variant (TF) may be defined in a protocol or standard (e.g. 802.11, 802.11bf) that allows a STA in non-infrastructure (e.g. sensing initiator) mode to solicit NDP transmission(s) from other STA(s) in non-infrastructure mode to obtain sensing measurements. If a STA in non-infrastructure mode is available, it may respond with a CTS-to-self.

In some embodiments, TF in the protocol or standard may be defined/refined/modified/changed to allow a STA in non-infrastructure mode to solicit NDP transmission(s) from other STA(s) in non-infrastructure to obtain sensing measurements. The TF, when sent by AP (in infrastructure mode), would allow the AP to solicit NDP transmission(s) from STA(s) to obtain sensing measurement. The TF, when sent by the STA in non-infrastructure mode, would allow the STA to solicit NDP transmission(s) from other STA(s) in non-infrastructure mode to obtain sensing measurement.

The non-infrastructure mode NDPA sounding phase may consist of the transmission of a NDPA, or a frame similar to NDPA, by a STA in non-infrastructure mode (e.g. sensing initiator, or sensing responder); and the transmission of an NDP by a STA in non-infrastructure mode (e.g. sensing initiator, or sensing responder, or sensing transmitter) a short duration (e.g. IFS, SIFS, RIFS, PIFS, DIFS, AIFS, EIFS, etc.) after the transmission of the NDPA. For example, NDPA sounding may be used by high efficiency (HE), extremely high throughput (EHT) or pre-HE STAs in 802.11.

The non-infrastructure mode TF sounding phase may consists of the transmission of a TF or a frame similar to TF by a STA in non-infrastructure mode (e.g. sensing initiator, or sensing responder) to solicit NDP transmission from other STA(s), and the transmission of an NDP by the other STA(s) (e.g. from another STA to the STA, or from the STA to the another STA, or from the another STA to yet another STA) a short duration (e.g. IFS, SIFS, RIFS, PIFS, DIFS, AIFS, EIFS, etc.) after receiving the TF or the frame similar to TF.

A non-infrastructure mode non-TB sensing measurement instance may be performed as follows: When a STA in non-infrastructure mode (e.g. sensing transmitter, sensing initiator, sensing responder) obtains a transmit opportunity (TXOP), it initiates a non-infrastructure mode non-TB sensing measurement instance by transmitting an NDPA to the sensing receiver followed by a pair of I2R NDP (from sensing initiator to sensing responder) and R2I NDP (from sensing responder to sensing initiator).

If the sensing initiator is only the sensing transmitter, then the NDPA frame should configure the R2I NDP to be transmitted with minimum possible length with one LTF symbol. If the sensing responder is only the sensing transmitter, then the NDPA frame should configure the I2R NDP to be transmitted with minimum possible length with one LTF symbol.

Sensing-by-proxy (SBP) procedure is used primarily in infrastructure mode. In the infrastructure mode SBP, a non-AP STA (which functions as a SBP initiator) sends a SBP request (using SBP Request frame, or "infrastructure mode SBP Request frame") to an AP (which functions as a SBP responder) which sends a SBP reply (using SBP response frame) to accept the SBP request. Then the AP performs a sensing procedure with a number of sensing responders (in which the SP functions as sensing initiator), with optional reporting of sensing measurement results (e.g. CSI).

In some embodiments, for infrastructure mode SBP, a SBP responder (and also the sensing initiator) in infrastructure mode may be performing an existing sensing procedure before receiving the SBP request from the SBP initiator. A sensing procedure may or may not be associated with another SBP procedure initiated by another SBP initiator. The existing sensing procedure comprises a number of existing sensing responders and may be associated with a set of sensing measurement settings/parameters.

In one case, the sensing measurement settings/parameters of the existing sensing procedure may be acceptable (for the requested SBP) to the SBP initiator. The SBP responder may simply associate the existing sensing procedure with the requested SBP and transmit/share sensing measurements from the existing sensing procedure to the SBP initiator.

In another case, the sensing measurement settings/parameters of the existing sensing procedure may be unacceptable (for the requested SBP) to the SBP initiator. The SBP responder/sensing initiator may work with the sensing responders to adjust/modify one or more sensing measurement settings/parameters of the existing sensing procedure such that the adjusted/modified sensing procedure with the adjusted/modified sensing measurement settings/parameters is acceptable to the SBP initiator. The SBP responder may then associate the existing sensing procedure with the requested SBP and transmit/share sensing measurements from the existing sensing procedure to the SBP initiator.

For example, one of the following settings/parameters of the existing sensing procedure may be adjusted/modified: the sounding frequency/timing (e.g. 0.1/1/10/100/1000/10000 Hz), carrier frequency (e.g. channel number, 2.4 GHz, 5 GHz, 6 GHz, etc.), bandwidth (e.g. 20/40/80/160/320/640 MHz, or some partial/sharing of bandwidth), unicast/multicast/broadcast, sensing transmitter/receiver setting, triggering (e.g. TB-sensing, NDPA/TF usage, non-TB sensing) amount of antennas, the optional reporting of sensing measurements, the type of sensing measurements being reported, the set of sensing responders.

In another case, the sensing measurement settings/parameters of the existing sensing procedure may be partially acceptable (for the requested SBP) to the SBP initiator. It may become acceptable if it is augmented by another sensing procedure. For example, the SBP initiator may request a sounding frequency of 100 Hz, but the existing sensing procedure has a sounding frequency of 50 Hz. The SBP responder may initiate a complimentary/auxiliary sensing procedure with a sounding frequency of 50 Hz and time the sounding of the complimentary/auxiliary sensing procedure such that together, the two sensing procedures can produce a sounding frequency of 100 Hz as requested by the SBP initiator.

In another example, the SBP initiator may request a sounding frequency of 100 Hz, but the existing sensing procedure has a sounding frequency of 25 Hz (uniform timing/sampling). The SBP responder may initiate a complimentary/auxiliary sensing procedure with a sounding frequency of 75 Hz (non-uniform timing/sampling) and time the sounding of the complimentary/auxiliary sensing procedure such that together, the two sensing procedures can produce a sounding frequency of 100 Hz (uniform sounding/sampling) as requested by the SBP initiator. For example, the SBP responder may obtain one sensing measurement from existing sensing procedure, then next three sensing measurements from auxiliary sensing procedure, then another one from existing sensing procedure, then another three from auxiliary sensing procedure, and so on.

In another example, the SBP initiator may request a bandwidth of 80 MHz, but the existing sensing procedure has a bandwidth of 40 MHz. The SBP responder may initiate a complimentary/auxiliary sensing procedure with a bandwidth of 40 MHz and such that together, the two sensing procedures can produce a bandwidth of 80 MHz as requested by the SBP initiator.

In the SBP request frame, there may be a field (e.g. a bit, or a bit-pattern) to indicate whether more than one sensing procedures may be used (for a/some/any/all sensing responder) in the SBP procedure or not. Alternatively, there may be a field (e.g. a bit) to indicate whether "mix-and-match" of sensing procedures is acceptable in the SBP procedure or not.

In some embodiments, the SBP request frame or a related frame may include a specification/description/list of admissible sensing responders (or allowable/preferred sensing responders). The SBP initiator may restrict the SBP procedure performed by/to be initiated by the SBP responder/sensing initiator such that the SBP responder/sensing initiator may only allow the admissible sensing responders to join the sensing procedure (or, the SBP initiator may only want/prefer to receive, and the SBP responder may only provide to SBP initiator, sensing measurement results from the admissible sensing responders). Other sensing responders not in the list of admissible sensing responders are "inadmissible" and may not be allowed to join the sensing procedure. To specify the admissible sensing responders, the SBP initiator may provide a unique identifier (ID) (e.g. any of a user ID (UID), an association (AID), a universally unique ID (UUID), a globally unique ID (GUID), a MAC address, or an internet protocol (IP) address, an internal ID in the system, etc.) of each admissible sensing responder in the SBP request frame or the related frame.

In some embodiments, the SBP initiator may send a SBP update frame to the SBP responder to update/change/modify at least one setting/parameter of the SBP procedure any time during the sensing procedure of the SBP procedure. For example, the SBP initiator may request the SBP responder/sensing initiator (e.g. using the SBP update frame) to terminate/stop a particular sensing responder (e.g. perhaps because the sensing measurements/TSCI associated with the particular sensing responder may be too noisy, problematic, erratic, faulty, unreliable, etc. and may be wasting precious network resources such as TXOP, data bandwidth, memory, computing power and/or energy to process/transmit), or at least to stop transmitting the sensing measurements/TSCI associated with the particular sensing responder. The SBP initiator may request the SBP responder/sensing initiator to pause, or resume, or add a particular sensing responder. The SBP may provide the unique identifier of the particular sensing responder.

In some embodiments, a non-infrastructure mode (NIM) SBP procedure is defined which is similar to the infrastructure mode SBP, except that the AP in the infrastructure mode SBP is replaced by a STA in non-infrastructure mode. A frame (public or protected) similar to SBP Request frame is defined in a protocol or standard (e.g. 802.11, 802.11bf) which allows a STA in non-infrastructure mode (which functions as a SBP initiator, or NIM SBP initiator) to use the frame to send a NIM SBP request to another STA in non-infrastructure mode (which, like the AP in infrastructure mode SBP, functions as SBP responder or NIM SBP responder) which sends a NIM SBP reply (e.g. SBP response frame or a similar frame) to accept the SBP request. The SBP Request frame may have bits/fields to indicate/specify whether the SBP responder may be a sensing transmitter, or a sensing receiver, or both, or none in the NIM sensing procedure to be initiated by it. Then the another STA (being both SBP responder and sensing initiator) may perform/initiate a NIM sensing procedure with a number of sensing responders (STAs in non-infrastructure mode). Measurement results obtained in the non-infrastructure mode sensing procedure may be optionally reported by the sensing responders to the sensing initiator, and by the SBP responder (sensing initiator) to the SBP initiator. The another STA (i.e. SBP responder and sensing initiator) may assign the Measurement Setup ID in its SBP reply.

In some embodiments, the infrastructure mode (IM) SBP Request frame may be defined/refined/modified/changed to allow the STA in non-infrastructure mode (SBP initiator) to send a non-infrastructure mode SBP request to the another STA in non-infrastructure mode.

The NIM SBP reply sent by the another STA in non-infrastructure mode may be a frame similar to IM SBP Response frame, or may be the IM SBP Response frame itself, which may be defined/modified in the protocol or standard to allow the another STA in non-infrastructure mode to accept or reject a NIM SBP request.

In some embodiments, the SBP initiator may specify/describe/list/provide a number of admissible sensing responders. The SBP initiator may restrict the NIM SBP procedure, or the NIM sensing procedure performed by/to be initiated by the SBP responder/sensing initiator, such that the SBP responder/sensing initiator may only allow the number of admissible sensing responders to join the NIM sensing procedure (or, the SBP initiator may only want/prefer to receive, and the SBP responder may only provide to SBP initiator, sensing measurement results from the admissible sensing responders). Other sensing responders that are not in the list of admissible sensing responders are "inadmissible" and may not be allowed to join the NIM sensing procedure. To specify the number of admissible sensing responders, the SBP initiator may provide a unique identifier (ID) (e.g. any of a user ID (UID), an association (AID), a universally unique ID (UUID), a globally unique ID (GUID), a MAC address, or an internet protocol (IP) address, an internal ID in the system, etc.) of each admissible sensing responder.

In some embodiments, the SBP initiator may send a NIM SBP update frame to the SBP responder to update/change/modify at least one setting/parameter of the NIM SBP procedure any time during the NIM sensing procedure of the NIM SBP procedure. For example, the SBP initiator may request the SBP responder/sensing initiator (e.g. using the NIM SBP update frame) to terminate/stop a particular sensing responder (e.g. perhaps because the sensing measurements/TSCI associated with the particular sensing responder may be too noisy, problematic, erratic, faulty, unreliable, etc. and may be wasting precious network resources such as TXOP, data bandwidth, memory, computing power and/or energy to process/transmit), or at least to stop transmitting the sensing measurements/TSCI associated with the particular sensing responder. The SBP initiator may request the SBP responder/sensing initiator to pause, or resume, or add a particular sensing responder. The SBP may provide the unique identifier of the particular sensing responder.

In infrastructure mode, the sensing procedure initiated by an AP STA may be enhanced to optionally allow sensing responder to sensing responder NDP measurement.

In some embodiments, the non-infrastructure mode sensing procedure initiated by a STA in non-infrastructure mode may be enhanced to optionally allow sensing responder to sensing responder NDP measurement. A first sensing responder and a second sensing responder, both being STAs in non-infrastructure mode, may be configured for NDP(s) to be transmitted from the first responder to the second responder, or from the second responder to the first responder, or both.

In some embodiments, an STA in non-infrastructure mode in an adhoc network serves as sensing initiator to initiate non-infrastructure mode sensing procedure based on a protocol (e.g. 802.11, 802.11bf). At least one other STA in the adhoc network in non-infrastructure mode joins the sensing procedure as sensing responder based on the protocol. Sensing initiator and sensing responder negotiate to setup the sensing procedure/session and the relevant sensing measurement parameters.

In some embodiments, one device is setup as sensing transmitter (Type 1 device). The other device is setup as sensing receiver (Type2 device). Wireless sounding signal (e.g. NDP, a time series of NDP) is sent from sensing transmitter to sensing receiver to generate sensing measurement (e.g. TSCI) in sensing receiver. The NDP may be I2R or R2I, depending whether which device is the sensing transmitter.

Sensing measurement may be made locally available to applications (e.g. software, firmware) in sensing receiver. Sensing measurement may be optionally transmitted wirelessly from sensing responder to sensing initiator (e.g. using sensing measurement report frame based on the protocol) and made available to applications (e.g. software, firmware) in sensing initiator, or from sensing receiver to sensing transmitter.

In some embodiments, in a mesh network, there may be more than one wireless mesh routers, say R1, R2, R3, . . . , R_k for some k (e.g. k may be 3, 4, 6, or 10, or 100). Some of the mesh routers may be dual-band, tri-band, quad-band devices. Some back channels may allow the mesh routers to transmit/receive/forward/channel/exchange digital data to or from internet/broadband service (e.g. via some broadband router/service provider). The mesh routers may be interconnected via non-infrastructure mode. Individual wireless client devices (e.g. IoT devices) may be connected to any one of the more than one mesh routers (e.g. in infrastructure mode or in non-infrastructure mode). The wireless client devices and/or the mesh routers may form a wireless sensing network, with some being wireless transmitters (e.g. sensing transmitter), and some being wireless receivers (e.g. sensing receivers). Some (e.g. sensing initiator) may initiate wireless sensing procedure/session. Some may respond to join the wireless sensing procedure/session.

In some embodiments, while each mesh router is available for the client devices to associate, it may be better to "encourage" or "move" or "re-associate" or "re-connect" or "concentrate" most or all of the client devices to one (or very few) mesh router, if possible. With all client devices associated with the same mesh router, the sensing network may have better coverage of the venue, and/or the sensing network functionality/logic/algorithm may function better. For example, the system may concentrate all client devices to one or more particular mesh router(s) (say, R1). But for a larger place, more than one mesh routers may be needed to cover the whole place. In that case, two or more mesh routers may be identified as the particular mesh routers.

In some embodiments, some signaling (protocol, control data/frame exchange) may be performed to suggest/hint/request/ask/instruct the client devices to dis-associate with their current mesh router and associate with the particular mesh router (or one of a few particular mesh routers). Each particular mesh router may be identified (e.g. SSID, name, MAC address, etc.)

Figure 20:
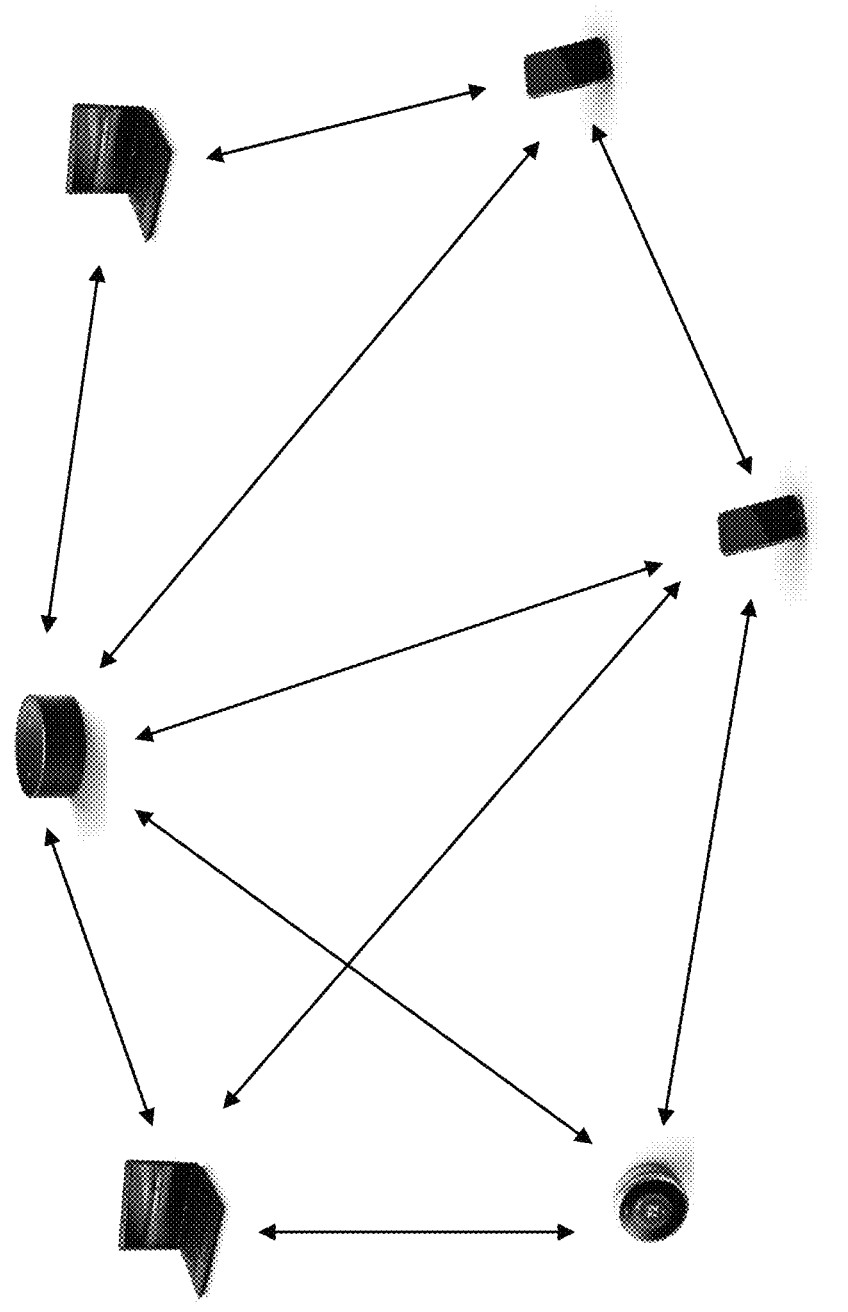
FIG. 20 shows a number of stations (STAs) in non-infrastructure mode forming an adhoc network, according to some embodiments of the present disclosure.

FIG. 20 shows a number of STAs in non-infrastructure mode forming an adhoc network. There is no access point (AP) in this adhoc network. FIGS. 21-25 illustrate various use cases for non-infrastructure mode sensing.

Figure 21:
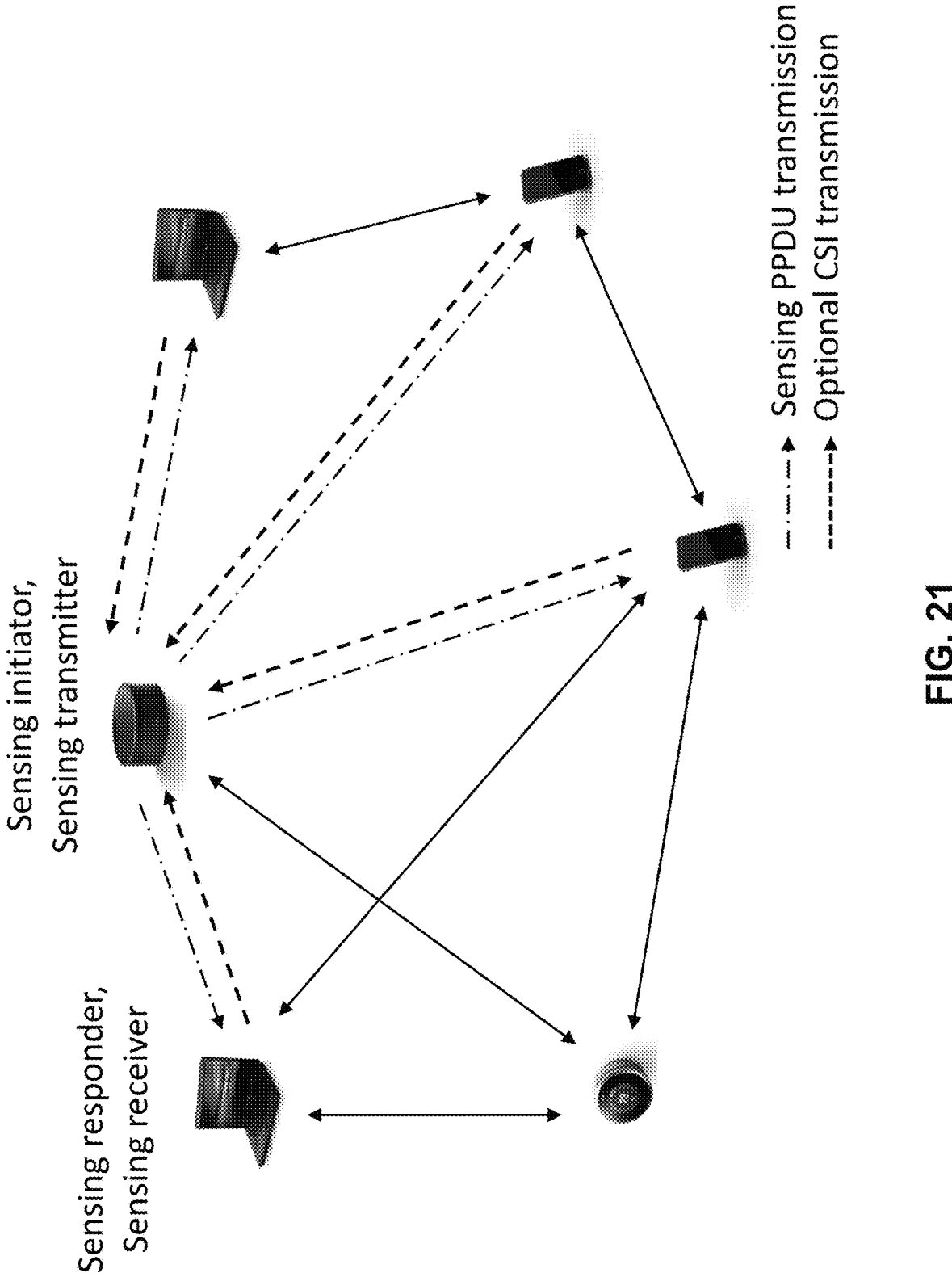
FIGS. 21-25 illustrate various use cases for non-infrastructure mode sensing, according to some embodiments of the present disclosure.

FIG. 21 shows a use case 1, wherein the sensing initiator is a sensing transmitter. First, an STA starts sensing session (as a sensing initiator). Some STAs join the sensing session (as sensing responders). Some STAs are not in the sensing session. The sensing initiator is the sensing transmitter (Tx). In some embodiments, TB-like sensing may be performed, with NDPA (I2R) and NDP (I2R). In some embodiments, non-TB-like sensing may be performed, with NDPA (I2R) and NDP (I2R) and NDP (R2I). A two-way sensing may be supported (i.e. being both Tx & Rx), where a sensing measurement reporting may be optional.

Figure 22:
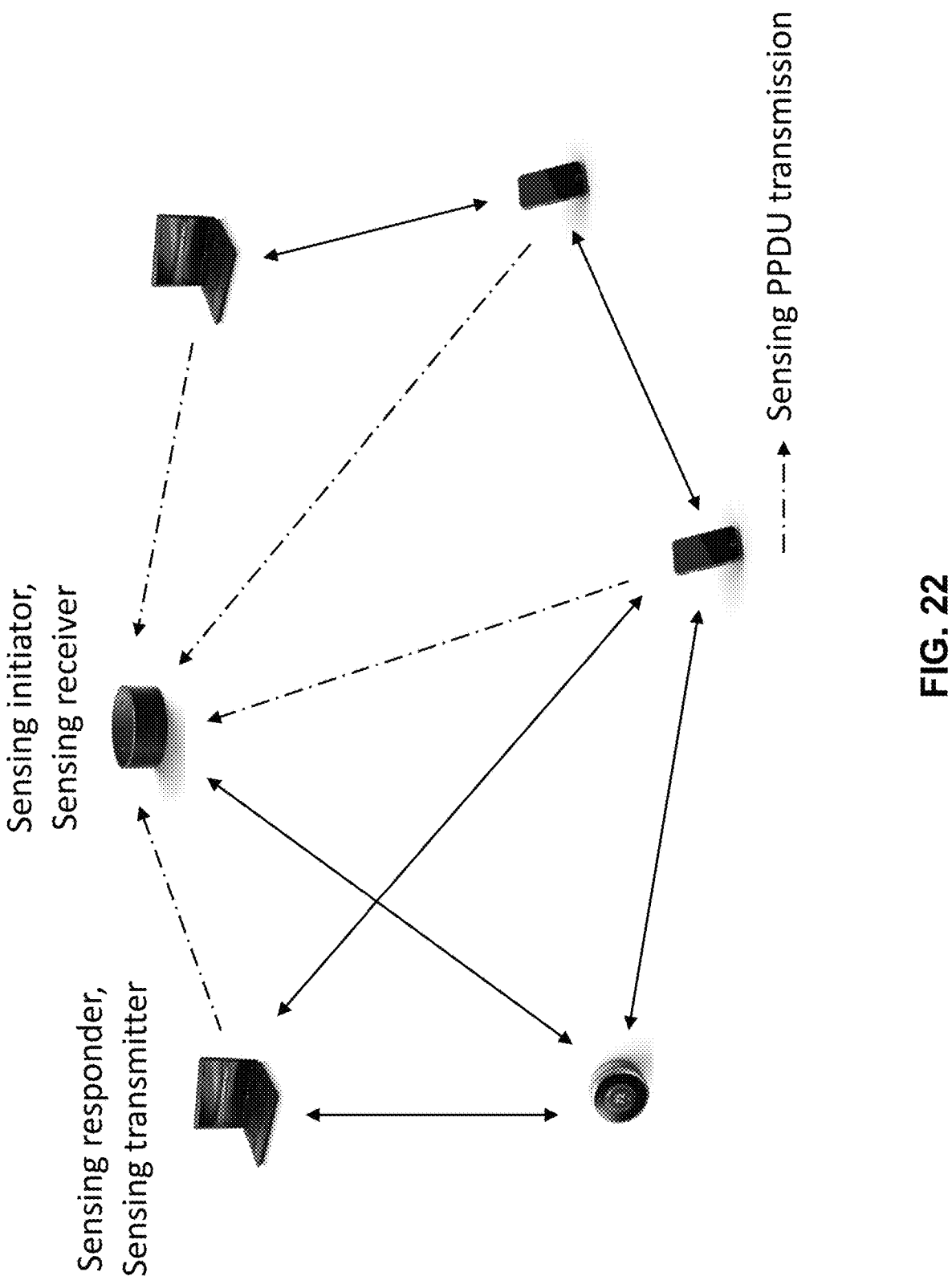

FIG. 22 shows a use case 2, wherein the sensing initiator is a sensing receiver. First, an STA starts sensing session (as a sensing initiator). Some STAs join the sensing session (as sensing responders). Some STAs are not in the sensing session. The sensing initiator is the sensing receiver (Rx). In some embodiments, TB-like sensing may be performed with TF (I2R) and NDP (R2I). In some embodiments, non-TB-like sensing may be performed with: NDPA (I2R) and NDP (I2R) and NDP (R2I). A two-way sensing may be supported (i.e. being both Tx & Rx), where a sensing measurement reporting may be optional.

Figure 23:
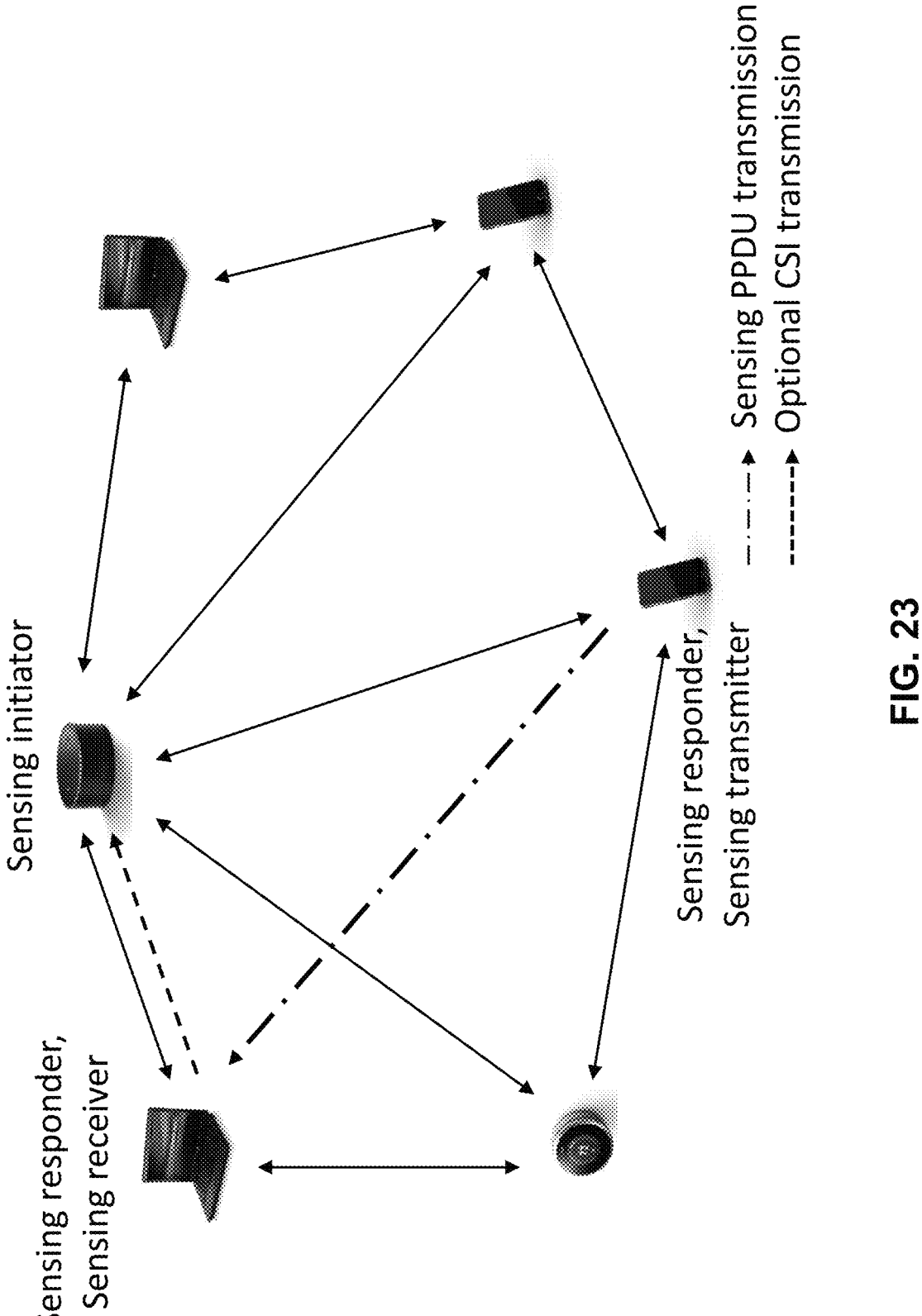

FIG. 23 shows a use case 3, wherein a responder-to-responder (R2R) sensing is performed. First, an STA starts a sensing session (as a sensing initiator). Some STAs join the sensing session (as sensing responders). Some STAs are not in the sensing session. A first responder (Tx) may be configured to send sounding signals to a second responder (Rx). A two-way sensing may be supported (i.e. being both Tx & Rx), where a sensing measurement reporting may be optional.

Figure 24:
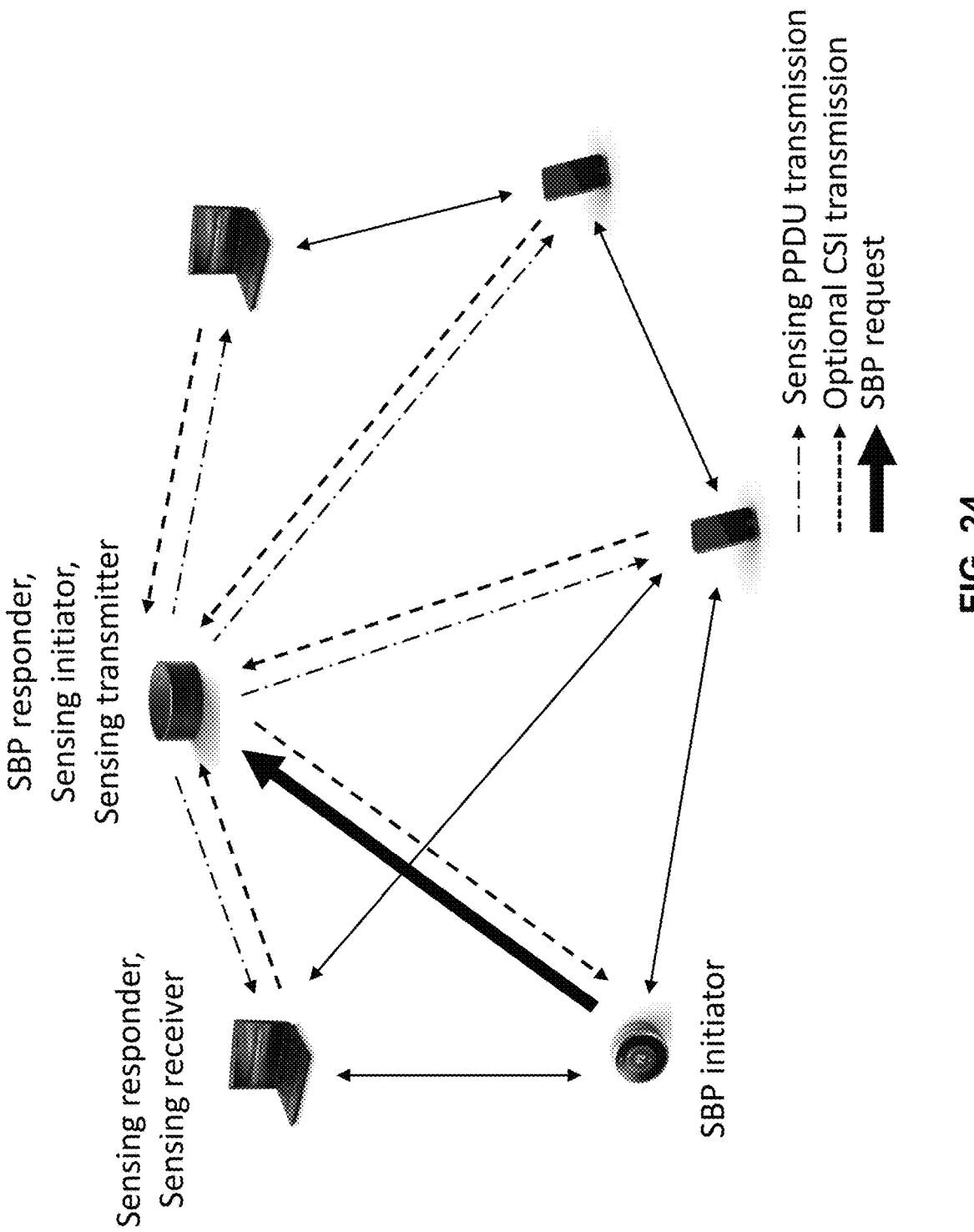

FIG. 24 shows a use case 4, wherein a sensing-by-proxy (SBP) is performed, with the sensing initiator being a sensing transmitter. First, an STA (SBP initiator) requests another STA (SBP responder, sensing initiator) to start a sensing session. The sensing initiator is the sensing transmitter (Tx). In some embodiments, TB-like sensing may be performed with NDPA (I2R) and NDP (I2R). In some embodiments, non-TB-like sensing may be performed with: NDPA (I2R) and NDP (I2R) and NDP (R2I). A two-way sensing may be supported (i.e. being both Tx & Rx), where a sensing measurement reporting may be optional.

Figure 25:
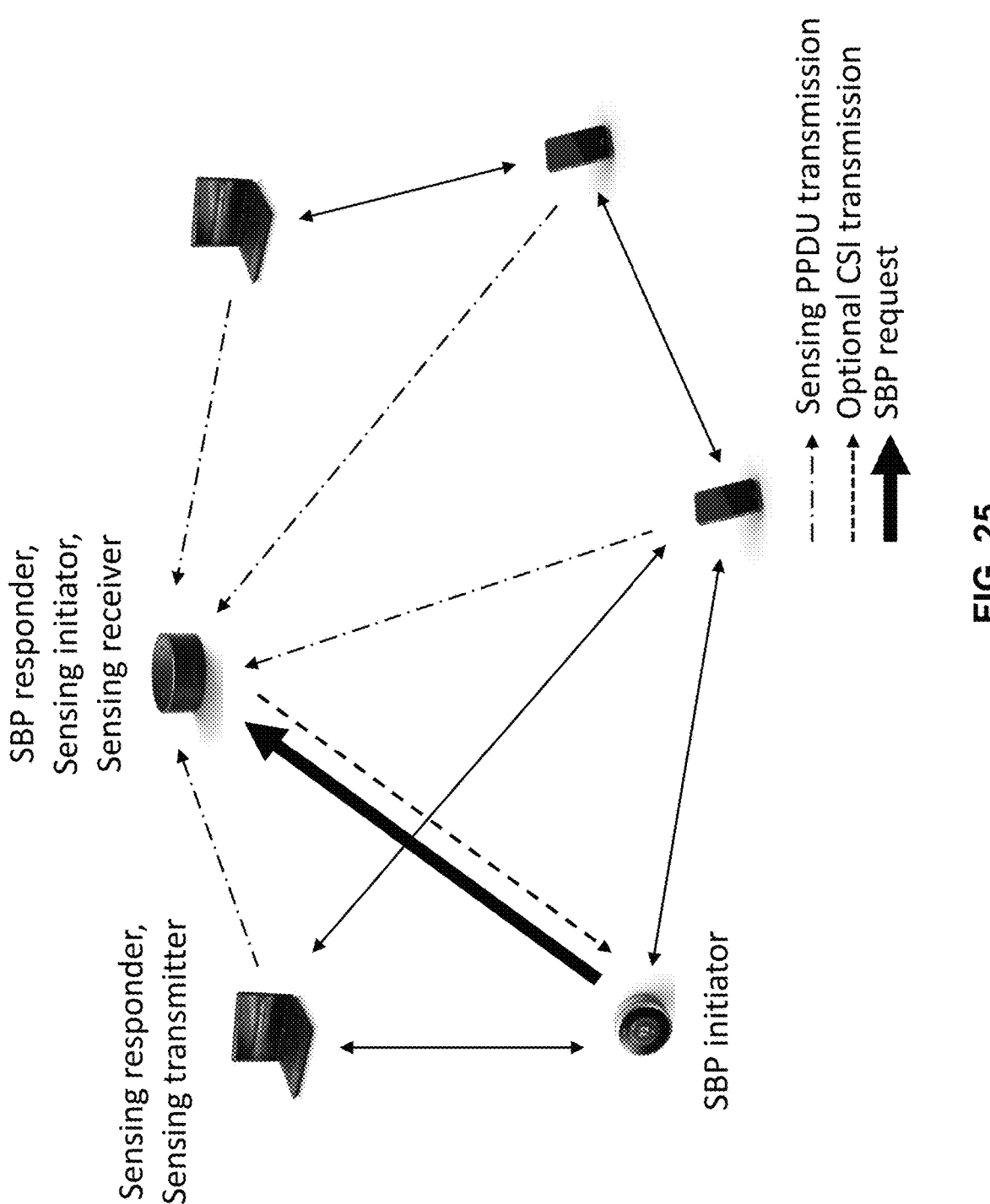

FIG. 25 shows a use case 5, wherein a sensing-by-proxy (SBP) is performed, with the sensing initiator being a sensing receiver. First, an STA (SBP initiator) requests another STA (SBP responder, sensing initiator) to start a sensing session. The sensing initiator is the sensing receiver (Rx). In some embodiments, TB-like sensing may be performed with TF (I2R) and NDP (R2I). In some embodiments, non-TB-like sensing may be performed with: NDPA (I2R) and NDP (I2R) and NDP (R2I). A two-way sensing may be supported (i.e. being both Tx & Rx), where a sensing measurement reporting may be optional.

According to some embodiments, in non-infrastructure mode, a WLAN sensing is supported. For WLAN sensing procedure in non-infrastructure mode, the WLAN sensing steps may be similar to sensing steps of at least one of: trigger-based (TB) sensing, non-TB sensing, or other WLAN sensing steps.

In some embodiments, in a sensing session/procedure set up frame and/or a SBP set up frame, there may be a first mode, flag, setting, bit-combination and/or field to indicate that both a minimum bandwidth (BW) requirement and a minimum number of spatial stream (SS) requirement would be applied (e.g. by the sensing initiator/SBP responder to a sensing responder). There may be a second mode, flag, setting, bit-combination and/or field to indicate that the minimum BW and minimum SS would not apply. Instead, a minimum "effective bandwidth" or a minimum "product of BW and SS" would be applied (e.g. by the sensing initiator/SBP responder to a sensing responder). For example, suppose {BW=40 MHz, no. of spatial stream=4}. In the first mode/flag/setting/bit-combination/field, the BW must be at least 40 MHz, and the SS must be at least 4. In the second mode/flag/setting/bit-combination/field, the system can allow {BW=80 MHz, no. of spatial stream=2} which otherwise would fail SS requirement, or {BW=20 MHz, no. of spatial stream=8} or {BW=20 MHz, no. of spatial stream=9} which would otherwise fail the BW requirement. Or, if {BW=40 MHz, SS=3}, the system can allow {BW=20 MHz, SS=6} or {BW=80 MHz, SS=2} which would otherwise fail either the BW or SS requirement.

In some embodiments, in a sensing session/procedure set up frame and/or a SBP set up frame, there may be a mode/flag/setting/bit-combination/field to indicate a priority of maintaining sounding frequency over BW. For example, a STA may typically be able to send sounding signal at a certain BW (e.g. 80 MHz) and at a certain sounding frequency (e.g. 100 Hz). However, in some situations (e.g. data traffic congestion, or high interference), the sounding frequency and the BW cannot be maintained at the same time. In that case, the priority may be to maintain the sounding frequency over BW. The priority may be applied by a sensing transmitter when transmitting the sounding signals to the sensing receiver. In a sensing session/procedure set up frame and/or a SBP set up frame, there may be another mode/flag/setting/bit-combination/field to indicate a priority of maintaining BW over sounding frequency. In general, there may be a mode/flag/setting/bit-combination/field to indicate a priority of maintaining a particular parameter of a sensing procedure/session or SBP over another parameter and/or other parameters. There may be a mode/flag/setting/bit-combination/field to indicate a first priority of maintaining a first parameter and a second priority of maintaining a second parameter (i.e. more than one parameters with corresponding priority) of a sensing procedure/session or SBP over another parameter and/or other parameters.

In some embodiments, after an SBP procedure has been established/setup, an SBP setup may be updated using a configuration field of a configuration frame, one or more times, during the SBP procedure. Possible updates may include, adding/configuring/stopping/pausing/resuming a new sensing responder, adding/configuring/pausing/resuming a new sensing transmitter, adding/configuring/stopping/pausing/resuming anew sensing receiver, stopping/pausing/resuming/terminating a sensing responder, adjusting local/nonlocally reporting (or report setting such as CSI processing, precision, or immediate/delayed CSI reporting), adjusting sounding frequency, adjusting channel setting (bandwidth, carrier frequency), adjusting threshold-based reporting, etc. The SBP setup may be updated by the SBP initiator (the particular client device).

At a certain point in an SBP, the SBP initiator may find sensing measurements associated with a particular sensing responder to be problematic (e.g. CSI being too noisy, unstable, unreliable, faulty). To avoid wasting resources (e.g. TXOP usage and data bandwidth to transmit sensing results), the particular sensing responder should be stopped.

Sometimes, the problematic situation may be temporary. Instead of being stopped, the particular sensing responder may to be paused, and then resumed later. Sometimes, a newly introduced device may to be added.

In some embodiments, SBP initiator is able to request the SBP responder (AP) to, and the AP is able to: stop sensing procedure with a particular sensing responder, pause sensing procedure with a particular sensing responder, resume sensing procedure with a paused sensing responder, or add sensing procedure with a particular sensing responder.

Figure 26:
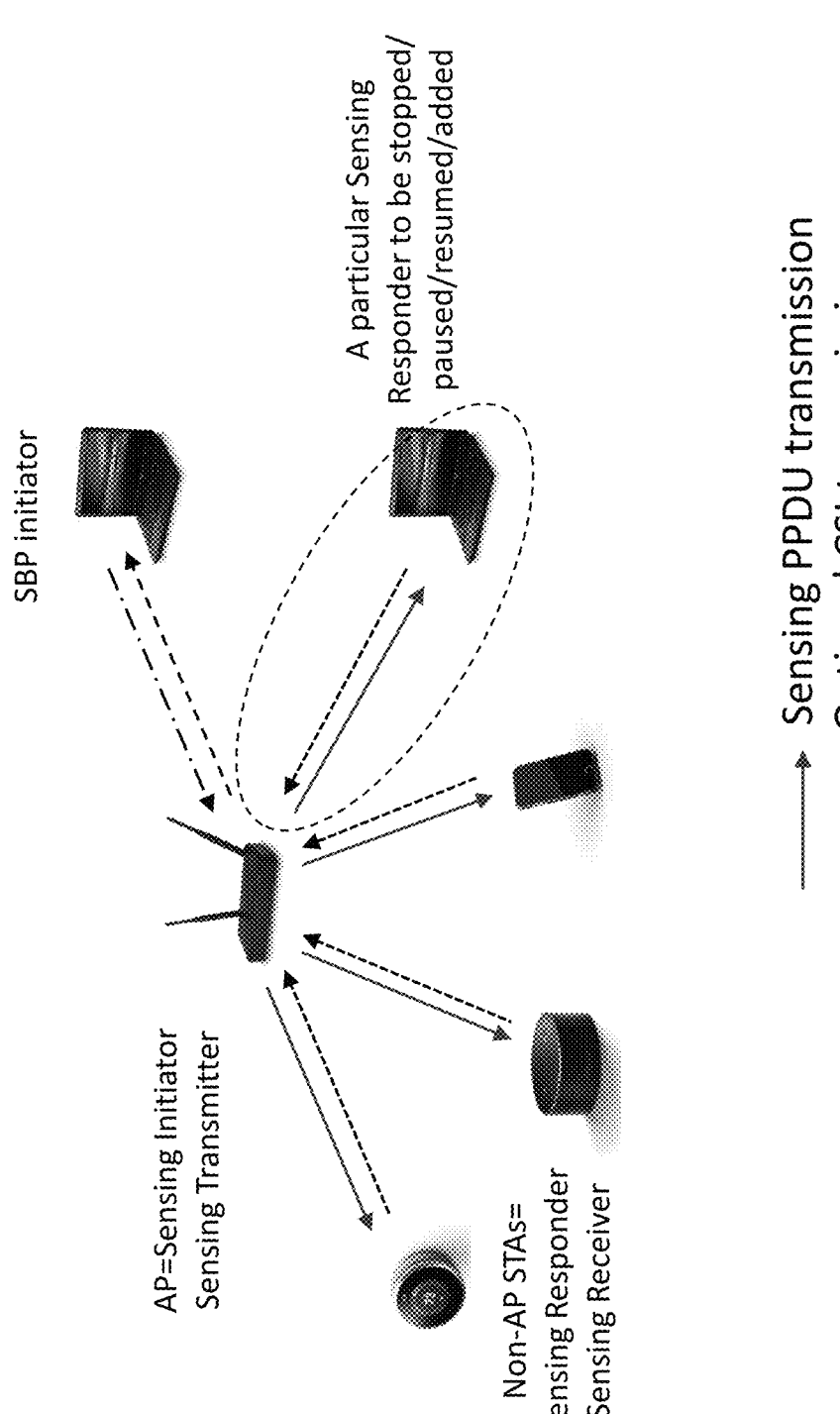
FIGS. 26-27 illustrate various use cases for updating a sensing by proxy (SBP) procedure, according to some embodiments of the present disclosure.

FIG. 26 shows a first use case for updating the SBP setup and procedure, with the sensing initiator being a sensing transmitter and an SBP responder. In this case, non-AP STAs are sensing responders and receivers. In some embodiments, a particular responder (e.g. a noisy, unstable, unreliable, faulty responder) is to be stopped/paused/resumed/added.

Figure 27:
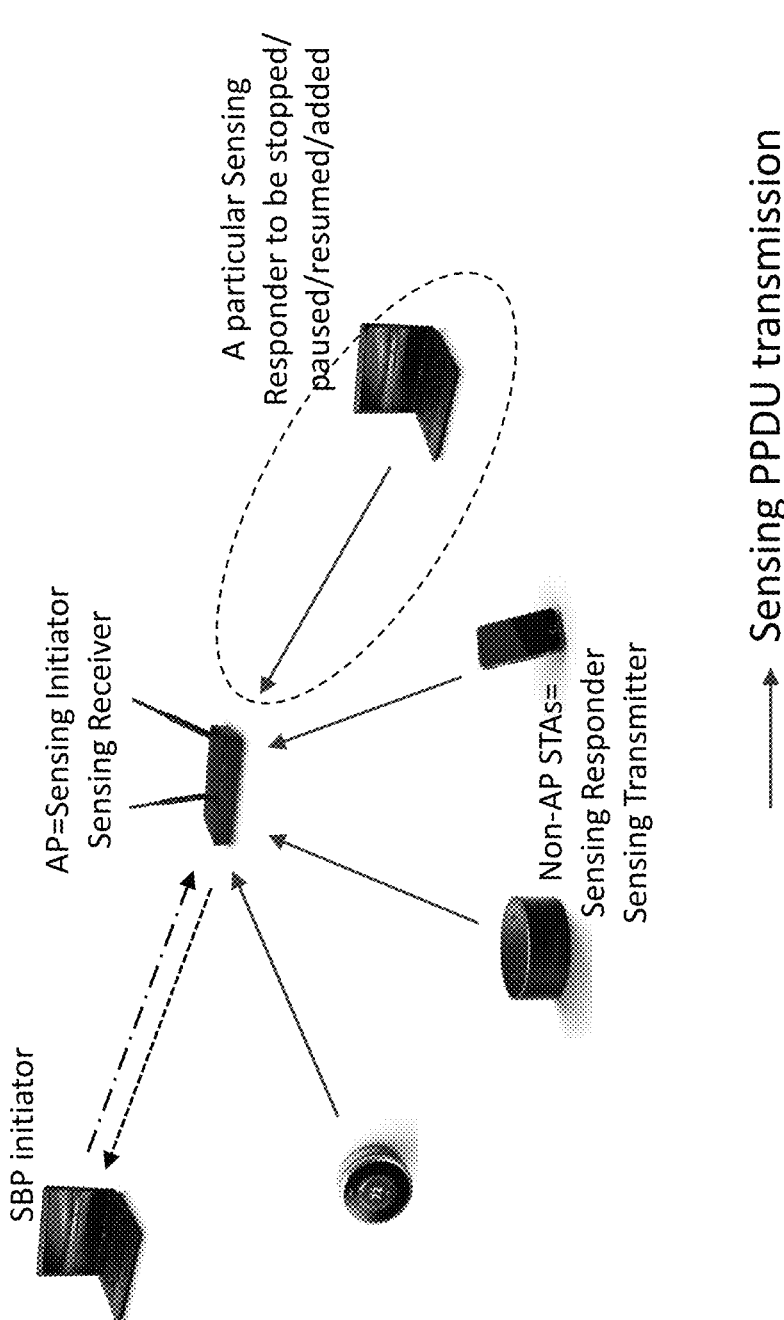

FIG. 27 shows a second use case for updating the SBP setup and procedure, with the sensing initiator being a sensing receiver and an SBP responder. In this case, non-AP STAs are sensing responders and transmitters. In some embodiments, a particular responder (e.g. a noisy, unstable, unreliable, faulty responder) is to be stopped/paused/resumed/added.

In some embodiments, the SBP initiator should be able to request to, and the SBP responder (an AP) should be able to, stop a sensing procedure with a particular sensing responder. This will not stop the SBP.

In some embodiments, the SBP initiator should be able to request to, and the SBP responder (an AP) should be able to, pause a sensing procedure with a particular sensing responder, and resume a sensing procedure with a paused sensing responder.

In some embodiments, the SBP initiator should be able to request to, and the SBP responder (an AP) should be able to, add a sensing procedure with a particular sensing responder.

In some embodiments, the present teaching discloses a system for local reporting of CSI in wireless sensing measurements based on 802.11bf standard. This means "local CSI reporting" or "CSI is not reported non-locally", which can affect many elements of 802.11bf (including configuration, set up, sensing measurement, reporting).

FIG. 28 illustrates a flow chart of an exemplary method 2800 for wireless sensing, according to some embodiments of the present disclosure. In various embodiments, the method 2800 can be performed by the systems disclosed above. At operation 2802, in response to wirelessly receiving a wireless sensing measurement setup request from a sensing initiator device, a time series of at least one wireless sounding signal (WSS) is received through a wireless channel of a venue based on a standard wireless network protocol and the wireless sensing measurement setup request in a wireless data communication network in the venue. At operation 2804, a plurality of wireless sensing measurements are performed based on the received time series of at least one WSS (TSWSS) to obtain a plurality of sensing measurement results based on the standard wireless network protocol and the wireless sensing measurement setup request. The TSWSS is transmitted by a transmitter in the venue based on the standard wireless network protocol through the wireless channel which is impacted by a motion of an object in the venue. The received TSWSS differs from the transmitted TSWSS due to the wireless channel and the motion of the object. The wireless data communication network comprises a physical (PHY) layer, a medium access control (MAC) layer, and at least one higher layer in the wireless sensing device. At operation 2806, the plurality of sensing measurement results are provided locally in the wireless sensing device from the PHY layer or the MAC layer to the at least one higher layer through a MAC sublayer management entity (MLME) in the wireless sensing device based on the standard wireless network protocol and the wireless sensing measurement setup request. At operation 2808, the plurality of sensing measurement results provided by the receiver from the PHY layer or the MAC layer through the MLME in the wireless sensing device are obtained locally based on the standard wireless network protocol, at one of the at least one higher layer in the wireless sensing device. At operation 2810, at least one motion information related to the object and the motion is computed based on the plurality of sensing measurement results. At operation 2812, a sensing task related to the object is performed to obtain a sensing task result based on the at least one motion information and the plurality of sensing measurement results. The order of the operations in FIG. 28 may be changed according to various embodiments of the present teaching.

FIG. 29 illustrates a flow chart of an exemplary method 2900 for standardized proxy wireless sensing, according to some embodiments of the present disclosure. In various embodiments, the method 2900 can be performed by the systems disclosed above. At operation 2910, a proxy sensing request message is wirelessly transmitted by a proxy initiator device to a proxy responder device based on a standard wireless network protocol to request the proxy responder device to, as a proxy of the proxy initiator device, perform wireless sensing on its behalf. The proxy responder device is requested (at operation 2912) to perform the wireless sensing by functioning as a sensing initiator device to initiate sensing sessions with a plurality of sensing responder devices comprising a selected sensing responder device based on the standard wireless network protocol to perform wireless sensing measurements to obtain sensing measurement results based on wireless sounding signals communicated among the plurality of sensing responder devices and the sensing initiator device. The selected sensing responder device is requested (at operation 2914) in the proxy sensing request message. At operation 2920, in response to the proxy sensing request message, a sensing session is initiated by the proxy responder device with the selected sensing responder device to perform wireless sensing measurements to obtain sensing measurement results based on wireless sounding signals communicated by the selected sensing responder device. The order of the operations in FIG. 29 may be changed according to various embodiments of the present teaching.

FIG. 30 illustrates a flow chart of an exemplary method 3000 for standardized proxy wireless sensing, according to some embodiments of the present disclosure. In various embodiments, the method 3000 can be performed by the systems disclosed above. At operation 3010, a proxy initiator device is configured in a wireless data communication network to use standardized proxy wireless sensing to indirectly cause wireless sensing measurements to be performed by a selected sensing device to obtain sensing measurement results based on wireless sounding signals communicated by the selected sensing device. At operation 3020, a proxy sensing request message is wirelessly transmitted by the proxy initiator device to a proxy responder device based on a standard wireless network protocol to request the proxy responder device to, as a proxy of the proxy initiator device, perform wireless sensing on its behalf.

The proxy responder device is requested to perform the wireless sensing by functioning as a sensing initiator device to initiate sensing sessions with a plurality of sensing responder devices comprising the selected sensing device based on the standard wireless network protocol to perform wireless sensing measurements to obtain sensing measurement results based on wireless sounding signals communicated among the plurality of sensing responder devices and the sensing initiator device. The selected sensing device is requested in the proxy sensing request message. At operation 3030, in response to the proxy sensing request message, a sensing session is initiated by the proxy responder device with the selected sensing device to perform wireless sensing measurements to obtain sensing measurement results based on wireless sounding signals communicated by the selected sensing device. At operation 3040, a sensing task is performed to produce a sensing task result by at least one processor based on the sensing measurement results obtained from the wireless sensing measurements performed by the selected sensing device. The order of the operations in FIG. 30 may be changed according to various embodiments of the present teaching.

FIG. 31 illustrates a flow chart of an exemplary method 3100 for standardized wireless sensing, according to some embodiments of the present disclosure. In various embodiments, the method 3100 can be performed by the systems disclosed above. The operation 3102 includes operations 3110, 3120, 3130, all of which are performed based on a standard wireless network protocol and in response to at least one of: (1) a first sensing measurement setup request message transmitted by a sensing initiator device to a first sensing responder device requesting the first sensing responder device to function as a sensing receiver device, or (2) a second sensing measurement setup request message transmitted by the sensing initiator device to a second sensing responder device requesting the second sensing responder device to function as a sensing transmitter device. At operation 3110, a receiving antenna and an associated receiving circuitry are used by the sensing receiver device to receive a wireless sounding signal transmitted from the sensing transmitter device through a wireless channel of a venue. At operation 3120, wireless sensing measurements are performed by the sensing receiver device based on the received wireless sounding signal to generate sensing measurement results. At operation 3130, a report is provided by the sensing receiver device, the report comprising: (a) the sensing measurement results and (b) an information of a processing operation of the received wireless sounding signal used to generate the sensing measurement results. The order of the operations in FIG. 31 may be changed according to various embodiments of the present teaching.

FIG. 32 illustrates a flow chart of an exemplary method 3200 for standardized proxy sensing, according to some embodiments of the present disclosure. In various embodiments, the method 3200 can be performed by the systems disclosed above. At operation 3210, a proxy sensing request message is wirelessly transmitted by a proxy initiator device to a proxy responder device in a wireless data communication network based on a standard wireless network protocol to request the proxy responder device to, as a proxy of the proxy initiator device, perform wireless sensing on its behalf. At operation 3220, in response to the proxy sensing request message from the proxy initiator device, at least one wireless sensing measurement setup request message is wirelessly transmitted by the proxy responder device to the at least one sensing responder device respectively based on the standard wireless network protocol. The operation 3230 includes operations 3232, 3234, 3236, 3238, all of which are performed in response to the proxy sensing request message or the at least one wireless sensing measurement setup request message. At operation 3232, a time series of at least one wireless sounding signal (WSS) is transmitted by a transmitter based on the standard wireless network protocol. At operation 3234, the time series of at least one WSS (TSWSS) is received by a receiver based on the standard wireless network protocol, each of the transmitter and the receiver being one of the at least one sensing responder device or the proxy responder device. At operation 3236, a plurality of wireless sensing measurements are performed by the receiver based on the received TSWSS to obtain sensing measurement results based on the standard wireless network protocol. At operation 3238, the sensing measurement results are provided locally from PHY or MAC layer to a higher layer of the receiver according to the proxy sensing request message for performing a sensing-based task. The order of the operations in FIG. 32 may be changed according to various embodiments of the present teaching.

The following numbered clauses provide examples for wireless sensing and reporting.

Clause 1. A method/device/system/software of a wireless sensing system, comprising: performing a plurality of wireless sensing measurements collaboratively in a wireless data communication network by a Type 1 heterogeneous wireless device of the system and a Type 2 heterogeneous wireless device of the system based on a wireless protocol associated with the wireless data communication network, wherein the wireless protocol is one of: a wireless network protocol, a wireless network standard, a wireless data communication protocol, a wireless LAN (WLAN) protocol, a mobile communication protocol, a wireless protocol based on a standard, a WLAN standard, a Wi-Fi standard, an IEEE 802 standard, an IEEE 802.11 standard, an IEEE 802.11bf standard, a wireless data communication standard, a 3G/4G/LTE/5G/6G/7G/8G standard; and reporting a plurality of results of the plurality of wireless sensing measurements locally.

In some embodiments, there may be a configuration for the results to be reported locally based on the wireless protocol (e.g. 802.11bf). The configuration may be performed during a setup procedure (e.g. sensing session setup procedure, sensing measurement setup procedure, SBP setup procedure) for the wireless sensing measurements. The configuration may be done using a configuration field of a configuration frame. For example, the configuration field may comprise any of: "a field to indicate sensing measurement results to be locally reported, or not", and/or "a field to indicate sensing measurement results to be non-locally reported, or not", and/or a "sensing measurement report requested" field. For example, the configuration frame may comprise any of: a setup frame, a request frame, a response frame, a sensing session setup request frame, a sensing session setup response frame, a sensing measurement setup request frame, a sensing measurement setup response frame, a SBP request frame, and/or a SBP response frame.

Clause 1b: The method/device/system/software of the wireless sensing system of clause 1 or clause 3, comprising: wherein the plurality of results are configured based on the wireless protocol to be reported locally, wherein the plurality of results are configured using a configuration field of a configuration frame during a setup procedure associated with the wireless sensing measurements in accordance with the wireless protocol.

In some embodiments, results are configured to be locally reported instead of non-locally reported.

Clause 1c: The method/device/system/software of the wireless sensing system of clause 1b, comprising: wherein the plurality of results are configured based on the wireless protocol to be reported locally, instead of non-locally.

In some embodiments, results are configured not to be non-locally reported, based on the protocol.

Clause 1d: The method/device/system/software of the wireless sensing system of clause 1 c, comprising: wherein the plurality of results are configured based on the wireless protocol not to be reported non-locally.

In some embodiments, setup procedure may be performed before the wireless sensing measurements based on the protocol. The configuration frame may be wireless transmitted/received based on the wireless protocol.

Clause 1e: The method/device/system/software of the wireless sensing system of clause 1 c, comprising: wherein the configuration frame is communicated based on the wireless protocol during the setup procedure; wherein the setup procedure is performed before the plurality of wireless sensing measurements.

In some embodiments, the Type 2 device, i.e. the sensing receiver device, may be configured based on the wireless protocol such that the sensing results are reported locally in the Type 2 device.

Clause 1f: The method/device/system/software of the wireless sensing system of clause 1e, comprising: wherein the plurality of results are configured to be reported locally in the Type 2 device, by configuring the Type 2 device (sensing receiver device) based on the wireless protocol using the configuration field of the configuration frame communicated during the setup procedure.

In some embodiments, the Type 2 device may be configured by a sensing initiator device based on the protocol.

Clause 1g: The method/device/system/software of the wireless sensing system of clause 1f, comprising: wherein the Type 2 device is configured by a sensing initiator device of the system based on the wireless protocol during the setup procedure to report TSCI locally.

In some embodiments, configuration of the Type 2 device may be performed during a negotiation between the sensing initiator and the sensing receiver based on the wireless protocol during the setup procedure.

Clause 1h: The method/device/system/software of the wireless sensing system of clause 1g, comprising: wherein the control frame is communicated between the sensing initiator device and the Type 2 device during a negotiation (or handshake) between the two devices based on the wireless protocol.

Clause 2. The method/device/system/software of a wireless sensing system of clause 1, comprising: transmitting a time series of wireless sounding signals (WSS) based on the wireless protocol by the Type 1 device in a venue; receiving the time series of WSS (TSWSS) based on the wireless protocol by the Type 2 device through a wireless multipath channel of the venue; obtaining the results of the plurality of wireless sensing measurements by the Type 2 device based on the received TSWSS based on the wireless protocol, wherein the results comprises a time series of channel information (CI) of the wireless multipath channel, wherein each CI comprises at least one of: a channel state information (CSI), a channel impulse response (CIR), or a channel frequency response (CFR), wherein each CI of the time series of CI (TSCI) is obtained based on a respective WSS; making the TSCI available for a wireless sensing task.

In some embodiments, type 1 device may be sensing transmitter. Type 2 device may be sensing receiver. Both may be configured by sensing initiator. Type 2 device may report TSCI locally and/or non-locally.

Clause 3. The method/device/system/software of a wireless sensing system of clause 2, comprising: configuring the Type 1 device and the Type 2 device individually based on the wireless protocol by a sensing initiator device of the system to perform the plurality of wireless sensing measurements collaboratively, by: configuring the Type 1 device to function as a sensing transmitter device by the sensing initiator device to send the TSWSS to the Type 2 device, wherein a configuration of the TSWSS is related to the sensing task, configuring, by the sensing initiator device, the Type 2 device to function as a sensing receiver device to receive the TSWSS from the Type 1 device and to obtain the TSCI based on the received TSWSS, and configuring the Type 2 device whether to report the TSCI non-locally or locally based on the wireless protocol, wherein the sensing initiator is a heterogeneous wireless device, wherein at least one of the Type 1 device or the Type 2 device functions as a sensing responder device in relation to the sensing initiator device; making the reported TSCI available for the wireless sensing task.

In some embodiments, sensing responder may be configured based on a negotiation.

Clause 4. The method/device/system/software of the wireless sensing system of clause 3, comprising: configuring a sensing responder device based on a negotiation between the sensing responder device and the sensing initiator device.

In some embodiments, CSI may be processed, e.g. quantized, denoised, thresholded.

Clause 5. The method/device/system/software of the wireless sensing system of clause 3 or 4, comprising: processing the TSCI in a first way for reporting non-locally and in a second way for reporting locally.

In some embodiments, the processing for non-local reporting may be configured by sensing initiator.

Clause 6. The method/device/system/software of the wireless sensing system of clause 5, comprising: configuring the Type 2 device by the sensing initiator device based on the wireless protocol to process the TSCI in the first way based on the wireless protocol.

In some embodiments, the processing for local reporting may be configured locally by Type 2 device (i.e. not sensing initiator).

Clause 7. The method/device/system/software of the wireless sensing system of clause 5, comprising: configuring the Type 2 device locally by the Type 2 device to process the TSCI in the second way for local reporting.

In some embodiments, the processing may comprise a precision reduction (e.g. quantization).

Clause 8. The method/device/system/software of the wireless sensing system of clause 5, comprising: wherein processing the TSCI in a first way comprises a first precision reduction; wherein processing the TSCI in a second way comprises a second precision reduction.

Clause 9. The method/device/system/software of the wireless sensing system of clause 3, comprising: wherein, when reporting the TSCI non-locally, the Type 2 device transmits each CI wirelessly to the sensing initiator device based on the wireless protocol and the reported TSCI is available non-locally at the sensing initiator device for the wireless sensing task.

In some embodiments, central computing (at sensing initiator) is performed. When there are more than one Type 2 devices (e.g. sharing the same Type 1 device) each Type 2 device reporting its respective TSCI to the sensing initiator, all the reported TSCI are available at the sensing initiator for central computing of the wireless sensing task.

Clause 9b. The method/device/system/software of the wireless sensing system of clause 9, comprising: wherein the non-locally reported TSCI is available at the sensing initiator for central computing of the wireless sensing task at the sensing initiator.

In some embodiments, edge computing (at sensing initiator) is performed. The sensing initiator in the edge (not cloud) may compute analytics based on the TSCI. The sensing initiator may send the analytics to a cloud server.

Clause 10. The method/device/system/software of the wireless sensing system of clause 9, comprising: computing a sensing analytics for the wireless sensing task by the sensing initiator device based on the non-locally reported TSCI; communicating the sensing analytics from sensing initiator device to a sensing server in the cloud for the wireless sensing task.

In some embodiments, cloud computing is performed. The sensing initiator may send the TSCI to a cloud server. The cloud server may compute sensing analytics based on the TSCI.

Clause 11. The method/device/system/software of the wireless sensing system of clause 9, comprising: communicating the non-locally reported TSCI from the sensing initiator device to a sensing server in the cloud for the wireless sensing task; computing a sensing analytic for the wireless sensing task based on the reported TSCI by the sensing server.

In some embodiments, if certain condition occurs, the non-local reporting of a particular CSI may be skipped.

Clause 12. The method/device/system/software of the wireless sensing system of clause 9, comprising: if a particular CI satisfies a first condition, the particular CI is skipped and not reported non-locally by the Type 2 device.

In some embodiments, non-local reporting may be skipped if CI variation<threshold.

Clause 13. The method/device/system/software of the wireless sensing system of clause 12, comprising: computing a first variation measure of the particular CI based on a first window of CI of the TSCI; if the first variation measure is less than a first threshold, the particular CI is skipped and not reported non-locally by the Type 2 device.

In some embodiments, in non-local reporting, thresholding may be configured by sensing initiator.

Clause 14. The method/device/system/software of the wireless sensing system of clause 13, comprising: configuring at least one of: the first variation measure or the first threshold by the sensing initiator device based on the wireless protocol.

Clause 15. The method/device/system/software of the wireless sensing system of clause 9, comprising: wherein, when reporting the TSCI locally, the Type 2 device makes each CI available locally in the Type 2 device for the sensing task.

In some embodiments, distributed computing (at each of a number of sensing receivers) is performed. When there are more than one Type 2 devices (e.g. sharing the same Type 1 device), each Type 2 device can use the locally reported TSCI to do part of the sensing task, in a distributed computing manner. The partial result computed by each Type 2 device may be transmitted to a server for fusion.

Clause 15b. The method/device/system/software of the wireless sensing system of clause 15, comprising: wherein the locally reported TSCI is available for distributed computing of the wireless sensing task at the Type 2 device.

In some embodiments, edge computing (at sensing receiver) may be performed. The Type 2 device in the edge (not cloud) may compute analytics based on the TSCI. The Type 2 device may send the analytics to a cloud server.

Clause 16. The method/device/system/software of the wireless sensing system of clause 15, comprising: computing a sensing analytics for the wireless sensing task by the Type 2 device based on the locally-reported TSCI; communicating the sensing analytics from the Type 2 device to a sensing server in the cloud for the wireless sensing task.

In some embodiments, cloud computing is performed. The Type 2 device may send the TSCI to a cloud server. The cloud server may compute sensing analytics based on the TSCI.

Clause 17. The method/device/system/software of the wireless sensing system of clause 15, comprising: communicating the locally-reported TSCI from the Type 2 device to a sensing server in the cloud for the wireless sensing task; computing a sensing analytic for the wireless sensing task based on the reported TSCI by the sensing server.

In some embodiments, if certain condition occurs, the local reporting of a particular CSI may be skipped.

Clause 18. The method/device/system/software of the wireless sensing system of clause 15, comprising: if a particular CI satisfies a second condition, the particular CI is skipped and not reported locally by the Type 2 device.

In some embodiments, local reporting may be skipped if CI variation<threshold.

Clause 19. The method/device/system/software of the wireless sensing system of clause 18, comprising: computing a second variation measure of the particular CI based on a second window of CI of the TSCI; if the second variation measure is less than a second threshold, the particular CI is skipped and not reported locally by the Type 2 device.

In some embodiments, in local reporting, thresholding may be configured by Type 2 device locally (i.e. NOT by sensing initiator).

Clause 20. The method/device/system/software of the wireless sensing system of clause 19, comprising: configuring at least one of: the second variation measure or the second threshold by the Type 2 device itself.

In some embodiments, CI may be temporarily buffered in Type 2 device. CI may be removed after some time-out period (e.g. to make space to store next CI, due to limited memory/buffer).

Clause 21. The method/device/system/software of the wireless sensing system of clause 15, comprising: storing a particular IC temporarily in a storage element of the Type 2 device for a period of time for the purpose of reporting; removing the particular CI from the storage element if the particular CI is not reported non-locally after a first time-out period, or if the particular CI is not reported locally after a second time-out period.

In some embodiments, a possible case is that both local and non-local reporting of a particular CI.

Clause 22. The method/device/system/software of the wireless sensing system of clause 15, comprising: reporting a particular CI by the Type 2 device both locally and non-locally.

In some embodiments, there are different ways (e.g. different timing) to report both locally and non-locally.

Clause 23. The method/device/system/software of the wireless sensing system of clause 22, comprising: reporting the particular CI by the Type 2 device both locally and non-locally in at least one of the following manner: simultaneously, alternately, adaptively, on-demand, upon-selection, as-scheduled, as-planned, or threshold-based.

In some embodiments, a particular CI may not be reported for some reason.

Clause 24. The method/device/system/software of the wireless sensing system of clause 15, comprising: not reporting a particular CI by the Type 2 device, whether locally or non-locally.

In some embodiments, a particular client device (SBP initiator) may request an AP (SBP responder) to initiate sensing sessions (i.e. function as sensing initiator). CSI may be reported to the particular client device.

Clause 25. The method/device/system/software of the wireless sensing system of clause 15, comprising: requesting an access-point device (AP) of the wireless data communication network based on the wireless protocol by a particular client device of the network to perform a sensing-by-proxy (SBP) procedure; performing the SBP procedure by the AP based on the wireless protocol by functioning as the sensing initiator device to perform the plurality of wireless sensing measurements on behalf of the particular client device.

Clauses 25b-25j are related to: terminate SBP procedure; terminate session setup or measurement setup associated with SBP; Terminate session setup or measurement setup associated with SBP; selective SBP; perform trial SBP with any available sensing responders; analyze sensing results to choose "selected sensing responders" with "good" or "well-behaving" sensing results; terminate trial SBP; perform selective SBP with the selected sensing responders.

Clause 25b: The method/device/system/software of the wireless sensing system of clause 25, comprising: terminating the SBP procedure based on the wireless protocol.

Clause 25c: The method/device/system/software of the wireless sensing system of clause 25b, comprising: terminating at least one of: a sensing session setup or a sensing measurement setup associated with the SBP procedure based on the wireless protocol.

Clause 25d: The method/device/system/software of the wireless sensing system of clause 25c, comprising: wherein the sensing session setup or the sensing measurement setup is identified by an identification (ID).

Clause 25e: The method/device/system/software of the wireless sensing system of clause 25, comprising: providing a list of selected heterogeneous wireless devices in the wireless data communication network by the particular client device to the AP; requesting the AP to select sensing responders from the list.

Clause 25f: The method/device/system/software of the wireless sensing system of clause 25e, comprising: wherein each of the selected devices is identified with a respective identity.

Clause 25g: The method/device/system/software of the wireless sensing system of clause 25f, comprising: wherein the identity of a selected device comprises at least one of: a MAC address, a device name, a host name, a vendor class ID, a device product name.

Clause 25h: The method/device/system/software of the wireless sensing system of clause 25, comprising: permitting any available heterogeneous wireless device in the wireless data communication network to be sensing responder by the AP functioning as the sensing initiator; selecting a number of selected devices by the particular client device based on the sensing measurement results; terminating the SBP procedure by the particular client device; requesting the AP to perform a second SBP procedure as the sensing initiator by the particular client device, with sensing responders restricted to the number of selected devices.

Clause 25i: The method/device/system/software of the wireless sensing system of clause 25h, comprising: performing a testing sensing task by the particular client device based on the sensing measurement results of the SBP procedure; selecting the number of selected device by the particular client device based on an outcome of the testing sensing task.

Clause 25j: The method/device/system/software of the wireless sensing system of clause 25i, comprising: wherein the testing sensing task is a motion detection task.

In some embodiments, SBP can have CSI reported locally or non-locally.

Clause 26. The method/device/system/software of the wireless sensing system of clause 25, comprising: performing the SBP procedure by the AP by: configuring the Type 1 device and the Type 2 device to perform the plurality of wireless sensing measurements collaboratively, and enabling the plurality of results of the plurality of wireless sensing measurements to be available locally.

Clauses 26b-26j are related to: terminate the sensing measurement between Type 1 device and Type 2 device; terminate the sensing measurement between Type 1 device and Type 2 device; the particular sensing responder may be the Type 1 device or Type 2 device; Measurement ID; session setup ID; measurement setup ID; termination may be initiated by AP (SBP responder) or the particular client device (SBP initiator); loosen constraint of BW and sounding requirement (e.g. BW*sounding frequency, "effective bandwidth").

Clause 26b: The method/device/system/software of the wireless sensing system of clause 26, comprising: stopping the wireless sensing measurements performed by the Type 1 device and Type 2 device in the SBP procedure based on the wireless protocol.

Clause 26c: The method/device/system/software of the wireless sensing system of clause 26b, comprising: terminating the wireless sensing measurements performed by the Type 1 device and Type 2 device in the SBP procedure based on the wireless protocol.

Clause 26d: The method/device/system/software of the wireless sensing system of clause 26c, comprising: terminating the wireless sensing measurements associated with a particular sensing responder in the SBP procedure based on the wireless protocol.

Clause 26e: The method/device/system/software of the wireless sensing system of clause 26d, comprising: wherein the wireless sensing measurements are identified by an identification (ID).

Clause 26f: The method/device/system/software of the wireless sensing system of clause 26e, comprising: wherein the wireless sensing measurements are identified by an identification (ID) associated with at least one of: the Type 1 device, the Type 2 device, or the configuration of the Type 1 device and the Type 2 device by the AP.

Clause 26g: The method/device/system/software of the wireless sensing system of clause 26f, comprising: terminating the wireless sensing measurements by at least one of: the AP and the particular client device.

Clause 26h: The method/device/system/software of the wireless sensing system of clause 26, comprising: requesting by the particular client device for at least two operational parameters of wireless sensing measurements to take on one of at least two combinations of values.

Clause 26i: The method/device/system/software of the wireless sensing system of clause 26h, comprising: wherein the at least two operational parameters of the wireless sensing measurements performed by the Type 1 device and the Type 2 device take on a first one of the at least two combinations of values; wherein the at least two operational parameters of another wireless sensing measurements performed by another Type 1 device of the system and another Type 2 device of the system take on a second one of the at least two combinations of values.

Clause 26j: The method/device/system/software of the wireless sensing system of clause 26h, comprising: wherein two of the operational parameters satisfy a mathematical formula in all of the at least two combinations of values.

Clause 27. The method/device/system/software of the wireless sensing system of clause 26, comprising: performing the SBP procedure by the AP by: configuring the Type 1 device to transmit the TSWSS to the Type 2 device, configuring the Type 2 device to receive the TSWSS from the Type 1 device and to obtain the TSCI based on the received TSWSS, configuring the Type 2 device whether to report the TSCI non-locally or locally.

In some embodiments, report the TSCI to SBP initiator, as requested (and only if requested) by SBP initiator.

Clause 28. The method/device/system/software of the wireless sensing system of clause 27, comprising: performing the SBP procedure by the AP further by: transmitting the plurality of results of the plurality of wireless sensing measurements to the particular client device as requested.

In some embodiments, part of the TSCI obtained by Type 2 device for a first sensing measurement session (associated with the sensing initiator, for the wireless sensing task) may be shared/re-used with a second sensing measurement session (e.g. associated with another sensing initiator, and/or for another wireless sensing task). The "shared" part may be an overlap of results and second results (which is "shared" by both).

Clause 29. The method/device/system/software of the wireless sensing system of clause 15, comprising: performing a plurality of second wireless sensing measurements collaboratively by the Type 1 device and the Type 2 device based on the wireless protocol; reporting a plurality of second results of the plurality of second wireless sensing measurements either locally or non-locally based on the wireless protocol, wherein there is an overlap between the plurality of results and the plurality of second results.

In some embodiments, the overlapped portion is reported locally in the wireless sensing measurements, and either locally or non-locally in the second wireless sensing measurement.

Clause 29b. The method/device/system/software of the wireless sensing system of clause 15, comprising: wherein the overlap is reported in the plurality of results locally; wherein the overlap is reported in the plurality of second results either locally or non-locally.

In some embodiments, perform a common (or super/encompassing) wireless sensing measurement instead of doing the wireless sensing measurement and the second wireless sensing measurement separately.

Clause 30. The method/device/system/software of the wireless sensing system of clause 29, comprising: performing a plurality of common wireless sensing measurement collaboratively by the Type 1 device and the Type 2 device based on the wireless protocol instead of the plurality of wireless sensing measurement and the plurality of second wireless sensing measurement; reporting a plurality of common results of the plurality of common wireless sensing measurements locally based on the wireless protocol, wherein the plurality of results is a first subset of the plurality of common results reported locally, wherein the plurality of second results is a second subset of the plurality of common results reported either locally or non-locally.

In some embodiments, extract corresponding subsets for the respective results.

Clause 31. The method/device/system/software of the wireless sensing system of clause 30, comprising: extracting the plurality of results from the plurality of common results; extracting the plurality of second results from the plurality of common results.

In some embodiments, extract corresponding subsets for the respective results. Special case: the results/second results are TSCI.

Clause 32. The method/device/system/software of the wireless sensing system of clause 31, comprising: wherein the plurality of common results comprises a common TSCI; wherein the plurality of second results comprises a second TSCI; extracting the TSCI from the common TSCI; extracting the second TSCI from the common TSCI.

In some embodiments, setting of common measurements is a superset of individual measurements, such that all the measurement requirements (e.g. bandwidth, carrier frequency, sounding frequency, sounding timing, antennas, protocol setting, etc.) are satisfied.

Clause 33. The method/device/system/software of the wireless sensing system of clause 29, comprising: wherein a common setting of the plurality of common wireless sensing measurement is a superset of a first setting of the plurality of first setting of the plurality of first wireless sensing measurements and the plurality of second wireless sensing measurements; wherein the common setting comprises at least one of: bandwidth, carrier frequency, sounding frequency, sounding timing, antennas, protocol setting, or circuit setting.

In some embodiments, overlap of results due to overlap of TSWSS and the another TSWSS.

Clause 34. The method/device/system/software of the wireless sensing system of clause 29, comprising: configuring the Type 1 device and the Type 2 device individually based on the wireless protocol by another sensing initiator device of the system to perform the plurality of second wireless sensing measurements collaboratively; configuring the Type 1 device to function as a sensing transmitter device by the another sensing initiator device to send another TSWSS to the Type 2 device, wherein there is a second overlap between the TSWSS and the another TSWSS; configuring, by the another sensing initiator device, the Type 2 device to be a sensing receiver device to receive the another TSWSS from the Type 1 device and to obtain another TSCI based on the received TSWSS, wherein the overlap comprises a third overlap between the TSCI and the another TSCI due to the second overlap between the TSWSS and the another TSWSS.

In some embodiments, possible overlaps of TSWSS and the another TSWSS.

Clause 35. The method/device/system/software of the wireless sensing system of clause 34, comprising: wherein the second overlap between the TSWSS and the another TSWSS comprises at least one of: a common sounding frequency of the TSWSS and the another TSWSS, a common factor between a first sounding frequency of the TSWSS and a second sounding frequency of the another TSWSS, a common frequency band for the transmission of TSWSS and the another TSWSS, an overlap of a first band for the transmission of TSWSS and a second band for the transmission of the another TSWSS, a shared WSS between the TSWSS and the another TSWSS, a common sounding time stamp of a WSS of the TSWSS and another WSS of the another TSWSS, a common setting for transmitting the TSWSS and the another TSWSS, a common setting for receiving the TSWSS and the another TSWSS, a common antenna for transmitting (or receiving) the TSWSS and the another TSWSS, a common radio circuit for transmitting (or receiving) the TSWSS and the another TSWSS, a common circuit setting for transmitting (or receiving) the TSWSS and the another TSWSS, a common carrier frequency for transmitting (or receiving) the TSWSS and the another TSWSS, a common signaling for transmitting (or receiving) the TSWSS and the another TSWSS, a common protocol parameter for transmitting (or receiving) the TSWSS and the another TSWSS.

In some embodiments, there are multiple measurement ID for a shared/overlapped result.

Clause 36. The method/device/system/software of the wireless sensing system of clause 34, comprising: associating a particular result overlapped with a particular second result with more than one wireless sensing measurements: the wireless sensing measurements and the second wireless sensing measurements.

In some embodiments, there are multiple measurement ID for a shared/overlapped result.

Clause 37. The method/device/system/software of the wireless sensing system of clause 36, comprising: associating a particular result overlapped with a particular second result with more than one measurement instance identity (ID): a first measurement ID of the wireless sensing measurements and a second measurement ID for the second wireless sensing measurements.

In some embodiments, a special case is that: same sensing initiator.

Clause 38. The method/device/system/software of the wireless sensing system of clause 34, comprising: wherein the another sensing initiator device is the sensing initiator device.

The results (TSCI) and second results (second TSCI) may be for two different wireless sensing tasks (e.g. one task may be motion detection while the other task may be breathing detection). The results and second results may also be available for the same wireless sensing task.

Clause 39. The method/device/system/software of the wireless sensing system of clause 34, comprising: wherein the plurality of results are made available to the wireless sensing task; wherein the plurality of second results are made available to another wireless sensing task.

In some embodiments, wireless sensing using central computing (e.g. sensing initiator may be AP).

Clause 40. The method/device/system/software of the wireless sensing system of clause 15, comprising: wherein the sensing initiator device is an access-point device (AP) of the wireless data communication network; wherein the Type 1 device is a client device of the wireless data communication network and functions as a sensing responder device; wherein the Type 2 device is the AP; wherein the Type 2 device reports the TSCI locally; wherein the locally reported TSCI is available at the AP for the wireless sensing task.

In some embodiments, the WSS may be an NDP in 11bf or 11az. When sensing initiator is an AP, trigger-based (TB) sensing may be used in 11bf or 11az. There may be two variations of TB sensing. The first variation (in which NDP may be sent from client devices to AP, with timing/synchronization achieved using TF) is used here in clause 24. The TF triggers the client device to send NDP to the AP.

Clause 41. The method/device/system/software of the wireless sensing system of clause 40, comprising: wherein the wireless sensing measurements are trigger-based (TB) using null data packet frames (NDP) and trigger frames (TF) based on the wireless protocol.

In some embodiments, sensing-by-proxy (SBP) in which a particular client device (SBP initiator) requests an AP (SBP responder) to initiate sensing sessions (i.e. function as sensing initiator). CSI may be reported to the particular client device.

Clause 42. The method/device/system/software of the wireless sensing system of clause 40, comprising: requesting the AP to perform a sensing-by-proxy (SBP) procedure by a particular client device of the wireless data communication network based on the wireless protocol; performing the SBP procedure by the AP based on the wireless protocol by: configuring the Type 1 device and the Type 2 device to perform the plurality of wireless sensing measurements collaboratively, and reporting the TSCI to the particular client device, wherein the reported TSCI is available for the wireless sensing task at the particular client device.

In some embodiments, there may be more than one Type 1 devices (e.g. client devices in a network). Each Type 1 device may transmit respective TSWSS to AP. The AP may obtain respective TSCI from respective received TSWSS. More than one TSCI from the more than one Type 1 devices may be reported/available in AP. The sensing task may be performed in a centralized manner based on the more than one TSCI. In one embodiment, all Type 1 devices may use the same wireless multipath channel. In another embodiment, they may use different wireless channel (e.g. different carrier frequency, different channel number, different bandwidth, and/or different wireless settings). In one embodiment, all Type 1 device may be in the same wireless sensing measurement session (e.g. same session ID, same measurement ID, same sounding frequency, and/or same sounding setting). In another embodiment, they may be in different wireless sensing measurement sessions (e.g. different session ID, different measurement ID, different sounding frequency, different wireless settings, different sensing settings, different sensing initiators).

Clause 43. The method/device/system/software of the wireless sensing system of clause 40, comprising: wherein there is at least one additional Type 1 heterogeneous wireless device of the system in the venue each configured by the sensing initiator device individually based on the wireless protocol to function as a sensing transmitter device; transmitting a respective TSWSS based on the wireless protocol by each respective additional Type 1 device to the Type 2 device; receiving the respective TSWSS through the wireless multipath channel based on the wireless protocol by the Type 2 device; obtaining a respective TSCI based on the wireless protocol by the Type 2 device based on the respective received TSWSS, reporting the respective TSCI locally by the Type 2 device; performing the wireless sensing task in a centralized manner based on more than one locally-reported TSCI.

In some embodiments, wireless sensing using distributed computing (e.g. sensing initiator may be AP).

Clause 44. The method/device/system/software of the wireless sensing system of clause 15, comprising: wherein the sensing initiator device is an access-point device (AP) of the wireless data communication network; wherein the Type 1 device is the AP; wherein the Type 2 device is a client device of the wireless data communication network and functions as a sensing responder device; wherein the Type 2 device reports the TSCI locally; wherein the locally reported TSCI is available at the client device for the wireless sensing task.

In some embodiments, the other variation of TB sensing (in which NDP may be sent from AP to client devices, with timing/synchronization achieved using NDPA) is used here in clause 27. The NDPA prepares the client devices to receive NDP from AP. In some embodiments, TSWSS (e.g. sounding signal, NDP) is broadcasted from AP to a number of non-AP client devices.

Clause 45. The method/device/system/software of the wireless sensing system of clause 44, comprising: wherein the wireless sensing measurements are trigger-based (TB) using null data packet (NDP) frames and NDP announcement (NDPA) frames based on the wireless protocol.

In some embodiments, TSWSS (e.g. sounding signal, NDP) may be broadcasted from AP to a number of non-AP client devices.

Clause 45b. The method/device/system/software of the wireless sensing system of clause 44, comprising: wherein the TSWSS is transmitted from the Type 1 device to, and is received by, the Type 2 device and an additional Type 2 device.

Clause 45c: The method/device/system/software of the wireless sensing system of clause 45b, comprising: wherein the TSWSS is transmitted from the Type 1 device using at least one of: a multicast or a broadcast.

In some embodiments, sensing-by-proxy (SBP) in which a particular client device (SBP initiator) requests an AP (SBP responder) to initiate sensing sessions (i.e. function as sensing initiator). CSI may be reported locally or non-locally. In some embodiments, TSWSS (e.g. sounding signal, NDP) is broadcasted from AP to a number of non-AP client devices.

Clause 46. The method/device/system/software of the wireless sensing system of clause 44, comprising: requesting the AP to perform a sensing-by-proxy (SBP) procedure by a particular client device based on the wireless protocol; performing the SBP procedure by the AP based on the wireless protocol by: configuring the Type 1 device and the Type 2 device to perform the plurality of wireless sensing measurements collaboratively, configuring the Type 2 device such that the TSCI is reported locally.

In some embodiments, TSWSS (e.g. sounding signal, NDP) may be broadcasted from AP to a number of non-AP client devices.

Clause 46b. The method/device/system/software of the wireless sensing system of clause 46, comprising: wherein the TSWSS is transmitted from the Type 1 device to, and is received by, the Type 2 device and an additional Type 2 device.

Clause 46c: The method/device/system/software of the wireless sensing system of clause 46b, comprising: wherein the TSWSS is transmitted from the Type 1 device using at least one of: a multicast or a broadcast.

In some embodiments, there may be more than one Type 2 device. Each Type 2 device may receive respective TSWSS from AP, obtain respective TSCI and perform respective part of the sensing task based on the respective TSCI. In one embodiment, all Type 2 devices may use the same wireless multipath channel. In another embodiment, they may use different wireless channel (e.g. different carrier frequency, different channel number, different bandwidth, and/or different wireless settings). In one embodiment, all Type 2 device may be in the same wireless sensing measurement session (e.g. same session ID, same measurement ID, same sounding frequency, and/or same sounding setting). In another embodiment, they may be in different wireless sensing measurement sessions (e.g. different session ID, different measurement ID, different sounding frequency, different wireless settings, different sensing settings, different sensing initiators).

Clause 47. The method/device/system/software of the wireless sensing system of clause 44, comprising: wherein there is at least one additional Type 2 heterogeneous wireless device of the system in the venue each configured by the sensing initiator device individually based on the wireless protocol to function as a sensing receiver device; transmitting a respective TSWSS based on the wireless protocol by the Type 1 device to each respective additional Type 2 device; receiving the respective TSWSS through the wireless multipath channel based on the wireless protocol by the respective additional Type 2 device; obtaining a respective TSCI based on the wireless protocol by the respective additional Type 2 device based on the respective received TSWSS, reporting the respective TSCI locally by the respective additional Type 2 device; performing the wireless sensing task in a de-centralized manner based on more than one locally-reported TSCI, wherein each respective additional Type 2 device performs a respective part of the wireless sensing task locally based on the respective locally-reported TSCI.

Clause 47b: The method/device/system/software of the wireless sensing system of clause 47, comprising: wherein all the TSWSS are a common TSWSS; transmitting the common TSWSS based on the wireless protocol by the Type 1 device to all of the Type 2 device and the at least one additional Type 2 device.

Clause 47c: The method/device/system/software of the wireless sensing system of clause 47b, comprising: transmitting the common TSWSS based on at least one of: a multicast or a broadcast.

In some embodiments, wireless sensing using non-TB sensing (e.g. sensing initiator may be client device). NDP may be sent from a client device to another client device. CSI may be locally reported.

Clause 48. The method/device/system/software of the wireless sensing system of clause 15, comprising: wherein the sensing initiator device is a client device of a wireless data communication network; wherein the sensing responder device is an access-point device (AP) of the wireless data communication network; wherein the Type 1 device is the client device; wherein the Type 2 device is the AP; wherein the Type 2 device is configured to report the TSCI locally; wherein the locally-reported TSCI is available at the AP for the wireless sensing task.

In some embodiments, wireless sensing using non-TB sensing (e.g. sensing initiator may be client device). Another possibility: NDP may be sent from AP to client device.

Clause 49. The method/device/system/software of the wireless sensing system of clause 15, comprising: wherein the sensing initiator device is a client device of the wireless data communication network; wherein the sensing responder device is an access-point device (AP) of the wireless data communication network; wherein the Type 1 device is the AP; wherein the Type 2 device is the client device; wherein the Type 2 device is configured to report the TSCI locally; wherein the locally-reported TSCI is available at the client device for the wireless sensing task.

In some embodiments, wireless sensing using P2P sensing. Another possibility: NDP may be sent from AP to client device.

Clause 50. The method/device/system/software of the wireless sensing system of clause 15, comprising: wherein the sensing initiator device is an access-point device (AP) of the wireless data communication network; wherein a first client device of the wireless data communication network is a first sensing responder device; wherein a second client device of the wireless data communication network is a second sensing responder device; wherein the Type 1 device is the first client device; wherein the Type 2 device is the second client device; wherein the Type 2 device is configured to report the TSCI locally; wherein the locally-reported TSCI is available at the second client device for the wireless sensing task.

In some embodiments, wireless sensing uses two-way P2P sensing. Another possibility: NDP may be sent from AP to client device.

Clause 51. The method/device/system/software of the wireless sensing system of clause 50, comprising: wherein the second client device is further configured to transmit another TSWSS to the first client device; wherein the first client device is further configured to receive the another TSWSS and to obtain another TSCI based on the received another TSWSS; wherein the first client device is further configured to report the another TSCI locally; wherein the locally-reported another TSCI is available at the first client device for the wireless sensing task.

In some embodiments, wireless sensing uses two-way sensing. Another possibility: NDP may be sent from AP to client device.

Clause 52. The method/device/system/software of the wireless sensing system of clause 3, comprising: configuring the Type 2 device based on the wireless protocol by the sensing initiator device to transmit another TSWSS to the Type 1 device based on the wireless protocol; configuring the Type 1 device based on the wireless protocol by the sensing initiator device to receive the another TSWSS from the Type 2 device through the wireless multipath channel and to obtain another TSCI based on the received another TSWSS; configuring the Type 1 device based on the wireless protocol whether to report the another TSCI non-locally or locally; making the reported another TSCI available for the wireless sensing task.

In some embodiments, the first device would collaborate with the second device only if the second device is considered/determined/judged/assessed/checked by the first device as suitable/permissible/allowable/reasonable/trustworthy for the second collaborative role. Sensing results of the wireless sensing measurement procedure may comprise TSCI. The sensing results (e.g. TSCI) may bear information of the user in the surrounding environment and thus access to the sensing results may need to be control in order to the privacy of the user. Different collaborative roles of the wireless sensing measurement procedure may have different access to the sensing results (e.g. TSCI). Sensing results access control may be controlled by limiting which device in the wireless data communication network may play which role.

In some embodiments, a trustworthy device (e.g. an AP, an associated AP, and/or an unassociated non-AP) may have certain degree of access to sensing results (e.g. TSCI). Only the most trustworthy device (e.g. AP, associated AP, and/or unassociated non-AP) may be entrusted with full access to privacy-sensitive sensing results. Untrustworthy device (e.g. AP, associated AP, and/or unassociated non-AP) should not have access to sensing results. Moderately trustworthy device (e.g. AP, associated AP, and/or unassociated non-AP) may have limited access to sensing results. To control sensing results (e.g. TSCI) access, a first device playing a role in the sensing procedure may decide whether or not to work with a second device playing a second role in the sensing procedure. The decision/judgment by the first device may be based on a classification of the second device with respect to some "trustworthiness" measure of the second device.

In one embodiment, the classification may be specific to the first device and/or the role of the first device. In another embodiment, the classification may not be specific to the first device/the role of the first device. In other words, the classification may be independent on the first device and the role of the first device.

In some embodiments, a number of devices in the network (e.g. AP, associated non-AP devices, unassociated-but-authenticated non-AP devices, or unassociated-and-unauthenticated non-AP devices) may be classified. The number of devices may be classified into some classes. All devices in the same classes may have the same "trustworthiness". Sensing receiver may generate a TSCI based on a received sounding signal and may report it either non-locally to sensing initiator or locally in the sensing receiver.

The TSCI bears information of the user in the surrounding environment and thus is related to the privacy of the user. Wireless devices (e.g. wireless station or STA in 802.11bf) that are not trustworthy should not be allowed to play the role of sensing receiver. In some embodiments, sensing transmitters have NO access to TSCI. It contributes to the generation of TSCI by sending the sounding signals.

The following numbered clauses provide examples for wireless sensing with privacy protection.

Clause A1. A method/device/system/software of an access-controlled wireless sensing system, comprising: determining, by a first heterogeneous wireless device of the system in a wireless data communication network, a plurality of collaborative roles in a wireless sensing measurement procedure to be performed in the wireless data communication network, the collaborative roles comprising: a sensing initiator device, a sensing responder device, a sensing transmitter device, a sensing receiver device, a sensing-by-proxy (SBP) initiator device, a SBP responder device; performing, by the first device in the network functioning as a first collaborative role, the wireless sensing measurement procedure collaboratively with a second heterogeneous wireless device of the system in the network functioning as a second collaborative role, provided that the second device is judged to be suitable for the second collaborative role by the first device.

In some embodiments, the first device may refuse/decline to function as the first collaborative role if it determines that the second device is NOT suitable.

Clause A2. The method/device/system/software of an access-controlled wireless sensing system of Clause A1, comprising: declining by the first device to function as the first collaborative role to perform the wireless sensing measurement procedure collaboratively with the second device functioning as the second collaborative role, when the second device is judged by the first device to be unsuitable for the second collaborative role. In some embodiments, the first device may classify all the (known) devices in the network in order to check/judge/determine/consider whether the second device is suitable for the second collaborative role, or not.

Clause A3. The method/device/system/software of an access-controlled wireless sensing system of Clause A2, comprising: computing a classification of each of a number of heterogeneous wireless devices in the network by the first device; judging based on the classification, by the first device functioning as the first collaborative role, whether the second device is suitable for the second collaborative role or not.

In some embodiments, the same classification may be used for determining/judging whether the second device is suitable for a third collaborative role when the first device functions as the first collaborative role.

Clause A4. The method/device/system/software of an access-controlled wireless sensing system of Clause A3, comprising: judging based on the classification, by the first device functioning as the first collaborative role, whether the second device is suitable for a third collaborative role or not; performing, by the first device functioning as the first collaborative role, another wireless sensing measurement procedure collaboratively with the second heterogeneous wireless device functioning as the third collaborative role, when the second device is judged to be suitable for the third collaborative role based on the classification.

In some embodiments, the same classification may be used for determining/judging whether the second device is suitable for the second collaborative role when the first device functions as a third collaborative role.

Clause A5. The method/device/system/software of an access-controlled wireless sensing system of Clause A3, comprising: judging based on the classification, by the first device functioning as a third collaborative role, of whether the second device is suitable for the second collaborative role or not; performing, by the first device functioning as the third collaborative role, another wireless sensing measurement procedure collaboratively with the second heterogeneous wireless device functioning as the second collaborative role, when the second device is judged to be suitable for the second collaborative role based on the classification.

In some embodiments, the classification may be different if the first device functions as a third collaborative role.

Clause A6. The method/device/system/software of an access-controlled wireless sensing system of Clause A3, comprising: computing another classification of each of a number of heterogeneous wireless devices in the network by the first device for the judgment, by the first device functioning as a third collaborative role, of whether the second device is suitable for the second collaborative role or not.

In some embodiments, the another classification may be used in another wireless sensing measurement procedure in which the first device functions as the third role and the second device functions as the second role.

Clause A7. The method/device/system/software of an access-controlled wireless sensing system of Clause A6, comprising: performing, by the first device functioning as the third collaborative role, another wireless sensing measurement procedure collaboratively with the second heterogeneous wireless device functioning as the second collaborative role, when the second device is judged to be suitable for the second collaborative role based on the another classification; declining, by the first device to function as the third collaborative role to perform the another wireless sensing measurement procedure collaboratively with the second device functioning as the second collaborative role, when the second device is judged to be unsuitable for the second collaborative role based on the another classification.

In some embodiments, the classification may be different if the judgment is about whether the second device is suitable for a third collaborative role.

Clause A8. The method/device/system/software of an access-controlled wireless sensing system of Clause A3, comprising: computing another classification of each of a number of heterogeneous wireless devices in the network by the first device for the judgment, by the first device functioning as the first collaborative role, of whether the second device is suitable for a third collaborative role or not.

In some embodiments, the another classification may be used in another wireless sensing measurement procedure in which the first device functions as the first role and the second device functions as the third role.

Clause A9. The method/device/system/software of an access-controlled wireless sensing system of Clause A8, comprising: performing, by the first device functioning as the first collaborative role, another wireless sensing measurement procedure collaboratively with the second heterogeneous wireless device functioning as the third collaborative role, when the second device is judged to be suitable for the third collaborative role based on the another classification; declining, by the first device to function as the first collaborative role to perform the another wireless sensing measurement procedure collaboratively with the second device functioning as the third collaborative role, when the second device is judged to be unsuitable for the third collaborative role. In some embodiments, each device may be associated with a trustworthiness score (or trust score) in the classification.

Clause A10. The method/device/system/software of an access-controlled wireless sensing system of Clause A3, comprising: wherein the classification of each device is associated with a trustworthiness score.

In some embodiments, the trustworthiness score (or trust score) of second device may be compared with a respective threshold to determine if the second device is suitable for the second collaborative role.

Clause A11. The method/device/system/software of an access-controlled wireless sensing system of Clause A10, comprising: judging the second device to be suitable for the second collaborative role if the trustworthiness score associated with the classification of the second device is higher than a threshold.

In some embodiments, while the threshold for the judgment of suitability may be different for different collaborator roles, the threshold may not change (i.e. remain unchanged) with different collaborative roles functioned by the first device and it may not change whether it is the first device or other device making the judgment of suitability.

Clause A12. The method/device/system/software of an access-controlled wireless sensing system of Clause A11, comprising: associating each collaborative role with a respective threshold for the judgment by any first device whether any second device is suitable for the collaborative role, regardless of any first collaborative role functioned by the any first device.

In some embodiments, with each role associated with a respective threshold, the second device may be judged to be suitable for a number of collaborative roles, each of such roles has a respective threshold smaller than the trustworthiness score of the second device.

Clause A13. The method/device/system/software of an access-controlled wireless sensing system of Clause A12, comprising: judging the second device to be suitable for a first group of collaborative roles whose thresholds are smaller than the trustworthiness score of the second device.

In some embodiments, the second device may be judged to be unsuitable for another group of collaborative roles, each such roles has a respective threshold larger than the trustworthiness score of the second device.

Clause A14. The method/device/system/software of an access-controlled wireless sensing system of Clause A13, comprising: judging the second device to be unsuitable for a second group of collaborative roles whose thresholds are greater than the trustworthiness score of the second device.

In some embodiments, other devices in the same class as the second device may be associated with the same or comparable trustworthiness and may thus be judged to be suitable for the first group and unsuitable for the second group.

Clause A15. The method/device/system/software of an access-controlled wireless sensing system of Clause A14, comprising: judging a third device to be suitable for the first group of collaborative roles and unsuitable for the second group of collaborative roles, wherein both the second device and the third device are classified to the same class and are associated with comparable trustworthiness scores.

In some embodiments, some devices may be classified into the first class, suitable for all roles.

Clause A16. The method/device/system/software of an access-controlled wireless sensing system of Clause A15, comprising: classifying the number of devices into a number of classes, wherein a group of devices are classified to each of the number of classes in the classification and are judged to be suitable for a corresponding subset of the collaborative roles.

In some embodiments, a special case is that: AP may be most trustworthy and may be suitable for basically for roles. When SBP is performed, AP may often serve as SBP responder. But in a mesh network with multiple AP, a first AP may serve as SBP initiator and a second AP may serve as SBP responder.

Clause A17. The method/device/system/software of an access-controlled wireless sensing system of Clause A16, comprising: wherein an access point device (AP) of the wireless data communication network is judged to be suitable for the following collaborative roles: SBP initiator device, SBP responder device, sensing initiator device, sensing responder device, sensing transmitter device and sensing receiver device.

In some embodiments, there are some possible classes with respective associated suitable or permitted roles.

Clause A18. The method/device/system/software of an access-controlled wireless sensing system of Clause A16, comprising: wherein a first group of devices are judged to be suitable for all the collaborative roles, comprising: SBP initiator, SBP responder, sensing initiator, sensing responder, sensing transmitter, and sensing receiver.

Clause A19. The method/device/system/software of an access-controlled wireless sensing system of Clause A18, comprising: wherein a second group of devices are judged to be suitable for the following collaborative roles: SBP initiator, sensing initiator, sensing responder, sensing transmitter, and sensing receiver.

Clause A20. The method/device/system/software of an access-controlled wireless sensing system of Clause A19, comprising: wherein a third group of devices are judged to be suitable for the following collaborative roles: sensing initiator, sensing responder, sensing transmitter, and sensing receiver.

Clause A21. The method/device/system/software of an access-controlled wireless sensing system of Clause A20, comprising: wherein a fourth group of devices are judged to be suitable for the following collaborative roles: sensing responder, sensing transmitter, and sensing receiver.

Clause A22. The method/device/system/software of an access-controlled wireless sensing system of Clause A21, comprising: wherein a fifth group of devices are judged to be suitable for the following collaborative roles: sensing responder, and sensing transmitter.

Clause A23. The method/device/system/software of an access-controlled wireless sensing system of Clause A22, comprising: wherein a sixth group of devices are judged to be suitable for the following collaborative roles: SBP initiator, sensing responder, sensing transmitter and sensing receiver.

Clause A24. The method/device/system/software of an access-controlled wireless sensing system of Clause A23, comprising: wherein a seventh group of devices are judged to be suitable for the following collaborative roles: SBP initiator, sensing responder, and sensing transmitter.

Clause A25. The method/device/system/software of an access-controlled wireless sensing system of Clause A24, comprising: wherein an eighth group of devices are judged to be suitable for the following collaborative roles: SBP initiator, sensing responder, and sensing receiver.

Clause A26. The method/device/system/software of an access-controlled wireless sensing system of Clause A25, comprising: wherein a ninth group of devices are judged to be suitable for the following collaborative roles: SBP initiator.

In some embodiments, the number of devices may include AP, non-AP (client devices), associated non-AP, unassociated non-AP, authenticated non-AP, unauthenticated non-AP.

Clause A27. The method/device/system/software of an access-controlled wireless sensing system of Clause A3, comprising: wherein the number of devices comprises at least one of: an access-point device (AP) of the wireless data communication network, an associated wireless non-AP device of the wireless data communication network, an authenticated but unassociated wireless non-AP device of the wireless data communication network, an unauthenticated and unassociated wireless client device of the wireless data communication network.

Clause A28. The method/device/system/software of an access-controlled wireless sensing system of Clause A10, comprising: wherein a trustworthiness score of a device associated with the classification of the device by another device is obtained from at least one of: the another device, a setting of the another device, a database of the another device, the system, a setting of the system, a database of the system, a server of the system, a database of the server, a setting of the server, a directive from the server, a user, a user of the device, a user of the another device, a user of the system, a user input, a user-interface input, a graphical user-interface input, a user setting, a user database.

In some embodiments, each collaborative role has its respective access to the sensing results (e.g. TSCI).

Clause A29. The method/device/system/software of an access-controlled wireless sensing system of Clause A1, comprising: wherein each collaborative role is associated with a respective access to the results of the wireless sensing measurement procedure in the collaborative generation and reporting of the results of the wireless sensing measurement procedure.

Clause A30. The method/device/system/software of an access-controlled wireless sensing system of Clause A29, comprising: wherein the wireless sensing measurement procedure comprises a basic procedure and an extended procedure; wherein the basic wireless sensing measurement procedure is performed collaboratively by the sensing initiator device, the sensing responder device, the sensing transmitter device and the sensing receiver device by: initiating the wireless sensing measurement procedure in the network by the sensing initiator device, wherein the sensing initiator device functions also as one of: a sensing transmitter device, a sensing receiver device, or both, or none, engaging at least one sensing responder device in the network to join the procedure by the sensing initiator device, wherein each sensing responder device functions also as one of: a sensing transmitter device, a sensing receiver device, or both, configuring each sensing transmitter device by the sensing initiator device to transmit a respective time series of wireless sounding signal (WSS) in the network to a respective sensing receiver device, and configuring each sensing receiver device by the sensing initiator device to receive the respective time series of WSS (TSWSS) from the respective sensing transmitter device, to obtain a respective time series of channel information (CI) based on the respective received TSWSS, and to report the respective time series of CI (TSCI) either non-locally to the sensing initiator device through the network or locally in the sensing receiver device; wherein the extended wireless sensing measurement procedure is performed collaboratively by the SBP initiator device and SBP responder device by: requesting an SBP responder device in the network by a SBP initiator device in the network to perform an SBP procedure in the network, performing the SBP procedure by the SBP responder device by: functioning as a sensing initiator device by the SBP responder device to perform the basic wireless sensing measurement procedure, and reporting the TSCI to the SBP initiator device as requested by the SBP initiator device.

In some embodiments, the roles are based on a wireless protocol (e.g. IEEE 802.11bf standard).

Clause A31. The method/device/system/software of an access-controlled wireless sensing system of Clause A30, comprising: wherein each of the roles in the wireless sensing measurement procedure is performed based on a wireless protocol; wherein the wireless protocol is one of: a wireless network protocol, a wireless network standard, a wireless data communication protocol, a wireless LAN (WLAN) protocol, a mobile communication protocol, a wireless protocol based on a standard, a WLAN standard, a Wi-Fi standard, an IEEE 802 standard, an IEEE 802.11 standard, an IEEE 802.11bf standard, a wireless data communication standard, a 3G/4G/LTE/5G/6G/7G/8G standard.

The following numbered clauses provide examples for two-way sensing, where two devices each sending respective wireless signal (e.g. NDP) in respective ways (i.e. directions) in session based on a protocol/standard. A first device transmits first wireless signal to a second device which generates sensing measurement results (e.g. channel info/CI, TSCI, CSI, CIR, CFR, RSSI, etc.) from received first wireless signal. Second device transmits second wireless signal to third device (e.g. first device) which generates CI from received second wireless signal. The sensing measurement generations are in succession also. In some embodiments, third device is first device, such that both first and second devices have their own TSCI and can perform wireless sensing computing. There is no reporting of sensing measurement results. Protocol may be a default protocol, an industry standard, a national standard, an international standard, WLAN standard, WiFi, IEEE 802.11, 802.11bf, Bluetooth, UWB, 802.15, 802.16, cellular communication standard, 4G/5G/6G/7G/8G, WiMax, etc.

Clause B1. A method/device/system/software of a wireless two-way sensing system, comprising: transmitting two wireless (sounding) signals in succession by two devices through a wireless multipath channel of a venue based on a protocol, a first wireless signal transmitted from a first heterogeneous wireless device to a second heterogeneous wireless device and a second wireless signal transmitted from the second heterogeneous wireless device to a third heterogeneous wireless device, wherein the wireless multipath channel is impacted by a motion of an object in the venue; receiving the two wireless signals in two ways in succession by two devices, the first wireless signal by the second device in the first way and the second wireless signal by the third device in the second way, wherein the transmitted first wireless signal differs from the received first wireless signal due to the multipath channel and the motion of the object, wherein the transmitted second wireless signal differs from the received second wireless signal due to the multipath channel and the motion of the object; obtaining two time series of channel information (TSCI) of the wireless multipath channel in the venue in succession by two devices based on the two received wireless signals, a first TSCI obtained by the second device based on the received first wireless signal and a second TSCI obtained by the third device based on the received second wireless signal; making the two TSCI available in two devices, the first TSCI available in the second device and the second TSCI available in the third device for applications.

In second and third devices: respective MLME sends a respective internal (electronic) signal/message to respective SME to indicate availability of respective TSCI in the respective device.

Clause B2. The method/device/system/software of the wireless two-way sensing system in clause B1, further comprising: sending two electronic signals in succession to indicate the availability of the two TSCI in the two devices based on the protocol; sending a second electronic signal within the second device from a second MAC layer management entity (MLME) of the second device to a second station management entity (SME) of the second device to indicate the availability of the first TSCI; sending a third electronic signal within the third device from a third MLME of the third device to a third SME of the third device to indicate the availability of the second TSCI.

Special case 1: First device=third device. First device is sensing initiator.

Clause B3. The method/device/system/software of the wireless two-way sensing system in clause B1 or 2, further comprising: initiating a sensing session by the first device based on the protocol, wherein the third device is the first device, wherein the first device is a sensing initiator, wherein the second device is a sensing responder, wherein the first wireless signal is an initiator-to responder (I2R) sounding signal, wherein the second wireless signal is a responder-to-initiator (R2I) sounding signal.

No report frame may be used by sensing responder to report its sensing measurement results to sensing initiator.

Clause B4. The method/device/system/software of the wireless two-way sensing system in clause B3, further comprising: wherein no wireless report frames are used by the sensing responder to transmit its TSCI (i.e. first TSCI) to the sensing initiator.

Alternatively, report frame may be optionally used by sensing responder to its report sensing measurement results to sensing initiator.

Clause B5. The method/device/system/software of the wireless two-way sensing system in clause B3, further comprising: wherein wireless report frames are optionally used by the second device (sensing responder) to transmit the first TSCI (i.e. sensing measurement generated in second device) to the first device (sensing initiator) such that both the first TSCI and second TSCI are available to the first device.

Trigger signal may be used to trigger the transmission of the two wireless signals in succession by the two devices. Trigger signal may be an NDPA frame, a Trigger Frame (TF), or another frame for triggering.

Clause B6. The method/device/system/software of the wireless two-way sensing system in clause B6, further comprising: transmitting a trigger signal by the sensing initiator to the sensing responder based on the protocol to trigger the transmission of the two wireless signals in succession by the two devices.

Special case 1a: Non-TB sensing, with a non-AP STA initiating sensing session. AP may be AP in WiFi/WLAN or base station in cellular communication.

Clause B7. The method/device/system/software of the wireless two-way sensing system in clause B3, further comprising: wherein the first device is a non-access point device (non-AP station or non-AP STA).

Special case 1b: TB sensing with an AP initiating sensing session. AP may be AP in WiFi/WLAN or base station in cellular communication.

Clause B8. The method/device/system/software of the wireless two-way sensing system in clause B3, further comprising: wherein the first device is an access point device (AP).

TB sensing may have a polling phase for sensing initiator (first device) to check "availability" of a number of devices (including second device). Each available device may reply to indicate that it is available.

Clause B9. The method/device/system/software of the wireless two-way sensing system in clause B8, further comprising: checking wirelessly for availability of a number of wireless heterogeneous devices (i.e. wireless station/STA) by the AP based on the protocol, wherein the second device is one of the number of wireless heterogeneous devices and is available.

The AP may send at least one polling frame to check for availability of the devices.

Clause B10. The method/device/system/software of the wireless two-way sensing system in clause B9, further comprising: transmitting a polling frame by the AP to the number of wireless heterogeneous devices based on the protocol to check wirelessly for their availability.

The available devices may send some wireless reply signal (e.g. "availability signal") as a reply to indicate they are available.

Clause B11. The method/device/system/software of the wireless two-way sensing system in clause B9, further comprising: transmitting a wireless availability signal by any available wireless heterogeneous device to the AP based on the protocol to indicate it is available.

The wireless reply signal in previous clause B may be a "reply frame".

Clause B12. The method/device/system/software of the wireless two-way sensing system in clause B11, further comprising: transmitting a reply frame by any available wireless heterogeneous device to the AP based on the protocol to indicate it is available.

All the devices being polled by AP may send some wireless reply signal (e.g. "availability signal") as a reply to indicate its "availability".

Clause B13. The method/device/system/software of the wireless two-way sensing system in clause B 11, further comprising: transmitting a wireless availability signal by any wireless heterogeneous device to the AP based on the protocol to indicate its availability.

The wireless reply signal in previous clause B may be a "reply frame".

Clause B14. The method/device/system/software of the wireless two-way sensing system in clause B13, further comprising: transmitting a reply frame by any wireless heterogeneous device to the AP based on the protocol to indicate its availability.

In SBP, a non-AP STA requests the AP to initiate sensing session.

Clause B15. The method/device/system/software of the wireless two-way sensing system in clause B8, further comprising: requesting the AP to initiate the sensing session by a non-AP heterogeneous wireless device.

In SBP, the non-AP STA initiates an SBP session by making SBP-request to AP.

Clause B16. The method/device/system/software of the wireless two-way sensing system in clause B15, further comprising: initiating a sensing-by-proxy (SBP) session by the non-AP device based on the protocol; making a SBP request by the non-AP device to the AP based on the protocol.

In SBP, the non-AP STA configures the SBP session.

Clause B17. The method/device/system/software of the wireless two-way sensing system in clause B16, further comprising: configuring the SBP session by the non-AP device.

Clause B18. The method/device/system/software of the wireless two-way sensing system in clause B17, further comprising: configuring the sensing session indirectly by the non-AP device, by configuring the SBP session.

Clause B19. The method/device/system/software of the wireless two-way sensing system in clause B18, further comprising: configuring the SBP session such that the AP does not report any TSCI to the non-AP device.

Clause B20. The method/device/system/software of the wireless two-way sensing system in clause B19, further comprising: configuring the sensing session indirectly such that sensing responders do not use wireless report frames to report their TSCI to the AP.

Clause B21. The method/device/system/software of the wireless two-way sensing system in clause B8, further comprising: configuring the second device by the AP regarding the transmission of the second wireless signal and the reception of the first wireless signal in succession, the generation of the first TSCI based on the received first wireless signal, and the making available of the first TSCI, based on the protocol.

Clause B22. The method/device/system/software of the wireless two-way sensing system in clause B21, further comprising: configuring the second device and another device jointly by the AP based on at least one of: a combined set-up, a combined negotiation, or a combined configuration.

Clause B23. The method/device/system/software of the wireless two-way sensing system in clause B21, further comprising: configuring the second device and another device separately by the AP based on at least one of: respective individual set-ups, respective individual negotiations, or respective individual configurations.

The following clauses are for non-infrastructure mode (NIM) sensing.

Clause C1. A method/device/system/software of a non-infrastructure mode wireless sensing system, comprising: initiating a non-infrastructure mode (NIM) sensing procedure by a sensing initiator of the system in a venue based on a protocol, the sensing initiator being a heterogeneous wireless device in non-infrastructure mode in a wireless adhoc network; joining the NIM sensing procedure by a sensing responder of the system in the venue based on the protocol, the sensing responder being a wireless heterogeneous wireless device in the wireless adhoc network; defining a set of mutually acceptable sensing parameters for the NIM sensing procedure between the sensing initiator and the sensing responder; defining one of the sensing initiator and the sensing responder to be a sensing transmitter which is a Type 1 heterogeneous wireless device and the other one to be a sensing receiver which is a Type2 heterogeneous wireless device; transmitting a wireless (sounding) signal by the sensing transmitter through a wireless multipath channel of the venue, wherein the wireless multipath channel is impacted by a motion of an object in the venue; receiving the wireless signal by the sensing receiver, wherein the transmitted wireless signal differs from the received wireless signal due to the multipath channel and the motion of the object; obtaining a time series of channel information (TSCI) of the wireless multipath channel in the venue by the sensing receiver based on the received wireless signals; making the TSCI available for a wireless sensing application. Reporting of sensing measurement results (e.g. using sensing measurement report frame) may be optional.

Clause C2. The method/device/system/software of the NIM wireless sensing system of clause C1, comprising: optionally transmitting the TSCI to the sensing initiator based on the protocol. Trigger-based (TB) sensing, which use either NDPA or trigger frame (TF) I2R NDP Clause C3. The method/device/system/software of the NIM wireless sensing system of clause C1, comprising: transmitting one of: an announcement frame or a triggering frame from the sensing initiator to the sensing responder before the transmission of the wireless signal. NDPA or a frame similar to NDPA TF or a frame similar to TF.

Clause C4. The method/device/system/software of the NIM wireless sensing system of clause C3, comprising: wherein the announcement frame comprises at least one of: an NDP Announcement frame (NDPA), a frame similar to NDPA, or an 802.11 compatible NDPA; wherein the triggering frame comprises at least one of: a Trigger frame (TF), a TF variant, a frame similar to TF, a frame similar to the TF variant, an 802.11 compatible frame, or an 802.11-compatible TF. Non-TB sensing, in which both R2I NDP and I2R NDP are transmitted. The R2I NDP sent from sensing responder to sensing initiator. The I2R NDP sent from sensing initiator to sensing responder.

Clause C5. The method/device/system/software of the NIM wireless sensing system of clause C1, comprising: transmitting a second wireless (sounding) signal by the sensing receiver through the wireless multipath channel of the venue; receiving the second wireless signal by the sensing transmitter; obtaining a second TSCI of the wireless multipath channel in the venue by the sensing transmitter based on the received second wireless signals; making the second TSCI available for at least one of: the wireless sensing application or a second wireless sensing application. Two-way sensing, i.e. I2R NDP sent from sensing initiator to sensing receiver, and R2I NDP sent from sensing responder to sensing initiator, s.t. sensing measurement (e.g. CSI) generated in both sensing initiator (based on R2I NDP) and sensing responder (based on I2R NDP). TSCI obtained in sensing initiator may be for local application/software/ sensing task in sensing initiator. TSCI obtained in sensing responder may be for local application/software/sensing task in sensing responder. It may optionally be reported to the sensing initiator. E.g. Sensing task in sensing initiator may be motion detection while sensing task in sensing responder may be fall-down detection.

Clause C6. The method/device/system/software of the NIM wireless sensing system of clause C1, comprising: defining two sensing transmitters and two sensing responders, wherein the sensing transmitters are Type 1 heterogeneous wireless devices and the sensing receivers are Type2 heterogeneous wireless devices; defining each of the sensing initiator and the sensing responder to be both a sensing transmitter and a sensing receiver; transmitting a respective wireless (sounding) signal by each sensing transmitter through the wireless multipath channel of the venue; receiving a respective wireless signal by each sensing receiver, wherein each transmitted wireless signal differs from the respective received wireless signal due to the multipath channel and the motion of the object; obtaining a respective TSCI of the wireless multipath channel in the venue by each sensing receiver based on the respective received wireless signal; making the respective TSCI locally available for a respective wireless sensing application. The sensing initiator STA may function as sensing initiator to initiate another non-infrastructure sensing procedure with a same or different set of sensing responder(s). Another non-infrastructure sensing procedure with the same sensing initiator and another sensing responder.

Clause C7. The method/device/system/software of the NIM wireless sensing system of clause C1, comprising: initiating a second NIM sensing procedure by the sensing initiator based on the protocol; joining the second NIM sensing procedure by a second sensing responder of the system in the venue based on the protocol, the second sensing responder being a wireless heterogeneous wireless device in non-infrastructure mode in the wireless adhoc network; defining a second set of mutually acceptable sensing parameters for the second NIM sensing procedure between the sensing initiator and the second sensing responder; defining one of the sensing initiator and the second sensing responder to be a second sensing transmitter which is another Type 1 heterogeneous wireless device and the other one to be a second sensing receiver which is another Type2 heterogeneous wireless device; transmitting a second wireless (sounding) signal by the second sensing transmitter through a second wireless multipath channel of the venue, wherein the second wireless multipath channel is impacted by the motion of the object in the venue; receiving the second wireless signal by the second sensing receiver, wherein the transmitted second wireless signal differs from the received second wireless signal due to the second multipath channel and the motion of the object; obtaining a second TSCI of the second wireless multipath channel in the venue by the second sensing receiver based on the received second wireless signals; making the second TSCI available for a second wireless sensing application. The sensing responder STA may function as sensing responder in another non-infrastructure sensing procedure (with potentially different sensing initiator). Another non-infrastructure sensing procedure with another sensing initiator and the same sensing responder.

Clause C8. The method/device/system/software of the NIM wireless sensing system of clause C1, comprising: initiating a second NIM sensing procedure by a second sensing initiator of the system in the venue based on the protocol, the second sensing initiator being another heterogeneous wireless device in non-infrastructure mode in the wireless adhoc network; joining the second NIM sensing procedure by the sensing responder; defining a second set of mutually acceptable sensing parameters for the second NIM sensing procedure between the second sensing initiator and the sensing responder; defining one of the second sensing initiator and the sensing responder to be a second sensing transmitter which is a Type 1 heterogeneous wireless device and the other one to be a second sensing receiver which is a Type2 heterogeneous wireless device; transmitting a second wireless (sounding) signal by the second sensing transmitter through a second wireless multipath channel of the venue, wherein the second wireless multipath channel is impacted by the motion of the object in the venue; receiving the second wireless signal by the second sensing receiver, wherein the transmitted second wireless signal differs from the received second wireless signal due to the second multipath channel and the motion of the object; obtaining a second TSCI of the second wireless multipath channel in the venue by the second sensing receiver based on the received second wireless signals; making the second TSCI available for a second wireless sensing application. P2P sensing, or responder-to-responder sensing. Case 1: Both responders join the same sensing procedure.

Clause C9. The method/device/system/software of the NIM wireless sensing system of clause C1, comprising: joining the NIM sensing procedure by a second sensing responder of the system in the venue based on the protocol, the second sensing responder being a wireless heterogeneous wireless device in non-infrastructure mode in the wireless adhoc network; defining a second set of mutually acceptable sensing parameters for the NIM sensing procedure between the sensing initiator and the second sensing responder; defining one of the sensing responder and the second sensing responder to be a second sensing transmitter which is a Type 1 heterogeneous wireless device and the other one to be a second sensing receiver which is a Type2 heterogeneous wireless device; transmitting a second wireless (sounding) signal by the second sensing transmitter through a second wireless multipath channel of the venue, wherein the second wireless multipath channel is impacted by the motion of the object in the venue; receiving the second wireless signal by the second sensing receiver, wherein the transmitted second wireless signal differs from the received second wireless signal due to the second multipath channel and the motion of the object; obtaining a second TSCI of the second wireless multipath channel in the venue by the second sensing receiver based on the received second wireless signal; making the second TSCI available for a second wireless sensing application. P2P sensing, or responder-to-responder sensing. Case 2: Each responder joins separate procedures.

Clause C10. The method/device/system/software of the NIM wireless sensing system of clause C1, comprising: initiating a second NIM sensing procedure by the sensing initiator of the system in the venue based on the protocol; joining the second NIM sensing procedure by a second sensing responder of the system in the venue based on the protocol, the second sensing responder being a wireless heterogeneous wireless device in non-infrastructure mode in the wireless adhoc network; defining a second set of mutually acceptable sensing parameters for the second NIM sensing procedure between the sensing initiator and the second sensing responder; defining one of the sensing responder and the second sensing responder to be a second sensing transmitter which is another Type 1 heterogeneous wireless device and the other one to be a second sensing receiver which is another Type2 heterogeneous wireless device; transmitting a second wireless (sounding) signal by the second sensing transmitter through a second wireless multipath channel of the venue, wherein the second wireless multipath channel is impacted by the motion of the object in the venue; receiving the second wireless signal by the second sensing receiver, wherein the transmitted second wireless signal differs from the received second wireless signal due to the second multipath channel and the motion of the object; obtaining a second TSCI of the second wireless multipath channel in the venue by the second sensing receiver based on the received second wireless signal; making the second TSCI available for a second wireless sensing application. P2P sensing, or responder-to-responder sensing. With 2 way sensing.

Clause C11. The method/device/system/software of the NIM wireless sensing system of clause C9 or 10, comprising: transmitting a third wireless (sounding) signal by the second sensing receiver through the second wireless multipath channel of the venue; receiving the third wireless signal by the second sensing transmitter, wherein the transmitted third wireless signal differs from the received third wireless signal due to the second multipath channel and the motion of the object; obtaining a third TSCI of the second wireless multipath channel in the venue by the second sensing transmitter based on the received third wireless signal; making the third TSCI available for at least one of: the second wireless sensing application or a third wireless sensing application. SBP.

Clause C12. The method/device/system/software of the NIM wireless sensing system of clause C1, comprising: initiating a non-infrastructure mode (NIM) sensing-by-proxy (SBP) procedure by a SBP initiator of the system in the venue based on the protocol, the SBP initiator being a heterogeneous wireless device in non-infrastructure mode in a wireless adhoc network; joining the NIM SBP procedure by a SBP responder of the system in the venue based on the protocol, wherein the SBP responder is the sensing initiator; initiating the NIM sensing procedure by the sensing initiator during the NIM SBP procedure. Two sub-cases: (1) SBP responder will initiate NIM sensing procedure after joining the NIM SBP procedure.

Clause C13. The method/device/system/software of the NIM wireless sensing system of clause C12, comprising: initiating the NIM sensing procedure by the SBP responder after the SBP responder joining the NIM SBP procedure. Two sub-cases: (2) SBP responder has been a sensing initiator (and has initiated the NIM sensing procedure) before joining the NIM SBP procedure.

Clause C14. The method/device/system/software of the NIM wireless sensing system of clause C12, comprising: initiating the NIM sensing procedure by the sensing initiator before the sensing initiator joining the NIM SBP procedure. Optional reporting of sensing measurement results from sensing responder to sensing initiator/SBP.

Clause C15. The method/device/system/software of the NIM wireless sensing system of clause C12, comprising: optionally transmitting the TSCI from the sensing receiver to the SBP initiator, possibly via the sensing initiator, based on the protocol. Various frames used to initiate/join SBP procedure and to report TSCI.

Clause C16. The method/device/system/software of the NIM wireless sensing system of clause C12, comprising: sending a SBP request frame by the SBP initiator to the SBP responder based on the protocol, to initiate the NIM SBP procedure; sending a SBP response frame by the SBP responder to the SBP initiator based on the protocol, either to join or to decline to join, the NIM SBP procedure; optionally sending a sensing measurement report frame by the sensing receiver based on the protocol, to transmit the TSCI to the SBP initiator, possibly via the sensing initiator.

Clause C17. The method/device/system/software of the NIM wireless sensing system of clause C16, comprising: specifying by the SBP initiator using the SBP request frame that the SBP responder is to be one of: a sensing transmitter, a sensing responder, both sensing transmitter and receiver, or none, in the NIM sensing procedure to be initiated by the SBP responder in the NIM SBP procedure. Restricting the SBP procedure or sensing procedure.

Clause C18. The method/device/system/software of the NIM wireless sensing system of clause C12, comprising: specifying a number of admissible sensing responders by the SBP initiator to the sensing initiator; restricting the NIM SBP procedure and the NIM sensing procedure initiated by the sensing responder to allow only the number of admissible sensing responders of the system to join the NIM sensing procedure of the NIM SBP procedure. In some embodiments, there is a unique ID for each admissible sensing responder.

Clause C19. The method/device/system/software of the NIM wireless sensing system of clause C18, comprising: specifying a unique identifier (ID) of each admissible sensing responder by the SBP initiator.

Clause C20. The method/device/system/software of the NIM wireless sensing system of clause C19, comprising: wherein the unique identifier comprises at least one of: a user ID (UID), an association (AID), a universally unique ID (UUID), a globally unique ID (GUID), a MAC address, or an internet protocol (IP) address. Update SBP setting (halfway, after the SBP request/response frames) during the NIM SBP procedure or during the NIM sensing procedure.

Clause C21. The method/device/system/software of the NIM wireless sensing system of clause C12, comprising: sending an SBP update frame by the SBP initiator to the SBP responder to update at least one setting of one of: the NIM SBP procedure or the NIM sensing procedure of the NIM SBP procedure, during the NIM SBP procedure. Send a request using the SBP update frame to stop/terminate, add, pause or resume a particular sensing responder.

Clause C22. The method/device/system/software of the NIM wireless sensing system of clause C21, comprising: sending a request by the SBP initiator to the sensing procedure to stop, or add, or pause or resume a particular sensing responder in the SBP. How to identify the particular sensing responder.

Clause C23. The method/device/system/software of the NIM wireless sensing system of clause C22, comprising: identifying the particular sensing responder by providing a unique identifier (ID) of it, wherein the unique identifier comprises at least one of: a user ID (UID), an association (AID), a universally unique ID (UUID), a globally unique ID (GUID), a MAC address, or an internet protocol (IP) address.

In some embodiments about non-infrastructure mode (NIM) sensing, an STA in non-infrastructure mode in an adhoc network serves as sensing initiator to initiate non-infrastructure mode sensing procedure based on a protocol (e.g. 802.11, 802.11bI). At least one other STA in the adhoc network in non-infrastructure mode joins the sensing procedure as sensing responder based on the protocol. Sensing initiator and sensing responder negotiate to setup the sensing procedure/session and the relevant sensing measurement parameters. One device is setup as sensing transmitter (Type 1 device). The other device is setup as sensing receiver (Type2 device). Wireless sounding signal (e.g. NDP, a time series of NDP) is sent from sensing transmitter to sensing receiver to generate sensing measurement (e.g. TSCI) in sensing receiver. The NDP may be I2R or R2I, depending whether which device is the sensing transmitter. Sensing measurement may be made locally available to applications (e.g. software, firmware) in sensing receiver. Sensing measurement may be optionally transmitted wirelessly from sensing responder to sensing initiator (e.g. using sensing measurement report frame based on the protocol) and made available to applications (e.g. software, firmware) in sensing initiator, or from sensing receiver to sensing transmitter.

The following numbered clauses provide examples for non-infrastructure mode (NIM) sensing.

Clause D1. A method/device/system/software of a non-infrastructure mode wireless sensing system, comprising: initiating a non-infrastructure mode (NIM) sensing procedure by a sensing initiator of the system in a venue based on a protocol, the sensing initiator being a heterogeneous wireless device in non-infrastructure mode in a wireless adhoc network; joining the NIM sensing procedure by a sensing responder of the system in the venue based on the protocol, the sensing responder being a wireless heterogeneous wireless device in the wireless adhoc network; defining a set of mutually acceptable sensing parameters for the NIM sensing procedure between the sensing initiator and the sensing responder; defining one of the sensing initiator and the sensing responder to be a sensing transmitter which is a Type 1 heterogeneous wireless device and the other one to be a sensing receiver which is a Type2 heterogeneous wireless device; transmitting a wireless (sounding) signal by the sensing transmitter through a wireless multipath channel of the venue, wherein the wireless multipath channel is impacted by a motion of an object in the venue; receiving the wireless signal by the sensing receiver, wherein the transmitted wireless signal differs from the received wireless signal due to the multipath channel and the motion of the object; obtaining a time series of channel information (TSCI) of the wireless multipath channel in the venue by the sensing receiver based on the received wireless signals; making the TSCI available for a wireless sensing application.

In some embodiments, reporting of sensing measurement results (e.g. using sensing measurement report frame) may be optional.

Clause D2. The method/device/system/software of the NIM wireless sensing system of clause D1, comprising: optionally transmitting the TSCI to the sensing initiator based on the protocol.

Trigger-based (TB) sensing, which use either NDPA or trigger frame (TF) I2R NDP.

Clause D3. The method/device/system/software of the NIM wireless sensing system of clause D1, comprising: transmitting one of: an announcement frame or a triggering frame from the sensing initiator to the sensing responder before the transmission of the wireless signal.

NDPA or a frame similar to NDPA; TF or a frame similar to TF.

Clause D4. The method/device/system/software of the NIM wireless sensing system of clause D3, comprising: wherein the announcement frame comprises at least one of: an NDP Announcement frame (NDPA), a frame similar to NDPA, or an 802.11 compatible NDPA; wherein the triggering frame comprises at least one of: a Trigger frame (TF), a TF variant, a frame similar to TF, a frame similar to the TF variant, an 802.11 compatible frame, or an 802.11-compatible TF.

Non-TB sensing, in which both R2I NDP and I2R NDP are transmitted. The R2I NDP sent from sensing responder to sensing initiator. The I2R NDP sent from sensing initiator to sensing responder.

Clause E1. A wireless sensing device, comprising: a receiver which: in response to wirelessly receiving a wireless sensing measurement setup request from a sensing initiator device by the receiver requesting the receiver to function as a sensing receiver in a wireless sensing measurement procedure in accordance with a standard wireless network protocol, receives a time series of at least one wireless sounding signal (WSS) through a wireless channel of a venue based on the standard wireless network protocol and the wireless sensing measurement setup request in a wireless data communication network in the venue, performs a plurality of wireless sensing measurements based on the received TSWSS to obtain a plurality of sensing measurement results based on the standard wireless network protocol and the wireless sensing measurement setup request, wherein the time series of at least one WSS (TSWSS) is transmitted by a transmitter in the venue based on the standard wireless network protocol through the wireless channel which is impacted by a motion of an object in the venue, wherein the received TSWSS differs from the transmitted TSWSS due to the wireless multipath channel and the motion of the object, wherein the wireless data communication network comprises a physical (PHY) layer, a medium access control (MAC) layer, and at least one higher layer in the wireless sensing device, and provides the plurality of sensing measurement results locally in the wireless sensing device from the PHY layer or the MAC layer to the at least one higher layer through a MAC sublayer management entity (MLME) in the wireless sensing device based on the standard wireless network protocol and the wireless sensing measurement setup request; a processor configured to: obtain locally, at one of the at least one higher layer in the wireless sensing device, the plurality of sensing measurement results provided by the receiver from the PHY layer or the MAC layer through the MLME in the wireless sensing device based on the standard wireless network protocol, wherein the processor is communicatively coupled with the receiver, compute at least one motion information related to the object and the motion based on the plurality of sensing measurement results, and perform a sensing task related to the object to obtain a sensing task result based on the motion information and the plurality of sensing measurement results.

Clause E2. The wireless sensing device of clause E1, wherein the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard.

Clause E3. The wireless sensing device of clause E1, wherein: the sensing measurement results comprise a time series of channel information (CI) of the wireless channel; each CI of the time series of CI (TSCI) is obtained by the receiver based on a respective WSS; and each CI comprises at least one of: a channel state information (CSI), a channel impulse response (CIR), or a channel frequency response (CFR).

Clause E4. The wireless sensing device of clause E1, wherein the receiver further: obtains a configuration frame comprising the wireless sensing measurement setup request during a setup procedure associated with the wireless sensing measurements according to the standard wireless network protocol; and determines whether a configuration field of the configuration frame has a first bit pattern or a second bit pattern.

Clause E5. The wireless sensing device of clause E4, wherein: when the configuration field has the first bit pattern, the receiver is configured to report the sensing measurement results locally to the at least one higher layer in the wireless sensing device but not to any device other than the wireless sensing device, according to the standard wireless network protocol; and when the configuration field has the second bit patterns, the receiver is configured to report the sensing measurement results both locally to the at least one higher layer in the wireless sensing device and nonlocally to the sensing initiator device in the wireless data communication network other than the wireless sensing device, according to the standard wireless network protocol.

Clause E6. The wireless sensing device of clause E4, wherein: when the configuration field has the first bit pattern, the receiver is configured not to report the sensing measurement results to any device other than the wireless sensing device, according to the standard wireless network protocol.

Clause E7. The wireless sensing device of clause E4, wherein: the configuration frame is communicated based on the standard wireless network protocol during the setup procedure; and the setup procedure is performed before the plurality of wireless sensing measurements.

Clause E8. The wireless sensing device of clause E1, wherein: the sensing measurement results are configured by the sensing initiator device in the wireless data communication network to be reported locally in the wireless sensing device, to be reported nonlocally to the sensing initiator device, to be reported both locally and nonlocally, or not to be reported, by configuring the receiver based on the standard wireless network protocol using a configuration field of a configuration frame communicated during a setup procedure.

Clause E9. The wireless sensing device of clause E8, wherein: the receiver is configured, by the sensing initiator device based on the standard wireless network protocol during the setup procedure, to report the sensing measurement results locally in the wireless sensing device, to report the sensing measurement results nonlocally to the sensing initiator device, to report both locally and nonlocally, or not to report.

Clause E10. The wireless sensing device of clause E9, wherein: the configuration frame is communicated during a negotiation process between the sensing initiator device and the receiver based on the standard wireless network protocol.

Clause E11. The wireless sensing device of clause E3, wherein: each of the transmitter and the receiver is configured individually by a sensing initiator device in the wireless data communication network to perform the plurality of wireless sensing measurements collaboratively; the transmitter is configured by the sensing initiator device to function as a sensing transmitter device to send the TSWSS to the receiver; at least one configuration associated with the TSWSS is related to the sensing task; the receiver is configured by the sensing initiator device to function as a sensing receiver device to receive the TSWSS from the transmitter and to obtain the TSCI based on the received TSWSS; the receiver is configured, based on the standard wireless network protocol, whether to report the TSCI locally to the at least one higher layer in the wireless sensing device, or non-locally to another device in the wireless data communication network, or both; and at least one of the transmitter or the receiver functions as a sensing responder device associated with the sensing initiator device.

Clause E12. The wireless sensing device of clause E11, wherein the receiver is configured by the sensing initiator device based on the standard wireless network protocol to: process the TSCI in a first manner comprising a first precision reduction for reporting the TSCI locally; or process the TSCI in a second manner comprising a second precision reduction for reporting the TSCI non-locally.

Clause E13. The wireless sensing device of clause E12, wherein when reporting the TSCI non-locally: the receiver transmits each CI wirelessly to the sensing initiator device based on the standard wireless network protocol; and the reported TSCI is available non-locally at the sensing initiator device for a second sensing task.

Clause E14. The wireless sensing device of clause E13, wherein: the non-locally reported TSCI is available for at least one of: central computing or edge computing of the second sensing task at the sensing initiator device.

Clause E15. The wireless sensing device of clause E12, wherein when reporting the TSCI locally: the receiver makes each CI available locally at the at least one higher layer in the wireless sensing device for the sensing task.

Clause E16. The wireless sensing device of clause E15, wherein: the locally reported TSCI is available for at least one of: distributed computing or edge computing of the sensing task in the wireless sensing device.

Clause E17. The wireless sensing device of clause E11, wherein: a first CI of the TSCI is reported by the receiver both locally and non-locally.

Clause E18. The wireless sensing device of clause E11, wherein: a second CI of the TSCI is either not reported locally or not reported nonlocally by the receiver.

Clause E19. The wireless sensing device of clause E11, wherein: the sensing initiator device is an access-point (AP) device of the wireless data communication network; the transmitter is a client device of the wireless data communication network and functions as a sensing responder device; the receiver is the AP; the receiver reports the TSCI locally; and the locally reported TSCI is available at the AP for the sensing task.

Clause E20. The wireless sensing device of clause E19, wherein: the wireless sensing measurements are trigger-based (TB) using null data packet (NDP) frames and trigger frames (TF) based on the standard wireless network protocol.

Clause E21. The wireless sensing device of clause E19, further comprising at least one additional transmitter in the venue each configured by the sensing initiator device individually based on the standard wireless network protocol to function as a respective sensing transmitter device: wherein each respective additional transmitter is configured to transmit a respective TSWSS based on the standard wireless network protocol to the receiver; wherein the receiver: receives the respective TSWSS through the wireless channel based on the standard wireless network protocol, performs a plurality of respective wireless sensing measurements based on the respective received TSWSS to obtain a plurality of respective sensing measurement results based on the standard wireless network protocol, and provides the plurality of respective sensing measurement results locally to the at least one higher layer in the wireless sensing device; wherein the processor is configured to: obtain locally, at one of the at least one higher layer in the wireless sensing device, the plurality of respective sensing measurement results provided by the receiver from the PHY layer or the MAC layer in the wireless sensing device based on the standard wireless network protocol, wherein the respective locally-reported sensing measurement results are available locally for performing the sensing task in a centralized manner in the wireless sensing device based on the respective locally-reported TSCI, computing at least one respective motion information based on the plurality of respective sensing measurement results, and performing the sensing task based on all the motion information and all the sensing measurement results.

Clause E22. The wireless sensing device of clause E11, wherein: the sensing initiator device is an access-point device (AP) of the wireless data communication network; the transmitter is the AP; the receiver is a client device of the wireless data communication network and functions as a sensing responder device; the receiver reports the TSCI locally; and the locally reported TSCI is available at the client device for the sensing task.

Clause E23. The wireless sensing device of clause E22, wherein: the TSWSS is broadcasted from the transmitter to the receiver.

Clause E24. The wireless sensing device of clause E22, wherein: the wireless sensing measurements are trigger-based (TB) using null data packet (NDP) frames and NDP announcement (NDPA) frames based on the standard wireless network protocol.

Clause E25. The wireless sensing device of clause E22, further comprising at least one additional wireless sensing device in the venue each comprising a respective receiver and a respective processor with the respective receiver configured by the sensing initiator device individually based on the standard wireless network protocol to function as a respective sensing receiver device, wherein the transmitter transmits a respective TSWSS based on the standard wireless network protocol to each respective additional receiver; wherein each respective additional receiver: receives the respective TSWSS through the wireless channel based on the standard wireless network protocol, performs a plurality of respective wireless sensing measurements based on the respective received TSWSS to obtain a plurality of respective sensing measurement results based on the standard wireless network protocol, and provides the plurality of respective sensing measurement results locally to the at least one higher layer in the respective additional wireless sensing device; wherein each respective additional processor is configured to: obtain locally, at one of the at least one higher layer in the respective additional wireless sensing device, the plurality of respective sensing measurement results provided by the respective additional receiver from the PHY layer or the MAC layer in the respective additional wireless sensing device based on the standard wireless network protocol, wherein the respective additional processor is communicatively coupled with the respective additional receiver, wherein the plurality of respective locally-reported sensing measurement results are available locally for performing the sensing task in a de-centralized manner in the respective additional wireless sensing device based on the respective locally-reported sensing measurement results, compute at least one respective motion information based on the plurality of respective sensing measurement results, and perform a respective part of the sensing task based on the at least one respective motion information and the plurality of respective sensing measurement results.

Clause E26. The wireless sensing device of clause E11, wherein: the sensing initiator device is a client device of the wireless data communication network; the sensing responder device is an access-point device (AP) of the wireless data communication network; the transmitter is the client device; the receiver is the AP; the receiver reports the TSCI locally; and the locally reported TSCI is available at the AP for the sensing task.

Clause E27. The wireless sensing device of clause E11, wherein: the sensing initiator device is a client device of the wireless data communication network; the sensing responder device is an access-point device (AP) of the wireless data communication network; the transmitter is the AP; the receiver is the client device; the receiver reports the TSCI locally; and the locally reported TSCI is available at the client device for the sensing task.

Clause E28. The wireless sensing device of clause E11, wherein: the sensing initiator device is an access-point device (AP) of the wireless data communication network; a first client device of the wireless data communication network is a first sensing responder device; a second client device of the wireless data communication network is a second sensing responder device; the transmitter is the first client device; the receiver is the second client device; the receiver reports the TSCI locally; and the locally reported TSCI is available at the second client device for the sensing task.

Clause E29. A wireless sensing system, comprising: a sensing initiator device that transmits wirelessly a wireless sensing measurement setup request to a receiver of a wireless sensing device of the wireless sensing system requesting the receiver to function as a sensing receiver in a wireless sensing measurement procedure in accordance with a standard wireless network protocol to receive a time series of at least one wireless sounding signal (WSS) transmitted from a transmitter in a wireless data communication network through a wireless channel of a venue; the wireless sensing device comprising: the receiver that, in response to wirelessly receiving the wireless sensing measurement setup request: receives the time series of at least one WSS (TSWSS) based on the standard wireless network protocol and the wireless sensing measurement setup request through the wireless channel which is impacted by a motion of an object in the venue, performs a plurality of wireless sensing measurements based on the received TSWSS to obtain a plurality of sensing measurement results based on the standard wireless network protocol and the wireless sensing measurement setup request, wherein the received TSWSS differs from the transmitted TSWSS due to the wireless multipath channel and the motion of the object, wherein the wireless data communication network comprises a physical (PHY) layer, a medium access control (MAC) layer, and at least one higher layer in the wireless sensing device, and provides the plurality of sensing measurement results locally in the wireless sensing device from the PHY layer or the MAC layer through a MAC sublayer management entity (MLME) to the at least one higher layer in the wireless sensing device based on the standard wireless network protocol and the wireless sensing measurement setup request; and a processor configured to: obtain locally, at one of the at least one higher layer in the wireless sensing device, the plurality of sensing measurement results provided by the receiver from the PHY layer or the MAC layer through the MLME in the wireless sensing device based on the standard wireless network protocol and the wireless sensing measurement setup request, wherein the processor is communicatively coupled with the receiver, compute at least one motion information based on the plurality of sensing measurement results, and perform a sensing task to obtain a sensing task result based on the motion information and the plurality of sensing measurement results.

Clause E30. A method for wireless sensing, comprising: configuring, by a sensing initiator device based on a standard wireless network protocol, by transmitting wirelessly a wireless sensing measurement setup request to a receiver of a wireless sensing device requesting the receiver to function as a sensing receiver in a wireless sensing measurement procedure in accordance with the standard wireless network protocol to receive a time series of at least one wireless sounding signal (WSS) transmitted from a transmitter in a wireless data communication network through a wireless channel of a venue, wherein the receiver is configured by the sensing initiator device to: receive the time series of at least one WSS (TSWSS) based on the standard wireless network protocol and the wireless sensing measurement setup request through the wireless channel which is impacted by a motion of an object in the venue, perform a plurality of wireless sensing measurements based on the received TSWSS to obtain a plurality of sensing measurement results based on the standard wireless network protocol and the wireless sensing measurement setup request, wherein the received TSWSS differs from the transmitted TSWSS due to the wireless multipath channel and the motion of the object, wherein the wireless data communication network comprises a physical (PHY) layer, a medium access control (MAC) layer, and at least one higher layer in the wireless sensing device, and provide the plurality of sensing measurement results locally in the wireless sensing device from the PHY layer or the MAC layer through a MAC sublayer management entity (MLME) to the at least one higher layer in the wireless sensing device based on the standard wireless network protocol and the wireless sensing measurement setup request; obtaining locally by a processor of the wireless sensing device, at one of the at least one higher layer in the wireless sensing device, the plurality of sensing measurement results provided by the receiver from the PHY layer or the MAC layer in the wireless sensing device based on the standard wireless network protocol, wherein the processor is communicatively coupled with the receiver; computing at least one motion information based on the plurality of sensing measurement results; and performing a sensing task to obtain a sensing task result based on the motion information and the plurality of sensing measurement results.

In some embodiments, all of the sensing initiator device, sensing responder device, sensing transmitter device, sensing receiver device, SBP initiator device, SBP responder device (an AP) are compatible with or operate in accordance with a standard wireless network protocol such as, WiFi, IEEE 802, IEEE 802.11, and/or IEEE 802.11bf.

In some embodiments, a sensing initiator device may initiate a sensing session with (e.g. by sending a respective sensing request message/frame to) each of a plurality of sensing responder devices requesting some sensing responder device(s) to be/to function as sensing transmitter device(s) to transmit respective wireless sounding signal(s) (e.g. null-data packet/NDP; NDP may be triggered by NDP announcement/NDPA or trigger frame/TF), and some to be/to function as sensing receiving device(s) to receive some respective wireless sounding signal(s) from some respective sensing transmitter device.

In some embodiments, to start a sensing session with a sensing responder, sensing initiator may send a sensing session setup (or sensing measurement setup) request frame/message to the sensing responder. In response/reply, the sensing responder may send a sensing session setup (or sensing measurement setup) response frame/message to accept/decline. If the sensing responder accepts, sensing initiator may send one or more sensing measurement setup request message(s)/frame(s) to the sensing responder (e.g. to set up one or more sensing measurement(s)). In response/reply, the sensing responder may reply to agree/disagree with the sensing parameters associated with each sensing measurement setup request.

In some embodiments, to perform sensing measurements (e.g. based on a particular sensing measurement setup), sensing transmitter may transmit wireless sounding signals to sensing receivers (e.g. based on the sensing measurement parameters agreed in the particular sensing measurement setup). Upon receiving the wireless sounding signals, the sensing receivers may obtain/extract/compute sensing measurement results (e.g. channel information/CI, channel state info/CSI, channel impulse response/CIR, channel frequency response/CFR, RSSI, etc.) from/based on the received wireless sounding signals. The sensing receivers may report/provide/transmit/communicate/make available the sensing measurement results locally (e.g. via some MLME) to a "upper layer" or "higher layer" above the PHY/MAC layers (e.g. application layer) of the sensing receivers, or nonlocally in report(s)/report frame(s)/sensing measurement report frame(s)/packet(s)/message(s) to the sensing initiator.

In some embodiments, in the case of sensing-by-proxy (SBP, or proxy sensing), a device (acting in the role of/acting as "SBP initiator device" and/or proxy initiator) may perform/do SBP initiation handshake/protocol (standard compliant protocol) with an access-point (AP) device (acting in the role of/as "SBP responder device" and/or proxy responder). To initiate an SBP, the SBP initiator may send a SBP request message/frame to SBP responder device. SBP responder (AP device) may reply with SBP response/reply message/frame to SBP initiator. The AP device may agree to join the SBP and may, on behalf of the SBP initiator, initiate (as sensing initiator) sensing sessions and/or sensing measurements with a number of sensing responders (non-AP devices, as requested by SBP initiator). Some specific sensing responders may have been specifically requested by the SBP initiator (SBP initiator may have specified the MAC addresses of those specific sensing responders in the SBP request). Sensing measurement results obtained by non-AP sensing receivers (as sensing responder and sensing receiver) may be sent/reported locally to upper layers of the non-AP sensing receivers, or nonlocally to AP (sensing initiator) from the sensing receivers. Sensing measurements may also be obtained directly by the AP device (as sensing initiator and sensing receiver). The AP (as SBP responder) may collect some/any/all the measurement results, and transmit them (after packing/organizing/processing them into some SBP report frames) to the SBP initiator device. The AP may report them locally to an upper layer (above PHY/MAC layers) in the AP.

When providing/reporting/transmitting sensing measurement results locally or nonlocally, the sensing receivers (e.g. Type2 device), and/or the AP device (SBP responder/proxy responder) may transmit/provide/report/make available, in accordance with the standard, an auxiliary/supportive/relevant/associated information (e.g. a representation/state/setting/strength/parameter, an integer/index representing a gain/processing/filtering/operation) associated with the analog/digital signal demodulation/processing/operation path/pipeline (e.g. amplification) used by the sensing receiver to extract/obtain/generate sensing measurement results from the received wireless sounding signal (e.g. analog signal with certain modulation, NDP).

The recipient (e.g. sensing initiator/SBP responder/SBP initiator/proxy responder/proxy initiator in the case of SBP, or the upper layer above PHY/MAC in sensing receiver/sensing initiator/SBP responder/SBP initiator) may receive the sensing measurement results and/or the auxiliary information (e.g. SBP initiator, proxy initiator, server, etc.), process/reorganize/repackage/compress/transform/adjust/store them, and/or transmit/forward to another device/recipient.

Any recipient of the sensing measurement results and/or the auxiliary info (in any form) may use the auxiliary information and/or the sensing measurement results in a sensing task (e.g. motion/presence/breathing/heartbeat/vital sign/sleep/gait/gesture/movement/location/situation/event/ intrusion/danger/fall/object/people detection/estimation/ monitoring/localization/recognition/classification) to obtain sensing task results (e.g. breathing rate, heart rate, presence, absence, detected, not detected, etc.).

In one embodiment, the recipient or an associated device (e.g. cloud/edge/remote/local server) may use the sensing measurement results (e.g. CI/CSI/CIR/CFR/RSSI) to compute some spatial-temporal information (STI), motion information (MI), motion statistics (MS), motion data (MD) and/or analytics, and to perform a sensing task based on the STI/MI/MS/MD/analytics. The recipient may use the auxiliary/supportive/relevant/associated information to interpret/preprocess/process/modify/adjust/correct sensing measurement results and/or the STI/MI/MS/MD/analytics and/ or a state (e.g. system state, venue state, object state, motion state, processing state).

In an embodiment, the recipient may compare some current auxiliary information (e.g. in a current sliding window) with some previous auxiliary information (e.g. in a past sliding window), or compute a difference/distance/ change/similarity/dissimilarity between them (or some representative value of them). When the difference/distance/ change/similarity/dissimilarity exceeds some threshold(s) (e.g. instantaneously, or consistently for N consecutive times), the associated sensing measurement results or STI/ MI/MS/MD/analytics (e.g. in the corresponding sliding window) may be considered normal/abnormal/good/bad/trust-worthy/untrustworthy/valid/invalid/correct/erratic/ contaminated/qualified/disqualified/acceptable/ unacceptable.

In an embodiment, the recipient may use the auxiliary information to obtain/derive/compute/monitor/track a state (e.g. a state of a finite state machine) related to the wireless sensing task, such as a state of the object, a state of the object motion/activity, a state of the venue, an operating point of the system, an operating point of the object, an operating point of the object motion/activity, a parameter/setting of the system, a parameter/setting of the object, a parameter/setting of the object motion/activity, a strength, a strength of the system, a strength of the object, a strength of the object motion/activity, a change of state, a change of operating point, a change of parameter/setting, and/or a change of strength.

The recipient may use auxiliary information (e.g. the object state/parameter/setting/strength, motion state/parameter/setting/strength, activity state/parameter/setting/ strength, venue state/parameter/setting/strength, system state/parameter/setting/strength, or change of state/parameter/setting/strength) in a wireless sensing task performed based on the sensing measurement results (e.g. CI/CSI/CIR/ CFR/RSSI).

Sensing receiver may provide a report (e.g. in the form of a report frame or a report message, or in the form of data transferred from PHY/MAC layer to upper layer via a MLME) comprising (a) sensing measurement results (e.g. CI/CSI/CIR/CFR/RSSI), and/or (b) auxiliary information (info of a processing operation (e.g. demodulation, MIMO, OFDM, OFDMA, EDCA, MU-MIMO, QAM, heterodyne, super-heterodyne, amplification, compensation, correction, distortion, quantization, state of operation, bandwidth, frequency hopping, carrier frequency, sub-carrier, subcarrier count, etc.) of/on the received wireless sounding signal (2.4 GHz/5 GHz/6 GHz/28 GHz/60 GHz, modulated signal in analog domain carrying digital information) used to generate the sensing measurement results).

In some embodiments, a proxy initiator device (e.g. SBP initiator) may send a proxy sensing request message (e.g. SBP request frame) to a proxy responder device (e.g. SBP responder which may be an AP) to request the proxy responder device to perform wireless sensing (e.g. WLAN/ WiFi sensing, WLAN/WiFi sensing procedure(s)) on its behalf.

In some embodiments, the proxy sensing request message/frame may require the proxy responder to function as sensing initiator device to find/identify/engage a number of sensing responder devices. For example, the proxy sensing request message/frame may specify: a) an amount/a count of the number of sensing responders to be found/identified/ engage; b) whether the amount/count is compulsory/mandatory, or not; c) a list of selected (or particular, or requested, or identified, or preferred) sensing responder devices with corresponding identity/ID (e.g. MAC address) to be approached/engaged.

The ID of the selected sensing responders are specified in a first field in the proxy sensing request message/frame; d) whether the list of selected sensing responders is present in the first field, or not; e) a count of the ID of selected sensing responder specified in the first field.

In some embodiments, the proxy sensing request message/frame may specify/request that the sensing responders (e.g. all of them, or some of them) are to perform wireless sensing measurements according to a set of sensing measurement parameters (e.g. roles of sensing responders to be sensing transmitter (to transmit wireless sounding signals, such as null-data packet/NDP), or sensing receiver (to receive wireless sounding signals and to obtain/report sensing measurement results from received wireless sounding signals), or both; reporting to proxy initiator via sensing initiator (i.e. proxy responder) required, or not; required bandwidth). The proxy responder may be an access point (AP). All the sensing responders may function as sensing receiver devices. Alternatively, all the sensing responder may function as sensing transmitters. Trigger-based (TB) sensing/sounding may be used. Trigger frame (TF) may be transmitted (downlink) from the AP to non-AP sensing transmitter devices trigger them to transmit (uplink) wireless sounding signals (NDP), which would be received by the AP. The AP may then perform wireless sensing measurements to obtain sensing measurement results (e.g. channel information/CI, channel state info/CSI, channel impulse response/CIR, channel frequency response/CFR) based on the received wireless sounding signals. NDP announcement frame (NDPA) may be transmitted (downlink) from the AP to non-AP sensing receivers, followed by wireless sounding signals (NDP) being transmitted (downlink) from the AP to the non-AP sensing receivers. The non-AP sensing receivers may then perform wireless sensing measurements to obtain sensing measurement results (e.g. CI, CSI, CIR, CFR) based on the received wireless sounding signals.

In some embodiments, all sensing responders may be requested to be sensing transmitters. They may send respective wireless sounding signals to the respective sensing receivers. The proxy responder or sensing initiator or AP may function also as sensing receiver for all the sensing transmitters. TB sensing may be performed using TF (downlink) followed by NDP (uplink).

In some embodiments, all sensing responders may be requested to be sensing receivers. They may send respective wireless sounding signals from respective sensing transmitters. The proxy responder or sensing initiator or AP may function also as sensing transmitter for all the sensing receivers. TB sensing may be performed using NDPA (downlink) followed by NDP (downlink).

In some embodiments, any sensing receiver may perform wireless sensing measurements to obtain sensing measurement results (e.g. CI, CSI, CIR, CFR) from the received wireless sounding signals. It may report the sensing measurement results locally from PHY/MAC layer to an upper layer where a sensing task (e.g. motion/presence/breathing/ heartbeat/sleep/gesture/gait/activity/ADL/event/fall-down/ location detection/estimation/recognition/classification/localization) may be performed to obtain sensing task results based on the sensing measurement results. It may report the sensing measurement results nonlocally from the sensing receiver to proxy initiator device (e.g. via sensing initiator/ proxy responder) where a sensing task may be performed to obtain sensing task results based on the sensing measurement results. It may report the sensing measurement results both locally and nonlocally.

In some embodiments, when reporting the sensing measurement results, the sensing receiver may report also an information associated with some processing/operation used by the sensing receiver to obtain the sensing measurement results from the received wireless signals. The information associated with the processing/operation may be associated with one or more receiving antenna and associated receiving circuitry of the sensing receiver. The information may be an integer. It may be a non-negative integer between a lower bound and an upper bound, resembling an index. The processing/operation may comprise an amplification and the information may be a representation of a gain factor associated with the amplification. The information may be a representation of an operation, a state of the operation or an operating point of the operation.

The following numbered clauses provide examples for standardized proxy wireless sensing.

Clause F1. A standardized proxy wireless sensing method, comprising: wirelessly transmitting a proxy sensing request message by a proxy initiator device to a proxy responder device based on a standard wireless network protocol to request the proxy responder device to, as a proxy of the proxy initiator device, perform wireless sensing on its behalf, wherein the proxy responder device is requested to perform the wireless sensing by functioning as a sensing initiator device to initiate sensing sessions with a plurality of sensing responder devices comprising a selected sensing responder device based on the standard wireless network protocol to perform wireless sensing measurements to obtain sensing measurement results based on wireless sounding signals communicated among the sensing initiator device and the plurality of sensing responder devices, wherein the selected sensing responder device is requested in the proxy sensing request message; in response to the proxy sensing request message, initiating a sensing session by the proxy responder device with the selected sensing responder device to perform wireless sensing measurements to obtain sensing measurement results based on wireless sounding signals communicated by the selected sensing responder device.

In some embodiments, ID of the selected/requested sensing responder device may be specified in a first field of the proxy sensing request message.

Clause F2. The standardized proxy wireless sensing method of clause F1, further comprising: specifying an identity (ID) of the requested selected sensing responder device in a first field of the proxy sensing request message by the proxy initiator device.

In some embodiments, there may be a third field of the proxy sensing request message to specify the presence of the ID of the selected/requested sensing responder device in the first field of the proxy sensing request message.

Clause F3. The standardized proxy wireless sensing method of clause F2, further comprising: using a first bit pattern of a third field in the proxy sensing request message to specify the presence of the ID of the requested selected sensing responder device in the proxy sensing request message; and using a second bit pattern of the third field in the proxy sensing request message to specify the absence of the ID of the requested selected sensing responder device in the proxy sensing request message.

In some embodiments, some possible ID that may be used to specify the selected sensing responder device, e.g. MAC address.

Clause F4. The standardized proxy wireless sensing method of clause F2, further comprising: wherein the ID of the selected sensing responder device comprises one of: a medium access control (MAC) address, a network address, a network ID, an internet protocol (IP) address, a multicast ID, an ID in a network associated with the proxy responder device, a name, an identifying number, an alphanumeric ID, a representation, a device ID, a device name, a device product name, a host name, a client name, a vendor ID, a vendor class ID, a serial number, a host ID, a client ID, UUID, or GUID.

In some embodiments, there may be more than one selected sensing responder devices requested in the proxy sensing request message. A respective sensing session may be established between the sensing initiator (proxy responder) and each of the selected sensing responder. Respective wireless sensing measurements may be performed to obtain respective sensing measurement results based on respective received wireless sounding signals communicated (transmitted, or received, or both) by the respective selected sensing responder.

Clause F5. The standardized proxy wireless sensing method of clause F1, further comprising: wherein the plurality of sensing responder devices comprise a number of selected sensing responder devices; wherein the number of selected sensing responder devices are requested in the proxy sensing request message; in response to the proxy sensing request message, initiating a respective sensing session by the proxy responder device with each of the number of selected sensing responder devices to perform respective wireless sensing measurements to obtain respective sensing measurement results based on respective wireless sounding signals communicated by the respective selected sensing responder device.

In some embodiments, more than one ID of the more than one selected sensing responder devices may be specified in some field in the proxy sensing request message.

Clause F6. The standardized proxy wireless sensing method of clause F5, further comprising: specifying a plurality of identity (ID) in a first field of the proxy sensing request message by the proxy initiator device, the plurality of ID comprising the ID of each of the number of requested selected sensing responder devices.

In some embodiments, a count of the more than one ID (or a count of the more than one selected sensing responder devices) may be specified in another field in the proxy sensing request message.

Clause F7. The standardized proxy wireless sensing method of clause F6, further comprising: specifying an amount of the plurality of ID in a second field of the proxy sensing request message by the proxy initiator device, wherein the amount is not less than a count of the number of selected sensing responder devices.

In some embodiments, a presence (or absence) of the more than one ID and the count of them may be specified in yet another field in the proxy sensing request message.

Clause F8. The standardized proxy wireless sensing method of clause F7, further comprising: using a first bit pattern of a third field in the proxy sensing request message to specify the presence of both (a) the plurality of ID in the first field comprising the ID of the number of requested selected sensing responder devices and (b) the amount in the second field, in the proxy sensing request message; using a second bit pattern of the third field in the proxy sensing request message to specify the absence of both (a) the plurality of ID in the first field comprising the ID of the number of requested selected sensing responder devices and (b) the amount in the second field in the proxy sensing request message.

In some embodiments, in response to the received proxy sensing request message, the proxy responder device may send a reply or a proxy sensing response message to confirm the wireless sensing to be performed/done by the proxy responder device with the plurality of sensing responder devices comprising the one or more requested/selected sensing responder devices on behalf of the proxy initiator device (as a proxy of the proxy initiator device). The reply may confirm that the selected sensing responder device can take part in the "proxy" wireless sensing. The case considered in clause F9 is when there is ONE selected sensing responder.

Clause F9. The standardized proxy wireless sensing method of clause F1, further comprising: in response to the proxy sensing request message, wirelessly transmitting a proxy sensing response message by the proxy responder device to the proxy initiator device, using a first bit pattern in a first field of the proxy sensing response message to confirm that the proxy responder device will function as the sensing initiator device to initiate sensing sessions with a plurality of sensing responder devices comprising the selected sensing responder device requested in the proxy sensing request message based on the standard wireless network protocol to perform wireless sensing measurements to obtain sensing measurement results based on wireless sounding signals communicated among the sensing initiator device and the plurality of sensing responder devices.

In some embodiments, upon receiving the proxy sensing request message from the proxy initiator device, the proxy responder device may send a sensing measurement setup request frame to the selected sensing responder device in an attempt to initiate a sensing session with it. In response to the sensing measurement setup request frame, the selected sensing responder device may send a reply or a sensing measurement setup response frame to the proxy responder device to agree. Upon receiving the "agree" in the sensing measurement setup response frame, the proxy responder may send a reply (or a proxy sensing setup response message/frame) to the proxy initiator device to confirm that the selected sensing responder will be included in the wireless sensing as requested.

Clause F10. The standardized proxy wireless sensing method of clause F9, further comprising: In response to the proxy sensing request message, wirelessly transmitting a sensing measurement setup request message to the selected sensing responder device requested in the proxy sensing request message by the proxy responder device using a third bit pattern in a third field in the sensing measurement setup request message to request to start a sensing session to perform wireless sensing measurements; In response to the sensing measurement setup request message, wirelessly transmitting a sensing measurement setup response message by the selected sensing responder device to the proxy responder device using a fourth bit pattern of a fourth field of the sensing measurement setup response message to agree to start the sensing session to perform wireless sensing measurements; In response to the proxy sensing request message and the sensing measurement setup response message, wirelessly transmitting the proxy sensing response message with the first bit pattern in the first field by the proxy responder device to the proxy initiator device.

In some embodiments, the reply may confirm that the selected sensing responder device cannot take part in the "proxy" wireless sensing, and the "proxy" wireless sensing will be performed without the selected sensing responder device.

Clause F11. The standardized proxy wireless sensing method of clause F1, further comprising: In response to the proxy sensing request message, wirelessly transmitting a proxy sensing response message by the proxy responder device to the proxy initiator device, using a second bit pattern in the first field of the proxy sensing response message to confirm that the proxy responder device will function as the sensing initiator device to initiate sensing sessions with a plurality of sensing responder devices without the selected sensing responder device requested in the proxy sensing request message based on the standard wireless network protocol to perform wireless sensing measurements to obtain sensing measurement results based on wireless sounding signals communicated among the sensing initiator device and the plurality of sensing responder devices.

In some embodiments, upon receiving the proxy sensing request message/frame from the proxy initiator device, the proxy responder device may send a sensing measurement setup request frame to the selected sensing responder device in an attempt to initiate a sensing session with it. In response to the sensing measurement setup request message/frame, the selected sensing responder device may send a reply or a sensing measurement setup response frame to the proxy responder device to decline. Upon receiving the "decline" in the sensing measurement setup response frame, the proxy responder may send a reply (or a proxy sensing setup response message/frame) to the proxy initiator device to confirm that the selected sensing responder will not be included in the wireless sensing as requested.

Clause F12. The standardized proxy wireless sensing method of clause F11, further comprising: in response to the proxy sensing request message, wirelessly transmitting a sensing measurement setup request message to the selected sensing responder device requested in the proxy sensing request message by the proxy responder device, using a third bit pattern in a third field in the sensing measurement setup request message to request to start a sensing session to perform wireless sensing measurements; in response to the sensing measurement setup request message, wirelessly transmitting a sensing measurement setup response message by the selected sensing responder device to the proxy responder device using a fifth bit pattern in a fourth field to decline the request to start a sensing session to perform wireless sensing measurements; and in response to the proxy sensing request message and the sensing measurement setup response message, wirelessly transmitting the proxy sensing response message with the second bit pattern in the first field by the proxy responder device to the proxy initiator device to indicate that the selected sensing responder device will not perform the wireless sensing measurements.

In some embodiments, a sensing measurement parameter may be specified in the sensing measurement setup request message sent by the proxy responder (sensing initiator) device to the selected sensing responder device. The selected sensing responder device may perform the wireless sensing measurements based on the sensing measurement parameter.

Clause F13. The standardized proxy wireless sensing method of clause F10, further comprising: specifying a sensing measurement parameter in a sixth bit pattern in a sixth field in the sensing measurement setup request message by the proxy responder device; performing the wireless sensing measurements based on the standard wireless network protocol according to the sensing measurement parameter by the selected sensing responder device based on wireless sounding signals communicated by the selected sensing responder device.

In some embodiments, a quantity (e.g. a requested parameter) related to the sensing measurement parameter may be specified in the proxy sensing setup request message.

Clause F14. The standardized proxy wireless sensing method of clause F13, further comprising: specifying a requested parameter related to the sensing measurement parameter by the proxy initiator device in the proxy sensing request message.

In some embodiments, the quantity (e.g. the requested parameter) may be equal to or equivalent to the sensing measurement parameter.

Clause F15. The standardized proxy wireless sensing method/system/device/software of clause F14, further comprising: wherein the requested parameter in the proxy sensing request message is equivalent to the sensing measurement parameter in the sensing measurement setup request message.

In some embodiments, selected sensing responder device may be configured to be a sensing transmitter.

Clause F16. The standardized proxy wireless sensing method of clause F13, further comprising: performing the wireless sensing measurements based on the standard wireless network protocol by: functioning as a sensing transmitter device by the selected sensing responder device according to the sensing measurement parameter, transmitting wireless sounding signals by the selected sensing responder device to a sensing receiver device in the plurality of sensing responder devices, and generating sensing measurement results by the sensing receiver device based on the received wireless sounding signals.

In some embodiments, proxy initiator device may perform a sensing task (to obtain sensing results) based on sensing measurement results provided by the sensing receiver device via the proxy responder device to the proxy initiator device.

Clause F17. The standardized proxy wireless sensing method of clause F16, further comprising: obtaining by the proxy initiator device the sensing measurement results provided by the sensing receiver device via the proxy responder device to the proxy initiator device based on the standard wireless network protocol; performing a sensing task to produce a sensing task result by the proxy initiator device based on the obtained sensing measurement results.

In some embodiments, selected sensing responder device may be configured to be a sensing receiver.

Clause F18. The standardized proxy wireless sensing method of clause F13, further comprising: performing the wireless sensing measurements based on the standard wireless network protocol by: functioning as a sensing receiver device by the selected sensing responder device according to the sensing measurement parameter, receiving wireless sounding signals from a sensing transmitter device in the plurality of sensing responder devices by the selected sensing responder device, and generating sensing measurement results by the selected sensing responder device based on the received wireless sounding signals.

In some embodiments, sensing measurement results (e.g. CI, CIR, CFR, CSI) may be reported/provided locally in/by the selected sensing responder device from PHY/MAC layer to upper layer.

Clause F19. The standardized proxy wireless sensing method of clause F18, further comprising: performing the wireless sensing measurements further by: providing the sensing measurement results locally by the selected sensing responder device from either the physical (PHY) layer or the medium access control (MAC) layer of the selected sensing responder device to at least one higher layer of the selected sensing responder device.

In some embodiments, selected sensing responder device may perform a sensing task (to obtain sensing results) in the upper layer based on sensing measurement results provided/reported locally.

Clause F20. The standardized proxy wireless sensing method of clause F19, further comprising: performing a sensing task to produce a sensing task result in the at least one higher layer of the selected sensing responder device based on the sensing measurement results provided locally by either the PHY layer or MAC layer of the selected sensing responder device.

In some embodiments, sensing measurement results (e.g. CI, CIR, CFR, CSI) may be reported non-locally by the selected sensing responder device to the proxy responder device, and then reported by the proxy responder device to the proxy initiator device.

Clause F21. The standardized proxy wireless sensing method of clause F18, further comprising: performing the wireless sensing measurements further by: providing the sensing measurement results non-locally by the selected sensing responder device by wirelessly reporting the sensing measurement results to the proxy responder device according to the standard wireless network protocol, and providing the sensing measurement results wirelessly by the proxy responder device to the proxy initiator device according to the standard wireless network protocol.

In some embodiments, proxy initiator device may perform a sensing task (to obtain sensing results) based on sensing measurement results provided by the selected sensing responder device via the proxy responder device to the proxy initiator device.

Clause F22. The standardized proxy wireless sensing method of clause F21, further comprising: obtaining by the proxy initiator device the sensing measurement results provided by the selected sensing responder device via the proxy responder device to the proxy initiator device; performing a sensing task to produce a sensing task result by the proxy initiator device based on the obtained sensing measurement results.

In some embodiments, the proxy responder device may be an access-point (AP) device. The sensing measurement may comprise: CI, CSI, CIR, CFR.

Clause F23. The standardized proxy wireless sensing method of clause F1, further comprising: wherein the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard; wherein the proxy responder device is an access point device; wherein the sensing measurement results comprise a plurality of channel information (CI) of wireless channels associated with the standard wireless network protocol and the wireless sounding signals (WSS), each CI comprising at least one of: a channel state information (CSI), a channel impulse response (CIR), or a channel frequency response (CFR) obtained based on a respective WSS.

In some embodiments, the proxy responder (i.e. sensing initiator) device may establish sensing session with each of them.

Clause F24. A standardized proxy wireless sensing system, comprising: a proxy initiator device configured to wirelessly transmitting a proxy sensing request message to a proxy responder device based on a standard wireless network protocol to request the proxy responder device to, as a proxy of the proxy initiator device, perform wireless sensing on its behalf, wherein the proxy responder device is requested to perform the wireless sensing by functioning as a sensing initiator device to initiate sensing sessions with a plurality of sensing responder devices comprising a number of selected sensing responder devices based on the standard wireless network protocol to perform wireless sensing measurements to obtain sensing measurement results based on wireless sounding signals communicated among the sensing initiator device and the plurality of sensing responder devices, wherein the number of selected sensing responder devices are requested in the proxy sensing request message; the proxy responder device configured to, in response to the proxy sensing request message, initiate a respective sensing session with each of the number of selected sensing responder devices to perform respective wireless sensing measurements to obtain respective sensing measurement results based on respective wireless sounding signals communicated by the respective selected sensing responder device; and the number of selected sensing responder devices.

In some embodiments, with "a number of" (or a plurality of) selected sensing responder devices, their ID, a count/amount of them and the presence of the ID and the count/amount are specified in the proxy sensing request message.

Clause F25. The standardized proxy wireless sensing system of clause F24, wherein: a plurality of identity (ID) is specified in a first field of the proxy sensing request message by the proxy initiator device, the plurality of ID comprising the ID of each of the number of requested selected sensing responder devices; an amount of the plurality of ID is specified in a second field of the proxy sensing request message by the proxy initiator device, wherein the amount is not less than a count of the number of selected sensing responder devices; a first bit pattern of a third field in the proxy sensing request message is used to specify the presence of both (a) the plurality of ID in the first field comprising the ID of the number of requested selected sensing responder devices and (b) the amount in the second field, in the proxy sensing request message; a second bit pattern of the third field in the proxy sensing request message is used to specify the absence of both (a) the plurality of ID in the first field comprising the ID of the number of requested selected sensing responder devices and (b) the amount in the second field in the proxy sensing request message.

In some embodiments, proxy responder may send a reply to confirm that a particular selected sensing responder device can be included in the wireless sensing. Upon receiving the proxy sensing request message, the proxy responder may send sensing measurement setup request frame to the particular selected sensing responder device. In response, the particular selected sensing responder device may send a sensing measurement setup response frame to accept. Upon receiving the "accept", the proxy responder device may send a proxy sensing setup response message to confirm that the particular selected sensing responder device can join the wireless sensing.

Clause F26. The standardized proxy wireless sensing system of clause F24, wherein: in response to the proxy sensing request message, a proxy sensing response message is wirelessly transmitted by the proxy responder device to the proxy initiator device, using a first bit pattern in a first field of the proxy sensing response message to confirm that the proxy responder device will function as the sensing initiator device to initiate sensing sessions with a plurality of sensing responder devices comprising a particular selected sensing responder device requested in the proxy sensing request message based on the standard wireless network protocol to perform wireless sensing measurements to obtain sensing measurement results based on wireless sounding signals communicated among the sensing initiator device and the plurality of sensing responder devices.

In response to the proxy sensing request message, a sensing measurement setup request message is wirelessly transmitted to the particular selected sensing responder device requested in the proxy sensing request message by the proxy responder device using a third bit pattern in a third field in the sensing measurement setup request message to request to start a sensing session to perform wireless sensing measurements; In response to the sensing measurement setup request message, a sensing measurement setup response message is wirelessly transmitted by the particular selected sensing responder device to the proxy responder device using a fourth bit pattern of a fourth field of the message to agree to start the sensing session to perform wireless sensing measurements; In response to the proxy sensing request message and the sensing measurement setup response message from the particular selected sensing responder device, wirelessly transmitting the proxy sensing response message with the first bit pattern in the first field by the proxy responder device to the proxy initiator device.

In some embodiments, a sensing measurement parameter may be specified by proxy initiator device in the proxy sensing setup request message. The sensing measurement parameter may be specified by the proxy responder device in the sensing measurement setup request frame. The particular selected sensing responder may perform the wireless sensing measurement to obtain the sensing measurement results in accordance with the sensing measurement parameter.

Clause F27. The standardized proxy wireless sensing system of clause F26, wherein: a sensing measurement parameter is specified in a sixth bit pattern in a sixth field in the sensing measurement setup request message by the proxy responder device; performing the wireless sensing measurements based on the standard wireless network protocol according to the sensing measurement parameter by the particular selected sensing responder device based on wireless sounding signals communicated by the particular selected sensing responder device; specifying a requested parameter related to the sensing measurement parameter by the proxy initiator device in the proxy sensing request message, wherein the requested parameter in the proxy sensing request message is equivalent to the sensing measurement parameter in the sensing measurement setup request message.

In some embodiments, it may receive the wireless sounding signal from a sensing transmitter, perform wireless sensing measurement to obtain sensing measurement results (e.g. CI, CSI, CIR, CFR) from the received wireless sounding signal and provide the result locally. A sensing task is then performed to obtain sensing task results based on the sensing measurement results.

Clause F28. The standardized proxy wireless sensing system of clause F27, wherein: the wireless sensing measurements are performed based on the standard wireless network protocol by: functioning as a sensing receiver device by the particular selected sensing responder device according to the sensing measurement parameter, receiving wireless sounding signals from a sensing transmitter device in the plurality of sensing responder devices by the particular selected sensing responder device, and generating sensing measurement results by the particular selected sensing responder device based on the received wireless sounding signals, and providing the sensing measurement results by the particular selected sensing responder device locally from either the physical (PHY) layer or the medium access control (MAC) layer of the particular selected sensing responder device to at least one higher layer of the particular selected sensing responder device, or non-locally from the particular selected sensing responder device via the proxy responder device to the proxy initiator device; a sensing task is performed to produce a sensing task result based on the sensing measurement results provided by the particular selected sensing responder device.

Clause F29. A proxy responder device of a standardized proxy wireless sensing system, configured to: wirelessly receive a proxy sensing request message from a proxy initiator device based on a standard wireless network protocol requesting the proxy responder device to, as a proxy of the proxy initiator device, perform wireless sensing on its behalf, wherein the proxy responder device is requested to perform the wireless sensing by functioning as a sensing initiator device to initiate sensing sessions with a plurality of sensing responder devices comprising a number of selected sensing responder devices based on the standard wireless network protocol to perform wireless sensing measurements to obtain sensing measurement results based on wireless sounding signals communicated among the sensing initiator device and the plurality of sensing responder devices, wherein the number of selected sensing responder devices are requested in the proxy sensing request message; and in response to the proxy sensing request message, initiate a sensing session with each of the number of selected sensing responder devices to perform wireless sensing measurements to obtain sensing measurement results based on wireless sounding signals communicated by the selected sensing responder device.

Clause F30. The proxy responder device of a standardized proxy wireless sensing system of clause F29, wherein: a plurality of identity (ID) is specified in a first field of the proxy sensing request message by the proxy initiator device, the plurality of ID comprising the ID of each of the number of requested selected sensing responder devices; an amount of the plurality of ID is specified in a second field of the proxy sensing request message by the proxy initiator device, wherein the amount is not less than a count of the number of selected sensing responder devices; a first bit pattern of a third field in the proxy sensing request message is used to specify the presence of both (a) the plurality of ID in the first field comprising the ID of the number of requested selected sensing responder devices and (b) the amount in the second field, in the proxy sensing request message; a second bit pattern of the third field in the proxy sensing request message is used to specify the absence of both (a) the plurality of ID in the first field comprising the ID of the number of requested selected sensing responder devices and (b) the amount in the second field in the proxy sensing request message.

The following numbered clauses provide examples for standardized proxy wireless sensing.

Clause G1. A standardized proxy wireless sensing method, comprising: using standardized proxy wireless sensing to indirectly cause wireless sensing measurements to be performed by a selected sensing device to obtain sensing measurement results based on wireless sounding signals communicated by the selected sensing device; wirelessly transmitting a proxy sensing request message by a proxy initiator device to a proxy responder device based on a standard wireless network protocol to request the proxy responder device to, as a proxy of the proxy initiator device, perform wireless sensing on its behalf wherein the proxy responder device is requested to perform the wireless sensing by functioning as a sensing initiator device to initiate sensing sessions with a plurality of sensing responder devices comprising the selected sensing device based on the standard wireless network protocol to perform wireless sensing measurements to obtain sensing measurement results based on wireless sounding signals communicated among the sensing initiator device and the plurality of sensing responder devices, wherein the selected sensing device is requested in the proxy sensing request message; in response to the proxy sensing request message, initiating a sensing session by the proxy responder device with the selected sensing device to perform wireless sensing measurements to obtain sensing measurement results based on wireless sounding signals communicated by the selected sensing device; performing a sensing task to produce a sensing task result by at least one processor based on the sensing measurement results obtained from the wireless sensing measurements performed by the selected sensing device.

In some embodiments, ID of the selected/requested sensing responder device may be specified in a first field of the proxy sensing request message.

Clause G2. The standardized proxy wireless sensing method of clause G1, further comprising: specifying an identity (ID) of the requested selected sensing device in a first field of the proxy sensing request message by the proxy initiator device.

In some embodiments, there may be a third field of the proxy sensing request message to specify the presence of the ID of the selected/requested sensing responder device in the first field of the proxy sensing request message.

Clause G3. The standardized proxy wireless sensing method of clause G2, further comprising: using a first bit pattern of a third field in the proxy sensing request message to specify the presence of the ID of the requested selected sensing device in the proxy sensing request message; and using a second bit pattern of the third field in the proxy sensing request message to specify the absence of the ID of the requested selected sensing device in the proxy sensing request message.

In some embodiments, some possible ID that may be used to specify the selected sensing responder device, e.g. MAC address.

Clause G4. The standardized proxy wireless sensing method of clause G2, further comprising: wherein the ID of the selected sensing device comprises one of: a medium access control (MAC) address, a network address, a network ID, an internet protocol (IP) address, a multicast ID, an ID in a network associated with the proxy responder device, a name, an identifying number, an alphanumeric ID, a representation, a device ID, a device name, a device product name, a host name, a client name, a vendor ID, a vendor class ID, a serial number, a host ID, a client ID, UUID, or GUID.

In some embodiments, there may be more than one selected sensing responder devices requested in the proxy sensing request message. A respective sensing session may be established between the sensing initiator (proxy responder) and each of the selected sensing responder. Respective wireless sensing measurements may be performed to obtain respective sensing measurement results based on respective received wireless sounding signals communicated (transmitted, or received, or both) by the respective selected sensing responder.

Clause G5. The standardized proxy wireless sensing method of clause G1, further comprising: indirectly causing wireless sensing measurements to be performed by a number of selected sensing devices to obtain sensing measurement results based on wireless sounding signals communicated by the number of selected sensing devices; wirelessly transmitting the proxy sensing request message by the proxy initiator device to the proxy responder device based on the standard wireless network protocol to request the proxy responder device to function as a sensing initiator device to initiate sensing sessions with a plurality of sensing responder devices comprising the number of selected sensing devices based on the standard wireless network protocol to perform wireless sensing measurements to obtain sensing measurement results based on wireless sounding signals communicated among the sensing initiator device and the plurality of sensing responder devices, wherein the number of selected sensing devices are requested in the proxy sensing request message; in response to the proxy sensing request message, initiating a respective sensing session by the proxy responder device with each of the number of selected sensing devices to perform respective wireless sensing measurements to obtain respective sensing measurement results based on respective wireless sounding signals communicated by the respective selected sensing device; performing a sensing task to obtain a sensing task result by the processor based on the sensing measurement results obtained from the wireless sensing measurements performed by the number of selected sensing devices.

In some embodiments, more than one ID of the more than one selected sensing responder devices may be specified in some field in the proxy sensing request message.

Clause G6. The standardized proxy wireless sensing method of clause G5, further comprising: specifying a plurality of identity (ID) in a first field of the proxy sensing request message by the proxy initiator device, the plurality of ID comprising the ID of each of the number of requested selected sensing devices.

In some embodiments, a count of the more than one ID (or a count of the more than one selected sensing responder devices) may be specified in another field in the proxy sensing request message.

Clause G7. The standardized proxy wireless sensing method of clause G6, further comprising: specifying an amount of the plurality of ID in a second field of the proxy sensing request message by the proxy initiator device, wherein the amount is not less than a count of the number of selected sensing devices.

In some embodiments, a presence (or absence) of the more than one ID and the count of them may be specified in yet another field in the proxy sensing request message.

Clause G8. The standardized proxy wireless sensing method of clause G7, further comprising: using a first bit pattern of a third field in the proxy sensing request message to specify the presence of both (a) the plurality of ID in the first field comprising the ID of the number of requested selected sensing devices and (b) the amount in the second field, in the proxy sensing request message; using a second bit pattern of the third field in the proxy sensing request message to specify the absence of both (a) the plurality of ID in the first field comprising the ID of the number of requested selected sensing devices and (b) the amount in the second field in the proxy sensing request message.

In some embodiments, in response to the received proxy sensing request message, the proxy responder device may send a reply or a proxy sensing response message to confirm the wireless sensing to be performed/done by the proxy responder device with the plurality of sensing responder devices comprising the one or more requested/selected sensing responder devices on behalf of the proxy initiator device (as a proxy of the proxy initiator device). The reply may confirm that the selected sensing responder device can take part in the "proxy" wireless sensing. The case considered in clause G9 is when there are a number of selected sensing responders.

Clause G9. The standardized proxy wireless sensing method of clause G8, further comprising: in response to the proxy sensing request message, wirelessly transmitting a proxy sensing response message by the proxy responder device to the proxy initiator device, using a first bit pattern in a first field of the proxy sensing response message to confirm that the proxy responder device will function as the sensing initiator device to initiate sensing sessions with a plurality of sensing responder devices comprising the number of selected sensing devices requested in the proxy sensing request message based on the standard wireless network protocol to perform wireless sensing measurements to obtain sensing measurement results based on wireless sounding signals communicated among the sensing initiator device and the plurality of sensing responder devices.

In some embodiments, upon receiving the proxy sensing request message from the proxy initiator device, the proxy responder device may send a respective sensing measurement setup request frame to each of the number of selected sensing responder device in an attempt to initiate a respective sensing session with it. In response to the respective sensing measurement setup request frame, the respective selected sensing responder device may send a respective reply or a respective sensing measurement setup response frame to the proxy responder device to agree. Upon receiving the "agree" in the respective sensing measurement setup response frame, the proxy responder may send a reply (or a proxy sensing setup response message/frame) to the proxy initiator device to confirm that the number of selected sensing responder devices will be included in the wireless sensing as requested.

Clause G10. The standardized proxy wireless sensing method of clause G9, further comprising: in response to the proxy sensing request message, wirelessly transmitting a respective sensing measurement setup request message to each of the number of selected sensing devices requested in the proxy sensing request message by the proxy responder device using a respective third bit pattern in a respective third field in the respective sensing measurement setup request message to request to start a respective sensing session to perform respective wireless sensing measurements; in response to the respective sensing measurement setup request message, wirelessly transmitting a respective sensing measurement setup response message by each of the number of selected sensing devices to the proxy responder device using a respective fourth bit pattern of a respective fourth field of the respective message to agree to start the respective sensing session to perform the respective wireless sensing measurements; In response to the proxy sensing request message and the number of sensing measurement setup response messages, wirelessly transmitting the proxy sensing response message with the first bit pattern in the first field by the proxy responder device to the proxy initiator device.

In some embodiments, the reply may confirm that a particular selected sensing responder device cannot take part in the "proxy" wireless sensing, and the "proxy" wireless sensing will be performed without the selected sensing responder device.

Clause G11. The standardized proxy wireless sensing method of clause G1, further comprising: In response to the proxy sensing request message, wirelessly transmitting a proxy sensing response message by the proxy responder device to the proxy initiator device, using a second bit pattern in the first field of the proxy sensing response message to confirm that the proxy responder device will function as the sensing initiator device to initiate sensing sessions with a plurality of sensing responder devices without a particular selected sensing device requested in the proxy sensing request message based on the standard wireless network protocol to perform wireless sensing measurements to obtain sensing measurement results based on wireless sounding signals communicated among the sensing initiator device and the plurality of sensing responder devices.

In some embodiments, upon receiving the proxy sensing request message/frame from the proxy initiator device, the proxy responder device may send a sensing measurement setup request frame to the particular selected sensing responder device in an attempt to initiate a sensing session with it. In response to the sensing measurement setup request message/frame, the particular selected sensing responder device may send a reply or a sensing measurement setup response frame to the proxy responder device to decline. Upon receiving the "decline" in the sensing measurement setup response frame, the proxy responder may send a reply (or a proxy sensing setup response message/frame) to the proxy initiator device to confirm that the particular selected sensing responder will not be included in the wireless sensing as requested.

Clause G12. The standardized proxy wireless sensing method of clause G11, further comprising: in response to the proxy sensing request message, wirelessly transmitting by the proxy responder device a sensing measurement setup request message to the particular selected sensing device requested in the proxy sensing request message, using a third bit pattern in a third field in the sensing measurement setup request message to request to start a sensing session with the particular selected sensing device to perform wireless sensing measurements; in response to the sensing measurement setup request message, wirelessly transmitting a sensing measurement setup response message by the particular selected sensing device to the proxy responder device using a fifth bit pattern in a fourth field to decline the request to start a sensing session to perform wireless sensing measurements; and in response to the proxy sensing request message and the sensing measurement setup response message sent by the particular selected sensing device, wirelessly transmitting the proxy sensing response message with the second bit pattern in the first field by the proxy responder device to the proxy initiator device to indicate that the particular selected sensing device will not be involved in the wireless sensing measurements.

In some embodiments, a respective sensing measurement parameter may be specified in the respective sensing measurement setup request message sent by the proxy responder (sensing initiator) device to the respective selected sensing responder device. The respective selected sensing responder device may perform the respective wireless sensing measurements based on the respective sensing measurement parameter.

Clause G13. The standardized proxy wireless sensing method of clause G10, further comprising: specifying a respective sensing measurement parameter using a respective sixth bit pattern in a respective sixth field in the respective sensing measurement setup request message sent to each respective selected sensing device by the proxy responder device; performing the respective wireless sensing measurements based on the standard wireless network protocol according to the respective sensing measurement parameter by the respective selected sensing device based on respective wireless sounding signals communicated by the respective selected sensing device.

In some embodiments, a respective quantity (e.g. a respective requested parameter) related to the respective sensing measurement parameter may be specified in the proxy sensing setup request message.

Clause G14. The standardized proxy wireless sensing method of clause G13, further comprising: specifying a respective requested parameter related to the respective sensing measurement parameter by the proxy initiator device in the proxy sensing request message.

In some embodiments, the respective quantity (e.g. the respective requested parameter) may be equal to or equivalent to the respective sensing measurement parameter.

Clause G15. The standardized proxy wireless sensing method/system/device/software of clause G14, further comprising: wherein the respective requested parameter in the proxy sensing request message is equivalent to the respective sensing measurement parameter in the respective sensing measurement setup request message.

In some embodiments, selected sensing device may be configured to be a sensing transmitter.

Clause G16. The standardized proxy wireless sensing method of clause G13, further comprising: performing the respective wireless sensing measurements based on the standard wireless network protocol by: functioning as a respective sensing transmitter device by the respective selected sensing device according to the respective sensing measurement parameter, transmitting respective wireless sounding signals by the respective selected sensing device to a respective sensing receiver device in the plurality of sensing responder devices, and generating respective sensing measurement results by the respective sensing receiver device based on the respective received wireless sounding signals.

In some embodiments, proxy initiator device may perform a sensing task (to obtain sensing results) based on sensing measurement results provided by the sensing receiver device via the proxy responder device to the proxy initiator device.

Clause G17. The standardized proxy wireless sensing method of clause G16, further comprising: obtaining by the proxy initiator device the respective sensing measurement results provided by the respective sensing receiver device via the proxy responder device to the proxy initiator device based on the standard wireless network protocol; performing the sensing task to produce the sensing task result by the processor of the proxy initiator device based on the obtained respective sensing measurement results.

In some embodiments, selected sensing device may be configured to be a sensing receiver.

Clause G18. The standardized proxy wireless sensing method of clause G13, further comprising: performing the respective wireless sensing measurements based on the standard wireless network protocol by: functioning as a respective sensing receiver device by the respective selected sensing device according to the respective sensing measurement parameter, receiving respective wireless sounding signals from a respective sensing transmitter device in the plurality of sensing responder devices by the respective selected sensing device, and generating respective sensing measurement results by the respective selected sensing device based on the respective received wireless sounding signals.

In some embodiments, sensing measurement results (e.g. CI, CIR, CFR, CSI) may be reported/provided locally in/by the selected sensing device from PHY/MAC layer to upper layer.

Clause G19. The standardized proxy wireless sensing method of clause G18, further comprising: performing the respective wireless sensing measurements further by: providing the respective sensing measurement results locally by the respective selected sensing device from either the physical (PHY) layer or the medium access control (MAC) layer of the respective selected sensing device to at least one higher layer of the respective selected sensing device.

In some embodiments, selected sensing device may perform a sensing task (to obtain sensing results) in the upper layer based on sensing measurement results provided/reported locally.

Clause G20. The standardized proxy wireless sensing method of clause G19, further comprising: performing the sensing task to produce the sensing task result by a respective processor of the respective selected sensing device in the at least one higher layer of the respective selected sensing device based on the respective sensing measurement results provided locally by either the PHY layer or MAC layer of the respective selected sensing device.

In some embodiments, sensing measurement results (e.g. CI, CIR, CFR, CSI) may be reported non-locally by the selected sensing device to the proxy responder device, and then reported by the proxy responder device to the proxy initiator device.

Clause G21. The standardized proxy wireless sensing method of clause G18, further comprising: performing the respective wireless sensing measurements further by: providing the respective sensing measurement results non-locally by the respective selected sensing device by wirelessly reporting the respective sensing measurement results to the proxy responder device according to the standard wireless network protocol, and providing the respective sensing measurement results wirelessly by the proxy responder device to the proxy initiator device according to the standard wireless network protocol.

In some embodiments, proxy initiator device may perform a sensing task (to obtain sensing results) based on sensing measurement results provided by the selected sensing device via the proxy responder device to the proxy initiator device.

Clause G22. The standardized proxy wireless sensing method of clause G21, further comprising: obtaining by the proxy initiator device the respective sensing measurement results provided by the respective selected sensing device via the proxy responder device to the proxy initiator device; performing the sensing task to produce the sensing task result by the processor of the proxy initiator device based on the obtained respective sensing measurement results.

In some embodiments, some possible standard wireless network protocol, such as IEEE 802.11bf. The proxy responder device may be an access-point (AP) device. The sensing measurement may comprise: CI, CSI, CIR, and/or CFR.

Clause G23. The standardized proxy wireless sensing method of clause G1, further comprising: wherein the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard; wherein the proxy responder device is an access point device; wherein the sensing measurement results comprise a plurality of channel information (CI) of wireless channels associated with the standard wireless network protocol and the wireless sounding signals (WSS), each CI comprising at least one of: a channel state information (CSI), a channel impulse response (CIR), or a channel frequency response (CFR) obtained based on a respective WSS.

In some embodiments, the proxy responder (i.e. sensing initiator) device may establish sensing session with each of them.

Clause G24. A standardized proxy wireless sensing system, comprising: a processor configured to use standardized proxy wireless sensing to indirectly cause wireless sensing measurements to be performed by a number of selected sensing devices to obtain sensing measurement results based on wireless sounding signals communicated by the number of selected sensing devices; a proxy initiator device caused to wirelessly transmit a proxy sensing request message to a proxy responder device based on a standard wireless network protocol to request the proxy responder device to, as a proxy of the proxy initiator device, perform wireless sensing on its behalf, wherein the proxy responder device is requested to perform the wireless sensing by functioning as a sensing initiator device to initiate sensing sessions with a plurality of sensing responder devices comprising the number of selected sensing devices based on the standard wireless network protocol to perform wireless sensing measurements to obtain sensing measurement results based on wireless sounding signals communicated among the sensing initiator device and the plurality of sensing responder devices, wherein the number of selected sensing devices are requested in the proxy sensing request message; the proxy responder device configured to initiate a respective sensing session with each of the number of selected sensing devices, in response to the proxy sensing request message, to perform respective wireless sensing measurements to obtain respective sensing measurement results based on respective wireless sounding signals communicated by the respective selected sensing device; the number of selected sensing devices; and at least one processor configured to perform a sensing task to produce a sensing task result based on the sensing measurement results obtained from the wireless sensing measurements performed by the number of selected sensing devices based on the received wireless sounding signals.

In some embodiments, with "a number of" (or a plurality of) selected sensing responder devices, their ID, a count/amount of them and the presence of the ID and the count/amount are specified in the proxy sensing request message.

Clause G25. The standardized proxy wireless sensing system of clause G24, wherein: a plurality of identity (ID) is specified in a first field of the proxy sensing request message by the proxy initiator device to request the number of selected sensing devices, the plurality of ID comprising the ID of the number of requested selected sensing devices; an amount of the plurality of ID is specified in a second field of the proxy sensing request message by the proxy initiator device, wherein the amount is not less than a count of the number of selected sensing devices; a first bit pattern of a third field in the proxy sensing request message is used to indicate the presence of both (a) the plurality of ID in the first field comprising the ID of the number of requested selected sensing devices and (b) the amount in the second field, in the proxy sensing request message; a second bit pattern of the third field in the proxy sensing request message is used to indicate the absence of both (a) the plurality of ID in the first field comprising the ID of the number of requested selected sensing devices and (b) the amount in the second field in the proxy sensing request message.

In some embodiments, proxy responder may send a reply to confirm that a particular selected sensing responder device can be included in the wireless sensing. Upon receiving the proxy sensing request message, the proxy responder may send sensing measurement setup request frame to the particular selected sensing responder device. In response, the particular selected sensing responder device may send a sensing measurement setup response frame to accept. Upon receiving the "accept", the proxy responder device may send a proxy sensing setup response message to confirm that the particular selected sensing responder device can join the wireless sensing.

Clause G26. The standardized proxy wireless sensing system of clause G24, wherein: in response to the proxy sensing request message, a proxy sensing response message is wirelessly transmitted by the proxy responder device to the proxy initiator device, using a first bit pattern in a first field of the proxy sensing response message to confirm that the proxy responder device will function as a sensing initiator device to initiate sensing sessions with a plurality of sensing responder devices comprising the number of selected sensing devices requested in the proxy sensing request message based on the standard wireless network protocol to perform wireless sensing measurements to obtain sensing measurement results based on wireless sounding signals communicated among the sensing initiator device and the plurality of sensing responder devices.

In response to the proxy sensing request message, a respective sensing measurement setup request message is wirelessly transmitted to each of the number selected sensing devices requested in the proxy sensing request message by the proxy responder device using a respective third bit pattern in a respective third field in the respective sensing measurement setup request message to request to start a respective sensing session to perform respective wireless sensing measurements; In response to the respective sensing measurement setup request message, a respective sensing measurement setup response message is wirelessly transmitted by the respective selected sensing device to the proxy responder device using a respective fourth bit pattern of a respective fourth field of the message to agree to start the respective sensing session to perform respective wireless sensing measurements; In response to the proxy sensing request message and the respective sensing measurement setup response message, the proxy sensing response message with the first bit pattern in the first field is wirelessly transmitted by the proxy responder device to the proxy initiator device.

In some embodiments, a sensing measurement parameter may be specified by proxy initiator device in the proxy sensing setup request message. The sensing measurement parameter may be specified by the proxy responder device in the sensing measurement setup request frame. The particular selected sensing responder may perform the wireless sensing measurement to obtain the sensing measurement results in accordance with the sensing measurement parameter.

Clause G27. The standardized proxy wireless sensing system of clause G26, wherein: a respective sensing measurement parameter is specified in a respective sixth bit pattern in a respective sixth field in the respective sensing measurement setup request message by the proxy responder device; the respective wireless sensing measurements are performed based on the standard wireless network protocol according to the respective sensing measurement parameter by the respective selected sensing device based on respective wireless sounding signals communicated by the respective selected sensing device; a respective requested parameter related to the respective sensing measurement parameter is specified by the proxy initiator device in the proxy sensing request message, wherein the respective requested parameter in the proxy sensing request message is equivalent to the respective sensing measurement parameter in the respective sensing measurement setup request message.

In some embodiments, it may receive the wireless sounding signal from a sensing transmitter, perform wireless sensing measurement to obtain sensing measurement results (e.g. CI, CSI, CIR, CFR) from the received wireless sounding signal and provide the result locally. A sensing task is then performed to obtain sensing task results based on the sensing measurement results.

Clause G28. The standardized proxy wireless sensing system of clause G27, wherein: the respective wireless sensing measurements are performed by the respective selected sensing device based on the standard wireless network protocol by: functioning as a sensing receiver device by the respective selected sensing device according to the respective sensing measurement parameter, receiving respective wireless sounding signals from a respective sensing transmitter device in the plurality of sensing responder devices by the respective selected sensing device, generating respective sensing measurement results by the respective selected sensing device based on the respective received wireless sounding signals, and providing the respective sensing measurement results by the respective selected sensing device locally from either the physical (PHY) layer or the medium access control (MAC) layer of the respective selected sensing device to at least one higher layer of the respective selected sensing device, or non-locally from the respective selected sensing device via the proxy responder device to the proxy initiator device.

Clause G29. A proxy initiator device of a standardized proxy wireless sensing system, configured to: use standardized proxy wireless sensing to indirectly cause wireless sensing measurements to be performed by a number of selected sensing devices to obtain sensing measurement results based on wireless sounding signals communicated by the number of selected sensing devices; wirelessly transmit a proxy sensing request message to a proxy responder device based on a standard wireless network protocol requesting the proxy responder device to, as a proxy of the proxy initiator device, perform wireless sensing on its behalf, wherein the proxy responder device is requested to perform the wireless sensing by functioning as a sensing initiator device to initiate sensing sessions with a plurality of sensing responder devices comprising the number of selected sensing devices based on the standard wireless network protocol to perform wireless sensing measurements to obtain sensing measurement results based on wireless sounding signals communicated among the sensing initiator device and the plurality of sensing responder devices, wherein the number of selected sensing devices are requested in the proxy sensing request message; wherein, in response to the proxy sensing request message, a respective sensing session is initiated by the proxy responder device with each of the number of selected sensing devices to perform respective wireless sensing measurements to obtain respective sensing measurement results based on respective wireless sounding signals communicated by the respective selected sensing device.

Clause G30. The proxy initiator device of a standardized proxy wireless sensing system of clause G29, configured further to: specify a plurality of identity (ID) in a first field of the proxy sensing request message, the plurality of ID comprising the ID of each of the number of requested selected sensing devices; specify an amount of the plurality of ID in a second field of the proxy sensing request message, wherein the amount is not less than a count of the number of selected sensing devices; use a first bit pattern of a third field in the proxy sensing request message to specify the presence of both (a) the plurality of ID in the first field comprising the ID of the number of requested selected sensing devices and (b) the amount in the second field, in the proxy sensing request message; use a second bit pattern of the third field in the proxy sensing request message to specify the absence of both (a) the plurality of ID in the first field comprising the ID of the number of requested selected sensing devices and (b) the amount in the second field in the proxy sensing request message.

In some embodiments, all of the sensing initiator device, sensing responder device, sensing transmitter device, sensing receiver device, SBP initiator device, SBP responder device (an AP) are compatible with or operate in accordance with a standard wireless network protocol such as, WiFi, IEEE 802, IEEE 802.11, and/or IEEE 802.11bf.

In some embodiments, a sensing initiator device may initiate a sensing session with (e.g. by sending a respective sensing request message/frame to) each of a plurality of sensing responder devices requesting some sensing responder device(s) to be/to function as sensing transmitter device(s) to transmit respective wireless sounding signal(s) (e.g. null-data packet/NDP; NDP may be triggered by NDP announcement/NDPA or trigger frame/TF), and some to be/to function as sensing receiving device(s) to receive some respective wireless sounding signal(s) from some respective sensing transmitter device.

In some embodiments, to start a sensing session with a sensing responder, sensing initiator may send a sensing session setup (or sensing measurement setup) request frame/message to the sensing responder. In response/reply, the sensing responder may send a sensing session setup (or sensing measurement setup) response frame/message to accept/decline. If the sensing responder accepts, sensing initiator may send one or more sensing measurement setup request message(s)/frame(s) to the sensing responder (e.g. to set up one or more sensing measurement(s)). In response/reply, the sensing responder may reply to agree/disagree with the sensing parameters associated with each sensing measurement setup request.

In some embodiments, to perform sensing measurements (e.g. based on a particular sensing measurement setup), sensing transmitter may transmit wireless sounding signals to sensing receivers (e.g. based on the sensing measurement parameters agreed in the particular sensing measurement setup). Upon receiving the wireless sounding signals, the sensing receivers may obtain/extract/compute sensing measurement results (e.g. channel information/CI, channel state info/CSI, channel impulse response/CIR, channel frequency response/CFR, RSSI, etc.) from/based on the received wireless sounding signals. The sensing receivers may report/provide/transmit/communicate/make available the sensing measurement results locally (e.g. via some MLME) to a "upper layer" or "higher layer" above the PHY/MAC layers (e.g. application layer) of the sensing receivers, or nonlocally in report(s)/report frame(s)/sensing measurement report frame(s)/packet(s)/message(s) to the sensing initiator.

In some embodiments, in the case of sensing-by-proxy (SBP, or proxy sensing), a device (acting in the role of/acting as "SBP initiator device" and/or proxy initiator) may perform/do SBP initiation handshake/protocol (standard compliant protocol) with an access-point (AP) device (acting in the role of/as "SBP responder device" and/or proxy responder). To initiate an SBP, the SBP initiator may send a SBP request message/frame to SBP responder device. SBP responder (AP device) may reply with SBP response/reply message/frame to SBP initiator. The AP device may agree to join the SBP and may, on behalf of the SBP initiator, initiate (as sensing initiator) sensing sessions and/or sensing measurements with a number of sensing responders (non-AP devices, as requested by SBP initiator). Some specific sensing responders may have been specifically requested by the SBP initiator (SBP initiator may have specified the MAC addresses of those specific sensing responders in the SBP request). Sensing measurement results obtained by non-AP sensing receivers (as sensing responder and sensing receiver) may be sent/reported locally to upper layers of the non-AP sensing receivers, or nonlocally to AP (sensing initiator) from the sensing receivers. Sensing measurements may also be obtained directly by the AP device (as sensing initiator and sensing receiver). The AP (as SBP responder) may collect some/any/all the measurement results, and transmit them (after packing/organizing/processing them into some SBP report frames) to the SBP initiator device. The AP may report them locally to an upper layer (above PHY/MAC layers) in the AP.

When providing/reporting/transmitting sensing measurement results locally or nonlocally, the sensing receivers (e.g. Type2 device), and/or the AP device (SBP responder/proxy responder) may transmit/provide/report/make available, in accordance with the standard, an auxiliary/supportive/relevant/associated information (e.g. a representation/state/setting/strength/parameter, an integer/index representing a gain/processing/filtering/operation) associated with the analog/digital signal demodulation/processing/operation path/pipeline (e.g. amplification) used by the sensing receiver to extract/obtain/generate sensing measurement results from the received wireless sounding signal (e.g. analog signal with certain modulation, NDP).

The recipient (e.g. sensing initiator/SBP responder/SBP initiator/proxy responder/proxy initiator in the case of SBP, or the upper layer above PHY/MAC in sensing receiver/sensing initiator/SBP responder/SBP initiator) may receive the sensing measurement results and/or the auxiliary information (e.g. SBP initiator, proxy initiator, server, etc.), process/reorganize/repackage/compress/transform/adjust/ store them, and/or transmit/forward to another device/recipient.

Any recipient of the sensing measurement results and/or the auxiliary info (in any form) may use the auxiliary information and/or the sensing measurement results in a sensing task (e.g. motion/presence/breathing/heartbeat/vital sign/sleep/gait/gesture/movement/location/situation/event/ intrusion/danger/fall/object/people detection/estimation/ monitoring/localization/recognition/classification) to obtain sensing task results (e.g. breathing rate, heart rate, presence, absence, detected, not detected, etc.).

In one embodiment, the recipient or an associated device (e.g. cloud/edge/remote/local server) may use the sensing measurement results (e.g. CI/CSI/CIR/CFR/RSSI) to compute some spatial-temporal information (STI), motion information (MI), motion statistics (MS), motion data (MD) and/or analytics, and to perform a sensing task based on the STI/MI/MS/MD/analytics. The recipient may use the auxiliary/supportive/relevant/associated information to interpret/preprocess/process/modify/adjust/correct sensing measurement results and/or the STI/MI/MS/MD/analytics and/ or a state (e.g. system state, venue state, object state, motion state, processing state).

In an embodiment, the recipient may compare some current auxiliary information (e.g. in a current sliding window) with some previous auxiliary information (e.g. in a past sliding window), or compute a difference/distance/ change/similarity/dissimilarity between them (or some representative value of them). When the difference/distance/ change/similarity/dissimilarity exceeds some threshold(s) (e.g. instantaneously, or consistently for N consecutive times), the associated sensing measurement results or STI/ MI/MS/MD/analytics (e.g. in the corresponding sliding window) may be considered normal/abnormal/good/bad/trustworthy/untrustworthy/valid/invalid/correct/erratic/ contaminated/qualified/disqualified/acceptable/ unacceptable.

In an embodiment, the recipient may use the auxiliary information to obtain/derive/compute/monitor/track a state (e.g. a state of a finite state machine) related to the wireless sensing task, such as a state of the object, a state of the object motion/activity, a state of the venue, an operating point of the system, an operating point of the object, an operating point of the object motion/activity, a parameter/setting of the system, a parameter/setting of the object, a parameter/setting of the object motion/activity, a strength, a strength of the system, a strength of the object, a strength of the object motion/activity, a change of state, a change of operating point, a change of parameter/setting, and/or a change of strength.

The recipient may use auxiliary information (e.g. the object state/parameter/setting/strength, motion state/parameter/setting/strength, activity state/parameter/setting/ strength, venue state/parameter/setting/strength, system state/parameter/setting/strength, or change of state/parameter/setting/strength) in a wireless sensing task performed based on the sensing measurement results (e.g. CI/CSI/CIR/ CFR/RSSI).

Sensing receiver may provide a report (e.g. in the form of a report frame or a report message, or in the form of data transferred from PHY/MAC layer to upper layer via a MLME) comprising (a) sensing measurement results (e.g. CI/CSI/CIR/CFR/RSSI), and/or (b) auxiliary information (info of a processing operation (e.g. demodulation, MIMO, OFDM, OFDMA, EDCA, MU-MIMO, QAM, heterodyne, super-heterodyne, amplification, compensation, correction, distortion, quantization, state of operation, bandwidth, frequency hopping, carrier frequency, sub-carrier, subcarrier count, etc.) of/on the received wireless sounding signal (2.4 GHz/5 GHz/6 GHz/28 GHz/60 GHz, modulated signal in analog domain carrying digital information) used to generate the sensing measurement results).

The following numbered clauses provide examples for standardized wireless sensing.

Clause H1. A standardized wireless sensing method, comprising: based on a standard wireless network protocol: in response to a first sensing measurement setup request message transmitted by a sensing initiator device to a first sensing responder device requesting the first sensing responder device to function as a sensing receiver device, or a second sensing measurement setup request message transmitted by the sensing initiator device to a second sensing responder device requesting the second sensing responder device to function as a sensing transmitter device: using a receiving antenna and an associated receiving circuitry by the sensing receiver device to receive a wireless sounding signal transmitted from the sensing transmitter device through a wireless channel of a venue; performing wireless sensing measurements by the sensing receiver device based on the received wireless sounding signal received using the receiving antenna and the associated receiving circuitry to generate sensing measurement results; and providing a report by the sensing receiver device, the report comprising (a) the sensing measurement results and (b) an information of a processing operation of the received wireless sounding signal used to generate the sensing measurement results.

In some embodiments, the (a) sensing measurement results may be reported locally from PHY or MAC layer to higher/upper layer (e.g. application layer) of the sensing receiver device.

Clause H2. The standardized wireless sensing method of clause H1, comprising: based on the standard wireless network protocol: reporting the (a) sensing measurement results locally from a physical (PHY) layer or a medium access control (MAC) layer of the sensing receiver device to a higher layer of the sensing receiver device.

In some embodiments, the (b) auxiliary information may also be reported locally from PHY or MAC layer to higher layer of the sensing receiver device, together with (a).

Clause H3. The standardized wireless sensing method of clause H2, comprising: based on the standard wireless network protocol: reporting further the (b) information of the processing operation used to generate the sensing measurement results locally from the physical (PHY) layer or the medium access control (MAC) layer of the sensing receiver device to the higher layer of the sensing receiver device.

In some embodiments, a sensing task may be performed to obtain sensing task results (e.g. motion/presence/breathing/heart beat/vital sign/sleep/rapid-eye-movement(REM)/ non-REM/gesture/gait/walking/activity/fall-down/count detected/recognized/estimated/monitored/classified/verified/counted/not), based on the (a) and the (b) auxiliary information.

Clause H4. The standardized wireless sensing method of clause H3, comprising: performing a sensing task to obtain a sensing task result in the higher layer of the sensing receiver device based on the (a) sensing measurement results and the (b) information of the processing operation used to generate the sensing measurement results.

In some embodiments, the report may also be reported nonlocally from the sensing receiver device to the sensing initiator.

Clause H5. The standardized wireless sensing method of clause H1, comprising: based on the standard wireless network protocol: providing the report comprising both (a) and the (b) to the sensing initiator device by wirelessly transmitting the report in a report frame by the sensing receiver device to the sensing initiator device, wherein the (a) is provided in a first field of the report frame and the (b) is provided in a second field of the report frame by the sensing receiver device.

In some embodiments, a sensing task may be performed by the sensing initiator device to obtain sensing task results based on the nonlocally reported (a) and the (b).

Clause H6. The standardized wireless sensing method of clause H5, comprising: performing a sensing task to obtain a sensing task result by the sensing initiator device based on the (a) sensing measurement results and the (b) information of the processing operation used by the sensing receiver device to generate the sensing measurement results from the received wireless sounding signal.

In some embodiments, in proxy sensing (e.g. SBP), the report may be reported nonlocally from the sensing receiver device to proxy initiator device via the sensing initiator (also proxy responder). The sensing initiator may/may not request the sensing receiver to report (a) the sensing measurement results, but may/may not request the sensing receiver to report (b) the auxiliary information. The reporting of (b) the auxiliary information may be a voluntary act of the sensing receiver (e.g. without being requested by the sensing initiator to do so). Sensing receiver may choose to report (b) the auxiliary information (e.g. in a optional manner). The reporting of (b) may be a requested act of the sensing receiver (e.g. as requested by sensing initiator and/or SBP/proxy initiator in accordance with the standard).

Clause H7. The standardized wireless sensing method of clause H5, comprising: based on the standard wireless network protocol: requesting the sensing initiator device by a proxy initiator device to: request a sensing responder device to function as the sensing transmitter device to transmit the wireless sounding signal, or request another sensing responder device to function as the sensing receiver device to: receive the wireless sounding signal, perform the wireless sensing measurements to generate the sensing measurement results based on the received wireless sounding signal, and report the sensing measurement results to the sensing initiator device; and providing the (a) sensing measurement results, and the (b) information of the processing operation, by the sensing initiator device to the proxy initiator device by wirelessly transmitting both (a) and (b) in a second report frame from the sensing initiator device to the proxy initiator device, wherein the (a) is provided in a third field of the second report frame and the (b) in a fourth field of the second report frame by the sensing initiator device.

In some embodiments, a sensing task may be performed by proxy initiator to obtain sensing task results based on the (a) and the (b).

Clause H8. The standardized wireless sensing method of clause H7, comprising: performing a sensing task to obtain a sensing task result by the proxy initiator device based on the (a) sensing measurement results and the (b) information of the processing operation used by the sensing receiver device to generate the sensing measurement results.

In some embodiments, selective SBP, with at least one selected sensing responder device requested in the proxy sensing request message.

Clause H9. The standardized wireless sensing method of clause H7, comprising: based on the standard wireless network protocol: transmitting a proxy sensing request message to the sensing initiator device by the proxy initiator device to request the sensing initiator device to, as a proxy of the proxy initiator device, perform wireless sensing on its behalf, wherein the sensing initiator device is requested to perform the wireless sensing by initiating sensing sessions with a plurality of sensing responder devices comprising a selected sensing device to perform wireless sensing measurements to obtain sensing measurement results based on wireless sounding signals communicated among the sensing initiator device and the plurality of sensing responder devices, wherein the selected sensing device is one of the sensing receiver device or the sensing transmitter device and is requested in the proxy sensing request message.

In some embodiments, selective SBP (continued). The MAC address of selected sensing responders may be provided in a field in proxy sensing setup request.

Clause H10. The standardized wireless sensing method of clause H9, comprising: based on the standard wireless network protocol: specifying an identity (ID) of the requested selected sensing device in a first field of the proxy sensing request message by the proxy initiator device; wherein the ID of the selected sensing device comprises one of: a medium access control (MAC) address, a network address, a network ID, an internet protocol (IP) address, a multicast ID, an ID in a network associated with the proxy responder device, a name, an identifying number, an alphanumeric ID, a representation, a device ID, a device name, a device product name, a host name, a client name, a vendor ID, a vendor class ID, a serial number, a host ID, a client ID, UUID, or GUID.

In some embodiments, the auxiliary information may be an integer (represented as an integer).

Clause H11. The standardized wireless sensing method of clause H7: wherein the information of the processing operation is an integer.

In some embodiments, the auxiliary information may be a non-negative integer, bounded. Effectively an index, or resembling an index.

Clause H12. The standardized wireless sensing method of clause H11: wherein the information is a non-negative integer between a lower bound and a upper bound, the information being effectively an index.

In some embodiments, the auxiliary information (b) is an information of a processing operation. The processing operation may be associated with various things of the sensing receiver, including amplification, operation, receiving antenna and receiving circuitry. The auxiliary information may be a representation, a state, a setting, a strength or a parameter.

Clause H13. The standardized wireless sensing method of clause H12: wherein the processing operation applied on the received wireless sounding signal to generate the sensing measurement results is associated with at least one of: the receiving antenna, the associated receiving circuitry, the associated demodulation circuitry, MIMO, OFDM, OFDMA, EDCA, MU-MIMO, QAM, heterodyne, a radio, an analog circuitry, a demodulation, an amplification, an analog amplification, a digital amplification, a radio amplifier, a power amplifier, a low-noise amplifier, a switch, a correction, a DC adjustment, a compensation, a processing, an analog processing, a digital processing, a baseband processing, a radio-frequency (RF) processing, a front end processing, a linear processing, a nonlinear processing, a filtering, an analog filtering, a digital filtering, a baseband filtering, an RF filtering, a front end filtering, a linear filtering, a nonlinear filtering, an operation, an analog operation, a digital operation, a baseband operation, an RF operation, a front end operation, a linear operation, or a nonlinear operation, wherein the information comprises a representation, a state, a setting, a strength, or a parameter of any of the above items associated with the processing operation.

In some embodiments, the auxiliary information may be a gain factor/index/strength/parameter/setting associated with some amplification.

Clause H14. The standardized wireless sensing method of clause H13: wherein the processing operation comprises the amplification; wherein the information comprises a representation of a gain associated with the amplification.

In some embodiments, the information may be a representation, operating state, operation index, representation.

Clause H15. The standardized wireless sensing method of clause H13: wherein the processing operation comprises the operation; wherein the information comprises a representation of the operation, a state of the operation or an operating point of the operation.

In some embodiments, auxiliary information may be a gain index associated with an amplification. Or it may be a representation/state/operation point of an operation.

Clause H16. The standardized wireless sensing method of clause H13: wherein the processing operation comprises one of the amplification or the operation; wherein the information comprises one of: a first representation of a gain associated with the amplification, or a second representation of the operation, a state of the operation or an operating point of the operation.

Clause H17. The standardized wireless sensing method of clause H16: wherein the information comprises one of the first representation or the second representation but not both.

In some embodiments, when sensing receiver has more than one receiving antennas, there may be more than one auxiliary information, each associated with a respective receiving antenna.

Clause H18. The standardized wireless sensing method of clause H13: wherein the sensing receiver device comprises more than one receiving antennas each with an associated receiving circuitry; wherein respective wireless sensing measurements associated with each respective receiving antenna are performed by the sensing receiver device based on the respective received wireless sounding signal received using the respective receiving antenna and the respective associated receiving circuitry to generate respective sensing measurement results based on the standard wireless network protocol; wherein the report comprises (b) more than one information, each being a respective information of a respective processing operation used to generate the respective sensing measurement results from the received wireless sounding signal received by the respective receiving antenna.

Clause H19. The standardized wireless sensing method of clause H1: wherein the sensing measurement results comprise one of: a channel information (CI), a channel state information (CSI), a channel impulse response (CIR) or a channel frequency response (CFR); wherein the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard.

In some embodiments, a standardized wireless sensing system comprising (standard-compliant or "standardized") sensing transmitter and (standard-compliant or standardized) sensing receiver operating according to the standardized wireless sensing method.

Clause H20. A standardized wireless sensing system, comprising: a sensing transmitter device, configured to transmit a wireless sounding signal through a wireless channel to a sensing receiver device in a venue based on a standard wireless network protocol; the sensing receiver device configured to: based on the standard wireless network protocol: use a receiving antenna and an associated receiving circuit to receive the wireless sounding signal from the sensing transmitter device, perform wireless sensing measurements based on the received wireless sounding signal received using the receiving antenna and the associated receiving circuitry to generate sensing measurement results, and provide a report comprising (a) the sensing measurement results and (b) an information of a processing operation used by the sensing receiver device to generate the sensing measurement results from the received wireless sounding signal.

In some embodiments, in the system, report comprising (a) and/or (b) may be locally reported from PHY or MAC layer to an upper layer in the sensing receiver device.

Clause H21. The standardized wireless sensing system of clause H20, wherein the sensing receiver device is further configured to: report the (a) sensing measurement results and the (b) information of the processing operation used to generate the sensing measurement results from the received wireless sounding signal locally from a physical (PHY) layer or a medium access control (MAC) layer of the sensing receiver device to a higher layer of the sensing receiver device; perform a sensing task to obtain a sensing task result in the higher layer of the sensing receiver device based on the (a) sensing measurement results and the (b) information of the processing operation used by the sensing receive device to generate the sensing measurement results from the received wireless sounding signal.

In some embodiments, the report may be nonlocally reported by the sensing receiver device to the sensing initiator device. Sensing receiver may provide (b) auxiliary information, together with (a) to sensing initiator device. Sensing receiver may provide (b) without being requested by sensing initiator to do. Sensing receiver may provide (b) as requested by sensing initiator. Sensing receiver may choose to provide (b) to sensing initiator.

Clause H22. The standardized wireless sensing system of clause H20, further comprising: a sensing initiator device configured to: request the sensing transmitter device to transmit the wireless sounding signal to the sensing receiver device, request the sensing receiver device to: receive the wireless sounding signal, perform the wireless sensing measurements to obtain the sensing measurement results based on the received wireless sounding signal, and provide a report comprising the (a) sensing measurement results, wirelessly receive the report from the wireless receiver device comprising the (a) sensing measurement results and the (b), and perform a sensing task to obtain a sensing task result based on the (a) and the (b) in the received report; wherein the sensing receiver device is further configured to: provide the report to the sensing initiator device by wirelessly transmitting the report in a report frame to the sensing initiator device, wherein the (a) is provided in a first field of the report frame and the (b) is provided in a second field of the report frame.

In some embodiments, in proxy wireless sensing (e.g. SBP), the report may be nonlocally reported from the sensing receiver to the proxy initiator device via the sensing initiator device. In first report frame sent from sensing receiver to sensing initiator, the (a) may be in first field of the first report frame and (b) may be in second field of the first report frame. In second report frame sent from sensing initiator (i.e. proxy responder) to proxy initiator, the (a) may be in third field of the second report frame and (b) may be in fourth field of the second report frame.

Clause H23. The standardized wireless sensing system of clause H20, further comprising: a sensing initiator device configured to, in response to a proxy sensing request from a proxy initiator device: request the sensing transmitter device to transmit the wireless sounding signal to the sensing receiver device, request the sensing receiver device to: receive the wireless sounding signal, perform the wireless sensing measurements to obtain the sensing measurement results based on the received wireless sounding signal, and provide a report comprising the (a) sensing measurement results, wirelessly receive the report from the wireless receiver device comprising both (a) and (b), and wirelessly transmit to the proxy initiator device the (a) sensing measurement results and the (b) information of the processing operation used by the sensing receiver device to generate the sensing measurement results from the received wireless sounding signal; the proxy initiator device configured to: wirelessly transmit the proxy sensing request to the sensing initiator device, wirelessly receive the (a) and the (b) from the sensing initiator device, and perform a sensing task to obtain a sensing task result based on the (a) and the (b); wherein the sensing receiver device is configured to provide the report to the sensing initiator device by wirelessly transmitting the report in a report frame to the sensing initiator device, wherein the (a) is provided in a first field of the report frame and the (b) is provided in a second field of the report frame; wherein the sensing initiator device is configured to wirelessly transmit the (a) and the (b) in a second report frame to the proxy initiator device, wherein the (a) is provided in a third field of the second report frame and the (b) is provided in a fourth field of the second report frame.

In some embodiments, the auxiliary information may be a non-negative integer index, bounded between an upper bound and a lower bound.

Clause H24. The standardized wireless sensing system of clause H20: wherein the information of the processing operation is a non-negative integer index between a lower bound and an upper bound.

Clause H25. The standardized wireless sensing system of clause H24: wherein the processing operation used by the sensing receiver device to generate the sensing measurement results based on the received wireless sounding signal is associated with at least one of: the receiving antenna, the associated receiving circuitry, the associated demodulation circuitry, MIMO, OFDM, OFDMA, EDCA, MU-MIMO, QAM, heterodyne, a radio, an analog circuitry, a demodulation, an amplification, an analog amplification, a digital amplification, a radio amplifier, a power amplifier, a low-noise amplifier, a switch, a correction, a DC adjustment, a compensation, a processing, an analog processing, a digital processing, a baseband processing, a radio-frequency (RF) processing, a front end processing, a linear processing, a nonlinear processing, a filtering, an analog filtering, a digital filtering, a baseband filtering, an RF filtering, a front end filtering, a linear filtering, a nonlinear filtering, an operation, an analog operation, a digital operation, a baseband operation, an RF operation, a front end operation, a linear operation, or a nonlinear operation, wherein the information comprises a representation, a state, a setting, a strength, or a parameter of any of the above items associated with the processing operation.

Clause H26. The standardized wireless sensing system of clause H25: wherein the processing operation comprises one of the amplification or the operation; wherein the information comprises one of: a first representation of a gain associated with the amplification, or a second representation of the operation, a state of the operation or an operating point of the operation.

In some embodiments, when sensing receiver has more than one receiving antennas, there may be more than one auxiliary information, each associated with a respective receiving antenna and respective (analog and/or digital) receiving circuitry.

Clause H27. The standardized wireless sensing system of clause H20: wherein the sensing receiver device is further configured to: based on the standard wireless network protocol: use more than one receiving antennas each with an associated receiving circuit to receive the wireless sounding signal from the sensing transmitter device, perform respective wireless sensing measurements based on the respective received wireless sounding signal received using the respective receiving antenna and the respective associated receiving circuitry to generate respective sensing measurement results, and provide the report comprising (a) the sensing measurement results and (b) more than one information, each being a respective information of a respective processing operation used to generate the respective sensing measurement results from the received wireless sounding signal received by the respective receiving antenna.

In some embodiments, a standardized sensing receiver of the standardized wireless sensing system operating according to the standardized wireless sensing method.

Clause H28. A sensing receiver device of a standardized wireless sensing system implementing a standardized wireless sensing method, configured to: based on a standard wireless network protocol: in response to a sensing measurement setup agreement between the sensing receiver device and a sensing initiator of the system: use a receiving antenna and an associated receiving circuit to receive a wireless sounding signal transmitted from a sensing transmitter device of the system through a wireless channel of a venue to the sensing receiver device, perform wireless sensing measurements based on the received wireless sounding signal received using the receiving antenna and the associated receiving circuitry to generate sensing measurement results, and provide a report comprising (a) the sensing measurement results and (b) an information of a processing operation of the received wireless sounding signal used to generate the sensing measurement results, wherein the information of the processing operation is a non-negative integer index between a lower bound and an upper bound.

Clause H29. The sensing receiver device of the standardized wireless sensing system implementing the standardized wireless sensing method of clause H28, configured to: wherein the processing operation used by the sensing receiver device to generate the sensing measurement results based on the received wireless sounding signal is associated with at least one of: the receiving antenna, the associated receiving circuitry, the associated demodulation circuitry, MIMO, OFDM, OFDMA, EDCA, MU-MIMO, QAM, heterodyne, a radio, an analog circuitry, a demodulation, an amplification, an analog amplification, a digital amplification, a radio amplifier, a power amplifier, a low-noise amplifier, a switch, a correction, a DC adjustment, a compensation, a processing, an analog processing, a digital processing, a baseband processing, a radio-frequency (RF) processing, a front end processing, a linear processing, a nonlinear processing, a filtering, an analog filtering, a digital filtering, a baseband filtering, an RF filtering, a front end filtering, a linear filtering, a nonlinear filtering, an operation, an analog operation, a digital operation, a baseband operation, an RF operation, a front end operation, a linear operation, or a nonlinear operation, wherein the information comprises a representation, a state, a setting, a strength, or a parameter of any of the above items associated with the processing operation.

Clause H30. The sensing receiver device of the standardized wireless sensing system implementing the standardized wireless sensing method of clause H29: wherein the processing operation comprises one of the amplification or the operation; wherein the information comprises one of: a first representation of a gain associated with the amplification, or a second representation of the operation, a state of the operation or an operating point of the operation.

In some embodiments, methods and systems are disclosed for sensing-by-proxy with local reporting (SBP-LR). In some embodiments, a proxy initiator device (e.g. SBP initiator in 802.11bf, non-AP device) may use/send a proxy sensing request message (e.g. SBP request frame) to request proxy responder device (e.g. SBP responder, AP device) to do "proxy wireless sensing" (i.e. to do wireless sensing as a proxy of proxy initiator) in a designated/prescribed/specified way/configuration/specification/parameter set (e.g. sensing measurement results/CSI to be locally and/or nonlocally reporting). To do proxy wireless sensing in the specified way (using the specified configuration), the proxy responder device may function as sensing initiator and find/configure appropriate/suitable/matching sensing responder devices according to the specified way/configuration. The proxy responder (sensing initiator) may configure some sensing responders (and/or itself) to be transmitters (e.g. sensing transmitters) and some to be receivers (e.g. sensing receivers). Proxy responder configures the sensing responders by sending a configuration frame (e.g. sensing measurement request frame) to each sensing responder.

In some embodiments, those configured to be receivers (sensing receivers) may be configured to report sensing measurement results (e.g. CSI/CIR/CFR/CI, obtained by sensing receivers based on wireless/sounding/probe signals transmitted from sensing transmitters to sensing receivers) locally and/or nonlocally. The local and/or nonlocal reporting of sensing measurement results by a sensing receiver may be governed/configured/specified directly by a first configuration field of the corresponding configuration frame, or indirectly by a second configuration field in the proxy sensing request message which the proxy responder use to construct the first field. The first field may hold the same parameter as the second field. The first field (or its value) may be the same as/equal to the second field (or its value). The first field may be constructed by the proxy responder based on the second field. The configuration frame may be constructed by the proxy responder based on the proxy sensing request message.

In one embodiment, the receiver (sensing receiver) may be a sensing responder device. E.g. in trigger-based (TB) sensing using NDP announcement frame (NDPA) followed by SI2SR NDP (NDP from sensing initiator to sensing responder). NDP is null data frame. In another embodiment, the receiver (sensing receiver) may be the sensing initiator (proxy responder). For example, in TB sensing using trigger frame (TF) followed by SR2SI NDP (NDP from sensing responder to sensing initiator). In various embodiments, SBP with local reporting are described from the perspective of an integrated circuit (IC)/chip, or from the perspective of system integrator/application/software.

The following numbered clauses provide examples for sensing-by-proxy with local reporting.

Clause I1. A standardized proxy sensing method/device/system/software, comprising: wirelessly transmitting a proxy sensing request message by a proxy initiator device to a proxy responder device in a wireless data communication network based on a standard wireless network protocol to request the proxy responder device to, as a proxy of the proxy initiator device, perform wireless sensing on its behalf, wherein the proxy responder device is requested by the proxy initiator device to perform the wireless sensing by functioning as a sensing initiator device to initiate at least one sensing session with at least one sensing responder device based on the standard wireless network protocol, wherein the wireless data communication network comprises a physical (PHY) layer, a medium access control (MAC) layer, and at least one higher layer; in response to the proxy sensing request message from the proxy initiator device, wirelessly transmitting at least one wireless sensing measurement setup request message by the proxy responder device to the at least one sensing responder device respectively based on the standard wireless network protocol; and in response to the proxy sensing request message or the at least one wireless sensing measurement setup request message: transmitting a time series of at least one wireless sounding signal (WSS) by a transmitter based on the standard wireless network protocol, receiving the time series of at least one WSS (TSWSS) by a receiver based on the standard wireless network protocol, wherein each of the transmitter and the receiver is one of the at least one sensing responder device or the proxy responder device, and performing a plurality of wireless sensing measurements by the receiver based on the received TSWSS to obtain sensing measurement results based on the standard wireless network protocol, wherein the PHY layer or the MAC layer of the receiver provides the sensing measurement results locally to the at least one higher layer of the receiver based on the standard wireless network protocol in accordance with the proxy sensing request message, wherein the sensing measurement results are available to the at least one higher layer of the receiver for performing a sensing-based task based on the sensing measurement results.

Clause I2. The standardized proxy sensing method/device/system/software of clause I1 (or I28), wherein the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard.

Clause I3. The standardized proxy sensing method/device/system/software of clause I1-I2 (or I28), wherein: the sensing measurement results comprise a time series of channel information (CI) of the wireless channel; each CI of the time series of CI (TSCI) is obtained by the receiver based on a respective WSS; and each CI comprises at least one of: a channel state information (CSI), a channel impulse response (CIR), or a channel frequency response (CFR).

In some embodiments, a configuration frame (e.g. sensing measurement request frame) may be constructed by the proxy responder (sensing initiator, access point/AP) based on the proxy sensing request frame. The proxy responder may send the configuration frame to a sensing responder (e.g. non-AP, sensing receiver/transmitter/both) to configure the sensing responder to be sensing transmitter/receiver or both with corresponding sensing/operating/configuration/setup parameters (e.g. including local/nonlocal reporting of sensing measurement results). The parameters (e.g. in first configuration field) in the configuration frame may be requested/included/specified (as second configuration field) in the proxy sensing request message (e.g. SBP request frame). The local/nonlocal reporting of sensing measurement results (e.g. CSI/CIR/CFR/CI/TSCI) may be controlled/governed/decided/depended by/on the bit pattern in the first configuration field and/or the second configuration field. First configuration field of configuration frame (e.g. in sensing measurement setup request message) may be constructed based on second configuration field of proxy sensing request message. If receiver is sensing initiator (proxy responder device), receiver may check if second field in proxy sensing request message is first/second bit pattern. If receiver is a sensing responder, receiver may check if first field in sensing measurement setup request message is first/second bit pattern.

Clause I4. The standardized proxy sensing method/device/system/software of clause I1-I3 (or I28), further comprising: in response to the proxy sensing request message, constructing at least one configuration frame by the proxy responder device based on the proxy sensing request message, wherein each wireless sensing measurement setup request message comprises a respective configuration frame, wherein a first configuration field of the at least one configuration frame is constructed based on a second configuration field of the proxy sensing request message; receiving a respective configuration frame of a respective wireless sensing measurement setup request message by each of the at least one sensing responder device; determining by the receiver whether the first configuration field of the respective received configuration frame or the second configuration field has a first bit pattern or a second bit pattern.

In some embodiments, first field may be a replica/replication/duplicate/duplication/copy/clone/double/repeat/representation/expression of second field, with the first field taking on/having the same bit pattern/value and/or effective parameter/selection/option as the second field. Both first and second fields may be sensing measurement parameter to be used in performing sensing measurements. As there may be only one proxy sensing request message, there may be only one second field. As there may be one or more sensing responder devices to be configured using the sensing measurement parameters, there may be one or more sensing measurement request frames to be constructed by proxy responder device (i.e. sensing initiator) each (sensing measurement request frame) with its respective first field. Some/all of the first field may be a replica/replication of the second field. In one embodiment, the first and second field may be related to local/nonlocal reporting of sensing measurement results. Sensing responders being configured to be sensing receivers may have the first field being the replica/replication of the second field. Sensing responders being configured to be sensing transmitter may not have sensing measurement results to be reported, and the corresponding first field may not be applicable (i.e. their first field may/may not be replica of the second field).

Clause I5. The standardized proxy sensing method/device/system/software of clause I4 (or I28), further comprising: constructing the first configuration field by the proxy responder device by replicating of the second configuration field.

In some embodiments, when bit pattern is first bit pattern, sensing measurement results may be reported locally (but not nonlocally). When bit pattern is second bit pattern, sensing measurements may be reported nonlocally/directly/wirelessly (in wireless data communication network) to proxy responder/sensing initiator, or indirectly to proxy initiator via the proxy responder.

Clause I6. The standardized proxy sensing method/device/system/software of clause I4 or I5 (or I28), wherein: when the first configuration field or the second configuration field has the first bit pattern, the sensing measurement results are configured to be reported locally to the at least one higher layer of the receiver but not to any device other than the receiver, according to the standard wireless network protocol; and when the first configuration field or the second configuration field has the second bit patterns, the sensing measurement results are configured to be reported both locally to the at least one higher layer of the receiver, and nonlocally to the proxy initiator device via the proxy responder device, according to the standard wireless network protocol.

In some embodiments, when bit pattern is first bit pattern, sensing measurement results may not be nonlocally reported to any other device.

Clause I7. The standardized proxy sensing method/device/system/software of clause I4 to I6 (or I28), wherein: when the first configuration field or the second configuration field has the first bit pattern, the sensing measurement results are configured not to be reported to any device other than the receiver, according to the standard wireless network protocol.

In some embodiments, a respective configuration frame may be sent from proxy responder (sensing initiator) to sensing responder to configure the sensing responder before sensing measurements are performed by the sensing responder.

Clause I8. The standardized proxy sensing method/device/system/software of clause I4 to I7 (or I28), wherein: a configuration frame is part of a corresponding wireless sensing measurement setup request message communicated before a corresponding plurality of wireless sensing measurements.

In some embodiments, with the configuration by the configuration frame, the sensing receiver may report the sensing measurement results locally, nonlocally, both locally and nonlocally, and/or not to report (e.g. threshold-based reporting when threshold not exceeded). Proxy responder device configures the receiver and/or sensing measurement results indirectly by configuring/requesting the proxy responder device using the proxy sensing request message to do the proxy wireless sensing (or to do wireless sensing on its behalf). In response, the proxy responder device then functions as sensing initiator to configure (directly) the receiver and/or sensing measurement results.

Clause I9. The standardized proxy sensing method/device/system/software of clause I1 to I8 (or I28), wherein: the sensing measurement results obtained by a receiver are configured indirectly by the proxy initiator device via the proxy responder device to be reported locally in the receiver, to be reported nonlocally to the proxy initiator device via the proxy responder device, to be reported both locally and nonlocally, or not to be reported, by configuring the receiver based on the standard wireless network protocol using a configuration field of a configuration frame of a wireless sensing measurement setup request message communicated during a setup procedure.

Clause I10. The standardized proxy sensing method/device/system/software of clause I1-I9 (or I28), wherein: the receiver is configured indirectly by the proxy initiator device via the proxy responder device based on the standard wireless network protocol during the setup procedure, to report the sensing measurement results locally in the receiver, to report the sensing measurement results nonlocally to the proxy initiator device via the proxy responder device, both, or not to report.

In some embodiments, to initiate a sensing session with a sensing responder device, the sensing initiator (proxy responder device) may perform a negotiation/handshake process with the sensing responder. In negotiation process, the sensing initiator may send a sensing measurement setup request message to sensing responder. Sensing responder may reply by sending a sensing measurement setup response message. Sensing responder may agree/disagree/disagree with suggested alternative configuration. Sensing initiator may agree with suggested alternative configuration (e.g. by sending another sensing measurement setup request message with the suggested alternative configuration).

Clause I11. The standardized proxy sensing method/device/system/software of clause I1-I10 (or I28), wherein: a wireless sensing measurement setup request message is communicated during a negotiation process between the sensing initiator device and each sensing responder device based on the standard wireless network protocol.

Clause I12. The standardized proxy sensing method/device/system/software of clause I1-I11 (or I28), wherein: each of the transmitter and the receiver is configured individually based on the standard wireless network protocol by the proxy initiator device indirectly via the proxy responder device based on the proxy sensing request message and a respective wireless sensing measurement setup request message to perform the plurality of wireless sensing measurements collaboratively; the transmitter is configured to function as a sensing transmitter device to send the TSWSS to the receiver; at least one configuration associated with the TSWSS is related to the sensing-based task; the receiver is configured to function as a sensing receiver device to receive the TSWSS from the transmitter and to obtain the sensing measurement results based on the received TSWSS; the receiver is configured whether to report the sensing measurement results locally to the at least one higher layer of the receiver, or non-locally to the proxy initiator device via the proxy responder device, or both; and at least one of the transmitter or the receiver is a sensing responder device.

In some embodiments, receiver may be configured to process the sensing measurement results before reporting them. The processing may comprise one or more step, including a precision reduction step (e.g. quantization using some quantization step size, mapping, grouping) when reporting locally, and/or another precision reduction step (e.g. quantization using another quantization step size, another mapping/grouping) when reporting nonlocally.

Clause I13. The standardized proxy sensing method/device/system/software of clause I1-I12 (or I28), further comprising: performing a first processing of the sensing measurement results by the receiver for reporting the sensing measurement results locally, the first processing comprising a first precision reduction; or performing a second processing of the sensing measurement results by the receiver for reporting the sensing measurement results non-locally, the second processing comprising a second precision reduction.

In some embodiments, reporting path of sensing measurement results (e.g. CI/CSI/CIR/CFR) is described for nonlocal reporting.

Clause I14. The standardized proxy sensing method/device/system/software of clause I1-I13 (or I28), wherein: when reporting the sensing measurement results non-locally, the sensing measurement results are transmitted by the receiver wirelessly to the proxy responder device, and then by the proxy responder device to the proxy initiator device, based on the standard wireless network protocol; the non-locally reported sensing measurement results are available non-locally at the proxy initiator device for a second sensing-based task.

In some embodiments, as one device (proxy initiator device) has multiple/many sensing measurement results, they can be used jointly/together to perform sensing (in a central computing manner).

Clause I15. The standardized proxy sensing method/device/system/software of clause I14 (or I28), wherein: the non-locally reported sensing measurement results are available for central computing of the second sensing-based task at the proxy initiator device.

Clause I16. The standardized proxy sensing method/device/system/software of clause I1-I15 (or I28), wherein: when reporting the sensing measurement results locally, the sensing measurement results are made available locally at the at least one higher layer of the receiver for the sensing-based task at the receiver.

In some embodiments, as there may be many sensing receivers each with one or more locally reported sensing measurement results, every receiver can perform respective distributive/local/edge sensing task/engine computation based in the one or more locally reported sensing measurement results.

Clause I17. The standardized proxy sensing method/device/system/software of clause I1-I16 (or I28), wherein: the locally reported sensing measurement results are available for distributed computing of the sensing-based task at the receiver.

In some embodiments, some sensing measurement result may be reported both locally and nonlocally.

Clause I18. The standardized proxy sensing method/device/system/software of clause I1-I17 (or I28), wherein: a first sensing measurement result is reported by the receiver both locally and non-locally.

In some embodiments, some sensing measurement result may be reported either locally or nonlocally (but not both).

Clause I19. The standardized proxy sensing method/device/system/software of clause I1-I18 (or I28), wherein: a second sensing measurement result is not reported by the receiver either locally or non-locally.

In some embodiments, transmitter (TX) may be non-AP while receiver (RX) may be AP such that locally reported sensing measurement results may be in the AP.

Clause I20. The standardized proxy sensing method/device/system/software of clause I1-I19 (or I28), wherein: the proxy responder device is an access-point (AP) device of the wireless data communication network; the proxy initiator device is a non-AP device of the wireless data communication network; the transmitter is a client device of the wireless data communication network and functions as a sensing responder device; the receiver is the AP; the sensing measurement results comprise a time series of channel information (CI), wherein each CI comprises at least one of: a channel state information (CSI), a channel impulse response (CIR), or a channel frequency response (CFR); the receiver reports the sensing measurement results locally; and the locally reported sensing measurement results are available at the AP for the sensing-based task.

In some embodiments, TX=non-AP, and RX=AP=initiator, which may be implemented using trigger-based sensing using trigger frame and R2I (SR2SI) NDP (i.e. NDP sent from responder to initiator).

Clause I21. The standardized proxy sensing method/device/system/software of clause I1-I20 (or I27 or I28), wherein: the wireless sensing measurements are trigger-based (TB) using null data packet (NDP) frames and trigger frames (TF) based on the standard wireless network protocol.

In some embodiments, there may be more than one transmitters/sensing transmitter (i.e. at least one additional transmitter), each transmitting respective sounding signal (respective TSWSS) to the receiver (sensing receiver). Receiver may receiver all sounding signals, perform respective sensing measurement to obtain respective sensing measurement results based on each TSWSS. The multiple sensing measurement results associated with the multiple TSWSS may be reported locally, and used in the at least one higher/upper layer for sensing task.

Clause I22. The standardized proxy sensing method/device/system/software of clause I1-I21 (or I27 or I28), wherein: there are at least one additional transmitter in the venue each configured indirectly by the proxy initiator device via the proxy responder device individually based on the standard wireless network protocol to function as a sensing transmitter device; each respective additional transmitter is configured to transmit a respective TSWSS based on the standard wireless network protocol to the receiver; and the receiver is configured to: receive the respective TSWSS from the respective additional transmitter through the wireless channel based on the standard wireless network protocol, obtain respective sensing measurement results based on the respective received TSWSS, and report the respective sensing measurement results locally to the at least one higher layer of the receiver, wherein multiple locally-reported sensing measurement results are available for performing the sensing-based task in a centralized manner.

In some embodiments, TX may be AP while RX may be non-AP client device such that locally reported sensing measurement results are reported locally in the non-AP client device.

Clause I23. The standardized proxy sensing method/device/system/software of clause I1-I22 (except I20) (or I28), wherein: the proxy responder device is an access-point (AP) device of the wireless data communication network; the proxy initiator device is a non-AP device of the wireless data communication network; the transmitter is the AP; the receiver is a client device of the wireless data communication network; the sensing measurement results comprise a time series of channel information (CI), wherein each CI comprises at least one of: a channel state information (CSI), a channel impulse response (CIR), or a channel frequency response (CFR); the receiver reports the sensing measurement results locally to the at least one higher layer of the receiver; and the locally reported sensing measurement results are available at the client device for the sensing-based task.

In some embodiments, TX may be AP. AP may broadcast the sounding signal (TSWSS, e.g. NDP, I2R NDP) to more than one non-AP.

Clause I24. The standardized proxy sensing method/device/system/software of clause I1-I23 (or I27, or I28), wherein: the TSWSS is broadcasted from the transmitter to the receiver.

In some embodiments, TX=AP=initiator and RX=non-AP, which may be implemented using trigger-based sensing using NDP announcement (NDPA) frame and I2R (SI2SR) NDP (i.e. NDP sent from initiator to responder).

Clause I25. The standardized proxy sensing method/device/system/software of clause I1-I24 (or I27, or I28), wherein: the wireless sensing measurements are trigger-based (TB) using null data packet (NDP) frames and NDP announcement (NDPA) frames based on the standard wireless network protocol.

In some embodiments, there may be more than one receiver/sensing receiver (i.e. at least one additional receiver), each receiving respective sounding signal (respective TSWSS) from the transmitter (sensing transmitter). The transmitter may transmit multiple TSWSS (sounding signals), each TSWSS to a respective receiver. Each receiver may receive respective TSWSS, perform respective sensing measurement and obtain respective sensing measurement results based on the received TSWSS. Each receiver may report the respective sensing measurement results locally, from PHY or MAC layer to at least one higher layer. Some application/software in the at least one higher layer of the receiver may use the sensing measurement results to perform some sensing task.

Clause I26. The standardized proxy sensing method/device/system/software of clause I1-I25 (or I27, or I28), wherein: there are at least one additional receiver in the venue each configured by the proxy initiator device via the proxy responder device individually based on the standard wireless network protocol to function as a sensing receiver device; the transmitter is configured to transmit a respective TSWSS based on the standard wireless network protocol to each respective additional receiver; and each respective additional receiver is configured to: receive the respective TSWSS through the respective wireless channel based on the standard wireless network protocol, obtain respective sensing measurement results based on the respective received TSWSS, and report the respective sensing measurement results locally to the at least one higher layer of the respective additional receiver, wherein the respective locally-reported sensing measurement results are available locally for performing the sensing-based task in a decentralized manner in the respective additional receiver based on the respective locally-reported sensing measurement results.

Clause I In some embodiments, TX may be non-AP while RX may be non-AP client device such that locally reported sensing measurement results are reported locally in the non-AP client device.

Clause I27. The standardized proxy sensing method/device/system/software of clause I1-I26 (except I20 and I23) (or I28), wherein: the proxy responder device is an access-point (AP) device of the wireless data communication network; the proxy initiator device is a non-AP device of the wireless data communication network; the transmitter is a second non-AP device; the receiver is a third non-AP device; the receiver reports the sensing measurement results locally; and the locally reported sensing measurement results is available at the third non-AP for the sensing-based task.

In some embodiments, a software/application in a non-AP device may use standardized proxy wireless sensing (e.g. sensing-by-proxy, SBP) to indirectly cause wireless sensing measurements to be performed by a receiver device and reported locally by the receiver device from PHY/MAC layer to at least one higher layer within the receiver. There may be multiple software: one software in the proxy initiator device, and additional software in each of the sensing receiver devices to make use of the locally reported sensing measurement results to perform sensing tasks. A first group of sensing receiver devices may jointly perform a first common sensing task based on all the locally reported sensing measurement results in the first group. Each receiver in the first group may compute an individual first analytics/statistics/sensing result based on a first analysis/processing of the respective sensing measurement results locally reported in the receiver. The individual first analytics/statistics/sensing results may be transmitted to a first fusion device (e.g. cloud server, edge server, local server, or any device) and may be analyzed/fused/combined/merged in the first fusion device. Similarly, a second group of sensing receiver devices may jointly perform a second common sensing task based on all the locally reported sensing measurement results in the second group. Each receiver in the second group may compute an individual second analytics/statistics/sensing result based on a second analysis/processing of the respective second sensing measurement results locally reported in the receiver. The individual second analytics/statistics/sensing results may be transmitted to a second fusion device (e.g. cloud server, edge server, local server, or any device) and are analyzed/fused/combined/merged in the second fusion device. The first group and second group may share one or more common sensing receiver devices. In the shared/common receiver devices, both the individual first analytics/statistics/sensing results and the individual second analytics/statistics/sensing results may be computed. The individual first analytics/statistics/sensing results may be sent to the first fusion device for the first common sensing task. The individual second analytics/statistics/sensing results may be sent to the second fusion device for the second common sensing task.

Clause I28. A standardized proxy sensing method/device/system/software, comprising: configuring a proxy initiator device in a wireless data communication network to use standardized proxy wireless sensing to indirectly cause wireless sensing measurements to be performed by a receiver in the wireless data communication network to (a) obtain sensing measurement results based on wireless sounding signals received from a transmitter in the wireless data communication network and (b) report the sensing measurement results locally based on a standard wireless network protocol; configuring the proxy initiator device to wirelessly transmit a proxy sensing request message to a proxy responder device in the wireless data communication network based on the standard wireless network protocol to request the proxy responder device to, as a proxy of the proxy initiator device, perform wireless sensing on its behalf, wherein the proxy responder device is requested by the proxy initiator device to perform the wireless sensing by functioning as a sensing initiator device to initiate at least one sensing session with at least one sensing responder device based on the standard wireless network protocol, wherein the wireless data communication network comprises a physical (PHY) layer, a medium access control (MAC) layer, and at least one higher layer, wherein, in response to the proxy sensing request message from the proxy initiator device, at least one wireless sensing measurement setup request message is wirelessly transmitted by the proxy responder device to the at least one sensing responder device respectively based on the standard wireless network protocol, wherein, in response to the proxy sensing request message or the at least one wireless sensing measurement setup request message: a time series of at least one wireless sounding signal (WSS) is transmitted by the transmitter based on the standard wireless network protocol, the time series of at least one WSS (TSWSS) is received by the receiver based on the standard wireless network protocol, and a plurality of wireless sensing measurements are performed by the receiver based on the received TSWSS to obtain sensing measurement results based on the standard wireless network protocol, wherein each of the transmitter and the receiver is one of the at least one sensing responder device or the proxy responder device, and wherein the PHY layer or the MAC layer of the receiver provides the sensing measurement results locally to the at least one higher layer of the receiver based on the standard wireless network protocol in accordance with the proxy sensing request message; configuring a processor of the receiver to, at the at least one higher layer of the receiver, obtain the sensing measurement results from the PHY layer or the MAC layer of the receiver and perform a sensing-based task based on the sensing measurement results.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A standardized proxy wireless sensing method, comprising:

wirelessly transmitting, by a proxy initiator device, a proxy sensing request message to a proxy responder device based on a standard wireless network protocol to request the proxy responder device to, as a proxy of the proxy initiator device, perform wireless sensing on its behalf with a plurality of sensing responder devices comprising a particular proxy-initiator-selected sensing responder device identified and requested in the proxy sensing request message, wherein the particular proxy-initiator-selected sensing responder device is selected by the proxy initiator device;

initiating, by the proxy responder device functioning as a sensing initiator device in response to the proxy sensing request message from the proxy initiator device, sensing sessions with the plurality of sensing responder devices comprising the particular proxy-initiator-selected sensing responder device selected and identified by the proxy initiator device based on the standard wireless network protocol to perform wireless sensing measurements to obtain sensing measurement results based on wireless sounding signals communicated among the plurality of sensing responder devices and the proxy responder device functioning as the sensing initiator device;

in response to the proxy sensing request message from the proxy initiator device, initiating a particular sensing session by the proxy responder device functioning as the sensing initiator device with the particular proxy-initiator-selected sensing responder device selected and identified by the proxy initiator device in the proxy sensing request message to perform particular wireless sensing measurements to obtain particular sensing measurement results based on particular wireless sounding signals communicated by the particular proxy-initiator-selected sensing responder device; and providing a report in a report frame either (1) non-locally by the particular proxy-initiator-selected sensing responder device to the sensing initiator device, or (2) locally from a physical (PHY) layer or a medium access control (MAC) layer of the particular proxy-initiator-selected sensing responder device to a higher layer of the particular proxy-initiator-selected sensing responder device, or (3) both, according to a bit pattern in a configuration field of a sensing measurement setup request message based on the standard wireless network protocol, wherein:

when the configuration field has a first-type bit pattern, the report is provided locally to the higher layer of the particular proxy-initiator-selected sensing responder device in a first reporting way but not to any device other than the particular proxy-initiator-selected sensing responder device, according to the standard wireless network protocol, when the configuration field has a second-type bit pattern, the report is provided both locally to the higher layer of the particular proxy-initiator-selected sensing responder device in the first reporting way and non-locally to the sensing initiator device other than the particular proxy-initiator-selected sensing responder device in a second reporting way different from the first reporting way, according to the standard wireless network protocol, and the sensing measurement setup request message is transmitted by the proxy responder device to the particular proxy-initiator-selected sensing responder device in response to the proxy sensing request message from the proxy initiator device.

2. The standardized proxy wireless sensing method of claim 1, further comprising:

selecting the particular proxy-initiator-selected sensing responder device by the proxy initiator device;

specifying an identity (ID) of the particular proxy-initiator-selected sensing responder device in a first field of the proxy sensing request message to the proxy responder device by the proxy initiator device.

3. The standardized proxy wireless sensing method of claim 2, further comprising:

using a first bit pattern of a third field in the proxy sensing request message to the proxy responder device by the proxy initiator device to specify a presence of the ID of the particular proxy-initiator-selected sensing responder device in the proxy sensing request message; and using a second bit pattern of the third field in the proxy sensing request message by the proxy initiator device to specify an absence of the ID of the particular proxy-initiator-selected sensing responder device in the proxy sensing request message.

4. The standardized proxy wireless sensing method of claim 2, wherein the ID of the particular proxy-initiator-selected sensing responder device comprises one of:

a medium access control (MAC) address, a network address, a network ID, an Internet protocol (IP) address, a multicast ID, an ID in a network associated with the proxy responder device, a name, an identifying number, an alphanumeric ID, a representation, a device ID, a device name, a device product name, a host name, a client name, a vendor ID, a vendor class ID, a serial number, a host ID, a client ID, a UUID, or a GUID.

5. The standardized proxy wireless sensing method of claim 1, further comprising:

configuring the proxy initiator device to select a number of particular proxy-initiator-selected sensing responder devices;

selecting the number of particular proxy-initiator-selected sensing responder devices by the proxy initiator device;

in response to the proxy sensing request message, initiating a respective sensing session by the proxy responder device with each respective particular proxy-initiator-selected sensing responder device of the number of particular proxy-initiator-selected sensing responder devices to perform respective wireless sensing measurements to obtain respective sensing measurement results based on respective wireless sounding signals communicated by the respective particular proxy-initiator-selected sensing responder device, wherein the plurality of sensing responder devices comprise the number of particular proxy-initiator-selected sensing responder devices, and the number of particular proxy-initiator-selected sensing responder devices are requested in the proxy sensing request message.

6. The standardized proxy wireless sensing method of claim 5, further comprising:

specifying a plurality of ID's in a first field of the proxy sensing request message by the proxy initiator device, wherein the plurality of ID's comprise an ID of each of the number of particular proxy-initiator-selected sensing responder devices.

7. The standardized proxy wireless sensing method of claim 6, further comprising:

specifying an amount of the plurality of ID's in a second field of the proxy sensing request message by the proxy initiator device, wherein the amount is greater than or equal to a quantity of the number of particular proxy-initiator-selected sensing responder devices.

8. The standardized proxy wireless sensing method of claim 7, further comprising:

using a first bit pattern of a third field in the proxy sensing request message by the proxy initiator device to specify a presence, in the proxy sensing request message, of both (a) the plurality of ID's in the first field comprising the ID of the number of particular proxy-initiator-selected sensing responder devices and (b) the amount in the second field; and using a second bit pattern of the third field in the proxy sensing request message by the proxy initiator device to specify an absence, in the proxy sensing request message, of both (a) the plurality of ID's in the first field comprising the ID of the number of particular proxy-initiator-selected sensing responder devices and (b) the amount in the second field.

9. The standardized proxy wireless sensing method of claim 1, further comprising:

in response to the proxy sensing request message from the proxy initiator device, wirelessly transmitting a proxy sensing response message by the proxy responder device to the proxy initiator device, using a first bit pattern in a first field of the proxy sensing response message to confirm that the proxy responder device will function as the sensing initiator device to initiate sensing sessions with a plurality of sensing responder devices comprising the particular proxy-initiator-selected sensing responder device requested in the proxy sensing request message based on the standard wireless network protocol to perform wireless sensing measurements to obtain sensing measurement results based on wireless sounding signals communicated among the plurality of sensing responder devices and the proxy responder device.

10. The standardized proxy wireless sensing method of claim 9, further comprising:

in response to the proxy sensing request message from the proxy initiator device, wirelessly transmitting the sensing measurement setup request message by the proxy responder device to the particular proxy-initiator-selected sensing responder device specified in the proxy sensing request message, wherein a third bit pattern in a third field in the sensing measurement setup request message is used by the proxy responder device to request the particular proxy-initiator-selected sensing responder device to start a sensing session to perform wireless sensing measurements;

in response to the sensing measurement setup request message from the proxy responder device, wirelessly transmitting a sensing measurement setup response message by the particular proxy-initiator-selected sensing responder device to the proxy responder device, wherein a fourth bit pattern of a fourth field of the sensing measurement setup response message is used by the particular proxy-initiator-selected sensing responder device to agree to start the sensing session to perform the wireless sensing measurements; and in response to the proxy sensing request message from the proxy initiator device and the sensing measurement setup response message from the particular proxy-initiator-selected sensing responder device, wirelessly transmitting the proxy sensing response message with the first bit pattern in the first field by the proxy responder device to the proxy initiator device.

11. The standardized proxy wireless sensing method of claim 1, further comprising:

in response to the proxy sensing request message from the proxy initiator device, wirelessly transmitting a proxy sensing response message by the proxy responder device to the proxy initiator device, using a second bit pattern in a first field of the proxy sensing response message to confirm that the proxy responder device will function as the sensing initiator device to initiate sensing sessions with a plurality of sensing responder devices excluding the particular proxy-initiator-selected sensing responder device specified in the proxy sensing request message based on the standard wireless network protocol to perform wireless sensing measurements to obtain sensing measurement results based on wireless sounding signals communicated among the proxy responder device and the plurality of sensing responder devices excluding the particular proxy-initiator-selected sensing responder device.

12. The standardized proxy wireless sensing method of claim 11, further comprising:

in response to the proxy sensing request message from the proxy initiator device, wirelessly transmitting the sensing measurement setup request message by the proxy responder device to the particular proxy-initiator-selected sensing responder device specified by the proxy initiator device in the proxy sensing request message, wherein a third bit pattern in a third field in the sensing measurement setup request message is used by the proxy responder device to request the particular proxy-initiator-selected sensing responder device to start a sensing session to perform wireless sensing measurements;

in response to the sensing measurement setup request message from the proxy responder device, wirelessly transmitting a sensing measurement setup response message by the particular proxy-initiator-selected sensing responder device to the proxy responder device using a fifth bit pattern in a fourth field to decline the request to start a sensing session to perform the wireless sensing measurements; and in response to the proxy sensing request message from the proxy initiator device and the sensing measurement setup response message from the particular proxy-initiator-selected sensing responder device, wirelessly transmitting the proxy sensing response message with the second bit pattern in the first field by the proxy responder device to the proxy initiator device to indicate that the particular proxy-initiator-selected sensing responder device will not perform the wireless sensing measurements.

13. The standardized proxy wireless sensing method of claim 10, further comprising:

specifying a sensing measurement parameter in a sixth bit pattern in a sixth field in the sensing measurement setup request message to the particular proxy-initiator-selected sensing responder device by the proxy responder device; and performing the wireless sensing measurements based on the standard wireless network protocol according to the sensing measurement parameter by the particular proxy-initiator-selected sensing responder device based on wireless sounding signals communicated by the particular proxy-initiator-selected sensing responder device.

14. The standardized proxy wireless sensing method of claim 13, further comprising:

specifying a requested parameter related to the sensing measurement parameter by the proxy initiator device in the proxy sensing request message to the proxy responder device.

15. The standardized proxy wireless sensing method of claim 14, wherein:

the requested parameter in the proxy sensing request message transmitted from the proxy initiator device to the proxy responder device is equivalent to the sensing measurement parameter in the sensing measurement setup request message transmitted from the proxy responder device to the particular proxy-initiator-selected sensing responder device.

16. The standardized proxy wireless sensing method of claim 13, further comprising performing the wireless sensing measurements based on the standard wireless network protocol by:

functioning as a sensing transmitter device by the particular proxy-initiator-selected sensing responder device according to the sensing measurement parameter;

transmitting wireless sounding signals by the particular proxy-initiator-selected sensing responder device to a sensing receiver device in the plurality of sensing responder devices; and generating sensing measurement results by the sensing receiver device based on the received wireless sounding signals.

17. The standardized proxy wireless sensing method of claim 16, further comprising:

obtaining, by the proxy initiator device, the sensing measurement results provided by the sensing receiver device via the proxy responder device to the proxy initiator device based on the standard wireless network protocol; and performing a sensing task to produce a sensing task result by the proxy initiator device based on the obtained sensing measurement results.

18. The standardized proxy wireless sensing method of claim 13, further comprising performing the wireless sensing measurements based on the standard wireless network protocol by:

functioning as a sensing receiver device by the particular proxy-initiator-selected sensing responder device according to the sensing measurement parameter;

receiving wireless sounding signals from a sensing transmitter device in the plurality of sensing responder devices by the particular proxy-initiator-selected sensing responder device; and generating sensing measurement results by the particular proxy-initiator-selected sensing responder device based on the received wireless sounding signals.

19. The standardized proxy wireless sensing method of claim 18, further comprising performing the wireless sensing measurements further by:

providing the sensing measurement results locally by the particular proxy-initiator-selected sensing responder device from either a physical (PHY) layer or a medium access control (MAC) layer of the particular proxy-initiator-selected sensing responder device to at least one higher layer of the particular proxy-initiator-selected sensing responder device.

20. The standardized proxy wireless sensing method of claim 19, further comprising:

performing a sensing task to produce a sensing task result in the at least one higher layer of the particular proxy-initiator-selected sensing responder device based on the sensing measurement results provided locally by either the PHY layer or MAC layer of the particular proxy-initiator-selected sensing responder device.

21. The standardized proxy wireless sensing method of claim 18, further comprising performing the wireless sensing measurements further by:

providing, by the particular proxy-initiator-selected sensing responder device, the sensing measurement results non-locally by wirelessly reporting the sensing measurement results to the proxy responder device according to the standard wireless network protocol; and providing the sensing measurement results wirelessly by the proxy responder device to the proxy initiator device according to the standard wireless network protocol.

22. The standardized proxy wireless sensing method of claim 21, further comprising:

obtaining, by the proxy initiator device, the sensing measurement results provided by the particular proxy-initiator-selected sensing responder device via the proxy responder device to the proxy initiator device; and performing a sensing task to produce a sensing task result by the proxy initiator device based on the obtained sensing measurement results.

23. The standardized proxy wireless sensing method of claim 1, wherein:

the standard wireless network protocol is at least one of: a wireless LAN (WLAN) standard protocol, a mobile communication standard protocol, a WLAN standard, a Wi-Fi standard, an IEEE 802 standard, an IEEE 802.11 standard, or an IEEE 802.11bf standard;

the proxy responder device is an access point (AP) device; and the sensing measurement results comprise a plurality of channel information (CI) of wireless channels associated with the standard wireless network protocol and the wireless sounding signals (WSS), each CI comprising at least one of: a channel state information (CSI), a channel impulse response (CIR), or a channel frequency response (CFR) obtained based on a respective WSS.

24. A standardized proxy wireless sensing system, comprising:

a proxy initiator device configured to (1) select a number of particular proxy-initiator-selected sensing responder devices for a standardized proxy wireless sensing and (2) perform the standardized proxy wireless sensing by specifying the number of particular proxy-initiator-selected sensing responder devices and wirelessly transmitting a proxy sensing request message to a proxy responder device based on a standard wireless network protocol to request the proxy responder device to, as a proxy of the proxy initiator device, perform wireless sensing on its behalf with a plurality of sensing responder devices comprising the number of particular proxy-initiator-selected sensing responder devices specified in the proxy sensing request message;

the proxy responder device configured to:

function as a sensing initiator device in response to the proxy sensing request message from the proxy initiator device to initiate sensing sessions with the plurality of sensing responder devices comprising the number of particular proxy-initiator-selected sensing responder devices selected and identified by the proxy initiator device in the proxy sensing request message based on the standard wireless network protocol to perform wireless sensing measurements to obtain sensing measurement results based on wireless sounding signals communicated among the plurality of sensing responder devices and the proxy responder device functioning as the sensing initiator device, in response to the proxy sensing request message from the proxy initiator device, initiate a particular sensing session by the proxy responder device functioning as the sensing initiator device with a particular proxy-initiator-selected sensing responder device selected and identified by the proxy initiator device in the proxy sensing request message to perform particular wireless sensing measurements to obtain particular sensing measurement results based on particular wireless sounding signals communicated by the particular proxy-initiator-selected sensing responder device; and the particular proxy-initiator-selected sensing responder device configured to provide a report in a report frame either (1) non-locally by the particular proxy-initiator-selected sensing responder device to the sensing initiator device, or (2) locally from a physical (PHY) layer or a medium access control (MAC) layer of the particular proxy-initiator-selected sensing responder device to a higher layer of the particular proxy-initiator-selected sensing responder device, or (3) both, according to a bit pattern in a configuration field of a sensing measurement setup request message based on the standard wireless network protocol, wherein:

when the configuration field has a first-type bit pattern, the report is provided locally to the higher layer of the particular proxy-initiator-selected sensing responder device in a first reporting way but not to any device other than the particular proxy-initiator-selected sensing responder device, according to the standard wireless network protocol, when the configuration field has a second-type bit pattern, the report is provided both locally to the higher layer of the particular proxy-initiator-selected sensing responder device in the first reporting way and non-locally to the sensing initiator device other than the particular proxy-initiator-selected sensing responder device in a second reporting way different from the first reporting way, according to the standard wireless network protocol, and the sensing measurement setup request message is transmitted by the proxy responder device to the particular proxy-initiator-selected sensing responder device in response to the proxy sensing request message from the proxy initiator device.

25. The standardized proxy wireless sensing system of claim 24, wherein:

a plurality of identities (ID's) are specified in a first field of the proxy sensing request message by the proxy initiator device, the plurality of ID's comprising an identify (ID) of each of the number of particular proxy-initiator-selected sensing responder devices;

an amount of the plurality of ID's is specified in a second field of the proxy sensing request message by the proxy initiator device, wherein the amount is greater than or equal to a quantity of the number of particular proxy-initiator-selected sensing responder devices;

a first bit pattern of a third field in the proxy sensing request message is used to specify a presence, in the proxy sensing request message, of both (a) the plurality of ID's in the first field comprising the ID of the number of particular proxy-initiator-selected sensing responder devices and (b) the amount in the second field; and a second bit pattern of the third field in the proxy sensing request message is used to specify an absence, in the proxy sensing request message, of both (a) the plurality of ID's in the first field comprising the ID of the number of particular proxy-initiator-selected sensing responder devices and (b) the amount in the second field.

26. The standardized proxy wireless sensing system of claim 24, wherein:

in response to the proxy sensing request message from the proxy initiator device, a proxy sensing response message is wirelessly transmitted by the proxy responder device to the proxy initiator device, using a first bit pattern in a first field of the proxy sensing response message to confirm that the proxy responder device will function as the sensing initiator device to initiate sensing sessions with a plurality of sensing responder devices comprising the number of particular proxy-initiator-selected sensing responder device specified by the proxy initiator device in the proxy sensing request message based on the standard wireless network protocol to perform wireless sensing measurements to obtain sensing measurement results based on wireless sounding signals communicated among the proxy responder device and the plurality of sensing responder devices;

in response to the proxy sensing request message from the proxy initiator device, a respective sensing measurement setup request message is wirelessly transmitted by the proxy responder device to each respective particular proxy-initiator-selected sensing responder device of the number of particular proxy-initiator-selected sensing responder devices specified by the proxy initiator device in the proxy sensing request message wherein a third bit pattern in a third field in the respective sensing measurement setup request message is used by the proxy responder device to request the respective particular proxy-initiator-selected sensing responder device to start a sensing session to perform the wireless sensing measurements;

in response to the respective sensing measurement setup request message from the proxy responder device, a sensing measurement setup response message is wirelessly transmitted by the particular proxy-initiator-selected sensing responder device to the proxy responder device using a fourth bit pattern of a fourth field of the sensing measurement setup response message to agree to start the sensing session to perform the wireless sensing measurements; and in response to the proxy sensing request message from the proxy initiator device and the respective sensing measurement setup response message from each of the number of particular proxy-initiator-selected sensing responder devices, wirelessly transmitting the proxy sensing response message with the first bit pattern in the first field by the proxy responder device to the proxy initiator device.

27. The standardized proxy wireless sensing system of claim 26, wherein:

a sensing measurement parameter is specified in a sixth bit pattern in a sixth field in the respective sensing measurement setup request message transmitted to each respective one of the number of particular proxy-initiator-selected sensing responder devices by the proxy responder device;

the wireless sensing measurements are performed based on the standard wireless network protocol according to the sensing measurement parameter by the respective particular proxy-initiator-selected sensing responder device based on wireless sounding signals communicated by the respective particular proxy-initiator-selected sensing responder device;

a requested parameter related to the sensing measurement parameter is specified by the proxy initiator device in the proxy sensing request message to the proxy responder device; and the requested parameter in the proxy sensing request message transmitted from the proxy initiator device to the proxy responder device is equivalent to the sensing measurement parameter in the respective sensing measurement setup request message transmitted from the proxy responder device to each of the number of particular proxy-initiator-selected sensing responder devices.

28. The standardized proxy wireless sensing system of claim 27, wherein:

respective wireless sensing measurements are performed by respective particular proxy-initiator-selected sensing responder device based on the standard wireless network protocol by:

functioning as a sensing receiver device by the respective particular proxy-initiator-selected sensing responder device according to the sensing measurement parameter, receiving wireless sounding signals from a sensing transmitter device in the plurality of sensing responder devices by the respective particular proxy-initiator-selected sensing responder device, generating sensing measurement results by the respective particular proxy-initiator-selected sensing responder device based on the received wireless sounding signals, and providing the sensing measurement results by the respective particular proxy-initiator-selected sensing responder device locally from either a physical (PHY) layer or a medium access control (MAC) layer of the respective particular proxy-initiatorselected sensing responder device to at least one higher layer of the respective particular proxy-initiator-selected sensing responder device, or non-locally from the respective particular proxy-initiator-selected sensing responder device via the proxy responder device to the proxy initiator device; and a sensing task is performed to produce a sensing task result based on the sensing measurement results provided by the respective particular proxy-initiator-selected sensing responder device.

29. A proxy responder device in a standardized proxy wireless sensing system, comprising:

a memory;

a receiver communicatively coupled to the memory and configured to:

wirelessly receive, from a proxy initiator device based on a standard wireless network protocol, a proxy sensing request message requesting the proxy responder device to, as a proxy of the proxy initiator device, perform wireless sensing on its behalf with a plurality of sensing responder devices comprising a number of particular proxy-initiator-selected sensing responder devices specified and requested by the proxy initiator device in the proxy sensing request message, wherein the number of particular proxy-initiator-selected sensing responder devices are selected by the proxy initiator device, wherein the proxy responder device is requested to perform the wireless sensing by functioning as a sensing initiator device to initiate sensing sessions with the plurality of sensing responder devices comprising the number of particular proxy-initiator-selected sensing responder devices selected and identified by the proxy initiator device based on the standard wireless network protocol to perform wireless sensing measurements to obtain sensing measurement results based on wireless sounding signals communicated among the plurality of sensing responder devices and the proxy responder device functioning as the sensing initiator device; and a processor communicatively coupled to the receiver and the memory, and configured to:

transmit a sensing measurement setup request message to each of the number of particular proxy-initiator-selected sensing responder devices in response to the proxy sensing request message from the proxy initiator device, and in response to the proxy sensing request message from the proxy initiator device, initiate a respective particular sensing session by the proxy responder device functioning as the sensing initiator device with each respective particular proxy-initiator-selected sensing responder device of the number of particular proxy-initiator-selected sensing responder devices selected and identified by the proxy initiator device in the proxy sensing request message to perform particular wireless sensing measurements to obtain particular sensing measurement results based on particular wireless sounding signals communicated by the respective particular proxy-initiator-selected sensing responder device, wherein:

the respective particular proxy-initiator-selected sensing responder device provides a report in a report frame either (1) non-locally to the sensing initiator device, or (2) locally from a physical (PHY) layer or a medium access control (MAC)

layer of the respective particular proxy-initiator-selected sensing responder device to a higher layer of the respective particular proxy-initiator-selected sensing responder device, or (3) both, according to a bit pattern in a configuration field of the sensing measurement setup request message based on the standard wireless network protocol, when the configuration field has a first-type bit pattern, the report is provided locally to the higher layer of the particular proxy-initiator-selected sensing responder device in a first reporting way but not to any device other than the particular proxy-initiator-selected sensing responder device, according to the standard wireless network protocol, and when the configuration field has a second-type bit pattern, the report is provided both locally to the higher layer of the particular proxy-initiator-selected sensing responder device in the first reporting way and non-locally to the sensing initiator device other than the particular proxy-initiator-selected sensing responder device in a second reporting way different from the first reporting way, according to the standard wireless network protocol.

30. The proxy responder device of claim 29, wherein:

a plurality of identities (ID's) are specified in a first field of the proxy sensing request message transmitted by the proxy initiator device to the proxy responder device, the plurality of ID's comprising an identify (ID) of each of the number of particular proxy-initiator-selected sensing responder devices;

an amount of the plurality of ID's is specified in a second field of the proxy sensing request message by the proxy initiator device, wherein the amount is greater than or equal to a quantity of the number of particular proxy-initiator-selected sensing responder devices;

a first bit pattern of a third field in the proxy sensing request message is used to specify a presence, in the proxy sensing request message, of both (a) the plurality of ID's in the first field comprising the ID of the number of particular proxy-initiator-selected sensing responder devices and (b) the amount in the second field; and a second bit pattern of the third field in the proxy sensing request message is used to specify an absence, in the proxy sensing request message, of both (a) the plurality of ID's in the first field comprising the ID of the number of particular proxy-initiator-selected sensing responder devices and (b) the amount in the second field.

* * * * *